US011011781B2

(12) United States Patent
Yamada et al.

(10) Patent No.: US 11,011,781 B2
(45) Date of Patent: May 18, 2021

(54) NONAQUEOUS ELECTROLYTE SECONDARY BATTERY

(71) Applicants: THE UNIVERSITY OF TOKYO, Tokyo (JP); KABUSHIKI KAISHA TOYOTA JIDOSHOKKI, Kariya (JP)

(72) Inventors: Atsuo Yamada, Tokyo (JP); Yuki Yamada, Tokyo (JP); Yoshihiro Nakagaki, Kariya (JP); Tomoyuki Kawai, Kariya (JP); Yuki Hasegawa, Kariya (JP); Kohei Mase, Kariya (JP); Nobuhiro Goda, Kariya (JP)

(73) Assignees: THE UNIVERSITY OF TOKYO, Tokyo (JP); KABUSHIKI KAISHA TOYOTA JIDOSHOKKI, Kariya (JP)

( * ) Notice: Subject to any disclaimer, the term of this patent is extended or adjusted under 35 U.S.C. 154(b) by 465 days.

(21) Appl. No.: 15/024,415

(22) PCT Filed: Sep. 25, 2014

(86) PCT No.: PCT/JP2014/004911
§ 371 (c)(1),
(2) Date: Mar. 24, 2016

(87) PCT Pub. No.: WO2015/045387
PCT Pub. Date: Apr. 2, 2015

(65) Prior Publication Data
US 2016/0226100 A1    Aug. 4, 2016

(30) Foreign Application Priority Data

Sep. 25, 2013  (JP) .............................. JP2013-198282
Sep. 25, 2013  (JP) .............................. JP2013-198283
(Continued)

(51) Int. Cl.
*H01M 10/0568* (2010.01)
*H01M 10/0569* (2010.01)
(Continued)

(52) U.S. Cl.
CPC ....... *H01M 10/0568* (2013.01); *H01M 4/587* (2013.01); *H01M 10/0525* (2013.01);
(Continued)

(58) Field of Classification Search
CPC ......... H01M 10/0568; H01M 10/0525; H01M 10/0569; H01M 4/587
See application file for complete search history.

(56) References Cited

U.S. PATENT DOCUMENTS 5,607,485 A * 3/1997 Gozdz ........................ C08J 9/28
                                                              29/623.5
6,274,271 B1    8/2001 Koshiba et al.
(Continued)

FOREIGN PATENT DOCUMENTS

CA       2625271 A1    9/2009
CN     101164189 A    4/2008
(Continued)

OTHER PUBLICATIONS

Communication dated Jul. 19, 2018 from the Japanese Patent Office in Japanese application No. 2015-172591.
(Continued)

*Primary Examiner* — Jimmy Vo
(74) *Attorney, Agent, or Firm* — Sughrue Mion, PLLC

(57) ABSTRACT

An electrolytic solution of a nonaqueous electrolyte secondary battery contains a metal salt, and an organic solvent having a heteroatom and satisfies Is>Io, when an intensity of an original peak of the solvent is represented as Io and an intensity of a peak resulting from shifting of the original peak is represented as Is. For the negative electrode, (1) a
(Continued)

graphite whose G/D ratio of G-band and D-band peaks in a Raman spectrum is not lower than 3.5; (2) a carbon material whose crystallite size, calculated from a half width of a peak appearing at 2θ=20 degrees to 30 degrees in a X-ray diffraction profile is not larger than 20 nm; (3) silicon element and/or tin element; (4) a metal oxide configured to occlude and release lithium ions; or (5) a graphite whose ratio (long axis/short axis) is 1 to 5.

21 Claims, 64 Drawing Sheets

(30) Foreign Application Priority Data

| Sep. 25, 2013 | (JP) | JP2013-198284 |
|---|---|---|
| Sep. 25, 2013 | (JP) | JP2013-198285 |
| Sep. 25, 2013 | (JP) | JP2013-198599 |
| Mar. 27, 2014 | (JP) | JP2014-065799 |
| Mar. 27, 2014 | (JP) | JP2014-065817 |
| Sep. 12, 2014 | (JP) | JP2014-186338 |
| Sep. 12, 2014 | (JP) | JP2014-186339 |
| Sep. 12, 2014 | (JP) | JP2014-186340 |
| Sep. 12, 2014 | (JP) | JP2014-186341 |
| Sep. 12, 2014 | (JP) | JP2014-186342 |

(51) Int. Cl.
*H01M 4/587* (2010.01)
*H01M 10/0525* (2010.01)

(52) U.S. Cl.
CPC ............... *H01M 10/0569* (2013.01); *H01M 2300/0025* (2013.01); *H01M 2300/0028* (2013.01)

(56) References Cited

U.S. PATENT DOCUMENTS

| 6,294,289 | B1* | 9/2001 | Fanta | C07C 317/44 |
|---|---|---|---|---|
|  |  |  |  | 429/188 |
| 6,340,716 | B1 | 1/2002 | Armand et al. | |
| 6,365,301 | B1* | 4/2002 | Michot | C07C 45/46 |
|  |  |  |  | 359/270 |
| 6,420,070 | B1 | 7/2002 | Kasamatsu et al. | |
| 7,622,226 | B2 | 11/2009 | Takahashi | |
| 8,076,026 | B2 | 12/2011 | Muthu et al. | |
| 8,148,017 | B2 | 4/2012 | Matsui et al. | |
| 8,257,865 | B2 | 9/2012 | Suzuki et al. | |
| 8,568,931 | B2 | 10/2013 | Iwaya et al. | |
| 8,945,780 | B2 | 2/2015 | Odani et al. | |
| 8,986,880 | B2 | 3/2015 | Odani et al. | |
| 9,017,881 | B2 | 4/2015 | Lee et al. | |
| 9,590,239 | B2 | 3/2017 | Abe et al. | |
| 2002/0013381 | A1 | 1/2002 | Armand et al. | |
| 2003/0195269 | A1 | 10/2003 | Armand et al. | |
| 2004/0094741 | A1 | 5/2004 | Sato et al. | |
| 2004/0106047 | A1 | 6/2004 | Mie et al. | |
| 2005/0158631 | A1 | 7/2005 | Armand et al. | |
| 2005/0221170 | A1 | 10/2005 | Takeuchi et al. | |
| 2006/0127764 | A1 | 6/2006 | Chen et al. | |
| 2007/0031729 | A1 | 2/2007 | Sato et al. | |
| 2007/0205388 | A1 | 9/2007 | Armand et al. | |
| 2008/0076021 | A1 | 3/2008 | Takahashi | |
| 2008/0314482 | A1 | 12/2008 | Suzuki et al. | |
| 2009/0023074 | A1 | 1/2009 | Matsui et al. | |
| 2009/0130565 | A1 | 5/2009 | Matsui et al. | |
| 2009/0176164 | A1 | 7/2009 | Matsui et al. | |
| 2009/0301866 | A1 | 12/2009 | Zaghib et al. | |
| 2010/0015514 | A1 | 1/2010 | Miyagi et al. | |
| 2010/0075229 | A1 | 3/2010 | Atsuki et al. | |
| 2011/0159379 | A1* | 6/2011 | Matsumoto | H01M 4/0421 |
|  |  |  |  | 429/326 |
| 2011/0183218 | A1 | 7/2011 | Odani et al. | |
| 2011/0287325 | A1 | 11/2011 | Zaghib et al. | |
| 2011/0318647 | A1 | 12/2011 | Lee et al. | |
| 2012/0135308 | A1 | 5/2012 | Loveridge et al. | |
| 2012/0171580 | A1 | 7/2012 | Iwaya et al. | |
| 2012/0316716 | A1 | 12/2012 | Odani et al. | |
| 2013/0022861 | A1 | 1/2013 | Miyagi et al. | |
| 2013/0164618 | A1* | 6/2013 | Konishi | H01M 4/133 |
|  |  |  |  | 429/217 |
| 2014/0242458 | A1 | 8/2014 | Abe et al. | |
| 2015/0050563 | A1 | 2/2015 | Yamada et al. | |
| 2015/0243936 | A1 | 8/2015 | Miyagi et al. | |
| 2017/0040593 | A1 | 2/2017 | Miyagi et al. | |

FOREIGN PATENT DOCUMENTS

| CN | 101385183 A | 3/2009 |
|---|---|---|
| CN | 101292389 A | 9/2010 |
| CN | 101292389 B | 9/2010 |
| CN | 101882696 A | 11/2010 |
| CN | 102576905 A | 7/2012 |
| EP | 1380569 A1 | 4/2004 |
| EP | 1 906 481 A1 | 4/2008 |
| JP | 60-036315 A | 2/1985 |
| JP | 07-320783 A | 12/1995 |
| JP | 10027733 A | 1/1998 |
| JP | 10-069922 A | 3/1998 |
| JP | 11031637 A | 2/1999 |
| JP | 11-154513 A | 6/1999 |
| JP | 2000077100 A | 3/2000 |
| JP | 2001-507043 A | 5/2001 |
| JP | 2001-266878 A | 9/2001 |
| JP | 2002-203562 A | 7/2002 |
| JP | 2002-523879 A | 7/2002 |
| JP | 2003268053 A | 9/2003 |
| JP | 2004-511887 A | 4/2004 |
| JP | 2004111294 A | 4/2004 |
| JP | 2004511887 A | 4/2004 |
| JP | 2005243321 A | 9/2005 |
| JP | 2006073434 A | 3/2006 |
| JP | 2006513554 A | 4/2006 |
| JP | 2006-164759 A | 6/2006 |
| JP | 2006-164960 A | 6/2006 |
| JP | 2006-324167 A | 11/2006 |
| JP | 2007019027 A | 1/2007 |
| JP | 2007091573 A | 4/2007 |
| JP | 2007115671 A | 5/2007 |
| JP | 2007243111 A | 9/2007 |
| JP | 2008010613 A | 1/2008 |
| JP | 2008501220 A | 1/2008 |
| JP | 2008-047479 A | 2/2008 |
| JP | 2008053207 A | 3/2008 |
| JP | 2009026514 A | 2/2009 |
| JP | 2009-117334 A | 5/2009 |
| JP | 2009123474 A | 6/2009 |
| JP | 2010-097802 A | 4/2010 |
| JP | 2010073489 A | 4/2010 |
| JP | 2010225539 A | 10/2010 |
| JP | 2011-054298 A | 3/2011 |
| JP | 2011077051 A | 4/2011 |
| JP | 2011-119053 A | 6/2011 |
| JP | 2011146359 A | 7/2011 |
| JP | 2011-150958 A | 8/2011 |
| JP | 2011216480 A | 10/2011 |
| JP | 4862555 B2 | 1/2012 |
| JP | 2012-033268 A | 2/2012 |
| JP | 2012504314 A | 2/2012 |
| JP | 2012-160345 A | 8/2012 |
| JP | 2013016456 A | 1/2013 |
| JP | 2013-065493 A | 4/2013 |
| JP | 5177211 B2 | 4/2013 |
| JP | 2013065575 A | 4/2013 |
| JP | 2013-093242 A | 5/2013 |
| JP | 2013082581 A | 5/2013 |
| JP | 2013134922 A | 7/2013 |
| JP | 2013137873 A | 7/2013 |
| JP | 2013145724 A | 7/2013 |
| JP | 2013149477 A | 8/2013 |
| JP | 2013-179067 A | 9/2013 |

(56) References Cited

FOREIGN PATENT DOCUMENTS

| JP | 2013178885 A | 9/2013 |
|---|---|---|
| JP | 2014-096528 A | 5/2014 |
| KR | 10-2006-0044479 A | 5/2006 |
| KR | 10-2007-0121034 A | 12/2007 |
| KR | 1020090004841 A | 1/2009 |
| WO | 2004019356 A1 | 3/2004 |
| WO | 2004027789 A1 | 4/2004 |
| WO | 2005076299 A1 | 8/2005 |
| WO | 2006049027 A1 | 5/2006 |
| WO | 2006/115023 A1 | 11/2006 |
| WO | 2007125682 A1 | 11/2007 |
| WO | 2010130976 A1 | 11/2010 |
| WO | 2011111364 A1 | 9/2011 |

OTHER PUBLICATIONS

Communication dated Jul. 24, 2018 from the Japanese Patent Office in counterpart Japanese application No. 2015-172547.
Communication dated Jul. 24, 2018 from the Japanese Patent Office in Japanese application No. 2015-172553.
Communication dated Jul. 24, 2018 from the Japanese Patent Office in Japanese application No. 2016-131137.
Communication dated Jul. 24, 2018 from the Japanese Patent Office in Japanese application No. 2016-131147.
Notification of Reasons for Refusal issued by the Japanese Patent Office in JP 2015-192458, a divisional of JP 2014-186298, dated Nov. 20, 2018.
Seo, et al., "Electrolyte Solvation and Ionic Association II. Acetonitrile-Lithium Salt Mixtures: Highly Dissociated Salts," Journal of the Electrochemical Society; vol. 159, No. 9 (2012) pp. A1489-A1500.
Yuki Yamada et al., "Electrochemical Anomalies of Organic Solutions in Crystallinity Gap", 80th Anniversary Convention of Public Interest Incorporated Association "Electrochemical Society", Mar. 29, 2013.
Takeshi Abe et al., "Solvated Li-Ion Transfer at Interface Between Graphite and Electrolyte", Journal of the Electrochemical Society, 2004, pp. A1120-A1123, vol. 151, No. 8.
Takeshi Abe et al., "Lithium-Ion Transfer at the Interface Between Lithium-Ion Conductive Ceramic Electrolyte and Liquid Electrolyte—A Key to Enhancing the Rate Capability of Lithium-Ion Batteries", Journal of the Electrochemical Society, 2005, pp. A2151-A2154, vol. 152, No. 11.
Yuki Yamada et al., "Kinetics of Lithium Ion Transfer at the Interface between Graphite and Liquid Electrolytes: Effects of Solvent and Surface Film", Langmuir, 2009, pp. 12766-12770, vol. 25, No. 21.
Makoto Yaegashi, "Developing New Functions of Organic Solutions by Controlling Coordination State of Solvents", Abstracts the 53rd Battery Symposium in Japan, The Committee of Battery Technology, The Electrochemical Society of Japan, Nov. 13, 2012, pp. 507.
International Search Report for PCT/JP2014/004911 dated Dec. 9, 2014.
Written Opinion for PCT/JP2014/004911 dated Dec. 9, 2014.
Japanese Office Action for JP 2014-186338 dated Apr. 2, 2015.
Japanese Office Action for JP 2014-186339 dated Apr. 2, 2015.
Japanese Office Action for JP 2014-186340 dated Dec. 2, 2014.
Japanese Office Action for JP 2014-186341 dated Dec. 2, 2014.
Japanese Office Action for JP 2014-186342 dated Apr. 2, 2015.
Jun-ichi Yamaki, "Thermal Stability of Materials Used in Lithium-Ion Cells", Netsu Sokutei 30 (1) 3-8, (2003) The Japan Society of Calorimetry and Thermal Analysis., p. 3 only.
Yuki Yamada et al., "Electrochemical Lithium Intercalation into Graphite in Dimethyl Sulfoxide-Based Electrolytes: Effect of Solvation Structure of Lithium Ion," Journal of Physical Chemistry, 2010, vol. 114, p. 11680-11685 (3 pages total).
Han et al., "Lithium bis(flourosulfonyl)imide (LiFSI) as conducting salt for nonaqueous liquid electrolytes for lithium-ion batteries: Physiochemical and electrochemical properties," Journal of Power Sources 196 (2011) 3623-3632.

Kramer et al., "Dependency of Aluminum Collector Corrosion of Lithium Ion Batteries on the Electrolyte Solvent," ECS Electrochemistry Letters, 1(5) C9-C11 (2012).
M. Yaegashi et al., "Increasing Both Cathodic and Anodic Stability of Ether-Based Electrolyte for Lithium-Ion Batteries", The Electrochemical Society of Japan Dai 79 Kai Taikai Koen Yoshishu, Mar. 29, 2012 (Mar. 29, 2012), p. 83 (6 pages total).
Y. Yamada et al., "Kinetics of Lithium Ion Transfer at the Interface between Graphite and Liquid Electrolytes: Effects of Solvent and Surface Film," Langmuir, (2009) 25 (21), 12766-12770 (6 pages total).
Communication dated Mar. 3, 2017 issued by the Canadian Intellectual Property Office in counterpart Canadian Application No. 2,925,379.
U.S. Appl. No. 15/024,380, Atsuo Yamada, filed Mar. 24, 2016.
U.S. Appl. No. 15/024,436, Atsuo Yamada, filed Mar. 24, 2016.
U.S. Appl. No. 15/024,418, Atsuo Yamada, filed Mar. 24, 2016.
U.S. Appl. No. 15/024,654, Atsuo Yamada, filed Mar. 24, 2016.
Communication dated Mar. 8, 2017, issued from the European Patent Office in corresponding European Application No. 14848198.9.
Communication dated Aug. 30, 2018 from the Japanese Patent Office in application No. 2015-172655.
Communication dated Sep. 20, 2018 from the Japanese Patent Office in application No. 2015-192458.
Furukawa et al., "Li-Air Battery Using Stabilized Acetonitrile Electrokyte", Abstracts the 53rd Battery Symposium in Japan, The Committee of Battery Technology, The Electrochemical Society of Japan, 2012, p. 455 (3 pages).
Communication dated Jun. 1, 2017 from the State Intellectual Property Office of the P.R.C. in counterpart Application No. 201480053195.4.
Communication dated Jun. 9, 2017 from the State Intellectual Property Office of the P.R.C. in counterpart Application No. 201480053185.0.
Communication dated Jun. 2, 2017 from the State Intellectual Property Office of the P.R.C. in counterpart Application No. 201480053187.X.
Communication dated Jun. 1, 2017 from the State Intellectual Property Office of the P.R.C. in counterpart Application No. 201480053188.4.
Lifei Li et al., "Transport and Electrochemical Properties and Spectral Features of Non-Aqueous Electrolytes Containing LiFSI in Linear Carbonate Solvents", Journal of the Electrochemical Society, vol. 158, No. 2, 2011, pp. A74-A82 (9 pages total).
Lifei, L., et al., "Transport and Electrochemical Properties and Spectral Features of Non-Aqueous Electrolytes Containing LiFSI in Linear Carbonate Solvents", Journal of the Electrochemical Society, U.S.A., vol. 158, issue 2, 2011, pp. A74-A82 (9 pages).
Communication dated Apr. 11, 2019, from the Japanese Patent Office in application No. 2015-192458.
Communication dated Apr. 11, 2019, from the Japanese Patent Office in application No. 2015-172553.
Communication dated May 2, 2019 from the United States Patent and Trademark Office in U.S. Appl. No. 15/993,729.
Yamada, Yuki et al., "A Superconcentrated Ether Electrolyte for Fast-Charging Li-Ion Batteries", The Royal Society of Chemistry: Chemical Communications, vol. 49, No. 95, 2013, pp. 11194-11196, doi: 10.1039/c3cc46665e (3 pages).
Communication dated Aug. 14, 2019 from the United States Patent and Trademark Office in U.S. Appl. No. 15/024,380.
Communication dated Nov. 15, 2019, from United States Patent and Trademark Office in U.S. Appl. No. 15/993,729.
Communication dated Mar. 3, 2020, from United States Patent and Trademark Office in U.S. Appl. No. 15/024,436.
Wang et al., "Conversion of carbohydrates into 5-hydroxymethylfurfural in an advanced single-phase reaction system consisting of water and 1,2-dimethoxyethane", RSC Advances, 2015, vol. 5, No. 102, pp. 84014-84021 (8 pages total).
Communication dated Apr. 13, 2020, from United States Patent and Trademark Office in U.S. Appl. No. 15/024,380 (16 pages total).
'SciFinder—CAS Registry No. 213195-23-4'. SciFinder [online], 2020, [retrieved on Apr. 7, 2020]. Retrieved from the Internet:

(56) References Cited

OTHER PUBLICATIONS

<URL: https://scifinder.cas.org/scifinder/view/link_v1/substance.html?I=t7c60yhXV6u1SNfs-Mvwca4zCgqKkIZY3EVcwfP34mLvcIP_rO7WqVQFqvw3k1FL>. (Year: 2020) (3 pages total).

Communication dated Oct. 8, 2020, from the United States Patent and Trademark Office in U.S. Appl. No. 15/024,380.

Kazuki Yoshida et al., "Electrode Kinetics and Ion Transport Mechanism in Glyme-Li salts Complexes", battery debate lecture gists, Japan, and Inaba, In Committee of Battery Technology, Electrochemical Society of Japan, 2013, with restriction of p. 160 (6 pages).

Akihiro Orita, "Development of high safety energy devices with ionic liquids and proposals for new electrochemical reaction models", National University Corporation Yokohama National University graduate school engineering prefecture With restriction of doctoral dissertation, Japan, Sep. 24, 2012, shell No. 1491 p. 101-103 (9 pages).

Kazuki Yoshida et al., "Oxidative-Stability Enhancement and Charge Transport Mechanism in Glyme-Lithium Salt Equimolar Complexes", Journal of the American Chemical Society, the U.S., American Chemical Society, 2011, No. 133, p. 13121-13126 (9 pages).

Notification of Reasons for Refusal dated Dec. 6, 2018, issued by the Japanese Patent Office in JP 2015-172655.

Communication dated Jun. 10, 2019, issued by the U.S. Patent and Trademark Office in U.S. Appl. No. 15/024,418.

Communication dated Jul. 10, 2017, from United States Patent and Trademark Office in U.S. Appl. No. 15/024,654.

Communication dated Mar. 7, 2018, from United States Patent and Trademark Office in U.S. Appl. No. 15/024,436.

Communication dated Aug. 31, 2018, from United States Patent and Trademark Office in U.S. Appl. No. 15/024,380.

Communication dated Jan. 24, 2019, from United States Patent and Trademark Office in U.S. Appl. No. 15/024,380.

Communication dated Jan. 31, 2019, from United States Patent and Trademark Office in U.S. Appl. No. 15/024,418.

Communication dated Aug. 24, 2017, from Korean Intellectual Property Office in application No. 10-2016-7010618.

Communication dated Aug. 22, 2017, from Korean Intellectual Property Office in application No. 10-2016-7010614.

Communication dated Sep. 28, 2017, from Korean Intellectual Property Office in counterpart application No. 10-2016-7010615.

Communication dated Aug. 24, 2017, from Korean Intellectual Property Office in application No. 10-2016-7010619

Communication dated Aug. 24, 2017, from Korean Intellectual Property Office in application No. 10-2016-7010617.

Kazuki Yoshida et al., "Oxidative-Stability Enhancement and Charge Transport Mechanism in Glyme-Lithium Salt Equimolar Complexes", Journal of the American Chemical Society, the U.S., American Chemical Society, 2011, No. 133, p. 13121-13129 (9 pages).

\* cited by examiner

Voltage / V

Example 3-2 ; (Si-C complex : graphite : PAI = 75:15:10)
Comparative Example 3-2 ; (Si-C complex : graphite : PAI = 75:15:10)

NONAQUEOUS ELECTROLYTE SECONDARY BATTERY

CROSS REFERENCE TO RELATED APPLICATIONS

This application is a National Stage of International Application No. PCT/JP2014/004911 filed Sep. 25, 2014, claiming priority based on Japanese Patent Application Nos. 2013-198282, 2013-198283, 2013-198284, 2013-198285, and 2013-198599 filed Sep. 25, 2013, 2014-065817 and 2014-065799 filed Mar. 27, 2014, 2014-186338, 2014-186339, 2014-186340, 2014-186341 and 2014-186342 filed Sep. 12, 2014, the contents of all of which are incorporated herein by reference in their entirety.

TECHNICAL FIELD

The present invention relates to a nonaqueous electrolyte secondary battery such as a lithium ion secondary battery.

BACKGROUND ART

For example, lithium ion secondary batteries are secondary batteries capable of having a high charge/discharge capacity and achieving high output. Currently, lithium ion secondary batteries are mainly used as power supplies for portable electronic equipment, notebook personal computers, and electric vehicles. Thus, a secondary battery that is smaller and lighter has been demanded. In particular, for use in automobiles, since charging and discharging with large current have to be conducted, development of a secondary battery having high rate characteristics capable of high-speed charging/discharging is demanded.

Lithium ion secondary batteries have, respectively on a positive electrode and a negative electrode, active materials capable of inserting and eliminating lithium (Li) therein/therefrom. The batteries operate when lithium ions move through an electrolytic solution sealed between the two electrodes. In order to achieve high rate, improvement of binders and active materials used in the positive electrode and/or the negative electrode and improvement in the electrolytic solution are necessary.

As a negative electrode active material for lithium ion secondary batteries, carbon materials such as graphite are widely used. In order to enable reversible insertion and elimination of lithium ions with respect to the negative electrode active material, nonaqueous carbonate based solvents such as cyclic esters and linear esters are used in the electrolytic solution. However, significant improvement in rate characteristics has been considered difficult when a carbonate based solvent is used. More specifically, as described in Non-Patent Literature 1 to 3, with a carbonate based solvent such as ethylene carbonate and propylene carbonate, activation barrier of electrode reaction is large, and a fundamental review of the composition of the solvent in the electrolytic solution has been considered necessary for improving rate characteristics.

CITATION LIST

Non-Patent Literature

Non-Patent Literature 1: T. Abe et al., J. Electrochem. Soc., 151, A1120-A1123 (2004).
Non-Patent Literature 2: T. Abe et al., J. Electrochem. Soc., 152, A2151-A2154 (2005).
Non-Patent Literature 3: Y. Yamada et al., Langmuir, 25, 12766-12770 (2009).

SUMMARY OF INVENTION

Technical Problem

The present invention has been made in view of the above described circumstances, and a main problem to be solved by the present invention is to seek improvement of battery characteristics by an optimum combination of an electrolytic solution and a negative electrode active material.

Solution to Problem

Hereinafter, if necessary, "an electrolytic solution containing a salt whose cation is an alkali metal, an alkaline earth metal, or aluminum, and an organic solvent having a heteroelement, and satisfying, regarding an intensity of a peak derived from the organic solvent in a vibrational spectroscopy spectrum, Is>Io when an intensity of an original peak of the organic solvent is represented as Io and an intensity of a peak resulting from shifting of the original peak is represented as Is" is sometimes referred to as "an electrolytic solution of the present invention."

A feature of a nonaqueous electrolyte secondary battery (1) of the present invention solving the above described problem is including: the electrolytic solution of the present invention; and a negative electrode having a negative electrode active material layer including a graphite whose G/D ratio, which is a ratio of G-band and D-band peaks in a Raman spectrum, is not lower than 3.5. In the present invention, "G/D ratio is not lower than 3.5" refers to either an area ratio or a height ratio of G-band and D-band peaks in a Raman spectrum being not lower than 3.5, and particularly refers to a height ratio of said peaks being not lower than 3.5.

A feature of a nonaqueous electrolyte secondary battery (2) of the present invention solving the above described problem is including: the electrolytic solution of the present invention; and a negative electrode having a negative electrode active material layer that includes a carbon material whose crystallite size, calculated from a half width of a peak appearing at 2θ=20 degrees to 30 degrees in a X-ray diffraction profile measured by X-ray diffraction method, is not larger than 20 nm.

A feature of a nonaqueous electrolyte secondary battery (3) of the present invention solving the above described problem is including: the electrolytic solution of the present invention; and a negative electrode including a negative electrode active material that includes silicon element and/or tin element.

A feature of a nonaqueous electrolyte secondary battery (4) of the present invention solving the above described problem is including: the electrolytic solution of the present invention; and a negative electrode including, as a negative electrode active material, a metal oxide configured to occlude and release lithium ions.

A feature of a nonaqueous electrolyte secondary battery (5) of the present invention solving the above described problem is including: the electrolytic solution of the present invention; and a negative electrode having a negative electrode active material layer that includes a graphite whose ratio (long axis/short axis) of long axis to short axis is 1 to 5.

Advantageous Effects of Invention

With the nonaqueous electrolyte secondary battery of the present invention, battery characteristics improve.

DESCRIPTION OF EMBODIMENTS

Figure 1:
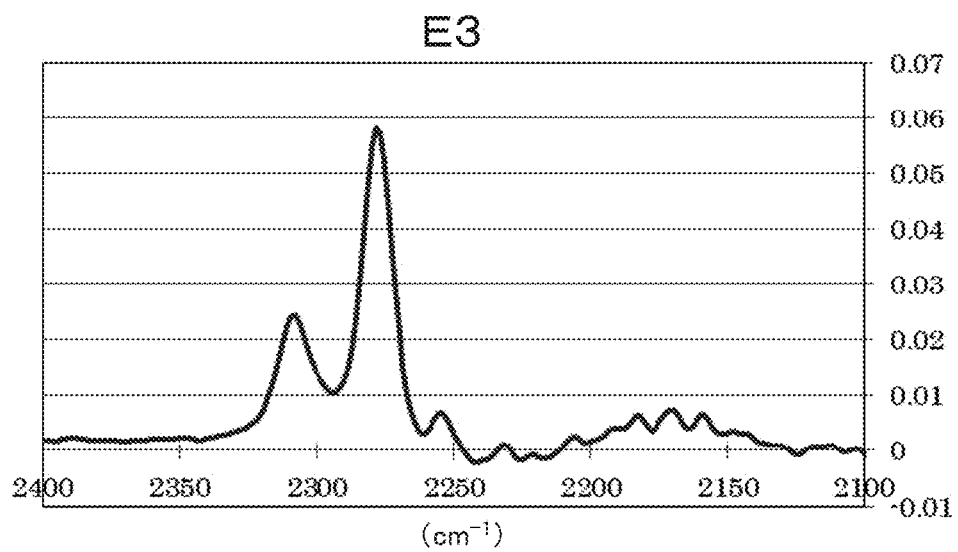
FIG. 1 is an IR spectrum of electrolytic solution E3.

The following describes embodiments of the present invention. Unless mentioned otherwise in particular, a numerical value range of "a to b" described in the present application includes, in the range thereof, a lower limit "a" and an upper limit "b." A numerical value range can be formed by arbitrarily combining such upper limit values, lower limit values, and numerical values described in Examples. In addition, numerical values arbitrarily selected within the numerical value range can be used as upper limit and lower limit numerical values.

The nonaqueous electrolyte secondary battery of the present invention seeks improvement of battery characteristics by an optimum combination of an electrolytic solution and a negative electrode active material. Thus, no particular limitation exists for other battery components such as, for example, positive electrodes. In addition, no particular limitation exists also for charge carriers in the nonaqueous electrolyte secondary battery of the present invention. For example, the nonaqueous electrolyte secondary battery of the present invention may be a nonaqueous electrolyte secondary battery whose charge carrier is lithium (e.g., a lithium secondary battery, a lithium ion secondary battery), or a nonaqueous electrolyte secondary battery whose charge carrier is sodium (e.g., a sodium secondary battery, a sodium ion secondary battery).

A main problem to be solved by the nonaqueous electrolyte secondary battery (1) of the present invention is to seek improvement of rate capacity characteristics and improvement of cycle characteristics by an optimum combination of the electrolytic solution and the negative electrode active material. The nonaqueous electrolyte secondary battery (1) of the present invention includes the electrolytic solution of the present invention, and a negative electrode having a negative electrode active material layer including a graphite whose G/D ratio, which is a ratio of G-band and D-band peaks in a Raman spectrum, is not lower than 3.5. The nonaqueous electrolyte secondary battery (1) of the present invention as described above is a nonaqueous electrolyte secondary battery having improved rate capacity characteristics and cycle characteristics. When a graphite whose G/D ratio is lower than 3.5 is used as the negative electrode active material, achieving both rate capacity and cycle characteristics is difficult even when the same electrolytic solution of the present invention is used. However, by using a graphite whose G/D ratio is not lower than 3.5 as the negative electrode active material, improvements in rate capacity characteristics and also in cycle characteristics are achieved.

A main problem to be solved by the nonaqueous electrolyte secondary battery (2) of the present invention is to improve rate capacity characteristics by an optimum combination of the electrolytic solution and the negative electrode active material. The nonaqueous electrolyte secondary battery (2) of the present invention includes the electrolytic solution of the present invention, and a negative electrode having a negative electrode active material layer that includes a carbon material whose crystallite size is not larger than 20 nm. The nonaqueous electrolyte secondary battery (2) of the present invention as described above can, by including a carbon material satisfying 2θ=20 degrees to 30 degrees as the negative electrode active material, achieve high rates compared to a nonaqueous electrolyte secondary battery using a general electrolytic solution.

A main problem to be solved by the nonaqueous electrolyte secondary battery (3) of the present invention is to seek improvement of battery characteristics of a nonaqueous electrolyte secondary battery by using silicon (Si) and tin (Sn) as the negative electrode active material for the nonaqueous electrolyte secondary battery. The nonaqueous electrolyte secondary battery (3) of the present invention includes the electrolytic solution of the present invention, and a negative electrode including silicon element and/or tin element in the negative electrode active material. When the negative electrode active material including silicon and/or tin, and carbon is used in combination with the electrolytic solution of the present invention; the nonaqueous electrolyte secondary battery (3) of the present invention as described above exerts excellent battery characteristics as a result of synergy between an effect derived from the negative electrode active material and an effect derived from the electrolytic solution.

A main problem to be solved by the nonaqueous electrolyte secondary battery (4) of the present invention is to provide a nonaqueous electrolyte secondary battery that has excellent energy density and charging/discharging efficiency by using a metal oxide as a negative electrode active material. For example, as disclosed in JP2012160345 (A), technologies using a metal oxide configured to occlude and release lithium ions as a negative electrode active material for a nonaqueous electrolyte secondary battery are known. As a type of such a metal oxide, for example, lithium titanate is known. In a nonaqueous electrolyte secondary battery whose negative electrode is lithium titanate, reactions for occluding and releasing lithium are thought to occur stably, and, as a result, degradation of an active material is thought to be suppressed. Thus, a nonaqueous electrolyte secondary battery having this type of metal oxide as the negative electrode active material is known to have excellent cycle characteristics. On the other hand, the nonaqueous electrolyte secondary battery having this type of metal oxide as the negative electrode active material is known to have small energy density in the negative electrode when compared to a nonaqueous electrolyte secondary battery using a carbon based negative electrode active material such as graphite. Thus, development of a nonaqueous electrolyte secondary battery that includes a metal oxide as the negative electrode active material and has further improved battery characteristics has been demanded. The nonaqueous electrolyte secondary battery (4) of the present invention uses a metal oxide as the negative electrode active material and is excellent in battery characteristics.

The nonaqueous electrolyte secondary battery (5) of the present invention includes the electrolytic solution of the present invention, and a negative electrode having a negative electrode active material layer that includes a graphite whose ratio (long axis/short axis) of long axis to short axis is 1 to 5. The nonaqueous electrolyte secondary battery (5) of the present invention as described above is a nonaqueous electrolyte secondary battery having further improved input-output characteristics. More specifically, when the electrolytic solution of the present invention is used, input-output characteristics of a nonaqueous electrolyte secondary battery improve. Furthermore, in addition to the electrolytic solution of the present invention, by using the graphite whose ratio (long axis/short axis) of long axis to short axis is 1 to 5 as the negative electrode active material, input-output characteristics of a nonaqueous electrolyte secondary battery are further improved.

<Electrolytic Solution>

The electrolytic solution of the present invention contains a salt (hereinafter, sometimes referred to as "metal salt" or simply "salt") whose cation is an alkali metal, an alkaline earth metal, or aluminum, and an organic solvent having a heteroatom. Regarding an intensity of an original peak of the organic solvent in a vibrational spectroscopy spectrum, the electrolytic solution satisfies Is>Io when an intensity of an original peak of the organic solvent is represented as Io and an intensity of a peak resulting from wave-number shifting of the original peak of the organic solvent is represented as Is.

The relationship between Is and Io in a conventional electrolytic solution is Is<Io.

[Metal Salt]

The metal salt may be a compound used as an electrolyte, such as $LiClO_4$, $LiAsF_6$, $LiPF_6$, $LiBF_4$, and $LiAlCl_4$ ordinarily contained in an electrolytic solution of a battery. Examples of a cation of the metal salt include alkali metals such as lithium, sodium, and potassium, alkaline earth metals such as beryllium, magnesium, calcium, strontium, and barium, and aluminum. The cation of the metal salt is preferably a metal ion identical to a charge carrier of the battery in which the electrolytic solution is used. For example, when the electrolytic solution of the present invention is to be used as an electrolytic solution for lithium ion secondary batteries, the cation of the metal salt is preferably lithium.

The chemical structure of an anion of the salt may include at least one element selected from a halogen, boron, nitrogen, oxygen, sulfur, or carbon. Specific examples of the chemical structure of the anion including a halogen or boron include: $ClO_4$, $PF_6$, $AsF_6$, $SbF_6$, $TaF_6$, $BF_4$, $SiF_6$, $B(C_6H_5)_4$, $B(oxalate)_2$, Cl, Br, and I.

The chemical structure of the anion including nitrogen, oxygen, sulfur, or carbon is described specifically in the following.

The chemical structure of the anion of the salt is preferably a chemical structure represented by the following general formula (1), general formula (2), or general formula (3).

$$(R^1X^1)(R^2X^2)N \qquad \text{General Formula (1)}$$

($R^1$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$R^2$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

Furthermore, $R^1$ and $R^2$ optionally bind with each other to form a ring.

$X^1$ is selected from $SO_2$, C=O, C=S, $R^aP$=O, $R^bP$=S, S=O, or Si=O.

$X^2$ is selected from $SO_2$, C=O, C=S, $R^cP$=O, $R^dP$=S, S=O, or Si=O.

$R^a$, $R^b$, $R^c$, and $R^d$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

In addition, $R^a$, $R^b$, $R^c$, and $R^d$ each optionally bind with $R^1$ or $R^2$ to form a ring.)

$$R^3X^3Y \qquad \text{General Formula (2)}$$

($R^3$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$X^3$ is selected from $SO_2$, C=O, C=S, $R^eP$=O, $R^fP$=S, S=O, or Si=O.

$R^e$ and $R^f$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

In addition, $R^e$ and $R^f$ each optionally bind with $R^3$ to form a ring.

Y is selected from O or S.)

$$(R^4X^4)(R^5X^5)(R^6X^6)C \qquad \text{General Formula (3)}$$

($R^4$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$R^5$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$R^6$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

In addition, any two or three of $R^4$, $R^5$, and $R^6$ optionally bind with each other to form a ring.

$X^4$ is selected from $SO_2$, C=O, C=S, $R^gP$=O, $R^hP$=S, S=O, or Si=O.

$X^5$ is selected from $SO_2$, C=O, C=S, $R^iP$=O, $R^jP$=S, S=O, or Si=O.

$X^6$ is selected from $SO_2$, C=O, C=S, $R^kP$=O, $R^lP$=S, S=O, or Si=O.

$R^g$, $R^h$, $R^i$, $R^j$, $R^k$, and $R^l$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

In addition, $R^g$, $R^h$, $R^i$, $R^j$, $R^k$, and $R^l$ each optionally bind with $R^4$, $R^5$, or $R^6$ to form a ring.)

The wording of "optionally substituted with a substituent group" in the chemical structures represented by the above described general formulae (1) to (3) is to be described. For example, "an alkyl group optionally substituted with a substituent group" refers to an alkyl group in which one or more hydrogen atoms of the alkyl group is substituted with a substituent group, or an alkyl group not including any particular substituent groups.

Examples of the substituent group in the wording of "optionally substituted with a substituent group" include alkyl groups, alkenyl groups, alkynyl groups, cycloalkyl groups, unsaturated cycloalkyl groups, aromatic groups, heterocyclic groups, halogens, OH, SH, CN, SCN, OCN, nitro group, alkoxy groups, unsaturated alkoxy groups, amino group, alkylamino groups, dialkylamino groups, aryloxy groups, acyl groups, alkoxycarbonyl groups, acyloxy groups, aryloxycarbonyl groups, acyloxy groups, acylamino groups, alkoxycarbonylamino groups, aryloxycarbonylamino groups, sulfonylamino groups, sulfamoyl groups, carbamoyl group, alkylthio groups, arylthio groups, sulfonyl group, sulfinyl group, ureido groups, phosphoric acid amide groups, sulfo group, carboxyl group, hydroxamic acid groups, sulfino group, hydrazino group, imino group, and silyl group, etc. These substituent groups may be further substituted. In addition, when two or more substituent groups exist, the substituent groups may be identical or different from each other.

The chemical structure of the anion of the salt is more preferably a chemical structure represented by the following general formula (4), general formula (5), or general formula (6).

$(R^7X^7)(R^8X^8)N$    General Formula (4)

($R^7$ and $R^8$ are each independently 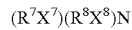$C_nH_aF_bCl_cBr_dI_e(CN)_f(SCN)_g(OCN)_h$.

"n," "a," "b," "c," "d," "e," "f," "g," and "h" are each independently an integer not smaller than 0, and satisfy 2n+1=a+b+c+d+e+f+g+h.

In addition, $R^7$ and $R^8$ optionally bind with each other to form a ring, and, in that case, satisfy 2n=a+b+c+d+e+f+g+h.

$X^7$ is selected from $SO_2$, C=O, C=S, $R^mP$=O, $R^nP$=S, S=O, or Si=O.

$X^8$ is selected from $SO_2$, C=O, C=S, $R^oP$=O, $R^pP$=S, S=O, or Si=O.

$R^m$, $R^n$, $R^o$, and $R^p$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

In addition, $R^m$, $R^n$, $R^o$, and $R^p$ each optionally bind with $R^7$ or $R^8$ to form a ring.)

$R^9X^9Y$    General Formula (5)

($R^9$ is $C_nH_aF_bCl_cBr_dI_e(CN)_f(SCN)_g(OCN)_h$.

"n," "a," "b," "c," "d," "e," "f," "g," and "h" are each independently an integer not smaller than 0, and satisfy 2n+1=a+b+c+d+e+f+g+h.

$X^9$ is selected from $SO_2$, C=O, C=S, $R^qP$=O, $R^rP$=S, S=O, or Si=O.

$R^q$ and $R^r$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

In addition, $R^q$ and $R^r$ each optionally bind with $R^9$ to form a ring.

Y is selected from O or S.)

$(R^{10}X^{10})(R^{11}X^{11})(R^{12}X^{12})C$    General Formula (6)

($R^{10}$, $R^{11}$, and $R^{12}$ are each independently $C_nH_aF_bCl_cBr_dI_e(CN)_f(SCN)_g(OCN)_h$.

"n," "a," "b," "c," "d," "e," "f," "g," and "h" are each independently an integer not smaller than 0, and satisfy $2n+1=a+b+c+d+e+f+g+h$.

Any two of $R^{10}$, $R^{11}$, and $R^{12}$ optionally bind with each other to form a ring, and in that case, groups forming the ring satisfy $2n=a+b+c+d+e+f+g+h$. In addition, the three of $R^{10}$, $R^{11}$, and $R^{12}$ optionally bind with each other to form a ring, and, in that case, two groups satisfy $2n=a+b+c+d+e+f+g+h$ and one group satisfies $2n-1=a+b+c+d+e+f+g+h$.

$X^{10}$ is selected from $SO_2$, C=O, C=S, $R^sP$=O, $R^tP$=S, S=O, or Si=O.

$X^{11}$ is selected from $SO_2$, C=O, C=S, $R^uP$=O, $R^vP$=S, S=O, or Si=O.

$X^{12}$ is selected from $SO_2$, C=O, C=S, $R^wP$=O, $R^xP$=S, S=O, or Si=O.

$R^s$, $R^t$, $R^u$, $R^v$, $R^w$, and $R^x$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

In addition, $R^s$, $R^t$, $R^u$, $R^v$, $R^w$, and $R^x$ each optionally bind with $R^{10}$, $R^{11}$, or $R^{12}$ to form a ring.)

In the chemical structures represented by the general formulae (4) to (6), the meaning of the wording of "optionally substituted with a substituent group" is synonymous with that described for the general formulae (1) to (3).

In the chemical structures represented by the general formulae (4) to (6), "n" is preferably an integer from 0 to 6, more preferably an integer from 0 to 4, and particularly preferably an integer from 0 to 2. In the chemical structures represented by the general formulae (4) to (6), when $R^7$ and $R^8$ bind with each other or $R^{10}$, $R^{11}$, and $R^{12}$ bind with each other to form a ring; "n" is preferably an integer from 1 to 8, more preferably an integer from 1 to 7, and particularly preferably an integer from 1 to 3.

The chemical structure of the anion of the salt is more preferably one that is represented by the following general formula (7), general formula (8), or general formula (9).

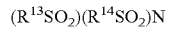     General Formula (7)

($R^{13}$ and $R^{14}$ are each independently $C_nH_aF_bCl_cBr_dI_e$.

"n," "a," "b," "c," "d," and "e" are each independently an integer not smaller than 0, and satisfy $2n+1=a+b+c+d+e$.

In addition, $R^{13}$ and $R^{14}$ optionally bind with each other to form a ring, and, in that case, satisfy $2n=a+b+c+d+e$.)

     General Formula (8)

($R^{15}$ is $C_nH_aF_bCl_cBr_dI_e$.

"n," "a," "b," "c," "d," and "e" are each independently an integer not smaller than 0, and satisfy $2n+1=a+b+c+d+e$.)

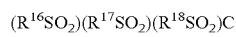     General Formula (9)

($R^{16}$, $R^{17}$, and $R^{18}$ are each independently $C_nH_aF_bCl_cBr_dI_e$.

"n," "a," "b," "c," "d," and "e" are each independently an integer not smaller than 0, and satisfy $2n+1=a+b+c+d+e$.

Any two of $R^{16}$, $R^{17}$, and $R^{18}$ optionally bind with each other to form a ring, and, in that case, groups forming the ring satisfy $2n=a+b+c+d+e$. In addition, the three of $R^{16}$, $R^{17}$, and $R^{18}$ optionally bind with each other to form a ring, and, among the three in that case, two groups satisfy $2n=a+b+c+d+e$ and one group satisfies $2n-1=a+b+c+d+e$.)

In the chemical structures represented by the general formulae (7) to (9), "n" is preferably an integer from 0 to 6, more preferably an integer from 0 to 4, and particularly preferably an integer from 0 to 2. In the chemical structures represented by the general formulae (7) to (9), when $R^{13}$ and $R^{14}$ bind with each other or $R^{16}$, $R^{17}$, and $R^{18}$ bind with each other to form a ring; "n" is preferably an integer from 1 to 8, more preferably an integer from 1 to 7, and particularly preferably an integer from 1 to 3.

In addition, in the chemical structures represented by the general formulae (7) to (9), those in which "a," "c," "d," and "e" are 0 are preferable.

The metal salt is particularly preferably $(CF_3SO_2)_2NLi$ (hereinafter sometimes referred to as "LiTFSA"), $(F_sO_2)_2NLi$ (hereinafter sometimes referred to as "LiFSA"), $(C_2F_5SO_2)_2NLi$, $FSO_2(CF_3SO_2)NLi$, $(SO_2CF_2CF_2SO_2)NLi$, $(SO_2CF_2CF_2CF_2SO_2)NLi$, $FSO_2(CH_3SO_2)NLi$, $FSO_2(C_2F_5SO_2)NLi$, or $FSO_2(C_2H_5SO_2)NLi$.

As the metal salt, one that is obtained by combining appropriate numbers of an anion and a cation described above may be used. Regarding the metal salt, a single type may be used, or a combination of multiple types may be used.

[Organic Solvent]

As the organic solvent having a heteroelement, an organic solvent whose heteroelement is at least one selected from nitrogen, oxygen, sulfur, or a halogen is preferable, and an organic solvent whose heteroelement is at least one selected from nitrogen or oxygen is more preferable. In addition, as the organic solvent having the heteroelement, an aprotic solvent not having a proton donor group such as NH group, $NH_2$ group, OH group, and SH group is preferable.

Specific examples of "the organic solvent having the heteroelement" (hereinafter, sometimes simply referred to as "organic solvent") include nitriles such as acetonitrile, propionitrile, acrylonitrile, and malononitrile, ethers such as 1,2-dimethoxyethane, 1,2-diethoxyethane, tetrahydrofuran, 1,2-dioxane, 1,3-dioxane, 1,4-dioxane, 2,2-dimethyl-1,3-dioxolane, 2-methyltetrahydropyran, 2-methyltetrahydrofuran, and crown ethers, carbonates such as ethylene carbonate, propylene carbonate, dimethyl carbonate, diethyl carbonate, and ethyl methyl carbonate, amides such as formamide, N,N-dimethylformamide, N,N-dimethylacetamide, and N-methylpyrrolidone, isocyanates such as isopropyl isocyanate, n-propylisocyanate, and chloromethyl isocyanate, esters such as methyl acetate, ethyl acetate, propyl acetate, methyl propionate, methyl formate, ethyl formate, vinyl acetate, methyl acrylate, and methyl methacrylate, epoxies such as glycidyl methyl ether, epoxy butane, and 2-ethyloxirane, oxazoles such as oxazole, 2-ethyloxazole, oxazoline, and 2-methyl-2-oxazoline, ketones such as acetone, methyl ethyl ketone, and methyl isobutyl ketone, acid anhydrides such as acetic anhydride and propionic anhydride, sulfones such as dimethyl sulfone and sulfolane, sulfoxides such as dimethyl sulfoxide, nitros such as 1-nitropropane and 2-nitropropane, furans such as furan and furfural, cyclic esters such as γ-butyrolactone, γ-valerolactone, and δ-valerolactone, aromatic heterocycles such as thiophene and pyridine, heterocycles such as tetrahydro- 4-pyrone, 1-methylpyrrolidine, and N-methylmorpholine, and phosphoric acid esters such as trimethyl phosphate and triethyl phosphate.

Examples of the organic solvent having a heteroelement include linear carbonates represented by the following general formula (10).

$$R^{19}OCOOR^{20} \qquad \text{General Formula (10)}$$

($R^{19}$ and $R^{20}$ are each independently selected from $C_nH_aF_bCl_cBr_dI_e$ that is a linear alkyl, or $C_mH_fF_gCl_hBr_iI_j$ whose chemical structure includes a cyclic alkyl. "n," "a," "b," "c," "d," "e," "m," "f," "g," "h," "i," and "j" are each independently an integer not smaller than 0, and satisfy $2n+1=a+b+c+d+e$ and $2m=f+g+h+i+j$)

In the linear carbonates represented by the general formula (10), "n" is preferably an integer from 1 to 6, more preferably an integer from 1 to 4, and particularly preferably an integer from 1 to 2. "m" is preferably an integer from 3 to 8, more preferably an integer from 4 to 7, and particularly preferably an integer from 5 to 6. In addition, among the linear carbonates represented by the general formula (10), dimethyl carbonate (hereinafter, sometimes referred to as "DMC"), diethyl carbonate (hereinafter, sometimes referred to as "DEC"), and ethyl methyl carbonate (hereinafter, sometimes referred to as "EMC") are particularly preferable.

As the organic solvent having a heteroelement, a solvent whose relative permittivity is not smaller than 20 or that has ether oxygen having donor property is preferable, and examples of such an organic solvent include nitriles such as acetonitrile, propionitrile, acrylonitrile, and malononitrile, ethers such as 1,2-dimethoxyethane, 1,2-diethoxyethane, tetrahydrofuran, 1,2-dioxane, 1,3-dioxane, 1,4-dioxane, 2,2-dimethyl-1,3-dioxolane, 2-methyltetrahydropyran, 2-methyltetrahydrofuran, and crown ethers, N,N-dimethylformamide, acetone, dimethyl sulfoxide, and sulfolane. Among those, acetonitrile (hereinafter, sometimes referred to as "AN") and 1,2-dimethoxyethane (hereinafter, sometimes referred to as "DME") are particularly preferable.

Regarding these organic solvents, a single type may be used by itself in the electrolytic solution, or a combination of two or more types may be used.

A feature of the electrolytic solution of the present invention is, in its vibrational spectroscopy spectrum and regarding an intensity of a peak derived from the organic solvent contained in the electrolytic solution of the present invention, satisfying Is>Io when an intensity of an original peak of the organic solvent is represented as Io and an intensity of "a peak resulting from shifting of the original peak of the organic solvent" (hereinafter, sometimes referred to as "shift peak") is represented as Is. More specifically, in a vibrational spectroscopy spectrum chart obtained by subjecting the electrolytic solution of the present invention to vibrational spectroscopy measurement, the relationship between the two peak intensities is Is>Io.

Here, "an original peak of the organic solvent" refers to a peak observed at a peak position (wave number) when the vibrational spectroscopy measurement is performed only on the organic solvent. The value of the intensity Io of the original peak of the organic solvent and the value of the intensity Is of the shift peak are the heights or area sizes from a baseline of respective peaks in the vibrational spectroscopy spectrum.

In the vibrational spectroscopy spectrum of the electrolytic solution of the present invention, when multiple peaks resulting from shifting of the original peak of the organic solvent exist, the relationship may be determined based on a peak enabling determination of the relationship between Is and Io most easily. In addition, when multiple types of the organic solvent having the heteroelement are used in the electrolytic solution of the present invention, an organic solvent enabling determination of the relationship between Is and Io most easily (resulting in the largest difference between Is and Io) is selected, and the relationship between Is and Io may be determined based on the obtained peak intensity. In addition, when the peak shift amount is small and peaks before and after shifting overlap with each other to give an appearance like a smooth mountain, the relationship between Is and Io may be determined by performing peak resolution with known means.

In the vibrational spectroscopy spectrum of the electrolytic solution using multiple types of the organic solvent having the heteroelement, a peak of an organic solvent most easily coordinated with a cation (hereinafter, sometimes referred to as "preferential coordination solvent") shifts preferentially from others. In the electrolytic solution using multiple types of the organic solvent having the heteroelement, the mass % of the preferential coordination solvent with respect to the whole organic solvent having the heteroelement is preferably 40% or higher, more preferably 50% or higher, further preferably 60% or higher, and particularly preferably 80% or higher. In addition, in the electrolytic solution using multiple types of the organic solvent having the heteroelement, the vol % of the preferential coordination solvent with respect to the whole organic solvent having the heteroelement is preferably 40% or higher, more preferably 50% or higher, further preferably 60% or higher, and particularly preferably 80% or higher.

The relationship between the two peak intensities satisfies a condition of Is>2×Io, further preferably satisfies a condition of Is>3×Io, and particularly preferably satisfies a condition of Is>5×Io. A most preferable electrolytic solution is one in which the intensity Io of the original peak of the organic solvent is not observed and the intensity Is of the shift peak is observed in the vibrational spectroscopy spectrum of the electrolytic solution of the present invention. This means that, in the electrolytic solution, all molecules of the organic solvent contained in the electrolytic solution are completely solvated with the metal salt. The electrolytic solution of the present invention is most preferably in a state in which all molecules of the organic solvent contained in the electrolytic solution are completely solvated with the metal salt (a state of Io=0).

In the electrolytic solution of the present invention, the metal salt and the organic solvent having the heteroelement (or the preferential coordination solvent) are estimated to interact with each other. Specifically, the metal salt and the heteroelement in the organic solvent having the heteroelement (or the preferential coordination solvent) are estimated to form a coordinate bond and form a stable cluster formed of the metal salt and the organic solvent having the heteroelement (or the preferential coordination solvent). Based on results from later described Examples, the cluster is estimated to be formed mostly from coordination of 2 molecules of the organic solvent having the heteroelement (or the preferential coordination solvent) with respect to 1 molecule of the metal salt. When this point is taken into consideration, in the electrolytic solution of the present invention, the mol range of the organic solvent having the heteroelement (or the preferential coordination solvent) with respect to 1 mol of the metal salt is preferably not lower than 1.4 mol but lower than 3.5 mol, more preferably not lower than 1.5 mol but not higher than 3.1 mol, and further preferably not lower than 1.6 mol but not higher than 3 mol.

The viscosity η (mPa·s) of the electrolytic solution of the present invention is preferably in a range of $10<\eta<500$, more preferably in a range of $12<\eta<400$, further preferably in a range of $15<\eta<300$, particularly preferably in a range of $18<\eta<150$, and most preferably in a range of $20<\eta<140$.

The electrolytic solution of the present invention displays excellent ionic conductivity. Thus, the nonaqueous electrolyte secondary battery of the present invention has excellent battery characteristics. An ionic conductivity σ (mS/cm) of the electrolytic solution of the present invention preferably satisfies $1\leq\sigma$.

When the ionic conductivity σ (mS/cm) of the electrolytic solution of the present invention is higher, ions can move suitably and an excellent electrolytic solution of a battery can be obtained. Regarding the ionic conductivity σ (mS/cm) of the electrolytic solution of the present invention, if a suitable range including an upper limit is to be shown, a range of $2<\sigma<200$ is preferable, a range of $3<\sigma<100$ is more preferable, a range of $4<\sigma<50$ is further preferable, and a range of $5<\sigma<35$ is particularly preferable.

A density d (g/cm$^3$) of the electrolytic solution of the present invention preferably satisfies $d\geq1.2$ or $d\geq2.2$, and is preferably within a range of $1.2\leq d\leq2.2$, more preferably within a range of $1.24\leq d\leq2.0$, further preferably within a range of $1.26\leq d\leq1.8$, and particularly preferably within a range of $1.27\leq d\leq1.6$. The density d (g/cm$^3$) of the electrolytic solution of the present invention refers to the density at 20° C. "d/c" described in the following is a value obtained by dividing "d" described above by a salt concentration c (mol/L).

In the electrolytic solution of the present invention, d/c is within a range of $0.15\leq d/c\leq0.71$, more preferably within a range of $0.15\leq d/c\leq0.56$, even more preferably within a range of $0.25\leq d/c\leq0.56$, further preferably within a range of $0.2\leq d/c\leq0.50$, and particularly preferably within a range of $0.27\leq d/c\leq0.47$.

"d/c" of the electrolytic solution of the present invention is defined also when the metal salt and the organic solvent are specified. For example, when LiTFSA and DME are respectively selected as the metal salt and the organic solvent, d/c is preferably within a range of $0.42\leq d/c\leq0.56$ and more preferably within a range of $0.4\leq d/c\leq0.52$. When LiTFSA and AN are respectively selected as the metal salt and the organic solvent, d/c is preferably within a range of $0.35\leq d/c\leq0.41$ and more preferably within a range of $0.36\leq d/c\leq0.39$. When LiFSA and DME are respectively selected as the metal salt and the organic solvent, d/c is preferably within a range of $0.32\leq d/c\leq0.46$ and more preferably within a range of $0.34\leq d/c\leq0.42$. When LiFSA and AN are respectively selected as the metal salt and the organic solvent, d/c is preferably within a range of $0.25\leq d/c\leq0.48$, more preferably within a range of $0.25\leq d/c\leq0.38$, further preferably within a range of $0.25\leq d/c\leq0.31$, and even further preferably within a range of $0.2\leq d/c\leq0.29$. When LiFSA and DMC are respectively selected as the metal salt and the organic solvent, d/c is preferably within a range of $0.32\leq d/c\leq0.46$ and more preferably within a range of $0.34\leq d/c\leq0.42$. When LiFSA and EMC are respectively selected as the metal salt and the organic solvent, d/c is preferably within a range of $0.34\leq d/c\leq0.50$ and more preferably within a range of $0.37\leq d/c\leq0.45$. When LiFSA and DEC are respectively selected as the metal salt and the organic solvent, d/c is preferably within a range of $0.36\leq d/c\leq0.54$ and more preferably within a range of $0.39\leq d/c\leq0.48$.

Since the electrolytic solution of the present invention has the metal salt and the organic solvent exist in a different environment and has a high density when compared to the conventional electrolytic solution; improvement in a metal ion transportation rate in the electrolytic solution (particularly improvement of lithium transference number when the metal is lithium), improvement in reaction rate between an electrode and an electrolytic solution interface, mitigation of uneven distribution of salt concentration in the electrolytic solution caused when a battery undergoes high-rate charge and discharge, and increase in the capacity of an electrical double layer is expected. In the electrolytic solution of the present invention, since the density is high, the vapor pressure of the organic solvent contained in the electrolytic solution becomes low. As a result, volatilization of the organic solvent from the electrolytic solution of the present invention is reduced.

In the electrolytic solution of the present invention, since a cluster is estimated to be formed mostly from coordination of 2 molecules of the organic solvent having the heteroelement (or the preferential coordination solvent) with respect to 1 molecule of the metal salt, the concentration (mol/L) of the electrolytic solution of the present invention depends on respective molecular weights of the metal salt and the organic solvent, and the density in the solution. Thus, unconditionally defining the concentration of the electrolytic solution of the present invention is not appropriate.

Concentration (mol/L) of each of the electrolytic solutions of the present invention is shown in Table 1.

TABLE 1

| Metal salt | Organic solvent | Concentration (mol/L) |
|---|---|---|
| LiTFSA | DME | 2.2 to 3.4 |
| LiTFSA | AN | 3.2 to 4.9 |
| LiFSA | DME | 2.6 to 4.1 |
| LiFSA | AN | 3.9 to 6.0 |
| LiFSA | DMC | 2.3 to 4.5 |
| LiFSA | EMC | 2.0 to 3.8 |
| LiFSA | DEC | 1.8 to 3.6 |

An organic solvent forming the cluster and an organic solvent not involved in the formation of the cluster are different in terms of the environment in which the respective organic solvents exist. Thus, in the vibrational spectroscopy measurement, a peak derived from the organic solvent forming the cluster is observed to be shifted toward the high wave number side or the low wave number side with respect to the wave number observed at a peak (original peak of the organic solvent) derived from the organic solvent not involved in the formation of the cluster. Thus, the shift peak represents a peak of the organic solvent forming the cluster.

Examples of the vibrational spectroscopy spectrum include an IR spectrum or a Raman spectrum. Examples of measuring methods of IR measurement include transmission measuring methods such as Nujol mull method and liquid film method, and reflection measuring methods such as ATR method. Regarding which of the IR spectrum and the Raman spectrum is to be selected, a spectrum enabling easy determination of the relationship between Is and Io may be selected as the vibrational spectroscopy spectrum of the electrolytic solution of the present invention. The vibrational spectroscopy measurement is preferably performed at a condition where the effect of moisture in the atmosphere can be lessened or ignored. For example, performing the IR measurement under a low humidity or zero humidity condition such as in a dry room or a glovebox is preferable, or performing the Raman measurement in a state where the electrolytic solution of the present invention is kept inside a sealed container is preferable.

Here, specific description is provided regarding a peak of the electrolytic solution of the present invention containing LiTFSA as the metal salt and acetonitrile as the organic solvent.

When the IR measurement is performed on acetonitrile alone, a peak derived from stretching vibration of a triple bond between C and N is ordinarily observed at around 2100 to 2400 cm$^{-1}$.

Here, based on conventional technical common knowledge, a case is envisioned in which an electrolytic solution is obtained by dissolving LiTFSA in an acetonitrile solvent at a concentration of 1 mol/L. Since 1 L of acetonitrile corresponds to approximately 19 mol, 1 mol of LiTFSA and 19 mol of acetonitrile exist in 1 L of a conventional electrolytic solution. Then, in the conventional electrolytic solution, at the same time when acetonitrile solvated with LiTFSA (coordinated with Li) exists, a large amount of acetonitrile not solvated with LiTFSA (not coordinated with Li) exists. Since an acetonitrile molecule solvated with LiTFSA and an acetonitrile molecule not solvated with LiTFSA are different regarding the environments in which the respective acetonitrile molecules are placed, the acetonitrile peaks of both molecules are distinctively observed in the IR spectrum. More specifically, although a peak of acetonitrile not solvated with LiTFSA is observed at the same position (wavenumber) as in the case with the IR measurement on acetonitrile alone, a peak of acetonitrile solvated with LiTFSA is observed such that its peak position (wave number) is shifted toward the high wave number side.

Since a large amount of acetonitrile not solvated with LiTFSA exists at the concentration of the conventional electrolytic solution, the relationship between the intensity Io of the original peak of acetonitrile and the intensity Is of the peak resulting from shift of the original peak of acetonitrile becomes Is<Io in the vibrational spectroscopy spectrum of the conventional electrolytic solution.

On the other hand, when compared to the conventional electrolytic solution, the electrolytic solution of the present invention has a high concentration of LiTFSA, and the number of acetonitrile molecules solvated (forming a cluster) with LiTFSA in the electrolytic solution is larger than the number of acetonitrile molecules not solvated with LiTFSA. As a result, the relationship between the intensity Io of the original peak of acetonitrile and the intensity Is of the peak resulting from shifting of the original peak of acetonitrile becomes Is>Io in the vibrational spectroscopy spectrum of the electrolytic solution of the present invention.

In Table 2, wave numbers and attributions thereof are exemplified for organic solvents considered to be useful when calculating Io and Is in the vibrational spectroscopy spectrum of the electrolytic solution of the present invention. Depending on measuring devices, measuring environments, and measuring conditions used for obtaining the vibrational spectroscopy spectrum, the wave number of the observed peak may be different from the following wave numbers.

TABLE 2

| Organic solvent | Wave number (cm$^{-1}$) | Attribution |
|---|---|---|
| Ethylene carbonate | 1769 | Double bond between C and O |
| Propylene carbonate | 1829 | Double bond between C and O |
| Acetic anhydride | 1785, 1826 | Double bond between C and O |
| Acetone | 1727 | Double bond between C and O |
| Acetonitrile | 2285 | Triple bond between C and N |
| Acetonitrile | 899 | C—C single bond |
| DME | 1099 | C—O single bond |
| DME | 1124 | C—O single bond |
| N,N-Dimethylformamide | 1708 | Double bond between C and O |
| γ-Butyrolactone | 1800 | Double bond between C and O |
| Nitropropane | 1563 | Double bond between N and O |
| Pyridine | 977 | Unknown |
| Dimethyl sulfoxide | 1017 | S—O bond |

Regarding a wave number of an organic solvent and an attribution thereof, well-known data may be referenced. Examples of the reference include "Raman spectrometry" Spectroscopical Society of Japan measurement method series 17, Hiroo Hamaguchi and Akiko Hirakawa, Japan Scientific Societies Press, pages 231 to 249. In addition, a wave number of an organic solvent considered to be useful for calculating Io and Is, and a shift in the wave number when the organic solvent and the metal salt coordinate with each other are predicted from a calculation using a computer. For example, the calculation may be performed by using Gaussian09 (Registered trademark, Gaussian, Inc.), and setting the density function to B3LYP and the basis function to 6-311G++ (d, p). A person skilled in the art can calculate Io and Is by referring to the description in Table 2, well-known data, and a calculation result from a computer to select a peak of an organic solvent.

Since the electrolytic solution of the present invention has the metal salt and the organic solvent exist in a different environment and has a high metal salt concentration when compared to the conventional electrolytic solution; improvement in a metal ion transportation rate in the electrolytic solution (particularly improvement of lithium transference number when the metal is lithium), improvement in reaction rate between an electrode and an electrolytic solution interface, mitigation of uneven distribution of salt concentration in the electrolytic solution caused when a battery undergoes high-rate charging and discharging, and increase in the capacity of an electrical double layer are expected. In the electrolytic solution of the present invention, since most of the organic solvent having the heteroelement is forming a cluster with the metal salt, the vapor pressure of the organic solvent contained in the electrolytic solution becomes lower. As a result, volatilization of the organic solvent from the electrolytic solution of the present invention is reduced.

When compared to the electrolytic solution of a conventional battery, the electrolytic solution of the present invention has a high viscosity. For example, a preferable Li concentration of the electrolytic solution of the present invention is about 2 to 5 times of the Li concentration of a general electrolytic solution. Thus, with a battery using the electrolytic solution of the present invention, even if the battery is damaged, leakage of the electrolytic solution is suppressed. Furthermore, a secondary battery using the conventional electrolytic solution has displayed a significant reduction in capacity when subjected to high-speed charging/discharging cycles. The reason is conceivably the inability of the electrolytic solution to supply sufficient amount of Li to a reaction interface with an electrode because of Li concentration unevenness generated in the electrolytic solution when charging and discharging are repeated rapidly, i.e., uneven distribution of Li concentration in the electrolytic solution. However, in a secondary battery using the electrolytic solution of the present invention, the capacity was shown to be suitably maintained during high-rate charging and discharging. A conceivable reason for that is the ability to suppress uneven distribution of the Li concentration in the electrolytic solution due to a physical property regarding having a high viscosity in the electrolytic solution of the present invention. In addition, another conceivable reason is, due to the physical property regarding having a high viscosity in the electrolytic solution of the present invention, improvement in liquid retaining property of the electrolytic solution at an electrode interface, resulting in suppression of a state of lacking the electrolytic solution at the electrode interface (i.e., liquid run-out state).

The electrolytic solution of the present invention contains a cation of the metal salt at a high concentration. Thus, the distance between adjacent cations is extremely small within the electrolytic solution of the present invention. When a cation such as a lithium ion moves between a positive electrode and a negative electrode during charging and discharging of the nonaqueous electrolyte secondary battery, a cation located most closely to an electrode that is a movement destination is firstly supplied to the electrode. Then, to the place where the supplied cation had been located, another cation adjacent to the cation moves. Thus, in the electrolytic solution of the present invention, a domino toppling-like phenomenon is predicted to be occurring in which adjacent cations sequentially change their positions one by one toward an electrode that is a supply target. Because of that, the distance for which a cation moves during charging and discharging is thought to be short, and movement speed of the cation is thought to be high, accordingly. Because of this reason, the nonaqueous electrolyte secondary battery of the present invention having the electrolytic solution of the present invention is thought to have a high reaction rate. As described later, the nonaqueous electrolyte secondary battery of the present invention includes an S,O-containing coating on the electrode (i.e., the negative electrode and/or the positive electrode), and the S,O-containing coating is thought to largely include a cation in addition to including the S=O structure. The cation included in the S,O-containing coating is thought to be preferentially supplied to the electrode. Thus, in the nonaqueous electrolyte secondary battery of the present invention, transportation rate of the cation is thought to be further improved because of having an abundant source of cation (i.e., the S,O-containing coating) in the vicinity of the electrode. As a result, in the nonaqueous electrolyte secondary battery of the present invention, excellent battery characteristics are thought to be exerted because of a cooperation between the electrolytic solution of the present invention and the S,O-containing coating.

The method for producing the electrolytic solution of the present invention is described. Since the electrolytic solution of the present invention contains a large amount of the metal salt compared to the conventional electrolytic solution, a production method of adding the organic solvent to a solid (powder) metal salt results in an aggregate, and manufacturing an electrolytic solution in a solution state is difficult. Thus, in the method for producing the electrolytic solution of the present invention, the metal salt is preferably gradually added to the organic solvent while a solution state of the electrolytic solution is maintained during production.

Depending on the types of the metal salt and the organic solvent, the electrolytic solution of the present invention includes a liquid in which the metal salt is dissolved in the organic solvent in a manner exceeding a conventionally regarded saturation solubility. A method for producing the electrolytic solution of the present invention includes: a first dissolution step of preparing a first electrolytic solution by mixing the organic solvent having the heteroelement and the metal salt to dissolve the metal salt; a second dissolution step of preparing a second electrolytic solution in a supersaturation state by adding the metal salt to the first electrolytic solution under stirring and/or heating conditions to dissolve the metal salt; and a third dissolution step of preparing a third electrolytic solution by adding the metal salt to the second electrolytic solution under stirring and/or heating conditions to dissolve the metal salt.

Here, the "supersaturation state" described above refers to a state in which a metal salt crystal is deposited from the electrolytic solution when the stirring and/or heating conditions are discontinued or when crystal nucleation energy such as vibration is provided thereto. The second electrolytic solution is in the "supersaturation state," whereas the first electrolytic solution and the third electrolytic solution are not in the "supersaturation state."

In other words, with the method for producing the electrolytic solution of the present invention, via the first electrolytic solution encompassing a conventional metal salt concentration and being in a thermodynamically stable liquid state, and via the second electrolytic solution in a thermodynamically unstable liquid state, the third electrolytic solution, i.e., the electrolytic solution of the present invention, in a thermodynamically stable new liquid state is obtained.

Since the third electrolytic solution in the stable liquid state maintains its liquid state at an ordinary condition, in the third electrolytic solution, for example, a cluster, formed of 2 molecules of the organic solvent with respect to 1 molecule of a lithium salt and stabilized by a strong coordinate bond between these molecules, is estimated to be inhibiting crystallization of the lithium salt.

The first dissolution step is a step of preparing the first electrolytic solution by mixing the organic solvent having a heteroatom with the metal salt to dissolve the metal salt.

For the purpose of mixing the organic solvent having a heteroatom with the metal salt, the metal salt may be added with respect to the organic solvent having a heteroatom, or the organic solvent having a heteroatom may be added with respect to the metal salt.

The first dissolution step is preferably performed under stirring and/or heating conditions. The stirring speed may be set suitably. The heating condition is preferably controlled suitably using a temperature controlled bath such as a water bath or an oil bath. Since dissolution heat is generated when dissolving the metal salt, the temperature condition is preferably strictly controlled when a metal salt that is unstable against heat is to be used. In addition, the organic solvent may be cooled in advance, or the first dissolution step may be performed under a cooling condition.

The first dissolution step and the second dissolution step may be performed continuously, or the first electrolytic solution obtained from the first dissolution step may be temporarily kept (left still), and the second dissolution step may be performed after a certain period of time has elapsed.

The second dissolution step is a step of preparing the second electrolytic solution in the supersaturation state by adding the metal salt to the first electrolytic solution under stirring and/or heating conditions to dissolve the metal salt.

Performing the second dissolution step under the stirring and/or heating conditions is essential for preparing the second electrolytic solution in the thermodynamically unstable supersaturation state. The stirring condition may be obtained by performing the second dissolution step in a stirring device accompanied with a stirrer such as a mixer, or the stirring condition may be obtained by performing the second dissolution step using a stirring bar and a device (stirrer) for moving the stirring bar. The heating condition is preferably controlled suitably using a temperature controlled bath such as a water bath or an oil bath. Needless to say, performing the second dissolution step using an apparatus or a system having both a stirring function and a heating function is particularly preferable. "Heating" described here refers to warming an object to a temperature not lower than an ordinary temperature (25° C.). The heating temperature is more preferably not lower than 30° C. and further preferably not lower than 35° C. In addition, the heating temperature is preferably a temperature lower than the boiling point of the organic solvent.

In the second dissolution step, when the added metal salt does not dissolve sufficiently, increasing the stirring speed and/or further heating are performed. In this case, a small amount of the organic solvent having a heteroatom may be added to the electrolytic solution in the second dissolution step.

Since temporarily leaving still the second electrolytic solution obtained in the second dissolution step causes deposition of crystal of the metal salt, the second dissolution step and the third dissolution step are preferably performed continuously.

The third dissolution step is a step of preparing the third electrolytic solution by adding the metal salt to the second electrolytic solution under stirring and/or heating conditions to dissolve the metal salt. In the third dissolution step, since adding and dissolving the metal salt in the second electrolytic solution in the supersaturation state are necessary, performing the step under stirring and/or heating conditions similarly to the second dissolution step is essential. Specific stirring and/or heating conditions are similar to the conditions for the second dissolution step.

When the mole ratio of the organic solvent and the metal salt added throughout the first dissolution step, the second dissolution step, and the third dissolution step reaches roughly about 2:1, production of the third electrolytic solution (the electrolytic solution of the present invention) ends. A metal salt crystal is not deposited from the electrolytic solution of the present invention even when the stirring and/or heating conditions are discontinued. Based on these circumstances, in the electrolytic solution of the present invention, for example, a cluster, formed of 2 molecules of the organic solvent with respect to 1 molecule of a lithium salt and stabilized by a strong coordinate bond between these molecules, is estimated to be formed.

When producing the electrolytic solution of the present invention, even without via the supersaturation state at processing temperatures of each of the dissolution steps, the electrolytic solution of the present invention is suitably produced using the specific dissolution means described in the first to third dissolution steps depending on the types of the metal salt and the organic solvent.

In addition, the method for producing the electrolytic solution of the present invention preferably includes a vibrational spectroscopy measurement step of performing vibrational spectroscopy measurement on the electrolytic solution that is being produced. As a specific vibrational spectroscopy measurement step, for example, a method in which a portion of each of the electrolytic solutions being produced is sampled to be subjected to vibrational spectroscopy measurement may be performed, or a method in which vibrational spectroscopy measurement is conducted on each of the electrolytic solutions in situ may be performed. Examples of the method of conducting the vibrational spectroscopy measurement on the electrolytic solution in situ include a method of introducing the electrolytic solution that is being produced in a transparent flow cell and conducting the vibrational spectroscopy measurement, and a method of using a transparent production container and conducting Raman measurement from outside the container.

Since the relationship between Is and Io in an electrolytic solution that is being produced is confirmed by including the vibrational spectroscopy measurement step in the method for producing the electrolytic solution of the present invention, whether or not an electrolytic solution that is being produced has reached the electrolytic solution of the present invention is determined, and, when an electrolytic solution that is being produced has not reached the electrolytic solution of the present invention, how much more of the metal salt is to be added for reaching the electrolytic solution of the present invention is understood.

To the electrolytic solution of the present invention, other than the organic solvent having the heteroelement, a solvent that has a low polarity (low permittivity) or a low donor number and that does not display particular interaction with the metal salt, i.e., a solvent that does not affect formation and maintenance of the cluster in the electrolytic solution of the present invention, may be added. Adding such a solvent to the electrolytic solution of the present invention is expected to provide an effect of lowering the viscosity of the electrolytic solution of the present invention while maintaining the formation of the cluster in the electrolytic solution of the present invention.

Specific examples of the solvent that does not display particular interaction with the metal salt include benzene, toluene, ethylbenzene, o-xylene, m-xylene, p-xylene, 1-methylnaphthalene, hexane, heptane, and cyclohexane.

In addition, to the electrolytic solution of the present invention, a fire-resistant solvent other than the organic solvent having the heteroelement may be added. By adding the fire-resistant solvent to the electrolytic solution of the present invention, safety of the electrolytic solution of the present invention is further enhanced. Examples of the fire-resistant solvent include halogen based solvents such as carbon tetrachloride, tetrachloroethane, and hydrofluoroether, and phosphoric acid derivatives such as trimethyl phosphate and triethyl phosphate.

Furthermore, when the electrolytic solution of the present invention is mixed with a polymer or an inorganic filler to form a mixture, the mixture enables containment of the electrolytic solution to provide a pseudo solid electrolyte. By using the pseudo solid electrolyte as an electrolytic solution of a battery, leakage of the electrolytic solution is suppressed in the battery.

As the polymer, a polymer used in batteries such as lithium ion secondary batteries and a general chemically cross-linked polymer are used. In particular, a polymer capable of turning into a gel by absorbing an electrolytic solution, such as polyvinylidene fluoride and polyhexafluoropropylene, and one obtained by introducing an ion conductive group to a polymer such as polyethylene oxide are suitable.

Specific examples of the polymer include polymethyl acrylate, polymethacrylate, polymethyl methacrylate, polyethylene oxide, polypropylene oxide, polyacrylonitrile, polyvinylidene fluoride, polyethylene glycol dimethacrylate, polyethylene glycol acrylate, polyglycidol, polytetrafluoroethylene, polyhexafluoropropylene, polysiloxane, polyvinyl acetate, polyvinyl alcohol, polyacrylic acid, polymethacrylic acid, polyitaconic acid, polyfumaric acid, polycrotonic acid, polyangelic acid, polycarboxylic acid such as carboxymethyl cellulose, styrene-butadiene rubbers, nitrile-butadiene rubbers, polystyrene, polycarbonate, unsaturated polyester obtained through copolymerization of maleic anhydride and glycols, polyethylene oxide derivatives having a substituent group, and a copolymer of vinylidene fluoride and hexafluoropropylene. In addition, as the polymer, a copolymer obtained through copolymerization of two or more types of monomers forming the above described specific polymers may be selected.

Polysaccharides are also suitable as the polymer. Specific examples of the polysaccharides include glycogen, cellulose, chitin, agarose, carrageenan, heparin, hyaluronic acid, pectin, amylopectin, xyloglucan, and amylose. In addition, materials containing these polysaccharides may be used as the polymer, and examples of the materials include agar containing polysaccharides such as agarose.

As the inorganic filler, inorganic ceramics such as oxides and nitrides are preferable.

Inorganic ceramics have hydrophilic and hydrophobic functional groups on their surfaces. Thus, a conductive passage may form within the inorganic ceramics when the functional groups attract the electrolytic solution. Furthermore, the inorganic ceramics dispersed in the electrolytic solution form a network among the inorganic ceramics themselves due to the functional groups, and may serve as containment of the electrolytic solution. With such a function by the inorganic ceramics, leakage of the electrolytic solution in the battery is further suitably suppressed. In order to have the inorganic ceramics suitably exert the function described above, the inorganic ceramics having a particle shape are preferable, and those whose particle sizes are nano level are particularly preferable.

Examples of the types of the inorganic ceramics include common alumina, silica, titania, zirconia, and lithium phosphate. In addition, inorganic ceramics that have lithium conductivity themselves are preferable, and specific examples thereof include $Li_3N$, $LiI$, $LiI$—$Li_3N$—$LiOH$, $LiI$—$Li_2S$—$P_2O_5$, $LiI$—$Li_2S$—$P_2S_5$, $LiI$—$Li_2S$—$B_2S_3$, $Li_2O$—$B_2S_3$, $Li_2O$—$V_2O_3$—$SiO_2$, $Li_2O$—$B_2O_3$—$P_2O_5$, $Li_2O$—$B_2O_3$—$ZnO$, $Li_2O$—$Al_2O_3$—$TiO_2$—$SiO_2$—$P_2O_5$, $LiTi_2(PO_4)_3$, $Li$-$\beta Al_2O_3$, and $LiTaO_3$.

Glass ceramics may be used as the inorganic filler. Since glass ceramics enables containment of ionic liquids, the same effect is expected for the electrolytic solution of the present invention. Examples of the glass ceramics include compounds represented by $xLi_2S$-$(1-x)P_2S_5$, and those in which one portion of S in the compound is substituted with another element and those in which one portion of P in the compound is substituted with germanium.

Since the electrolytic solution of the present invention described above displays excellent ionic conductivity, the electrolytic solution is suitably used as an electrolytic solution of a power storage device such as a battery. In particular, the electrolytic solution is preferably used as electrolytic solutions of secondary batteries, and, among those, preferably used as electrolytic solutions of lithium ion secondary batteries.

In the following, description of the nonaqueous electrolyte secondary battery of the present invention using the electrolytic solution of the present invention is provided. Unless mentioned otherwise in particular in the following, the description is regarding all the nonaqueous electrolyte secondary batteries (1) to (5) of the present invention.

The nonaqueous electrolyte secondary battery includes a negative electrode having a negative electrode active material configured to occlude and release a charge carrier such as lithium ions, a positive electrode having a positive electrode active material configured to occlude and release the charge carrier, and the electrolytic solution of the present invention. The electrolytic solution of the present invention is particularly suitable as an electrolytic solution for lithium ion secondary batteries since a lithium salt is used as the metal salt.

<Negative Electrode>

The negative electrode includes a current collector and a negative electrode active material layer bound to the surface of the current collector.

[Current Collector]

The current collector refers to a fine electron conductor that is chemically inert for continuously sending a flow of current to the electrode during discharging or charging of the nonaqueous electrolyte secondary battery. Examples of the current collector include at least one selected from silver, copper, gold, aluminum, tungsten, cobalt, zinc, nickel, iron, platinum, tin, indium, titanium, ruthenium, tantalum, chromium, or molybdenum, and metal materials such as stainless steel. The current collector may be coated with a protective layer known in the art. One obtained by treating the surface of the current collector with a method known in the art may be used as the current collector.

The current collector takes forms such as a foil, a sheet, a film, a line shape, a bar shape, and a mesh. Thus, as the current collector, for example, metal foils such as copper foil, nickel foil, and stainless steel foil may be suitably used. When the current collector is in the form of a foil, a sheet, or a film, its thickness is preferably within a range of 1 μm to 100 μm.

[Negative Electrode Active Material Layer]

The negative electrode active material layer includes a negative electrode active material and a general binder. The negative electrode active material layer may further include a conductive additive if necessary.

<Nonaqueous Electrolyte Secondary Battery (1)>

The negative electrode active material in the nonaqueous electrolyte secondary battery (1) includes a graphite whose G/D ratio is not lower than 3.5. The G/D ratio is a ratio of G-band and D-band peaks in a Raman spectrum as described above. In a Raman spectrum for graphite, peaks appear at G-band (around 1590 $cm^{-1}$) and D-band (around 1350 $cm^{-1}$), and G-band is derived from a graphite structure and D-band is derived from defects. Thus, having a higher G/D ratio, which is the ratio of G-band and D-band, means the graphite has high crystallinity with less defects. Hereinafter, a graphite whose G/D ratio is not lower than 3.5 is sometimes referred to as a high-crystallinity graphite, and a graphite whose G/D ratio is lower than 3.5 is sometimes referred to as a low-crystallinity graphite.

As such a high-crystallinity graphite, both natural graphites and artificial graphites may be used. When a classification method based on shape is used, flake-like graphites, spheroidal graphites, block-like graphites, and earthy graphites may also be used. In addition, coated graphites obtained by coating the surface of a graphite with a carbon material or the like may also be used.

As long as the high-crystallinity graphite whose G/D ratio is not lower than 3.5 is included as a main component, the negative electrode active material may include the low-crystallinity graphite or amorphous carbon.

<Nonaqueous Electrolyte Secondary Battery (2)>

The negative electrode active material in the nonaqueous electrolyte secondary battery (2) includes a carbon material whose crystallite size is not larger than 20 nm. As described above, the crystallite size is calculated from a half width of a peak appearing at 2θ=20 degrees to 30 degrees in a X-ray diffraction profile measured by X-ray diffraction method. A larger crystallite size means atoms are arranged periodically and precisely in accordance with a certain rule. On the other hand, a carbon material whose crystallite size is not larger than 20 nm is considered to be in a poorly periodical and precise state. For example, when the carbon material is a graphite, the crystallite size becomes not larger than 20 nm when the size of a graphite crystal is not larger than 20 nm or when atoms forming the graphite are arranged irregularly due to distortion, defects, and impurities, etc. Using a carbon material whose crystallite size is not larger than 5 nm in the nonaqueous electrolyte secondary battery (2) of the present invention is particularly preferable.

Although representative examples of the carbon material whose crystallite size is not larger than 20 nm are hard carbon and soft carbon, "the carbon material whose crystallite size is not larger than 20 nm" in the nonaqueous electrolyte secondary battery (2) of the present invention is not limited thereto.

In order to measure the crystallite size of the carbon material, an X-ray diffraction method using Cu K-α radiation as an X-ray source may be used. From the X-ray diffraction method, the crystallite size is calculated using the next Scherrer's equation based on a half width of a diffraction peak detected at a diffraction angle of 2θ=20 degrees to 30 degrees and the diffraction angle.

$$L=0.94\lambda/(\beta \cos \theta)$$

wherein

L: Crystallite size

λ: Incident X-ray wavelength (1.54 Å)

β: Half width of peak (radian)

θ: Diffraction angle

<Nonaqueous Electrolyte Secondary Battery (3)>

The negative electrode active material in the nonaqueous electrolyte secondary battery (3) includes silicon element and/or tin element. Silicon and tin are known negative electrode active materials capable of greatly improving the capacity of a nonaqueous electrolyte secondary battery. Silicon and tin belong to group 14 elements. These elemental substances become negative electrode active materials with high capacity since being configured to occlude and release a large amount of charge carriers (lithium ions, etc.) per unit volume (mass). However, a nonaqueous electrolyte secondary battery using those as the negative electrode active material has relatively poor rate characteristics.

On the other hand, a nonaqueous electrolyte secondary battery using carbon as the negative electrode active material has excellent rate characteristics. Thus, by using both as the negative electrode active material, the nonaqueous electrolyte secondary battery obtains a high capacity, and excellent rate characteristics are provided to the nonaqueous electrolyte secondary battery.

Although the theoretical capacity is large when silicon is used as the negative electrode active material, the change in volume during charging and discharging is large. Thus, as the negative electrode active material including silicon element, using $SiO_x$ ($0.3 \leq x \leq 1.6$) disproportionated into two phases of Si phase and silicon oxide phase is particularly preferable. The Si phase in $SiO_x$ is configured to occlude and release lithium ions. The Si phase changes in volume (i.e., expands and contracts) associated with occlusion and release lithium ions. The silicon oxide phase is formed of $SiO_2$ etc., and changes less in volume associated with charging and discharging when compared to the Si phase. Thus, $SiO_x$ used as the negative electrode active material achieves higher capacity because of the Si phase, and, when included in the silicon oxide phase, suppresses change of the whole volume of the negative electrode active material (or the negative electrode). When "x" becomes smaller than a lower limit value, cycle characteristics deteriorate since the change in volume during charging and discharging becomes too large due to the ratio of Si becoming excessive. On the other hand, when "x" becomes larger than an upper limit value, energy density is decreased due to the Si ratio being too small. The range of "x" is more preferably $0.5 \leq x \leq 1.5$ and further preferably $0.7 \leq x \leq 1.2$.

In $SiO_x$ described above, an alloying reaction between lithium element and silicon element included in the Si phase is thought to occur during charging and discharging of the nonaqueous electrolyte secondary battery. This alloying reaction is thought to contribute to charging and discharging of the nonaqueous electrolyte secondary battery (lithium ion secondary battery in this case). Also in the negative electrode active material including tin element described later, charging and discharging are thought to occur by an alloying reaction between tin element and lithium element similarly.

Examples of the negative electrode active material including tin element include Sn elemental substance, tin alloys (Cu—Sn alloys, Co—Sn alloys), amorphous tin oxides, and tin silicon oxides, etc. Among these, examples of the amorphous tin oxides include $SnB_{0.4}P_{0.6}O_{3.1}$. Examples of the tin silicon oxides include $SnSiO_3$.

The above described negative electrode active material including silicon element and the negative electrode active material including tin element may also be used as a composite with a material containing carbon element (carbon material). By using these as a composite instead of independently, the structure of particularly silicon and/or tin stabilizes, and durability of the negative electrode improves. Specifically, the carbon material such as graphite is a material showing less volume change during charging and discharging, when compared to elemental substance silicon and elemental substance tin. Thus, by forming a composite of such a carbon material with the negative electrode active material including silicon element and the negative electrode active material including tin element, damage or the like to the negative electrode caused by volume change during charging and discharging is suppressed, and durability of the negative electrode improves. As a result, cycle characteristics of the nonaqueous electrolyte secondary battery improve. A known method may be used for forming a composite of the carbon material with the negative electrode active material including silicon element and/or the negative electrode active material including tin element.

As the carbon material that is to be formed into a composite with the negative electrode active material including silicon element and/or the negative electrode active material including tin element, graphite, hard carbon (hardly graphitizable carbon), soft carbon (easily graphitizable carbon), and the like are used preferably. Regarding the graphite, natural and artificial graphites may be used, and its particle size is not particularly limited.

<Nonaqueous Electrolyte Secondary Battery (4)>

The negative electrode active material in the nonaqueous electrolyte secondary battery (4) includes a metal oxide configured to occlude and release lithium ions. Examples of the metal oxide include titanium oxides such as $TiO_2$, lithium titanium oxides, tungsten oxides such as $WO_3$, amorphous tin oxides, and tin silicon oxides.

Specific examples of the lithium titanium oxides include lithium titanate having a spinel structure (e.g., $Li_{4+x}Ti_{5+y}O_{12}$ (x and y respectively satisfy $-1 \le x \le 4$ and $-1 \le y \le 1$)) and lithium titanate having a ramsdellite structure (e.g., $Li_2Ti_3O_7$). Specific examples of the amorphous tin oxides include $SnB_{0.4}P_{0.6}O_{3.1}$. Specific examples of the tin silicon oxides include $SnSiO_3$. Usage of lithium titanate having a spinel structure is particularly preferable, which is further specifically $Li_4Ti_5O_{12}$. In such a lithium ion secondary battery that includes lithium titanate as the negative electrode, reactions for occluding and releasing lithium are thought to occur stably, and, as a result, degradation of an active material is thought to be suppressed. Thus, a lithium ion secondary battery having this type of metallic compound as a negative electrode active material is known to have superior cycle characteristics. By using the metal oxide with the nonaqueous electrolyte secondary battery of the present invention using the electrolytic solution of the present invention, a nonaqueous electrolyte secondary battery capable of achieving both the excellent battery characteristics derived from the electrolytic solution of the present invention and excellent cycle characteristics is obtained.

<Nonaqueous Electrolyte Secondary Battery (5)>

The negative electrode active material in nonaqueous electrolyte secondary battery (5) includes a graphite whose ratio (long axis/short axis) of long axis to short axis is 1 to 5. Representative graphites whose ratio (long axis/short axis) of long axis to short axis is 1 to 5 include spheroidal graphites, MCMB (meso carbon micro beads), and the like. Spheroidal graphites are carbon materials such as artificial graphites, natural graphites, easily graphitizable carbon, and hardly graphitizable carbon, and refer to those whose shapes are spheroidal or almost spheroidal.

Spherical graphite particles are obtained by grinding material graphite in an impact grinder having a relatively small crushing force, and collecting and then spheroidizing the resulting flakes through compression. As the impact grinder, for example, a hammer mill or a pin mill is used. An outer-circumference line speed of a rotating hammer or pin is preferable about 50 to 200 m/s. Supply and ejection of graphite with respect to such grinders are preferably performed in association with a current of air or the like.

The degree of spheroidization of graphite particles is represented by "the ratio of long axis to short axis" (long axis/short axis, hereinafter referred to as "aspect ratio"). Thus, in an arbitrary cross section of a graphite particle, when, among axis lines that perpendicularly intersect at the center of gravity, those who have the largest aspect ratio are selected; an aspect ratio close to 1 means close to being a true sphere. With the above described spheroidization process, the aspect ratio is easily set equal to or lower than 5 (1 to 5). When the spheroidization process is performed sufficiently, the aspect ratio is set equal to or lower than 3 (1 to 3). The graphite used in the present invention has a particle aspect ratio of 1 to 5, and preferably 1 to 3. When the aspect ratio is set equal to or lower than 5, a diffusion pathway of the electrolytic solution in the negative electrode active material layer becomes short. As a result, since resistance component caused by the electrolytic solution is reduced, improvement of input and output is thought to be possible. When the aspect ratio is set to 1, the graphite becomes a shape closest to a true sphere, and the diffusion pathway of the electrolytic solution is set to be the shortest.

Graphite is capable of easily taking a flat shape since having a property of being easily cracked at a basal surface due to its crystal structure. When a graphite having a flat shape is arranged in the negative electrode active material layer, the proportion of basal surfaces of graphite crystals orientated parallelly to the surface of the current collector increases, and diffraction intensity such as I (002) derived from the basal surface becomes relatively strong in an XRD analysis.

By using this feature and investigating a ratio [I(110)/I (004)] with a diffraction intensity derived from a crystal surface different from the basal surface such as I(110), information regarding how much of flat shaped graphite is included is indirectly investigated. Thus, the graphite used in the present invention preferably has I(110)/I(004) in a range of 0.03 to 1. By using such a graphite, input-output characteristics improve since arrangement of flat particles becomes less and the diffusion pathway of the electrolytic solution in the negative electrode active material layer becomes short.

The graphite particles preferably have a BET specific surface area within a range of 0.5 to 15 $m^3/g$. When the BET specific surface area becomes larger than 15 $m^3/g$, side reaction with the electrolytic solution tends to accelerate. When the BET specific surface area becomes smaller than 0.5 $m^3/g$, input/output sometimes deteriorate since the reaction resistance becomes large.

As long as the graphite whose aspect ratio is 1 to 5 is used as a main component, the negative electrode active material may include a graphite, amorphous carbon, or the like whose aspect ratio is outside this range.

The nonaqueous electrolyte secondary batteries (1) to (5) of the present invention may include, in addition to the characteristic negative electrode active material that is used in each of the nonaqueous electrolyte secondary batteries, another negative electrode active material configured to occlude and release a charge carrier. Hereinafter, if necessary, the other negative electrode active material is referred to as a secondary negative electrode active material. In addition, the characteristic negative electrode active material in each of the nonaqueous electrolyte secondary batteries of the present invention is referred to as a primary negative electrode active material. For example, when the nonaqueous electrolyte secondary battery of the present invention is a lithium ion secondary battery, the secondary negative electrode active material is not particularly limited as long as the secondary negative electrode active material is an elemental substance, an alloy, or a compound configured to occlude and release a charge carrier, i.e., lithium ion. Examples of the elemental substance used as the secondary negative electrode active material include respective elemental substances of Li, group 14 elements such as carbon, silicon, germanium and tin, group 13 elements such as aluminum and indium, group 12 elements such as zinc and cadmium, group 15 elements such as antimony and bismuth, alkaline earth metals such as magnesium and calcium, and group 11 elements such as silver and gold.

When silicon or the like is used as the secondary negative electrode active material, a high capacity active material is obtained since a single silicon atom reacts with multiple lithium ions. However, a fear of occurrence of a problem regarding a significant expansion and contraction of volume associated with occlusion and release of lithium exists. In order to mitigate the fear, an alloy or a compound obtained by combining an elemental substance such as silicon with another element such as a transition metal is suitably used as the secondary negative electrode active material. Specific examples of the alloy or the compound include tin based materials such as Ag—Sn alloys, Cu—Sn alloys, and Co—

Sn alloys, carbon based materials such as various graphites, silicon based materials such as $SiO_x$ ($0.3 \le x \le 1.6$) that undergoes disproportionation into the elemental substance silicon and silicon dioxide, and a complex obtained by combining a carbon based material with elemental substance silicon or a silicon based material. In addition, as the secondary negative electrode active material, an oxide such as $Nb_2O_5$, $TiO_2$, $Li_4Ti_5O_{12}$, $WO_2$, $MoO_2$, and $FE_2O_3$, or a nitride represented by $Li_{3-x}M_xN$ (M=Co, Ni, Cu) may be used. With regard to the secondary negative electrode active material, one or more types described above may be used.

By using the primary negative electrode active material with the various secondary negative electrode active materials described above, further excellent battery characteristics are provided to the nonaqueous electrolyte secondary battery. For example, in the nonaqueous electrolyte secondary battery (4), by using any of the above described secondary negative electrode active materials with a metal oxide as the primary negative electrode active material, the nonaqueous electrolyte secondary battery obtains a higher capacity compared to when the metal oxide is used by itself. When the primary negative electrode active material and the secondary negative electrode active material are used together, the main component of the negative electrode active material is preferably the primary negative electrode active material. Specifically, with respect to the entire negative electrode active material, the primary negative electrode active material preferably accounts for not less than 50 mass % and more preferably not less than 80 mass %. This also applies for the negative electrode active materials in other nonaqueous electrolyte secondary batteries.

In addition, in the nonaqueous electrolyte secondary battery (4), the above described metal oxide based negative electrode active material includes, as a main component, at least one type selected from titanium oxides, lithium titanium oxides, tungsten oxides, amorphous tin oxides, and tin silicon oxides. The "main component" described herein refers to a corresponding component that is included by not less than 50 mass % of a population that forms the basis. Specifically, when the entirety of the metal oxide capable of functioning as the negative electrode active material is defined as 100 mass %, the main component (i.e., at least one type selected from titanium oxides, lithium titanium oxides, tungsten oxides, amorphous tin oxides, and tin silicon oxides) is included by not less than 50 mass %. The negative electrode may include other unavoidable contents, and examples thereof include at least one element selected from Li, Fe, Cr, Cu, Zn, Ca, Mg, S, Si, Na, K, Al, Zr, Ti, P, Ga, Ge, V, Mo, Nb, W, and La.

The binder serves a role of fastening the active material and the conductive additive to the surface of the current collector.

Examples of the binder include fluorine-containing resins such as polyvinylidene fluoride, polytetrafluoroethylene, and fluororubbers, thermoplastic resins such as polypropylene and polyethylene, imide based resins such as polyimide and polyamide-imide, alkoxysilyl group-containing resins, and polymers having a hydrophilic group such as polyacrylic acid (PAA) and carboxymethyl cellulose (CMC). The blending ratio of the binder in the negative electrode active material layer is preferably negative electrode active material:binder=1:0.005 to 1:0.3. When the amount of the binder is too small, moldability of the electrode deteriorates, whereas, when the amount of the binder is too large, energy density of the electrode becomes low.

The conductive additive included in the negative electrode active material layer if necessary is added for increasing conductivity of the electrode. Thus, the conductive additive is preferably added optionally when conductivity of an electrode is insufficient, and does not have to be added when conductivity of an electrode is sufficiently superior. As the conductive additive, a fine electron conductor that is chemically inert may be used, and examples thereof include carbonaceous fine particles such as carbon black, graphite, acetylene black, Ketchen black (Registered Trademark), and vapor grown carbon fiber (VGCF). With regard to the conductive additive described above, a single type by itself, or a combination of two or more types may be added to the active material layer. The blending ratio of the conductive additive in the negative electrode active material layer is not particularly limited, but is preferably, in mass ratio, negative electrode active material:conductive additive=1:0.01 to 1:0.5. The reason is that when too little of the amount of the conductive additive is contained, efficient conducting paths cannot be formed, whereas when the amount of the conductive additive is too large, moldability of the negative electrode active material layer deteriorates and energy density of the electrode becomes low.

The negative electrode of the nonaqueous electrolyte secondary battery is produced by: applying, on the current collector using a method such as roll coating method, dip coating method, doctor blade method, spray coating method, and curtain coating method, a slurry obtained through adding and mixing the negative electrode active material powder, the conductive additive such as a carbon powder, the binder, and a proper amount of a solvent; and drying mixture or curing the binder. Examples of the solvent include N-methyl-2-pyrrolidone, methanol, methyl isobutyl ketone, and water. In order to increase electrode density, compression may be performed after drying.

<Positive Electrode>

The positive electrode used in the nonaqueous electrolyte secondary battery includes the positive electrode active material configured to occlude and release a charge carrier. The positive electrode includes the current collector and the positive electrode active material layer bound to the surface of the current collector. The positive electrode active material layer includes the positive electrode active material, and, if necessary, the binding agent and/or the conductive additive. The current collector of the positive electrode is not particularly limited as long as the current collector is a metal capable of withstanding a voltage suited for the active material that is used. Examples of the current collector include at least one selected from silver, copper, gold, aluminum, tungsten, cobalt, zinc, nickel, iron, platinum, tin, indium, titanium, ruthenium, tantalum, chromium, or molybdenum, and metal materials such as stainless steel. When the nonaqueous electrolyte secondary battery of the present invention is a lithium ion secondary battery, and when the potential of the positive electrode is set to not lower than 4 V using lithium as reference, a current collector made from aluminum is preferably used.

The electrolytic solution of the present invention is unlikely to corrode a current collector made from aluminum. Thus, the nonaqueous electrolyte secondary battery using the electrolytic solution of the present invention and the aluminum current collector on the positive electrode is thought unlikely to cause elution of Al even at a high potential. Although the reason why elution of Al is unlikely to occur is unclear, the electrolytic solution of the present invention is different from the conventional electrolytic solution regarding the types and existing environment of the metal salt and the organic solvent and the concentration of the metal salt. Thus, solubility of Al with respect to the electrolytic solution of the present invention is speculated to be low when compared to a conventional electrolytic solution.

Specifically, one formed from aluminum or an aluminum alloy is preferably used as the positive electrode current collector. Here, aluminum refers to pure aluminum, and an aluminum whose purity is equal to or higher than 99.0% is referred to as pure aluminum. An alloy obtained by adding various elements to pure aluminum is referred to as an aluminum alloy. Examples of the aluminum alloy include those that are Al—Cu based, Al—Mn based, Al—Fe based, Al—Si based, Al—Mg based, AL—Mg—Si based, and Al—Zn—Mg based.

In addition, specific examples of aluminum or the aluminum alloy include A1000 series alloys (pure aluminum based) such as JIS A1085, A1N30, etc., A3000 series alloys (Al—Mn based) such as JIS A3003, A3004, etc., and A8000 series alloys (Al—Fe based) such as JIS A8079, A8021, etc.

The current collector may be coated with a protective layer known in the art. One obtained by treating the surface of the current collector with a method known in the art may be used as the current collector.

The current collector takes forms such as a foil, a sheet, a film, a line shape, a bar shape, and a mesh. Thus, as the current collector, for example, metal foils such as copper foil, nickel foil, aluminum foil, and stainless steel foil are suitably used. When the current collector is in the form of a foil, a sheet, or a film, its thickness is preferably within a range of 1 μm to 100 μm.

The binding agent and the conductive additive of the positive electrode are similar to those described in relation to the negative electrode.

Examples of the positive electrode active material include layer compounds that are $Li_aNi_bCo_cMn_dD_eO_f$ ($0.2 \le a \le 1.2$; $b+c+d+e=1$; $0 \le e < 1$; D is at least one element selected from Li, Fe, Cr, Cu, Zn, Ca, Mg, S, Si, Na, K, Al, Zr, Ti, P, Ga, Ge, V, Mo, Nb, W, or La; $1.7 \le f \le 2.1$) and $Li_2MnO_3$. Additional examples of the positive electrode active material include spinel such as $LiMn_2O_4$, a solid solution formed from a mixture of spinel and a layer compound, and polyanion based compounds such as $LiMPO_4$, $LiMVO_4$, or $Li_2MSiO_4$ (wherein, "M" is selected from at least one of Co, Ni, Mn, or Fe).

Further additional examples of the positive electrode active material include favorite based compounds represented by $LiMPO_4F$ ("M" is a transition metal) such as $LiFePO_4F$ and borate based compounds represented by $LiMBO_3$ ("M" is a transition metal) such as $LiFeBO_3$. Any metal oxide used as the positive electrode active material may have a basic composition of the composition formulae described above, and those in which a metal element included in the basic composition is substituted with another metal element may also be used.

In addition, as the positive electrode active material, a positive electrode active material that does not include a charge carrier that contributes to charging and discharging may be used. For example, in the case with the lithium ion secondary battery, elemental substance sulfur (S), a compound that is a composite of sulfur and carbon, metal sulfides such as $TiS_2$, oxides such as $V_2O_5$ and $MnO_2$, polyaniline and anthraquinone and compounds including such aromatics in the chemical structure, conjugate based materials such as conjugate diacetic acid based organic matters, and other materials known in the art may be used for the positive electrode active material. Furthermore, a compound having a stable radical such as nitroxide, nitronyl nitroxide, galvinoxyl, and phenoxyl may be used as the positive electrode active material.

When a raw material for the positive electrode active material not containing a charge carrier such as lithium is to be used, a charge carrier has to be added in advance to the positive electrode and/or the negative electrode using a method known in the art. Specifically, the charge carrier may be added in an ionic state, or may be added in a nonionic state such as a metal or a compound. For example, a lithium foil or the like may be pasted to, and integrated with the positive electrode and/or the negative electrode. Similarly to the negative electrode, the positive electrode may include a conductive additive, a binder, and the like. The conductive additive and the binder are not particularly limited as long as the conductive additive and the binder are usable in a nonaqueous electrolyte secondary battery, similarly to the negative electrode.

In order to form the active material layer on the surface of the current collector, the active material may be applied on the surface of the current collector using a conventional method known in the art such as roll coating method, die coating method, dip coating method, doctor blade method, spray coating method, and curtain coating method. Specifically, an active material layer forming composition including the active material and, if necessary, the binding agent and the conductive additive is prepared, and, after adding a suitable solvent to this composition to obtain a paste, the paste is applied on the surface of the current collector and then dried. Examples of the solvent include N-methyl-2-pyrrolidone, methanol, methyl isobutyl ketone, and water. In order to increase electrode density, compression may be performed after drying.

A separator is used in the nonaqueous electrolyte secondary battery, if necessary. The separator is for separating the positive electrode and the negative electrode to allow passage of lithium ions while preventing short circuiting of current due to a contact of both electrodes. Examples of the separator include porous materials, nonwoven fabrics, and woven fabrics using one or more types of materials having electrical insulation property such as: synthetic resins such as polytetrafluoroethylene, polypropylene, polyethylene, polyimide, polyamide, polyaramide (aromatic polyamide), polyester, and polyacrylonitrile; polysaccharides such as cellulose and amylose; natural polymers such as fibroin, keratin, lignin, and suberin; and ceramics. In addition, the separator may have a multilayer structure. Since the electrolytic solution of the present invention has a high polarity and a slightly high viscosity, a film which is easily impregnated with a polar solvent such as water is preferable. Specifically, a film in which 90% or more of gaps existing therein are impregnated with a polar solvent such as water is preferable.

An electrode assembly is formed from the positive electrode, the negative electrode, and, if necessary, the separator interposed therebetween. The electrode assembly may be a laminated type obtained by stacking the positive electrode, the separator, and the negative electrode, or a wound type obtained by winding the positive electrode, the separator, and the negative electrode. The nonaqueous electrolyte secondary battery is preferably formed by respectively connecting, using current collecting leads or the like, the positive electrode current collector to a positive electrode external connection terminal and the negative electrode current collector to a negative electrode external connection terminal, and adding the electrolytic solution of the present invention to the electrode assembly. In addition, the nonaqueous electrolyte secondary battery of the present invention preferably executes charging and discharging at a voltage range suitable for the types of active materials included in the electrodes.

In the nonaqueous electrolyte secondary battery of the present invention including the electrolytic solution of the present invention, an SEI coating having a special structure derived from the electrolytic solution of the present invention is produced on the surface of the negative electrode and/or the surface of the positive electrode. As described later, the SEI coating includes S and O, and has an S=O structure. Thus, the electrolytic solution of the present invention for producing the SEI coating particularly includes, in a chemical structure of an anion of the salt, sulfur element and oxygen element. Hereinafter, if necessary, the SEI coating which has the special structure is referred to as an S,O-containing coating. The S,O-containing coating, in cooperation with the electrolytic solution of the present invention, contributes in the improvement of battery characteristics of the nonaqueous electrolyte secondary battery (improvement of battery life, improvement of input-output characteristics, etc.).

The form of the nonaqueous electrolyte secondary battery of the present invention is not particularly limited, and various forms such as a cylindrical type, square type, a coin type, and a laminated type, etc., are used.

The nonaqueous electrolyte secondary battery of the present invention may be mounted on a vehicle. The vehicle may be a vehicle that uses, as all or one portion of the source of power, electrical energy obtained from the nonaqueous electrolyte secondary battery, and examples thereof include electric vehicles and hybrid vehicles. When the nonaqueous electrolyte secondary battery is to be mounted on the vehicle, a plurality of the nonaqueous electrolyte secondary batteries may be connected in series to form an assembled battery. Other than the vehicles, examples of instruments on which the nonaqueous electrolyte secondary battery may be mounted include various home appliances, office instruments, and industrial instruments driven by a battery such as personal computers and portable communication devices. In addition, the nonaqueous electrolyte secondary battery of the present invention may be used as power storage devices and power smoothing devices for wind power generation, photovoltaic power generation, hydroelectric power generation, and other power systems, power supply sources for auxiliary machineries and/or power of ships, etc., power supply sources for auxiliary machineries and/or power of aircraft and spacecraft, etc., auxiliary power supply for vehicles that do not use electricity as a source of power, power supply for movable household robots, power supply for system backup, power supply for uninterruptible power supply devices, and power storage devices for temporarily storing power required for charging at charge stations for electric vehicles.

Although the embodiments of the present invention have been described above, the present invention is not limited to the embodiments. Without departing from the gist of the present invention, the present invention can be implemented in various modes with modifications and improvements, etc., that can be made by a person skilled in the art.

In the following, embodiments of the present invention are described specifically by means of Examples, Comparative Examples, and the like. The present invention is not limited to these Examples. Hereinafter, unless mentioned otherwise in particular, "part(s)" refers to part(s) by mass, and "%" refers to mass %.

(Electrolytic Solution of the Present Invention)
(Electrolytic Solution E1)

The electrolytic solution of the present invention was produced in the following manner.

Approximately 5 mL of 1,2-dimethoxyethane, which is an organic solvent, was placed in a flask including a stirring bar and a thermometer. Under a stirring condition, with respect to 1,2-dimethoxyethane in the flask, $(CF_3SO_2)_2NLi$, which is a lithium salt, was gradually added so as to maintain a solution temperature equal to or lower than 40° C. to be dissolved. Since dissolving of $(CF_3SO_2)_2NLi$ momentarily stagnated at a time point when approximately 13 g of $(CF_3SO_2)_2NLi$ was added, the flask was heated by placing the flask in a temperature controlled bath such that the solution temperature in the flask reaches 50° C. to dissolve $(CF_3SO_2)_2NLi$. Since dissolving of $(CF_3SO_2)_2NLi$ stagnated again at a time point when approximately 15 g of $(CF_3SO_2)_2NLi$ was added, a single drop of 1,2-dimethoxyethane was added thereto using a pipette to dissolve $(CF_3SO_2)_2NLi$. Furthermore, $(CF_3SO_2)_2NLi$ was gradually added to accomplish adding an entire predetermined amount of $(CF_3SO_2)_2NLi$. The obtained electrolytic solution was transferred to a 20-mL measuring flask, and 1,2-dimethoxyethane was added thereto until a volume of 20 mL was obtained. This was used as electrolytic solution E1. The volume of the obtained electrolytic solution was 20 mL, and 18.38 g of $(CF_3SO_2)_2NLi$ was contained in the electrolytic solution. The concentration of $(CF_3SO_2)_2NLi$ in electrolytic solution E1 was 3.2 mol/L. In electrolytic solution E1, 1.6 molecules of 1,2-dimethoxyethane were contained with respect to 1 molecule of $(CF_3SO_2)_2NLi$.

The production was performed within a glovebox under an inert gas atmosphere.

(Electrolytic Solution E2)

With a method similar to that of electrolytic solution E1, electrolytic solution E2 whose concentration of $(CF_3SO_2)_2NLi$ was 2.8 mol/L was produced using 16.08 g of $(CF_3SO_2)_2NLi$. In electrolytic solution E2, 2.1 molecules of 1,2-dimethoxyethane were contained with respect to 1 molecule of $(CF_3SO_2)_2NLi$.

(Electrolytic Solution E3)

Approximately 5 mL of acetonitrile, which is an organic solvent, was placed in a flask including a stirring bar. Under a stirring condition, with respect to acetonitrile in the flask, $(CF_3SO_2)_2NLi$, which is a lithium salt, was gradually added to be dissolved. A total amount of 19.52 g of $(CF_3SO_2)_2NLi$ was added to the flask, and stirring was performed overnight in the flask. The obtained electrolytic solution was transferred to a 20-mL measuring flask, and acetonitrile was added thereto until a volume of 20 mL was obtained. This was used as electrolytic solution E3. The production was performed within a glovebox under an inert gas atmosphere.

The concentration of $(CF_3SO_2)_2NLi$ in electrolytic solution E3 was 3.4 mol/L. In electrolytic solution E3, 3 molecules of acetonitrile were contained with respect to 1 molecule of $(CF_3SO_2)_2NLi$.

(Electrolytic Solution E4)

With a method similar to that of electrolytic solution E3, electrolytic solution E4 whose concentration of $(CF_3SO_2)_2NLi$ was 4.2 mol/L was produced using 24.11 g of $(CF_3SO_2)_2NLi$. In electrolytic solution E4, 1.9 molecules of acetonitrile were contained with respect to 1 molecule of $(CF_3SO_2)_2NLi$.

(Electrolytic Solution E5)

Electrolytic solution E5 whose concentration of $(FSO_2)_2NLi$ was 3.6 mol/L was produced with a method similar to that of electrolytic solution E3 except for using 13.47 g of $(FSO_2)_2NLi$ as the lithium salt and 1,2-dimethoxyethane as the organic solvent. In electrolytic solution E5, 1.9 molecules of 1,2-dimethoxyethane were contained with respect to 1 molecule of $(FSO_2)_2NLi$.

(Electrolytic Solution E6)

With a method similar to that of electrolytic solution E5, electrolytic solution E6 whose concentration of $(FSO_2)_2NLi$ was 4.0 mol/L was produced using 14.97 g of $(FSO_2)_2NLi$. In electrolytic solution E6, 1.5 molecules of 1,2-dimethoxyethane were contained with respect to 1 molecule of $(FSO_2)_2NLi$.

(Electrolytic Solution E7)

Electrolytic solution E7 whose concentration of $(FSO_2)_2NLi$ was 4.2 mol/L was produced with a method similar to that of electrolytic solution E3 except for using 15.72 g of $(FSO_2)_2NLi$ as the lithium salt. In electrolytic solution E7, 3 molecules of acetonitrile were contained with respect to 1 molecule of $(FSO_2)_2NLi$.

(Electrolytic Solution E8)

With a method similar to that of electrolytic solution E7, electrolytic solution E8 whose concentration of $(FSO_2)_2NLi$ was 4.5 mol/L was produced using 16.83 g of $(FSO_2)_2NLi$. In electrolytic solution E8, 2.4 molecules of acetonitrile were contained with respect to 1 molecule of $(FSO_2)_2NLi$.

(Electrolytic Solution E9)

With a method similar to that of electrolytic solution E7, electrolytic solution E9 whose concentration of $(FSO_2)_2NLi$ was 5.0 mol/L was produced using 18.71 g of $(FSO_2)_2NLi$ii. In electrolytic solution E9, 2.1 molecules of acetonitrile were contained with respect to 1 molecule of $(FSO_2)_2NLi$.

(Electrolytic Solution E10)

With a method similar to that of electrolytic solution E7, electrolytic solution E10 whose concentration of $(FSO_2)_2NLi$ was 5.4 mol/L was produced using 20.21 g of $(FSO_2)_2NLi$. In electrolytic solution E10, 2 molecules of acetonitrile were contained with respect to 1 molecule of $(FSO_2)_2NLi$.

(Electrolytic Solution E11)

Approximately 5 mL of dimethyl carbonate, which is an organic solvent, was placed in a flask including a stirring bar. Under a stirring condition, with respect to dimethyl carbonate in the flask, $(FSO_2)_2NLi$, which is a lithium salt, was gradually added to be dissolved. A total amount of 14.64 g of $(FSO_2)_2NLi$ was added to the flask, and stirring was performed overnight in the flask. The obtained electrolytic solution was transferred to a 20-mL measuring flask, and dimethyl carbonate was added thereto until a volume of 20 mL was obtained. This was used as electrolytic solution E11. The production was performed within a glovebox under an inert gas atmosphere.

The concentration of $(FSO_2)_2NLi$ in electrolytic solution E11 was 3.9 mol/L. In electrolytic solution E11, 2 molecules of dimethyl carbonate were contained with respect to 1 molecule of $(FSO_2)_2NLi$.

(Electrolytic Solution E12)

Electrolytic solution E12 whose concentration of $(FSO_2)_2NLi$ was 3.4 mol/L was obtained by adding dimethyl carbonate to, and thereby diluting, electrolytic solution E11. In electrolytic solution E12, 2.5 molecules of dimethyl carbonate were contained with respect to 1 molecule of $(FSO_2)_2NLi$.

(Electrolytic Solution E13)

Electrolytic solution E13 whose concentration of $(FSO_2)_2NLi$ was 2.9 mol/L was obtained by adding dimethyl carbonate to, and thereby diluting, electrolytic solution E11. In electrolytic solution E13, 3 molecules of dimethyl carbonate were contained with respect to 1 molecule of $(FSO_2)_2NLi$.

(Electrolytic Solution E14)

Electrolytic solution E14 whose concentration of $(FSO_2)_2NLi$ was 2.6 mol/L was obtained by adding dimethyl carbonate to, and thereby diluting, electrolytic solution E11. In electrolytic solution E14, 3.5 molecules of dimethyl carbonate were contained with respect to 1 molecule of $(FSO_2)_2NLi$.

(Electrolytic Solution E15)

Electrolytic solution E15 whose concentration of $(FSO_2)_2NLi$ was 2.0 mol/L was obtained by adding dimethyl carbonate to, and thereby diluting, electrolytic solution E11. In electrolytic solution E15, 5 molecules of dimethyl carbonate were contained with respect to 1 molecule of $(FSO_2)_2NLi$.

(Electrolytic Solution E16)

Approximately 5 mL of ethyl methyl carbonate, which is an organic solvent, was placed in a flask including a stirring bar. Under a stirring condition, with respect to ethyl methyl carbonate in the flask, $(FSO_2)_2NLi$, which is a lithium salt, was gradually added to be dissolved. A total amount of 12.81 g of $(FSO_2)_2NLi$ was added to the flask, and stirring was performed overnight in the flask. The obtained electrolytic solution was transferred to a 20-mL measuring flask, and ethyl methyl carbonate was added thereto until a volume of 20 mL was obtained. This was used as electrolytic solution E16. The production was performed within a glovebox under an inert gas atmosphere.

The concentration of $(FSO_2)_2NLi$ in electrolytic solution E16 was 3.4 mol/L. In electrolytic solution E16, 2 molecules of ethyl methyl carbonate were contained with respect to 1 molecule of $(FSO_2)_2NLi$.

(Electrolytic Solution E17)

Electrolytic solution E17 whose concentration of $(FSO_2)_2NLi$ was 2.9 mol/L was obtained by adding ethyl methyl carbonate to, and thereby diluting, electrolytic solution E16. In electrolytic solution E17, 2.5 molecules of ethyl methyl carbonate were contained with respect to 1 molecule of $(FSO_2)_2NLi$.

(Electrolytic Solution E18)

Electrolytic solution E18 whose concentration of $(FSO_2)_2NLi$ was 2.2 mol/L was obtained by adding ethyl methyl carbonate to, and thereby diluting, electrolytic solution E16. In electrolytic solution E18, 3.5 molecules of ethyl methyl carbonate were contained with respect to 1 molecule of $(FSO_2)_2NLi$.

(Electrolytic Solution E19)

Approximately 5 mL of diethyl carbonate, which is an organic solvent, was placed in a flask including a stirring bar. Under a stirring condition, with respect to diethyl carbonate in the flask, $(FSO_2)_2NLi$, which is a lithium salt, was gradually added to be dissolved. A total amount of 11.37 g of $(FSO_2)_2NLi$ was added to the flask, and stirring was performed overnight in the flask. The obtained electrolytic solution was transferred to a 20-mL measuring flask, and diethyl carbonate was added thereto until a volume of 20 mL was obtained. This was used as electrolytic solution E19. The production was performed within a glovebox under an inert gas atmosphere.

The concentration of $(FSO_2)_2NLi$ in electrolytic solution E19 was 3.0 mol/L. In electrolytic solution E19, 2 molecules of diethyl carbonate were contained with respect to 1 molecule of $(FSO_2)_2NLi$.

(Electrolytic Solution E20)
Electrolytic solution E20 whose concentration of (FSO$_2$)$_2$NLi was 2.6 mol/L was obtained by adding diethyl carbonate to, and thereby diluting, electrolytic solution E19. In electrolytic solution E20, 2.5 molecules of diethyl carbonate were contained with respect to 1 molecule of (FSO$_2$)$_2$NLi.

(Electrolytic Solution E21)
Electrolytic solution E21 whose concentration of (FSO$_2$)$_2$NLi was 2.0 mol/L was obtained by adding diethyl carbonate to, and thereby diluting, electrolytic solution E19. In electrolytic solution E21, 3.5 molecules of diethyl carbonate were contained with respect to 1 molecule of (FSO$_2$)$_2$NLi.

(Electrolytic Solution C1)
Electrolytic solution C1 whose concentration of (CF$_3$SO$_2$)$_2$NLi was 1.0 mol/L was produced with a method similar to that of electrolytic solution E3, except for using 5.74 g of (CF$_3$SO$_2$)$_2$NLi and 1,2-dimethoxyethane as the organic solvent. In electrolytic solution C1, 8.3 molecules of 1,2-dimethoxyethane were contained with respect to 1 molecule of (CF$_3$SO$_2$)$_2$NLi.

(Electrolytic Solution C2)
With a method similar to that of electrolytic solution E3, electrolytic solution C2 whose concentration of (CF$_3$SO$_2$)$_2$NLi was 1.0 mol/L was produced using 5.74 g of (CF$_3$SO$_2$)$_2$NLi. In electrolytic solution C2, 16 molecules of acetonitrile were contained with respect to 1 molecule of (CF$_3$SO$_2$)$_2$NLi.

(Electrolytic Solution C3)
With a method similar to that of electrolytic solution E5, electrolytic solution C3 whose concentration of (FSO$_2$)$_2$NLi was 1.0 mol/L was produced using 3.74 g of (FSO$_2$)$_2$NLi. In electrolytic solution C3, 8.8 molecules of 1,2-dimethoxyethane were contained with respect to 1 molecule of (FSO$_2$)$_2$NLi.

(Electrolytic Solution C4)
With a method similar to that of electrolytic solution E7, electrolytic solution C4 whose concentration of (FSO$_2$)$_2$NLi was 1.0 mol/L was produced using 3.74 g of (FSO$_2$)$_2$NLi. In electrolytic solution C4, 17 molecules of acetonitrile were contained with respect to 1 molecule of (FSO$_2$)$_2$NLi.

(Electrolytic Solution C5)
Electrolytic solution C5 whose concentration of LiPF$_6$ was 1.0 mol/L was produced with a method similar to that of electrolytic solution E3 except for using a mixed solvent of ethylene carbonate and diethyl carbonate (volume ratio of 3:7; hereinafter, sometimes referred to as "EC/DEC") as the organic solvent, and 3.04 g of LiPF$_6$ as the lithium salt.

(Electrolytic Solution C6)
Electrolytic solution C6 whose concentration of (FSO$_2$)$_2$NLi was 1.1 mol/L was obtained by adding dimethyl carbonate to, and thereby diluting, electrolytic solution E11. In electrolytic solution C6, 10 molecules of dimethyl carbonate were contained with respect to 1 molecule of (FSO$_2$)$_2$NLi.

(Electrolytic Solution C7)
Electrolytic solution C7 whose concentration of (FSO$_2$)$_2$NLi was 1.1 mol/L was obtained by adding ethyl methyl carbonate to, and thereby diluting, electrolytic solution E16. In electrolytic solution C7, 8 molecules of ethyl methyl carbonate were contained with respect to 1 molecule of (FSO$_2$)$_2$NLi.

(Electrolytic Solution C8)
Electrolytic solution C8 whose concentration of (FSO$_2$)$_2$NLi was 1.1 mol/L was obtained by adding diethyl carbonate to, and thereby diluting, electrolytic solution E19. In electrolytic solution C8, 7 molecules of diethyl carbonate were contained with respect to 1 molecule of (FSO$_2$)$_2$NLi.

Table 3 shows a list of electrolytic solutions E1 to E21 and C1 to C8.

TABLE 3

| | Lithium salt | Organic solvent | Lithium salt concentration (mol/L) | Organic solvent/ Lithium salt (mol ratio) |
|---|---|---|---|---|
| E1 | LiTFSA | DME | 3.2 | 1.6 |
| E2 | LiTFSA | DME | 2.8 | 2.1 |
| E3 | LiTFSA | AN | 3.4 | 3 |
| E4 | LiTFSA | AN | 4.2 | 1.9 |
| E5 | LiFSA | DME | 3.6 | 1.9 |
| E6 | LiFSA | DME | 4.0 | 1.5 |
| E7 | LiFSA | AN | 4.2 | 3 |
| E8 | LiFSA | AN | 4.5 | 2.4 |
| E9 | LiFSA | AN | 5.0 | 2.1 |
| E10 | LiFSA | AN | 5.4 | 2 |
| E11 | LiFSA | DMC | 3.9 | 2 |
| E12 | LiFSA | DMC | 3.4 | 2.5 |
| E13 | LiFSA | DMC | 2.9 | 3 |
| E14 | LiFSA | DMC | 2.6 | 3.5 |
| E15 | LiFSA | DMC | 2.0 | 5 |
| E16 | LiFSA | EMC | 3.4 | 2 |
| E17 | LiFSA | EMC | 2.9 | 2.5 |
| E18 | LiFSA | EMC | 2.2 | 3.5 |
| E19 | LiFSA | DEC | 3.0 | 2 |
| E20 | LiFSA | DEC | 2.6 | 2.5 |
| E21 | LiFSA | DEC | 2.0 | 3.5 |
| C1 | LiTFSA | DME | 1.0 | 8.3 |
| C2 | LiTFSA | AN | 1.0 | 16 |
| C3 | LiFSA | DME | 1.0 | 8.8 |
| C4 | LiFSA | AN | 1.0 | 17 |
| C5 | LiPF$_6$ | EC/DEC | 1.0 | |
| C6 | LiFSA | DMC | 1.1 | 10 |
| C7 | LiFSA | EMC | 1.1 | 8 |
| C8 | LiFSA | DEC | 1.1 | 7 |

LiTFSA: (CF$_3$SO$_2$)$_2$NLi,
LiFSA: (FSO$_2$)$_2$NLi
AN: acetonitrile,
DME: 1,2-dimethoxyethane
DMC: dimethyl carbonate,
EMC: ethyl methyl carbonate,
DEC: diethyl carbonate
EC/DEC: Mixed solvent of ethylene carbonate and diethyl carbonate (volume ratio 3:7)

Evaluation Example 1: IR Measurement

IR measurement was performed using the following conditions on electrolytic solutions E3, E4, E7, E8, E10, C2, and C4, acetonitrile, (CF$_3$SO$_2$)$_2$NLi, and (FSO$_2$)$_2$NLi. An IR spectrum in a range of 2100 to 2400 cm$^{-1}$ is shown in each of FIGS. 1 to 10. Furthermore, IR measurement was performed using the following conditions on electrolytic solutions E11 to E21 and C6 to C8, dimethyl carbonate, ethyl methyl carbonate, and diethyl carbonate. An IR spectrum in a range of 1900 to 1600 cm$^{-1}$ is shown in each of FIGS. 11 to 27. In addition, an IR spectrum of (FSO$_2$)$_2$NLi in a range of 1900 to 1600 cm$^{-1}$ is shown in FIG. 28. In each figure, the horizontal axis represents wave number (cm$^{-1}$) and the vertical axis represents absorbance (reflective absorbance).

IR Measuring Conditions
Device: FT-IR (manufactured by Bruker Optics K.K.)
Measuring condition: ATR method (diamond was used)
Measurement atmosphere: Inert gas atmosphere At around 2250 cm$^{-1}$ in the IR spectrum of acetonitrile shown in FIG. 8, a characteristic peak derived from stretching vibration of a triple bond between C and N of acetonitrile was observed. No particular peaks were observed at around 2250 cm$^{-1}$ in the IR spectrum of (CF$_3$SO$_2$)$_2$NLi shown in FIG. 9 and the IR spectrum of (FSO$_2$)$_2$NLi shown in FIG. 10.

In the IR spectrum of electrolytic solution E3 shown in FIG. 1, a characteristic peak derived from stretching vibration of a triple bond between C and N of acetonitrile was slightly (Io=0.00699) observed at around 2250 cm$^{-1}$. Additionally in the IR spectrum in FIG. 1, a characteristic peak derived from stretching vibration of a triple bond between C and N of acetonitrile was observed at a peak intensity of Is=0.05828 at around 2280 cm$^{-1}$ shifted toward the high wave number side from around 2250 cm$^{-1}$. The relationship between peak intensities of Is and Io was Is>Io and Is=8×Io.

Figure 2:
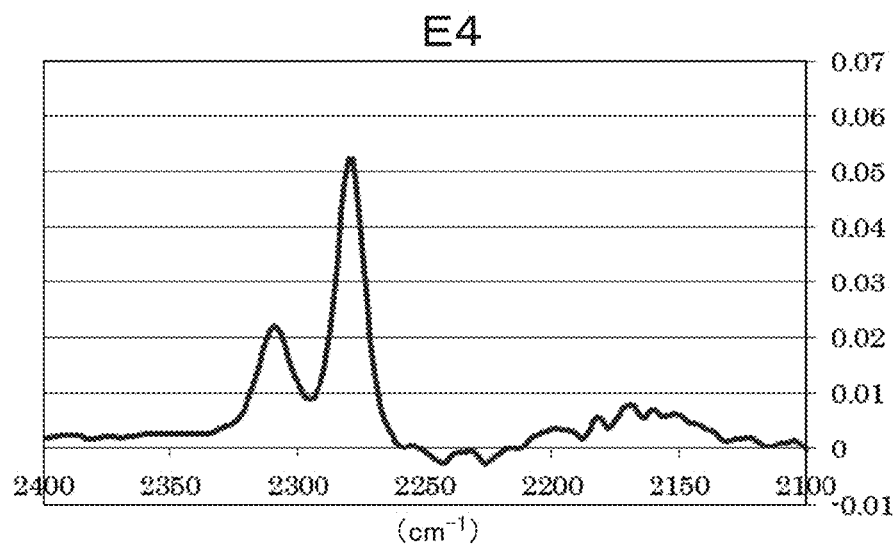
FIG. 2 is an IR spectrum of electrolytic solution E4.

In the IR spectrum of electrolytic solution E4 shown in FIG. 2, a peak derived from acetonitrile was not observed at around 2250 cm$^{-1}$, whereas a characteristic peak derived from stretching vibration of a triple bond between C and N of acetonitrile was observed at a peak intensity of Is=0.05234 at around 2280 cm$^{-1}$ shifted toward the high wave number side from around 2250 cm$^{-1}$. The relationship between peak intensities of Is and Io was Is>Io.

Figure 3:
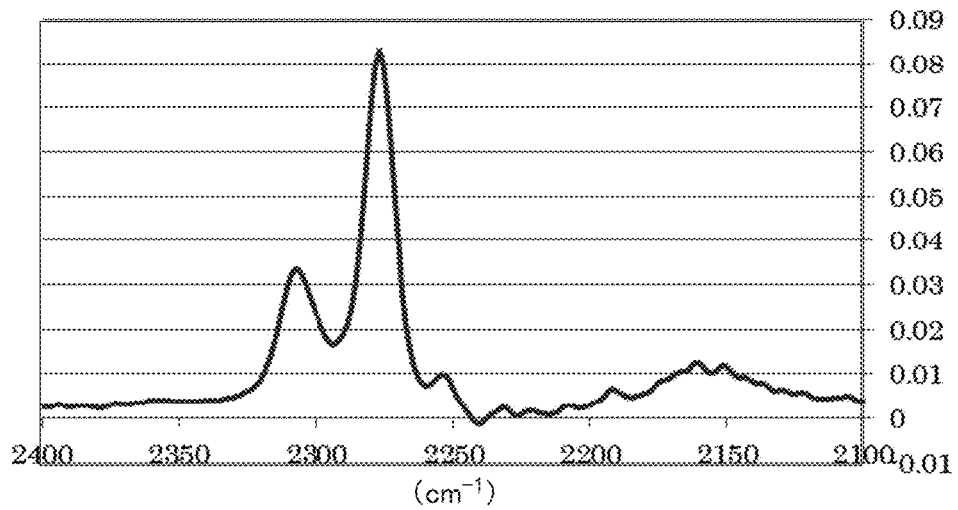
FIG. 3 is an IR spectrum of electrolytic solution E7.
Figure 4:
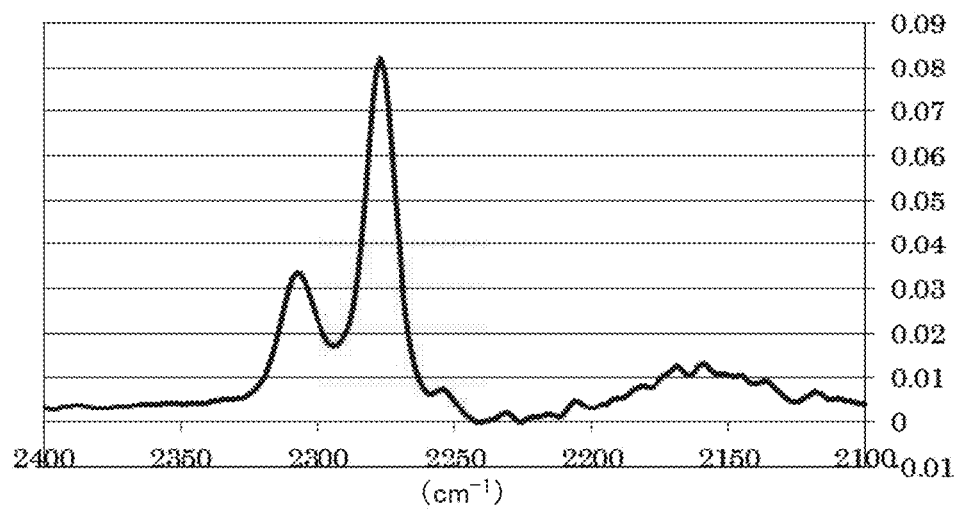
FIG. 4 is an IR spectrum of electrolytic solution E8.

In the IR spectrum of electrolytic solution E7 shown in FIG. 3, a characteristic peak derived from stretching vibration of a triple bond between C and N of acetonitrile was slightly (Io=0.00997) observed at around 2250 cm$^{-1}$. Additionally in the IR spectrum in FIG. 3, a characteristic peak derived from stretching vibration of a triple bond between C and N of acetonitrile was observed at a peak intensity of Is=0.08288 at around 2280 cm$^{-1}$ shifted toward the high wave number side from around 2250 cm$^{-1}$. The relationship between peak intensities of Is and Io was Is>Io and Is=8×Io. A peak having a similar intensity and similar wave number to those in the IR chart of FIG. 3 was also observed in the IR spectrum of electrolytic solution E8 shown in FIG. 4. The relationship between peak intensities of Is and Io was Is>Io and Is=11×Io.

Figure 5:
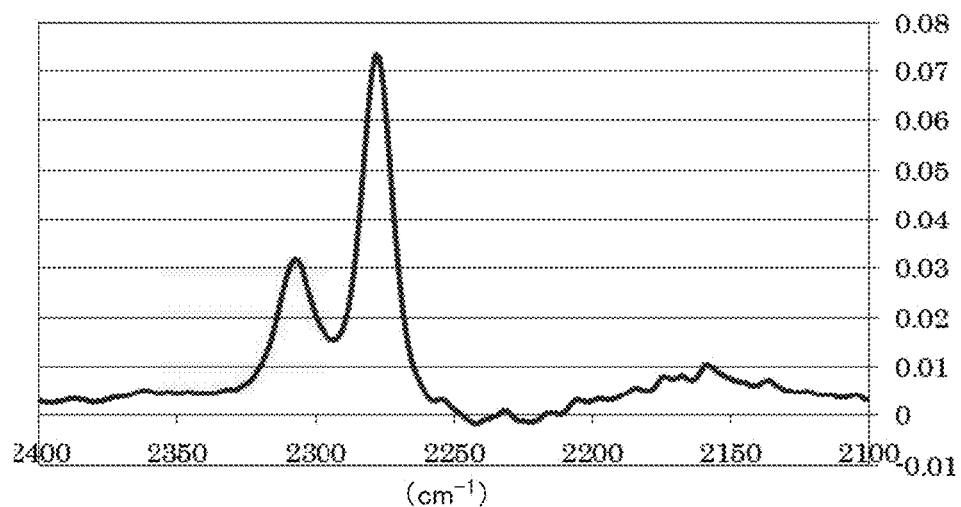
FIG. 5 is an IR spectrum of electrolytic solution E10.

In the IR spectrum of electrolytic solution E10 shown in FIG. 5, a peak derived from acetonitrile was not observed at around 2250 cm$^{-1}$, whereas a characteristic peak derived from stretching vibration of a triple bond between C and N of acetonitrile was observed at a peak intensity of Is=0.07350 at around 2280 cm$^{-1}$ shifted toward the high wave number side from around 2250 cm$^{-1}$. The relationship between peak intensities of Is and Io was Is>Io.

Figure 6:
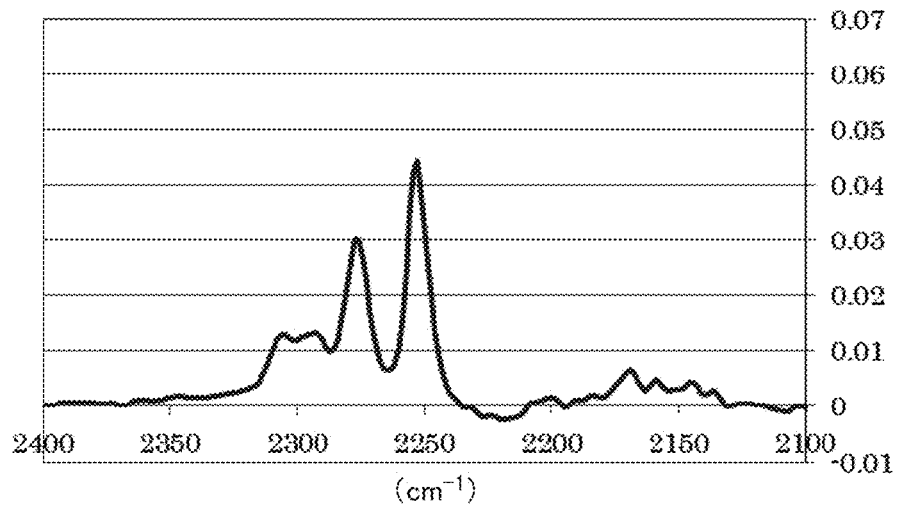
FIG. 6 is an IR spectrum of electrolytic solution C2.
Figure 8:
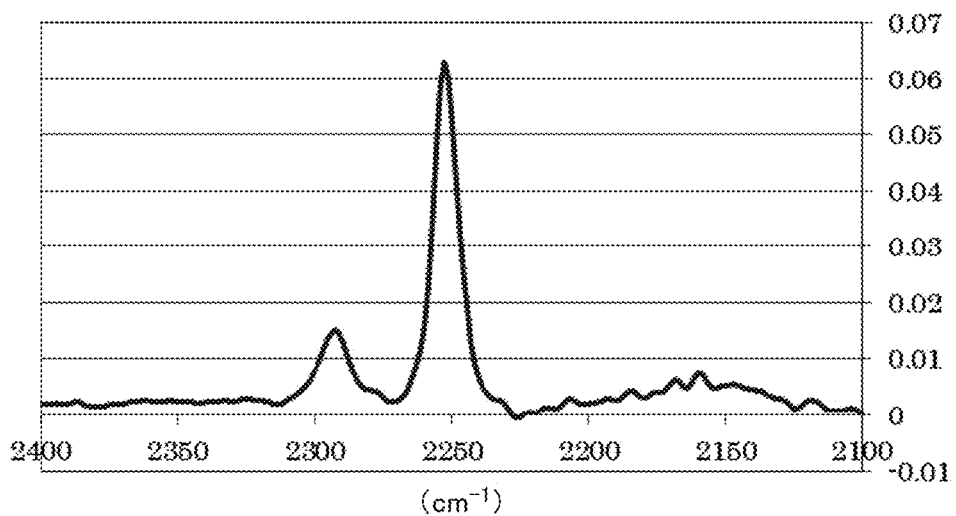
FIG. 8 is an IR spectrum of acetonitrile.
Figure 9:
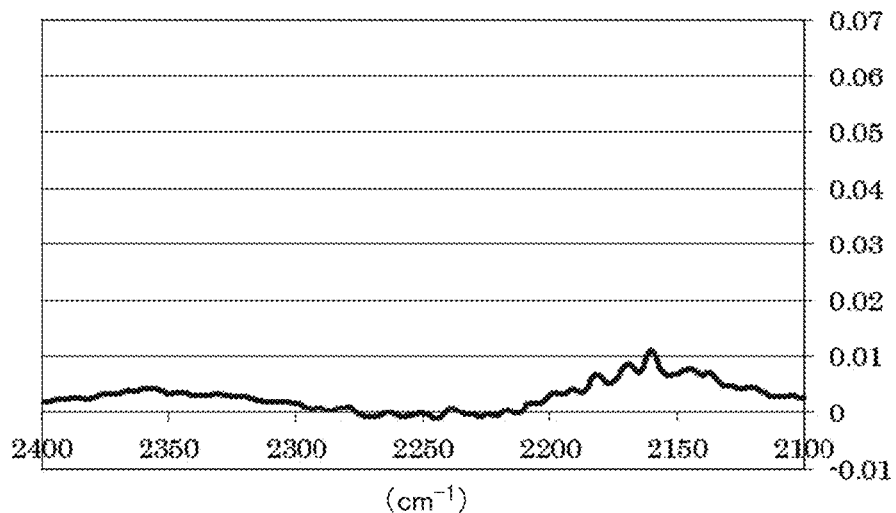
FIG. 9 is an IR spectrum of $(CF_3SO_2)_2NLi$.
Figure 10:
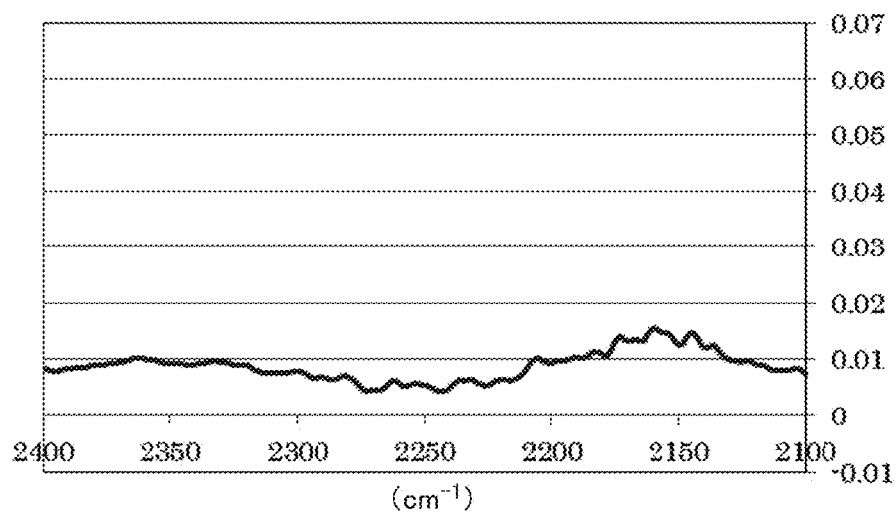
FIG. 10 is an IR spectrum of $(FSO_2)_2NLi$ (2100 to 2400 $cm^{-1}$)

In the IR spectrum of electrolytic solution C2 shown in FIG. 6, a characteristic peak derived from stretching vibration of a triple bond between C and N of acetonitrile was observed at a peak intensity of Io=0.04441 at around 2250 cm$^{-1}$ in a manner similar to FIG. 8. Additionally in the IR spectrum in FIG. 6, a characteristic peak derived from stretching vibration of a triple bond between C and N of acetonitrile was observed at a peak intensity of Is=0.03018 at around 2280 cm$^{-1}$ shifted toward the high wave number side from around 2250 cm$^{-1}$. The relationship between peak intensities of Is and Io was Is<Io.

Figure 7:
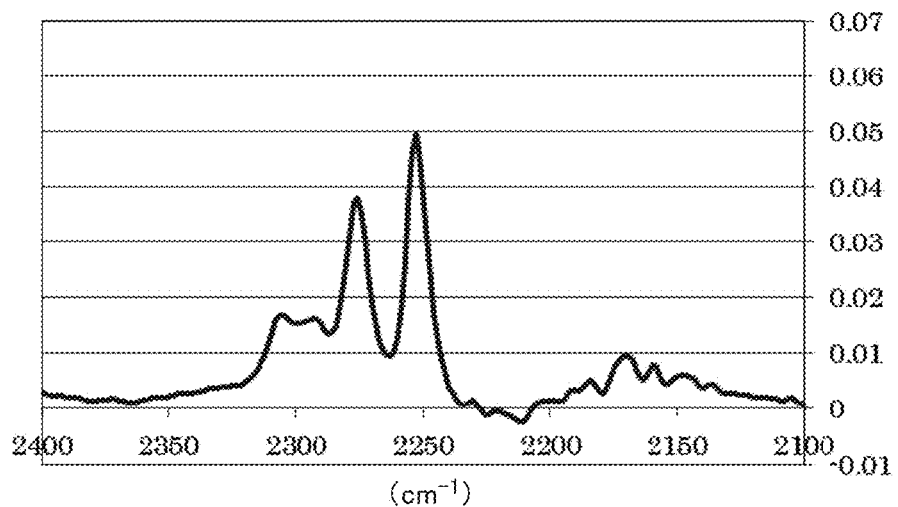
FIG. 7 is an IR spectrum of electrolytic solution C4.

In the IR spectrum of electrolytic solution C4 shown in FIG. 7, a characteristic peak derived from stretching vibration of a triple bond between C and N of acetonitrile was observed at a peak intensity of Io=0.04975 at around 2250 cm$^{-1}$ in a manner similar to FIG. 8. Additionally in the IR spectrum in FIG. 7, a characteristic peak derived from stretching vibration of a triple bond between C and N of acetonitrile was observed at a peak intensity of Is=0.03804 at around 2280 cm$^{-1}$ shifted toward the high wave number side from around 2250 cm$^{-1}$. The relationship between peak intensities of Is and Io was Is<Io.

Figure 25:
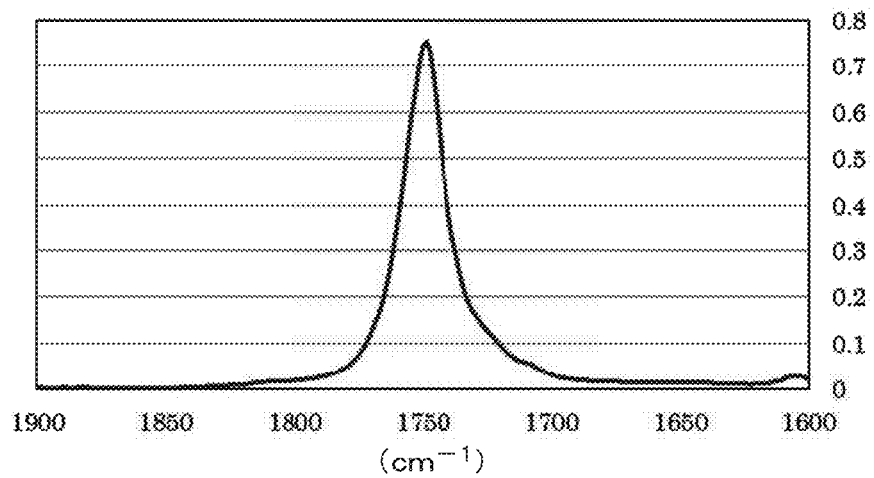
FIG. 25 is an IR spectrum of dimethyl carbonate.

In the IR spectrum of dimethyl carbonate shown in FIG. 25, a characteristic peak derived from stretching vibration of a double bond between C and O of dimethyl carbonate was observed at around 1750 cm$^{-1}$. No particular peaks were observed at around 1750 cm$^{-1}$ in the IR spectrum of (FSO$_2$)$_2$NLi shown in FIG. 28.

Figure 11:
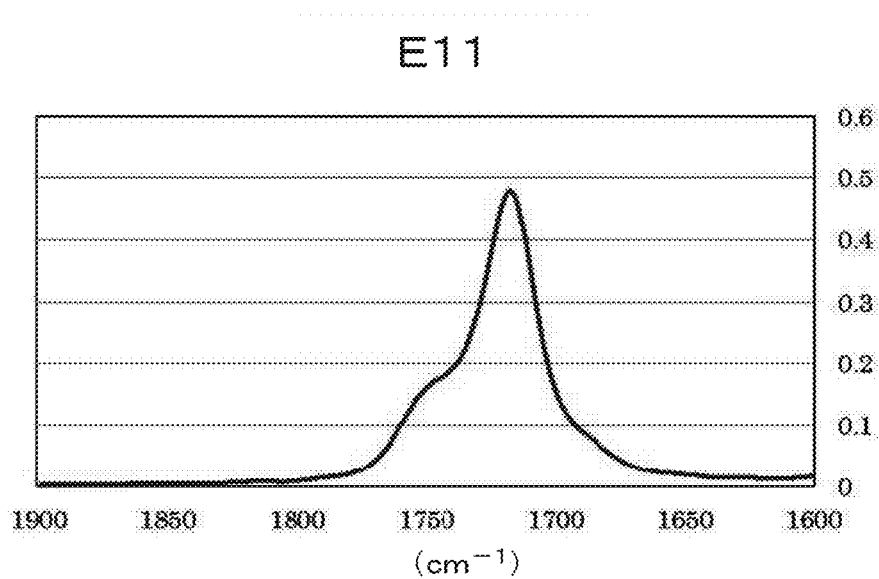
FIG. 11 is an IR spectrum of electrolytic solution E11.

In the IR spectrum of electrolytic solution E11 shown in FIG. 11, a characteristic peak derived from stretching vibration of a double bond between C and O of dimethyl carbonate was slightly (Io=0.16628) observed at around 1750 cm$^{-1}$. Additionally in the IR spectrum in FIG. 11, a characteristic peak derived from stretching vibration of a double bond between C and O of dimethyl carbonate was observed at a peak intensity of Is=0.48032 at around 1717 cm$^{-1}$ shifted toward the low wave number side from around 1750 cm$^{-1}$. The relationship between peak intensities of Is and Io was Is>Io and Is=2.89×Io.

Figure 12:
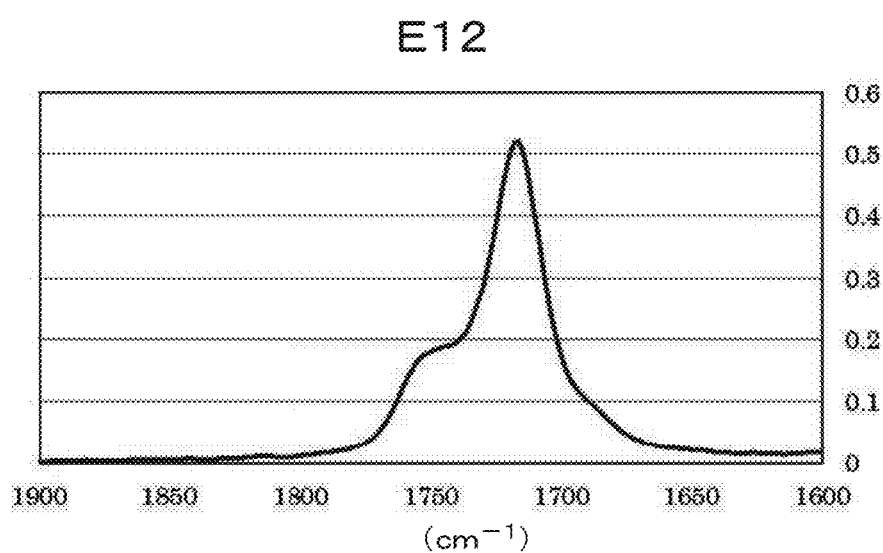
FIG. 12 is an IR spectrum of electrolytic solution E12.

In the IR spectrum of electrolytic solution E12 shown in FIG. 12, a characteristic peak derived from stretching vibration of a double bond between C and O of dimethyl carbonate was slightly (Io=0.18129) observed at around 1750 cm$^{-1}$. Additionally in the IR spectrum in FIG. 12, a characteristic peak derived from stretching vibration of a double bond between C and O of dimethyl carbonate was observed at a peak intensity of Is=0.52005 at around 1717 cm$^{-1}$ shifted toward the low wave number side from around 1750 cm$^{-1}$. The relationship between peak intensities of Is and Io was Is>Io and Is=2.87×Io.

Figure 13:
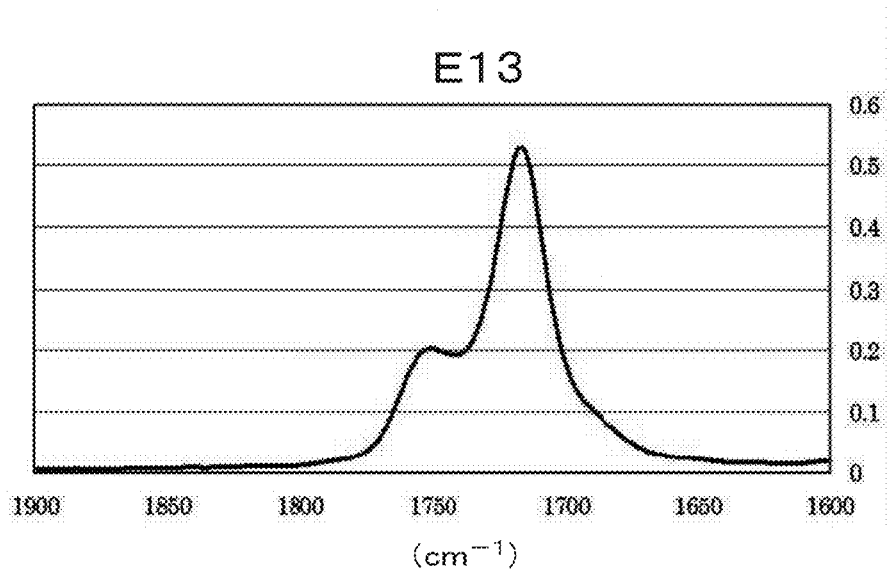
FIG. 13 is an IR spectrum of electrolytic solution E13.

In the IR spectrum of electrolytic solution E13 shown in FIG. 13, a characteristic peak derived from stretching vibration of a double bond between C and O of dimethyl carbonate was slightly (Io=0.20293) observed at around 1750 cm$^{-1}$. Additionally in the IR spectrum in FIG. 13, a characteristic peak derived from stretching vibration of a double bond between C and O of dimethyl carbonate was observed at a peak intensity of Is=0.53091 at around 1717 cm$^{-1}$ shifted toward the low wave number side from around 1750 cm$^{-1}$. The relationship between peak intensities of Is and Io was Is>Io and Is=2.62×Io.

Figure 14:
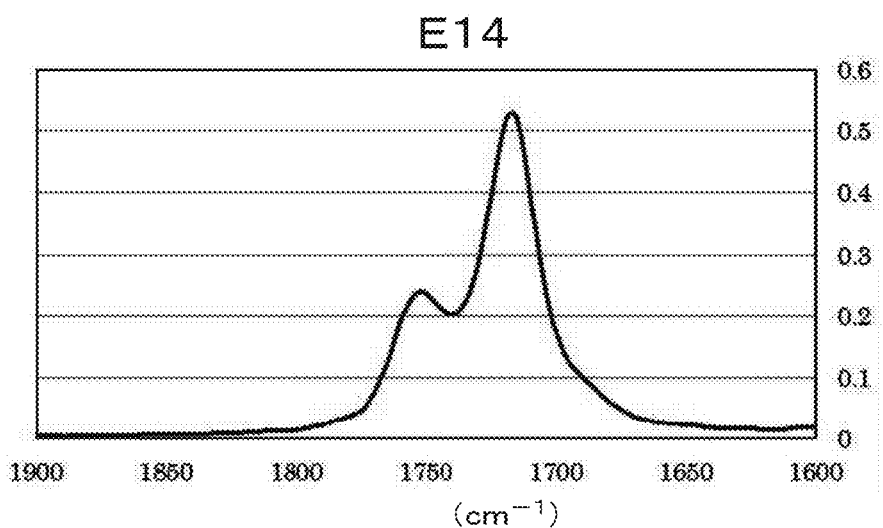
FIG. 14 is an IR spectrum of electrolytic solution E14.

In the IR spectrum of electrolytic solution E14 shown in FIG. 14, a characteristic peak derived from stretching vibration of a double bond between C and O of dimethyl carbonate was slightly (Io=0.23891) observed at around 1750 cm$^{-1}$. Additionally in the IR spectrum in FIG. 14, a characteristic peak derived from stretching vibration of a double bond between C and O of dimethyl carbonate was observed at a peak intensity of Is=0.53098 at around 1717 cm$^{-1}$ shifted toward the low wave number side from around 1750 cm$^{-1}$. The relationship between peak intensities of Is and Io was Is>Io and Is=2.22×Io.

Figure 15:
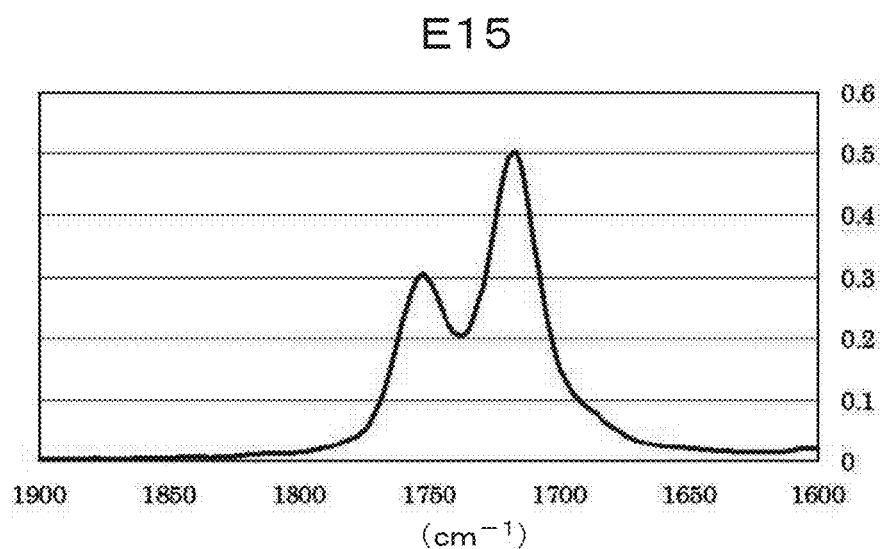
FIG. 15 is an IR spectrum of electrolytic solution E15.

In the IR spectrum of electrolytic solution E15 shown in FIG. 15, a characteristic peak derived from stretching vibration of a double bond between C and O of dimethyl carbonate was slightly (Io=0.30514) observed at around 1750 cm$^{-1}$. Additionally in the IR spectrum in FIG. 15, a characteristic peak derived from stretching vibration of a double bond between C and O of dimethyl carbonate was observed at a peak intensity of Is=0.50223 at around 1717 cm$^{-1}$ shifted toward the low wave number side from around 1750 cm$^{-1}$. The relationship between peak intensities of Is and Io was Is>Io and Is=1.65×Io.

Figure 22:
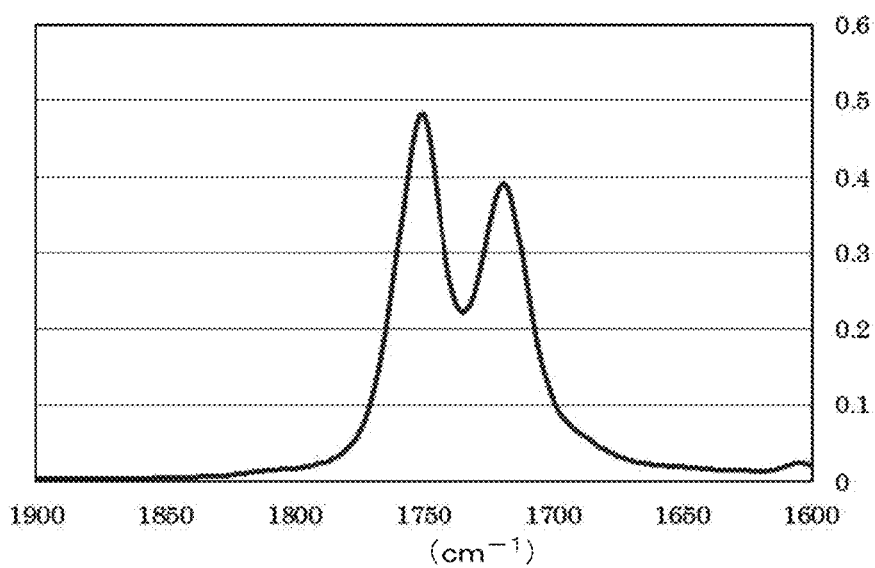
FIG. 22 is an IR spectrum of electrolytic solution C6.

In the IR spectrum of electrolytic solution C6 shown in FIG. 22, a characteristic peak derived from stretching vibration of a double bond between C and O of dimethyl carbonate was observed (Io=0.48204) at around 1750 cm$^{-1}$. Additionally in the IR spectrum in FIG. 22, a characteristic peak derived from stretching vibration of a double bond between C and O of dimethyl carbonate was observed at a peak intensity of Is=0.39244 at around 1717 cm$^{-1}$ shifted toward the low wave number side from around 1750 cm$^{-1}$. The relationship between peak intensities of Is and Io was Is<Io.

Figure 26:
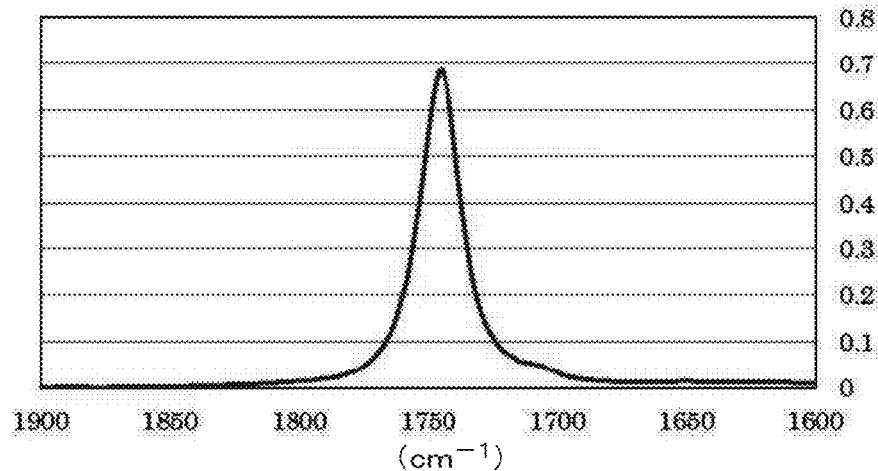
FIG. 26 is an IR spectrum of ethyl methyl carbonate.

At around 1745 cm$^{-1}$ in the IR spectrum of ethyl methyl carbonate shown in FIG. 26, a characteristic peak derived from stretching vibration of a double bond between C and O of ethyl methyl carbonate was observed.

Figure 16:
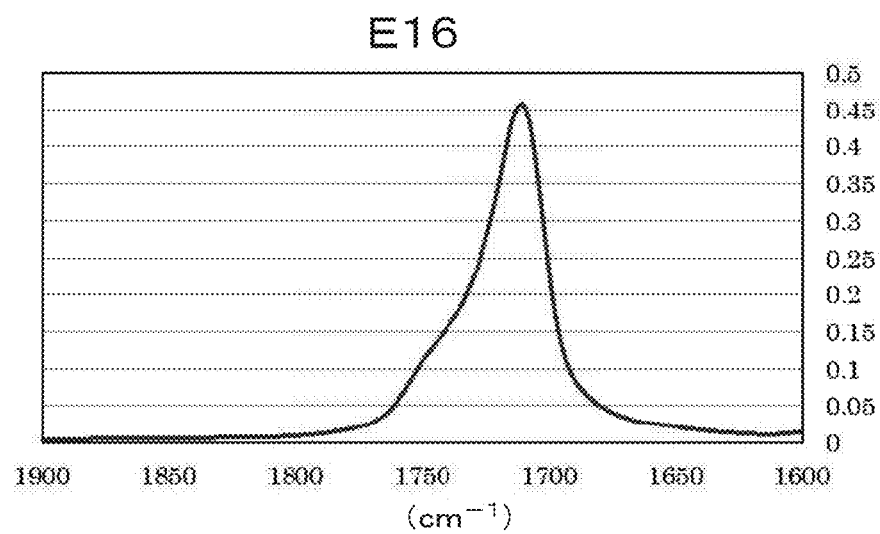
FIG. 16 is an IR spectrum of electrolytic solution E16.

In the IR spectrum of electrolytic solution E16 shown in FIG. 16, a characteristic peak derived from stretching vibration of a double bond between C and O of ethyl methyl carbonate was slightly (Io=0.13582) observed at around 1745 cm$^{-1}$. Additionally in the IR spectrum in FIG. 16, a characteristic peak derived from stretching vibration of a double bond between C and O of ethyl methyl carbonate was observed at a peak intensity of Is=0.45888 at around 1711 cm$^{-1}$ shifted toward the low wave number side from around 1745 cm$^{-1}$. The relationship between peak intensities of Is and Io was Is>Io and Is=3.38×Io.

Figure 17:
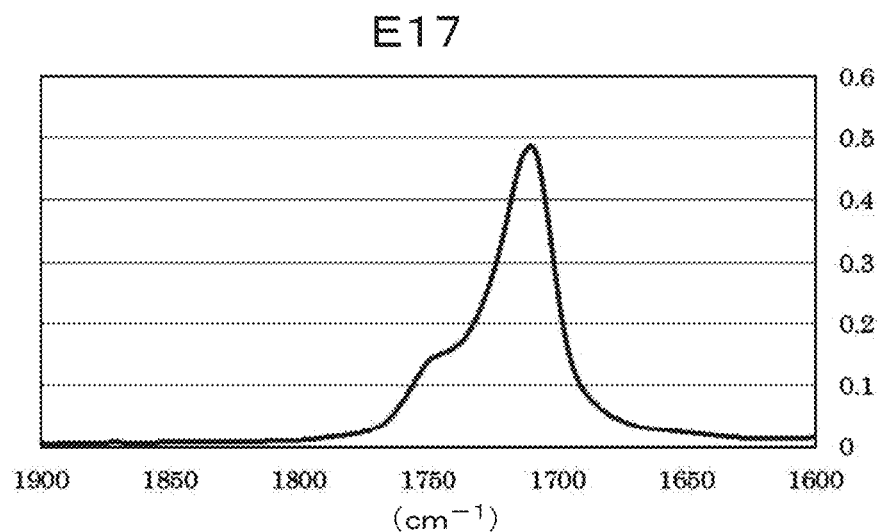
FIG. 17 is an IR spectrum of electrolytic solution E17.

In the IR spectrum of electrolytic solution E17 shown in FIG. 17, a characteristic peak derived from stretching vibration of a double bond between C and O of ethyl methyl carbonate was slightly (Io=0.15151) observed at around 1745 cm$^{-1}$. Additionally in the IR spectrum in FIG. 17, a characteristic peak derived from stretching vibration of a double bond between C and O of ethyl methyl carbonate was observed at a peak intensity of Is=0.48779 at around 1711 cm$^{-1}$ shifted toward the low wave number side from around 1745 cm$^{-1}$. The relationship between peak intensities of Is and Io was Is>Io and Is=3.22×Io.

Figure 18:
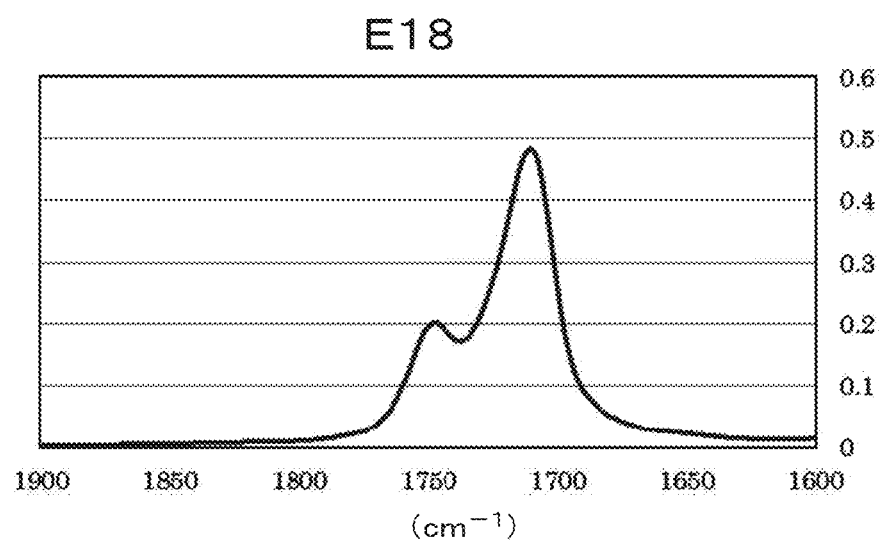
FIG. 18 is an IR spectrum of electrolytic solution E18.

In the IR spectrum of electrolytic solution E18 shown in FIG. 18, a characteristic peak derived from stretching vibration of a double bond between C and O of ethyl methyl carbonate was slightly (Io=0.20191) observed at around 1745 cm$^{-1}$. Additionally in the IR spectrum in FIG. 18, a characteristic peak derived from stretching vibration of a double bond between C and O of ethyl methyl carbonate was observed at a peak intensity of Is=0.48407 at around 1711 cm$^{-1}$ shifted toward the low wave number side from around 1745 cm$^{-1}$. The relationship between peak intensities of Is and Io was Is>Io and Is=2.40×Io.

Figure 23:
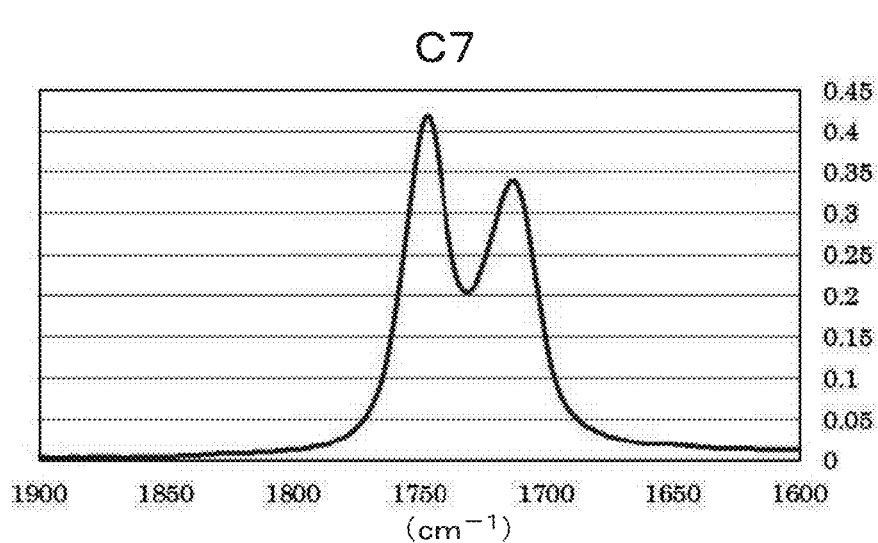
FIG. 23 is an IR spectrum of electrolytic solution C7.

In the IR spectrum of electrolytic solution C7 shown in FIG. 23, a characteristic peak derived from stretching vibration of a double bond between C and O of ethyl methyl carbonate was observed (Io=0.41907) at around 1745 cm$^{-1}$. Additionally in the IR spectrum in FIG. 23, a characteristic peak derived from stretching vibration of a double bond between C and O of ethyl methyl carbonate was observed at a peak intensity of Is=0.33929 at around 1711 cm$^{-1}$ shifted toward the low wave number side from around 1745 cm$^{-1}$. The relationship between peak intensities of Is and Io was Is<Io.

Figure 27:
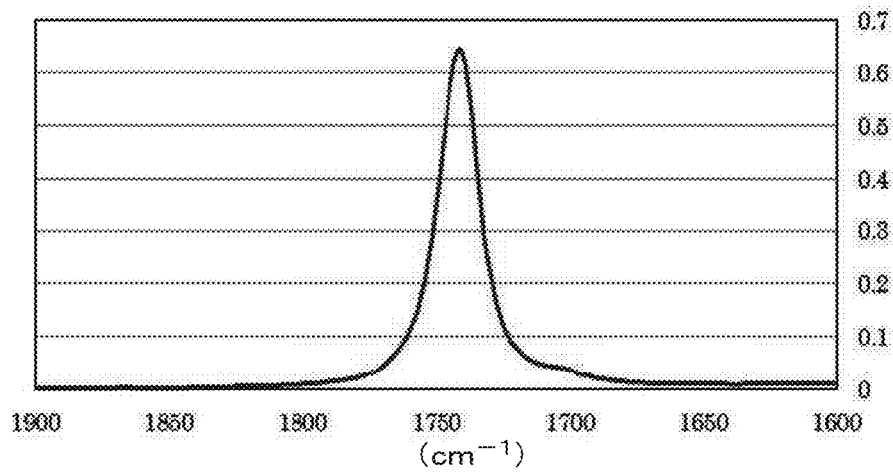
FIG. 27 is an IR spectrum of diethyl carbonate.
Figure 28:
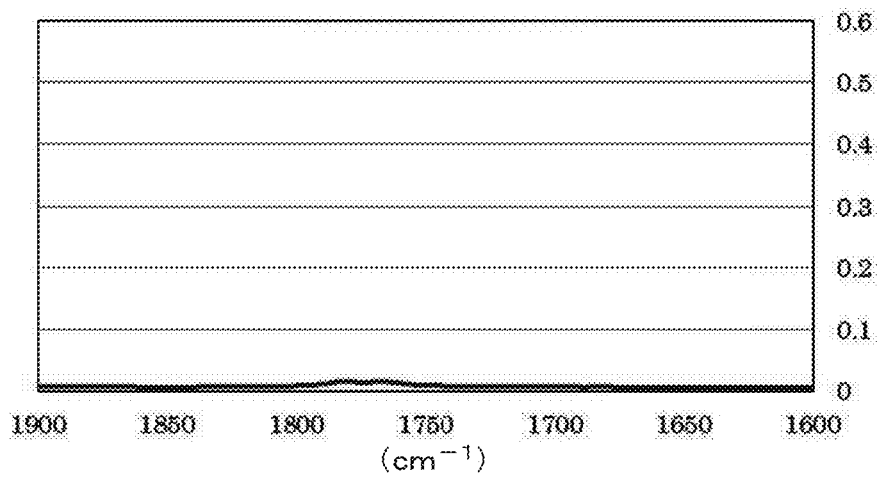
FIG. 28 is an IR spectrum of $(FSO_2)_2NLi$ (1900 to 1600 $cm^{-1}$)

At around 1742 cm$^{-1}$ in the IR spectrum of diethyl carbonate shown in FIG. 27, a characteristic peak derived from stretching vibration of a double bond between C and O of diethyl carbonate was observed.

Figure 19:
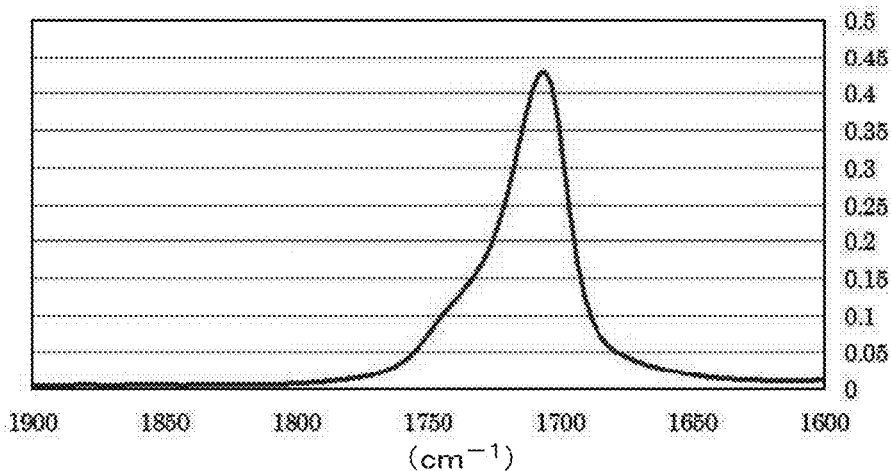
FIG. 19 is an IR spectrum of electrolytic solution E19.

In the IR spectrum of electrolytic solution E19 shown in FIG. 19, a characteristic peak derived from stretching vibration of a double bond between C and O of diethyl carbonate was slightly (Io=0.11202) observed at around 1742 cm$^{-1}$. Additionally in the IR spectrum in FIG. 19, a characteristic peak derived from stretching vibration of a double bond between C and O of diethyl carbonate was observed at a peak intensity of Is=0.42925 at around 1706 cm$^{-1}$ shifted toward the low wave number side from around 1742 cm$^{-1}$. The relationship between peak intensities of Is and Io was Is>Io and Is=3.83×Io.

Figure 20:
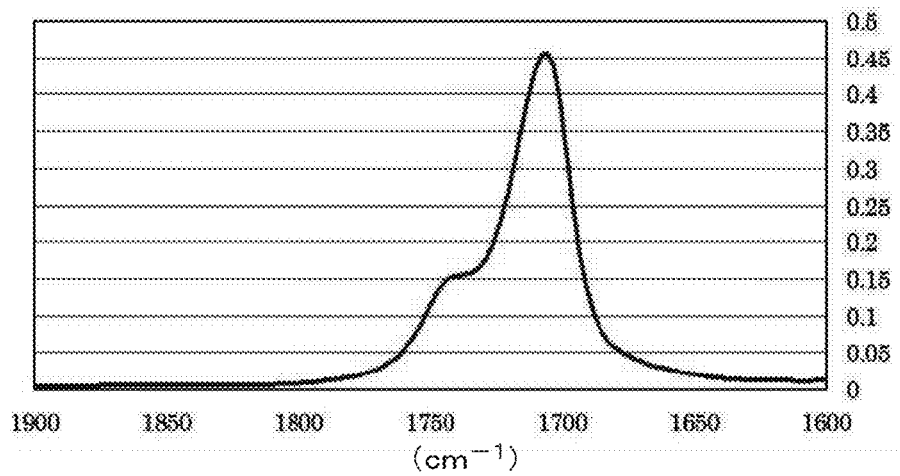
FIG. 20 is an IR spectrum of electrolytic solution E20.

In the IR spectrum of electrolytic solution E20 shown in FIG. 20, a characteristic peak derived from stretching vibration of a double bond between C and O of diethyl carbonate was slightly (Io=0.15231) observed at around 1742 cm$^{-1}$. Additionally in the IR spectrum in FIG. 20, a characteristic peak derived from stretching vibration of a double bond between C and O of diethyl carbonate was observed at a peak intensity of Is=0.45679 at around 1706 cm$^{-1}$ shifted toward the low wave number side from around 1742 cm$^{-1}$. The relationship between peak intensities of Is and Io was Is>Io and Is=3.00×Io.

Figure 21:
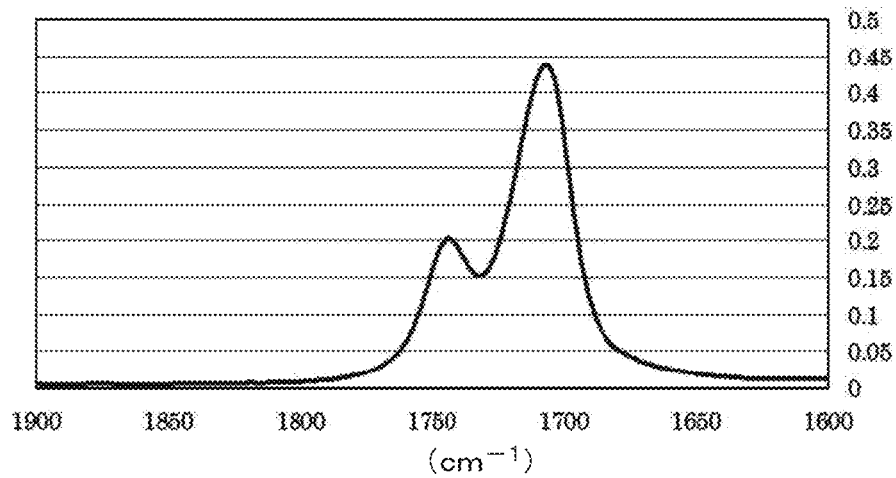
FIG. 21 is an IR spectrum of electrolytic solution E21.

In the IR spectrum of electrolytic solution E21 shown in FIG. 21, a characteristic peak derived from stretching vibration of a double bond between C and O of diethyl carbonate was slightly (Io=0.20337) observed at around 1742 cm$^{-1}$. Additionally in the IR spectrum in FIG. 21, a characteristic peak derived from stretching vibration of a double bond between C and O of diethyl carbonate was observed at a peak intensity of Is=0.43841 at around 1706 cm$^{-1}$ shifted toward the low wave number side from around 1742 cm$^{-1}$. The relationship between peak intensities of Is and Io was Is>Io and Is=2.16×Io.

Figure 24:
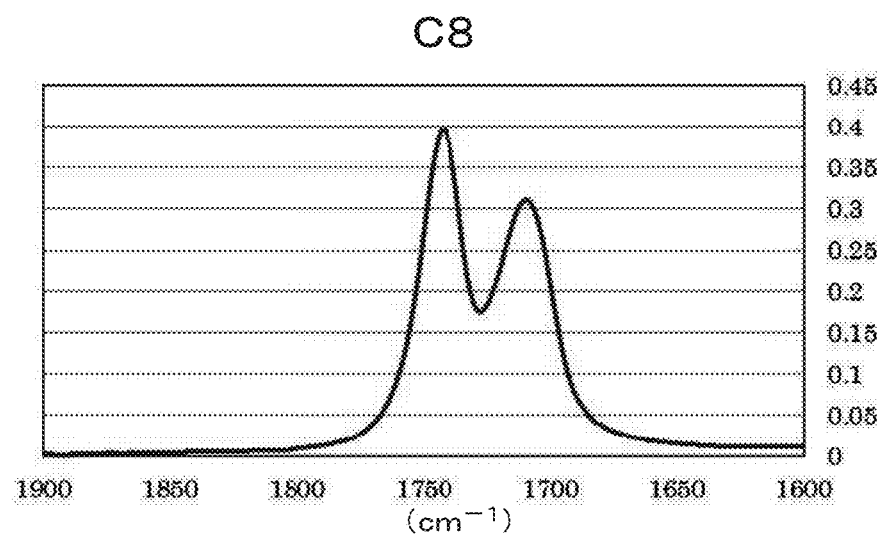
FIG. 24 is an IR spectrum of electrolytic solution C8.

In the IR spectrum of electrolytic solution C8 shown in FIG. 24, a characteristic peak derived from stretching vibration of a double bond between C and O of diethyl carbonate was observed (Io=0.39636) at around 1742 cm$^{-1}$. Additionally in the IR spectrum in FIG. 24, a characteristic peak derived from stretching vibration of a double bond between C and O of diethyl carbonate was observed at a peak intensity of Is=0.31129 at around 1709 cm$^{-1}$ shifted toward the low wave number side from around 1742 cm$^{-1}$. The relationship between peak intensities of Is and Io was Is<Io.

Evaluation Example 2: Ionic Conductivity

Ionic conductivities of electrolytic solutions E1, E2, E4 to E6, E8, E11, E16, and E19 were measured using the following conditions. The results are shown in Table 4.

Ionic Conductivity Measuring Conditions

Under an Ar atmosphere, an electrolytic solution was sealed in a glass cell that has a platinum electrode and whose cell constant is known, and impedance thereof was measured at 30° C., 1 kHz. Ionic conductivity was calculated based on the result of measuring impedance. As a measurement instrument, Solartron 147055BEC (Solartron Analytical) was used.

TABLE 4

|  | Lithium salt | Organic solvent | Lithium salt concentration (mol/L) | Ionic conductivity (mS/cm$^{-1}$) |
|---|---|---|---|---|
| E1 | LiTFSA | DME | 3.2 | 2.4 |
| E2 | LiTFSA | DME | 2.8 | 4.4 |
| E4 | LiTFSA | AN | 4.2 | 1.0 |
| E5 | LiFSA | DME | 3.6 | 7.2 |
| E6 | LiFSA | DME | 4.0 | 7.1 |
| E8 | LiFSA | AN | 4.5 | 9.7 |
| E9 | LiFSA | AN | 5.0 | 7.5 |
| E11 | LiFSA | DMC | 3.9 | 2.3 |
| E13 | LiFSA | DMC | 2.9 | 4.6 |
| E16 | LiFSA | EMC | 3.4 | 1.8 |
| E19 | LiFSA | DEC | 3.0 | 1.4 |

Electrolytic solutions E1, E2, E4 to E6, E8, E11, E16, and E19 all displayed ionic conductivity. Thus, the electrolytic solutions of the present invention are understood to be all capable of functioning as electrolytic solutions of various batteries.

Evaluation Example 3: Viscosity

Viscosities of electrolytic solutions E1, E2, E4 to E6, E8, E11, E16, E19, C1 to C4, and C6 to C8 were measured using the following conditions. The results are shown in Table 5.

Viscosity Measuring Conditions

Under an Ar atmosphere, an electrolytic solution was sealed in a test cell, and viscosity thereof was measured under a condition of 30° C. by using a falling ball viscometer (Louis 2000 M manufactured by Anton Paar GmbH).

TABLE 5

| | Lithium salt | Organic solvent | Lithium salt concentration (mol/L) | Viscosity (mPa · s) |
|---|---|---|---|---|
| E1 | LiTFSA | DME | 3.2 | 36.6 |
| E2 | LiTFSA | DME | 2.8 | 31.6 |
| E4 | LiTFSA | AN | 4.2 | 138.0 |
| E5 | LiFSA | DME | 3.6 | 25.1 |
| E6 | LiFSA | DME | 4.0 | 30.3 |
| E8 | LiFSA | AN | 4.5 | 23.8 |
| E9 | LiFSA | AN | 5.0 | 31.5 |
| E11 | LiFSA | DMC | 3.9 | 34.2 |
| E13 | LiFSA | DMC | 2.9 | 17.6 |
| E16 | LiFSA | EMC | 3.4 | 29.7 |
| E19 | LiFSA | DEC | 3.0 | 23.2 |
| C1 | LiTFSA | DME | 1.0 | 1.3 |
| C2 | LiTFSA | AN | 1.0 | 0.75 |
| C3 | LiFSA | DME | 1.0 | 1.2 |
| C4 | LiFSA | AN | 1.0 | 0.74 |
| C6 | LiFSA | DMC | 1.1 | 1.38 |
| C7 | LiFSA | EMC | 1.1 | 1.67 |
| C8 | LiFSA | DEC | 1.1 | 2.05 |

When compared to the viscosities of electrolytic solutions C1 to C4 and C6 to C8, the viscosities of electrolytic solutions E1, E2, E4 to E6, E8, E11, E16, and E19 were significantly higher. Thus, with a battery using the electrolytic solution of the present invention, even if the battery is damaged, leakage of the electrolytic solution is suppressed.

Evaluation Example 4: Volatility

Volatilities of electrolytic solutions E2, E4, E8, E11, E13, C1, C2, C4, and C6 were measured using the following method.

Approximately 10 mg of an electrolytic solution was placed in a pan made from aluminum, and the pan was disposed in a thermogravimetry measuring device (SDT600 manufactured by TA Instruments) to measure weight change of the electrolytic solution at room temperature. Volatilization rate was calculated through differentiation of weight change (mass %) by time. Among the obtained volatilization rates, largest values were selected and are shown in Table 6.

TABLE 6

| | Lithium salt | Organic solvent | Lithium salt concentration (mol/L) | Maximum volatilization rate (mass %/min.) |
|---|---|---|---|---|
| E2 | LiTFSA | DME | 2.8 | 0.4 |
| E4 | LiTFSA | AN | 4.2 | 2.1 |
| E8 | LiFSA | AN | 4.5 | 0.6 |
| E11 | LiFSA | DMC | 3.9 | 0.1 |
| E13 | LiFSA | DMC | 2.9 | 1.3 |
| C1 | LiTFSA | DME | 1.0 | 9.6 |
| C2 | LiTFSA | AN | 1.0 | 13.8 |
| C4 | LiFSA | AN | 1.0 | 16.3 |
| C6 | LiFSA | DMC | 1.1 | 6.1 |

Maximum volatilization rates of electrolytic solutions E2, E4, E8, E11, and E13 were significantly smaller than maximum volatilization rates of electrolytic solutions C1, C2, C4, and C6. Thus, even if a battery using the electrolytic solution of the present invention is damaged, rapid volatilization of the organic solvent outside the battery is suppressed since the volatilization rate of the electrolytic solution is small.

Evaluation Example 5: Combustibility

Combustibility of electrolytic solutions E4 and C2 was tested using the following method.

Three drops of an electrolytic solution were dropped on a glass filter by using a pipette to have the electrolytic solution retained by the glass filter. The glass filter was held by a pair of tweezers, and the glass filter was brought in contact with a flame.

Electrolytic solution E4 did not ignite even when being brought in contact with a flame for 15 seconds. On the other hand, electrolytic solution C2 burned out in a little over 5 seconds. Thus, the electrolytic solution of the present invention was confirmed to be unlikely to combust.

Evaluation Example 6: Low Temperature Test

Electrolytic solutions E11, E13, E16, and E19 were each placed in a container, and the container was filled with inert gas and sealed. These solutions were stored in a −30° C. freezer for two days. Each of the electrolytic solutions after storage was observed. All of the electrolytic solutions maintained a liquid state without solidifying, and depositing of salts was also not observed.

Evaluation Example 7: Raman Spectrum Measurement

Raman spectrum measurement was performed on electrolytic solutions E8, E9, C4, E11, E13, E15, and C6 using the following conditions. FIGS. 29 to 35 each show a Raman spectrum in which a peak derived from an anion portion of a metal salt of an electrolytic solution was observed. In each of the figures, the horizontal axis represents wave number ($cm^{-1}$) and the vertical axis represents scattering intensity.

Raman Spectrum Measurement Conditions

Device: Laser Raman spectrometer (NRS series, JASCO Corp.)

Laser wavelength: 532 nm

The electrolytic solutions were each sealed in a quartz cell under an inert gas atmosphere and subjected to the measurement.

Figure 29:
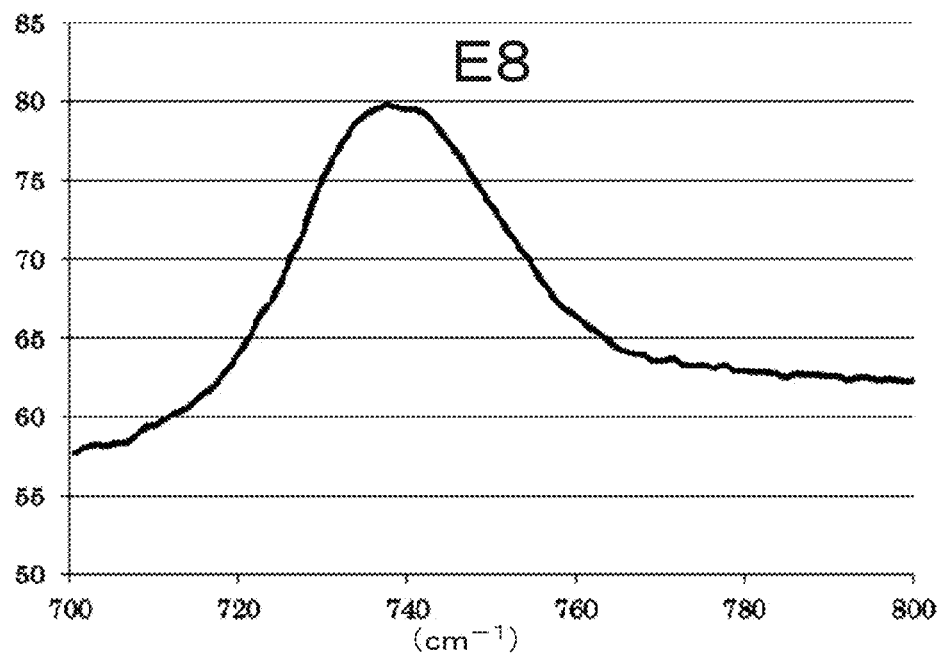
FIG. 29 is a Raman spectrum of electrolytic solution E8.
Figure 30:
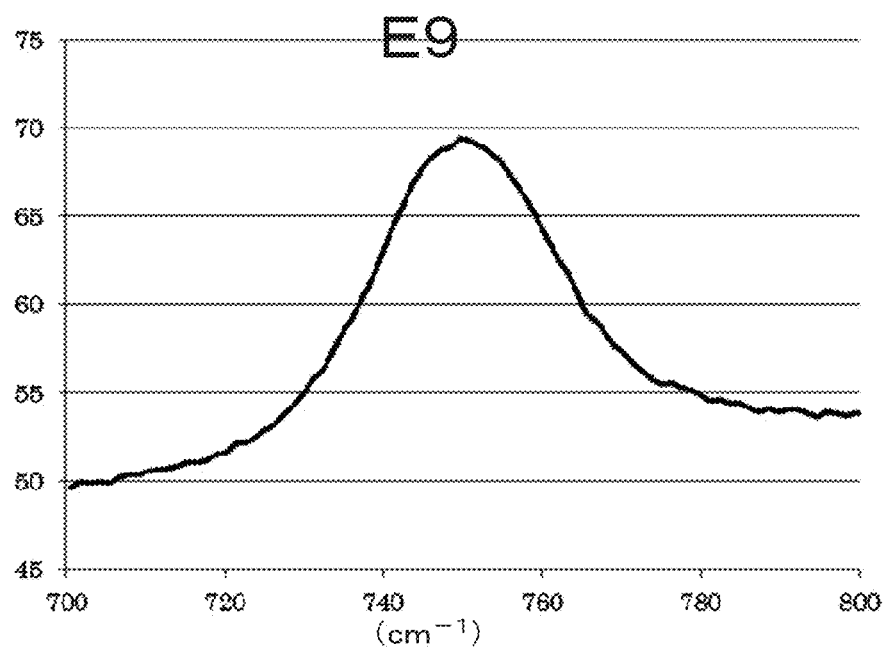
FIG. 30 is a Raman spectrum of electrolytic solution E9.
Figure 31:
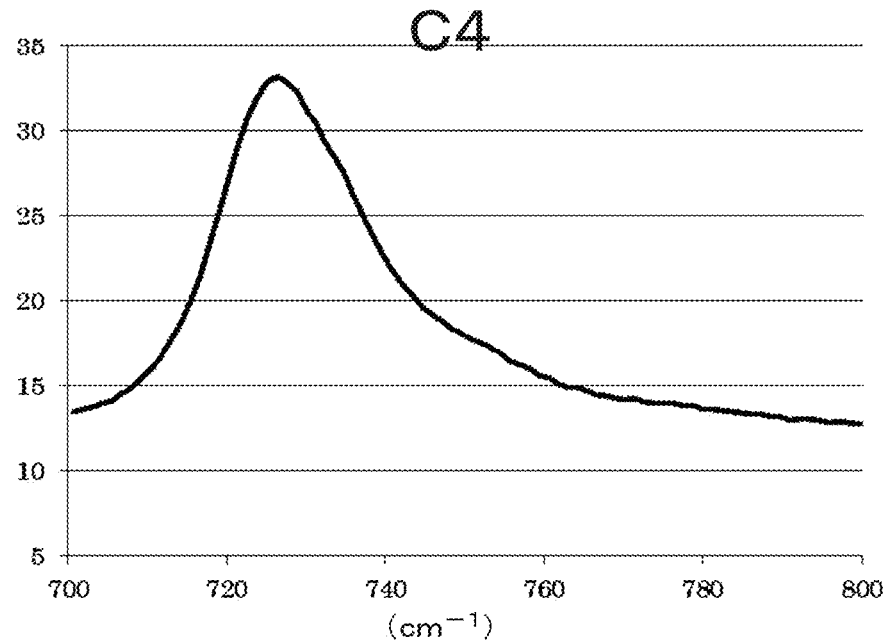
FIG. 31 is a Raman spectrum of electrolytic solution C4.
Figure 32:
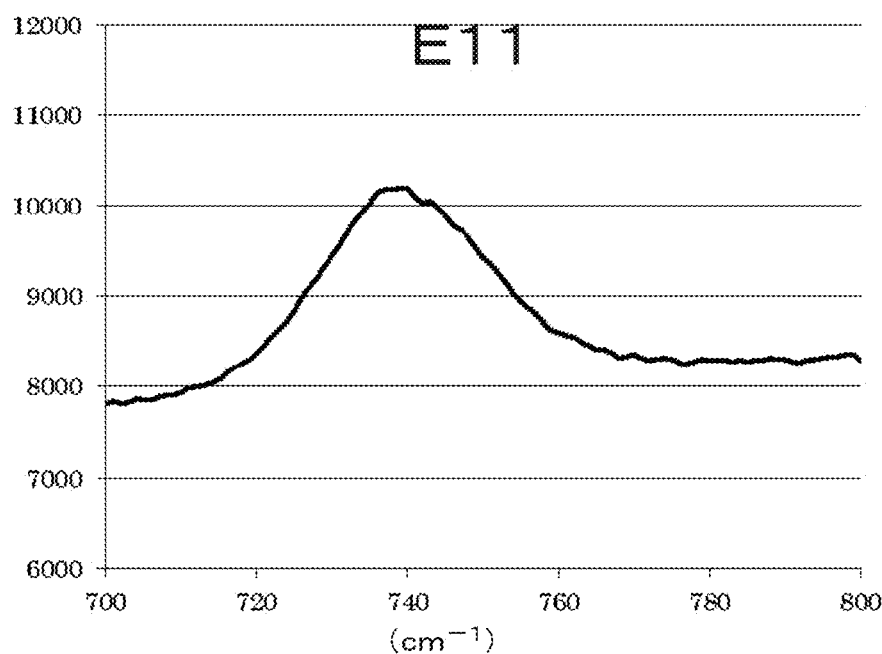
FIG. 32 is a Raman spectrum of electrolytic solution E11.
Figure 33:
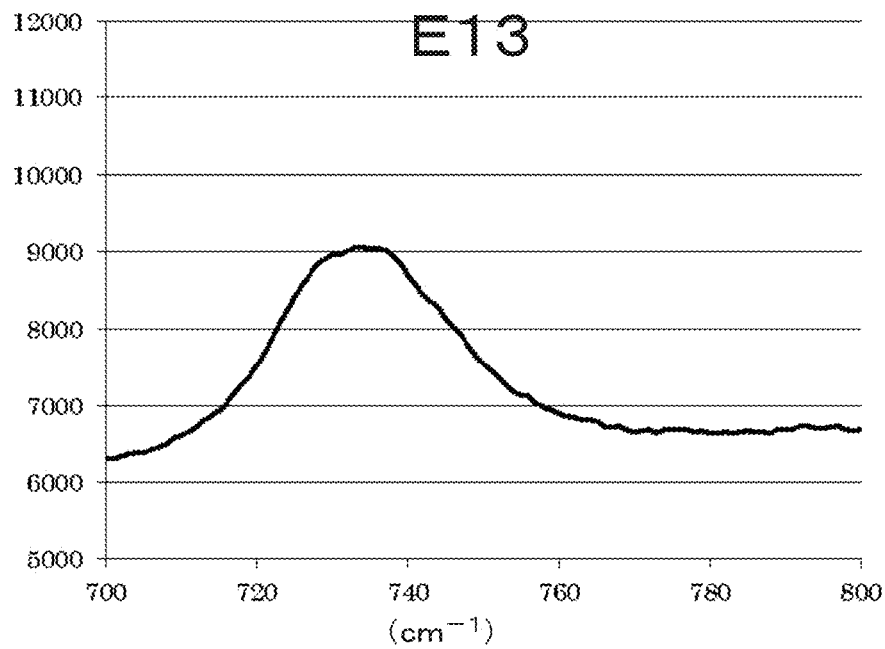
FIG. 33 is a Raman spectrum of electrolytic solution E13.
Figure 34:
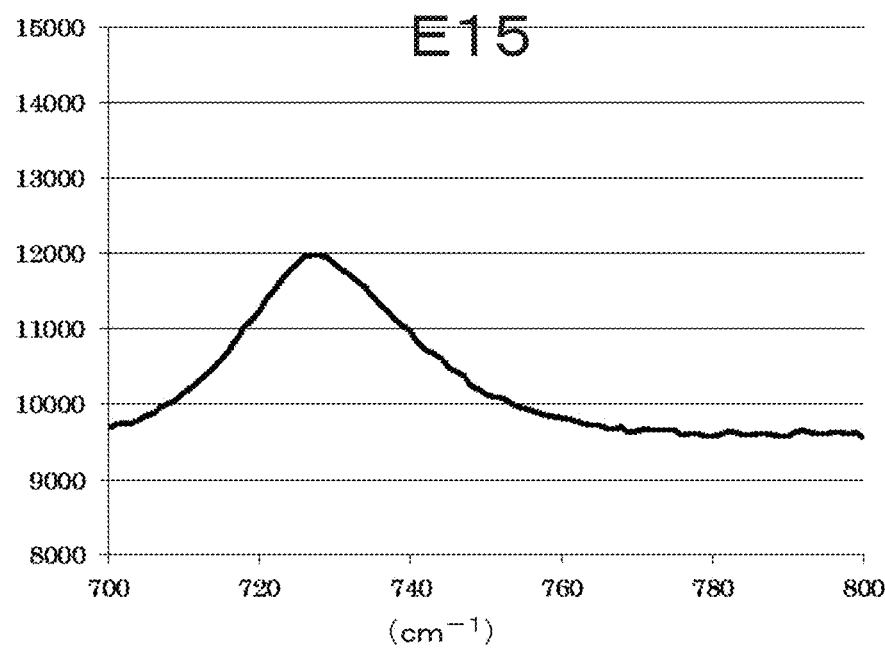
FIG. 34 is a Raman spectrum of electrolytic solution E15.
Figure 35:
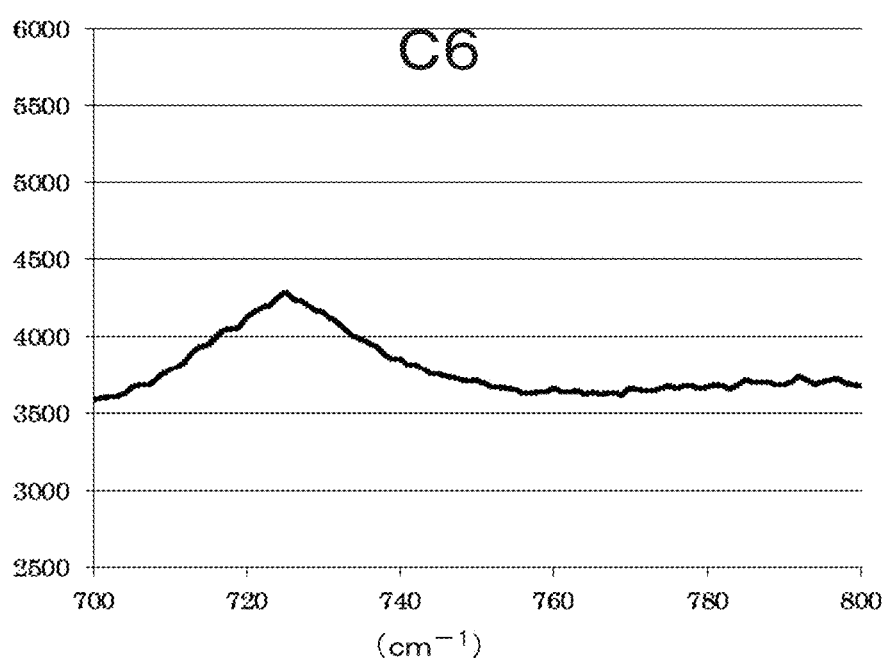
FIG. 35 is a Raman spectrum of electrolytic solution C6.
Figure 36:
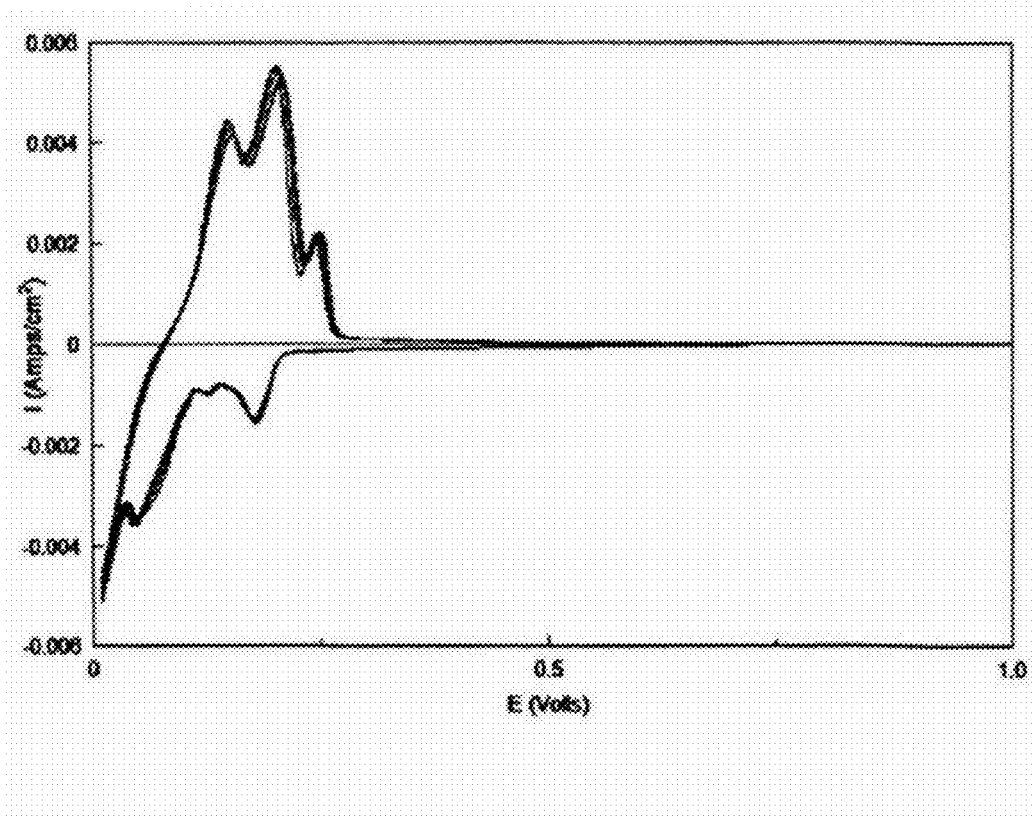
FIG. 36 is a graph showing cyclic voltammetry (CV) of a nonaqueous electrolyte secondary battery of Example 1-1.
Figure 37:
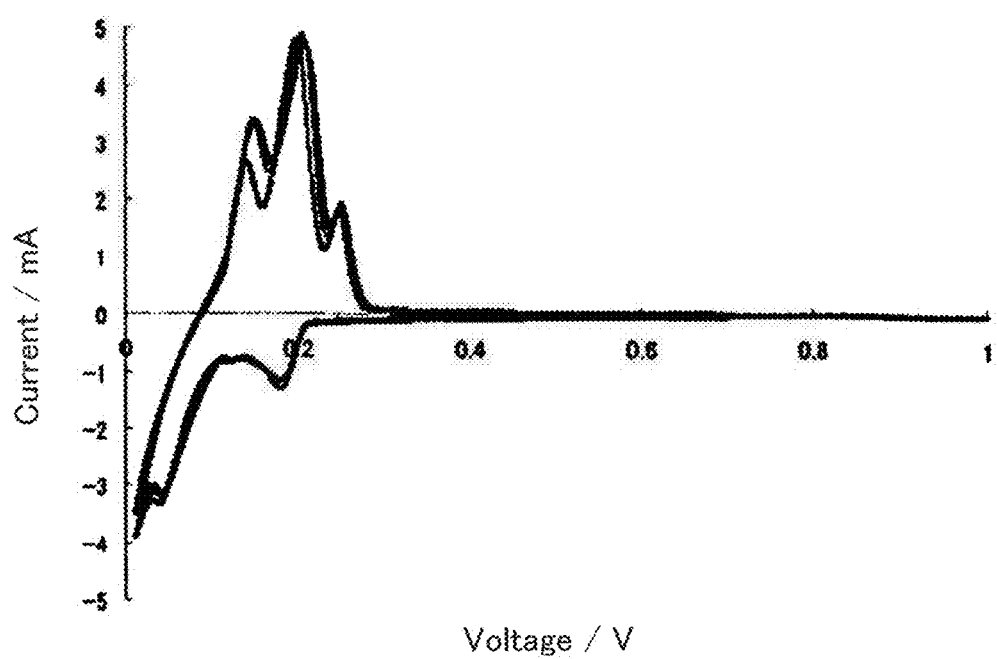
FIG. 37 is a graph showing cyclic voltammetry (CV) of a nonaqueous electrolyte secondary battery of Example 1-2.
Figure 38:
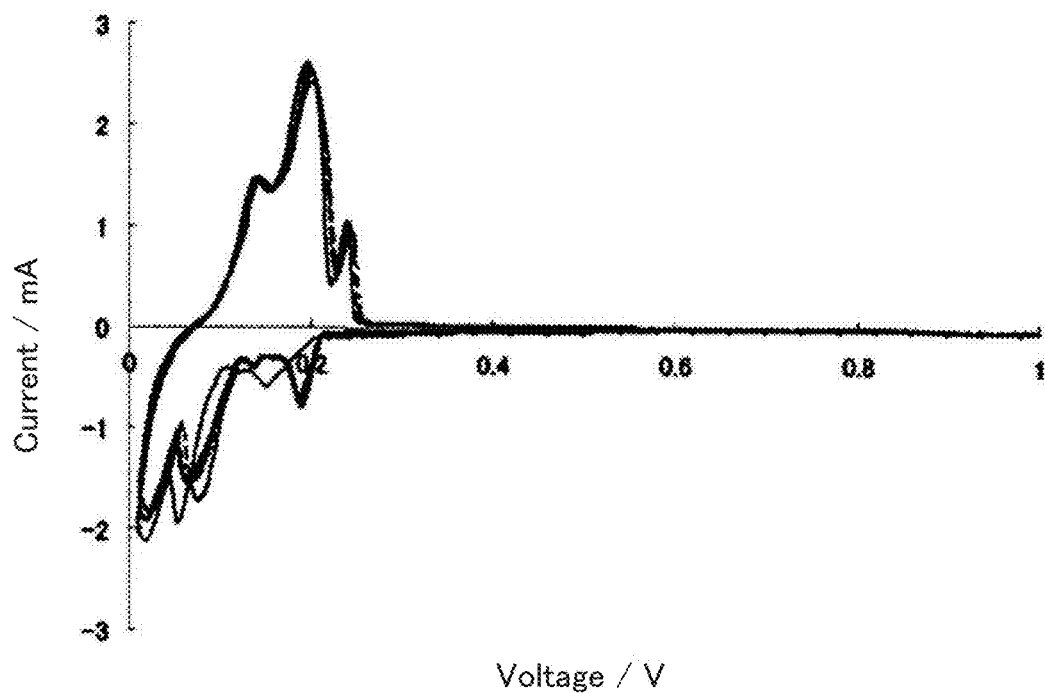
FIG. 38 is a graph showing cyclic voltammetry (CV) of a nonaqueous electrolyte secondary battery of Example 1-3.
Figure 39:
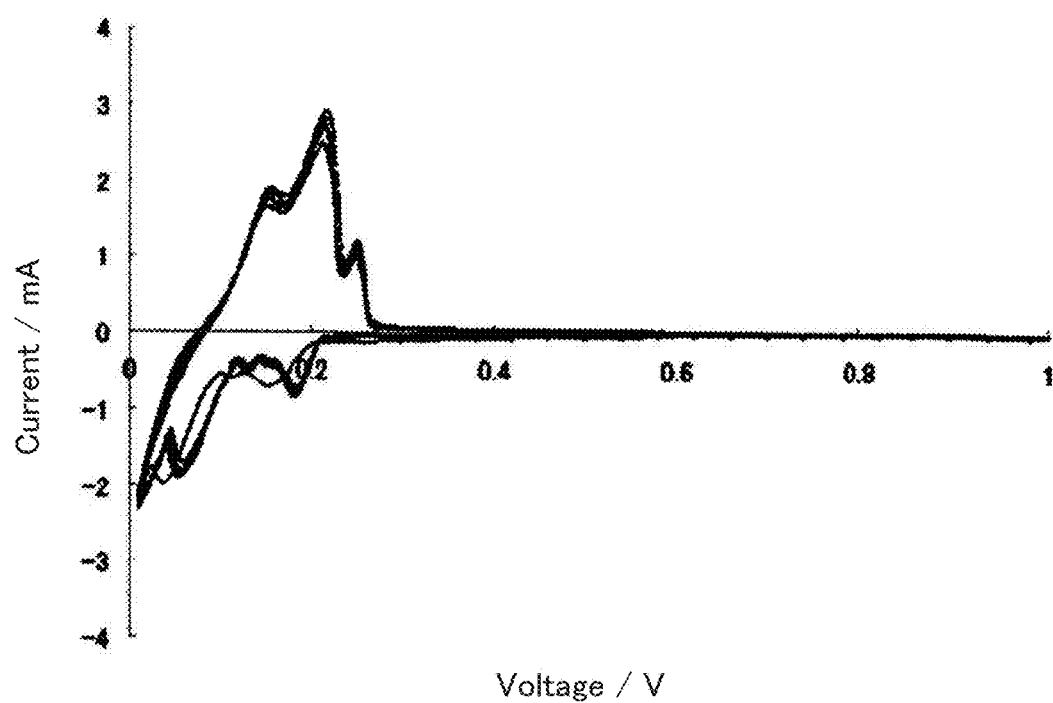
FIG. 39 is a graph showing cyclic voltammetry (CV) of a nonaqueous electrolyte secondary battery of Comparative Example 1-1.
Figure 40:
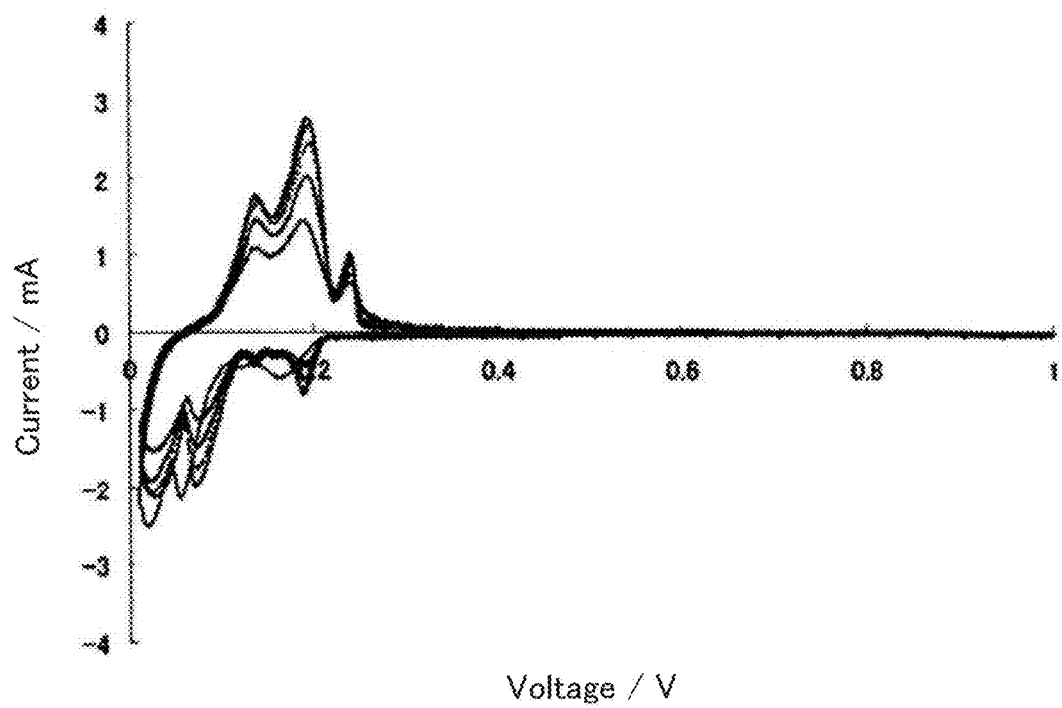
FIG. 40 is a graph showing cyclic voltammetry (CV) of a nonaqueous electrolyte secondary battery of Comparative Example 1-2.
Figure 41:
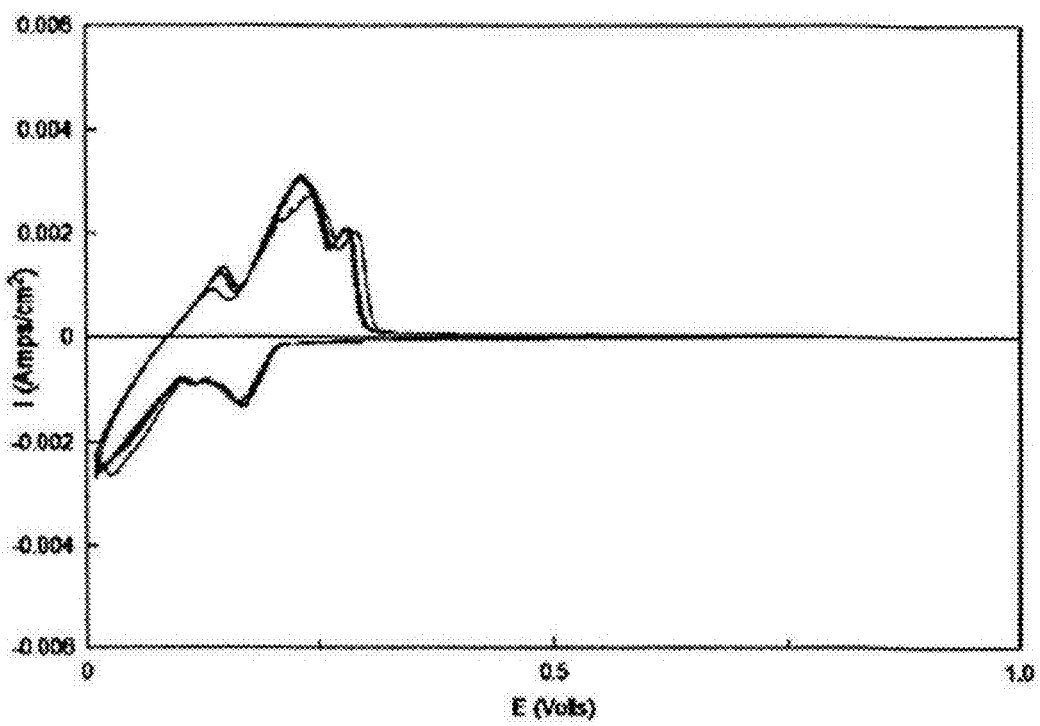
FIG. 41 is a graph showing cyclic voltammetry (CV) of a nonaqueous electrolyte secondary battery of Comparative Example 1-3.
Figure 42:
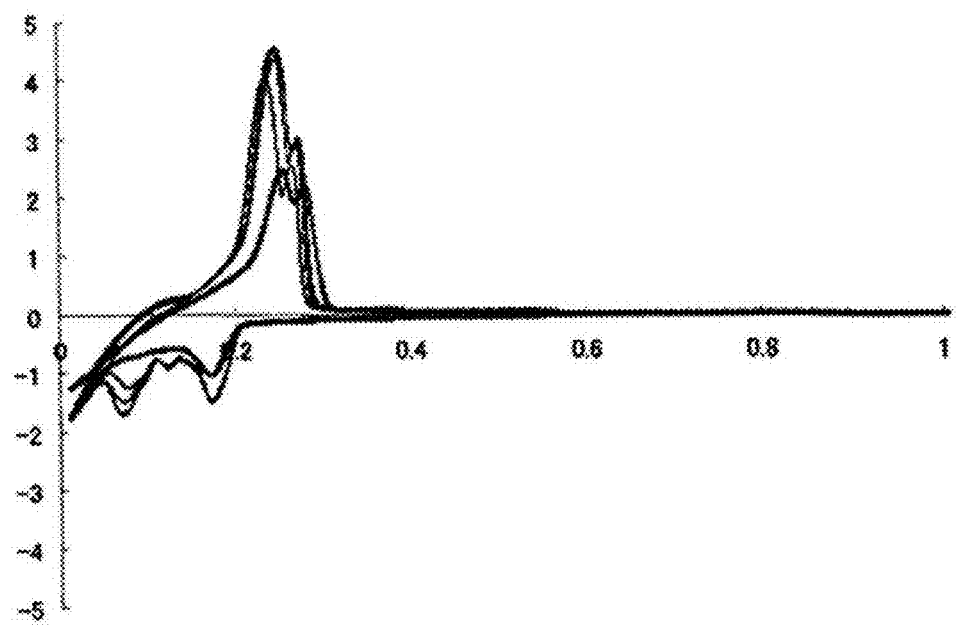
FIG. 42 is a graph showing cyclic voltammetry (CV) of a nonaqueous electrolyte secondary battery of Comparative Example 1-4.
Figure 43:
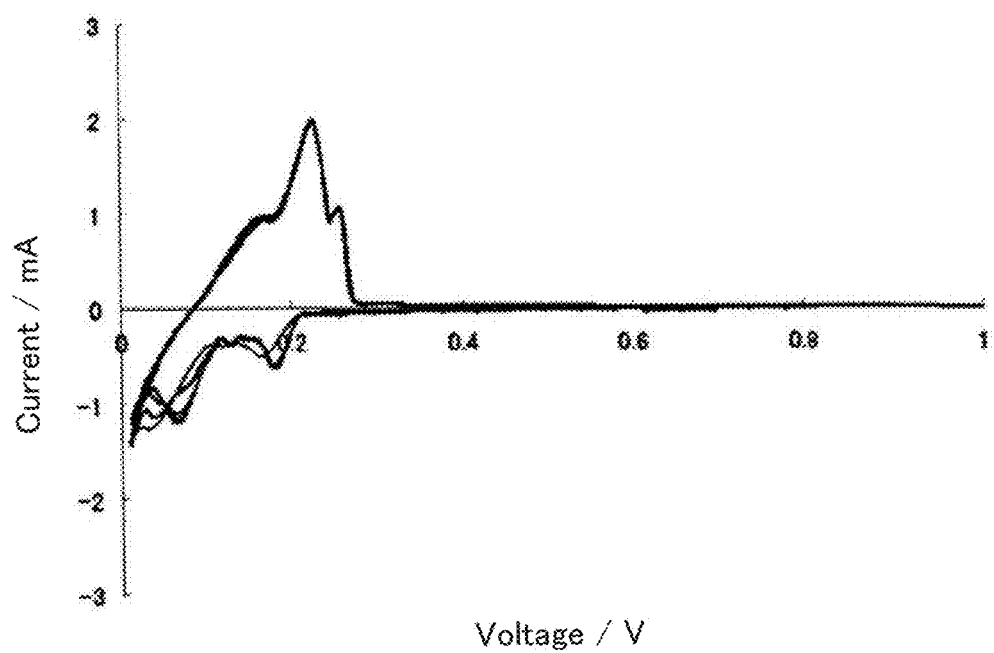
FIG. 43 is a graph showing cyclic voltammetry (CV) of a nonaqueous electrolyte secondary battery of Comparative Example 1-5.
Figure 44:
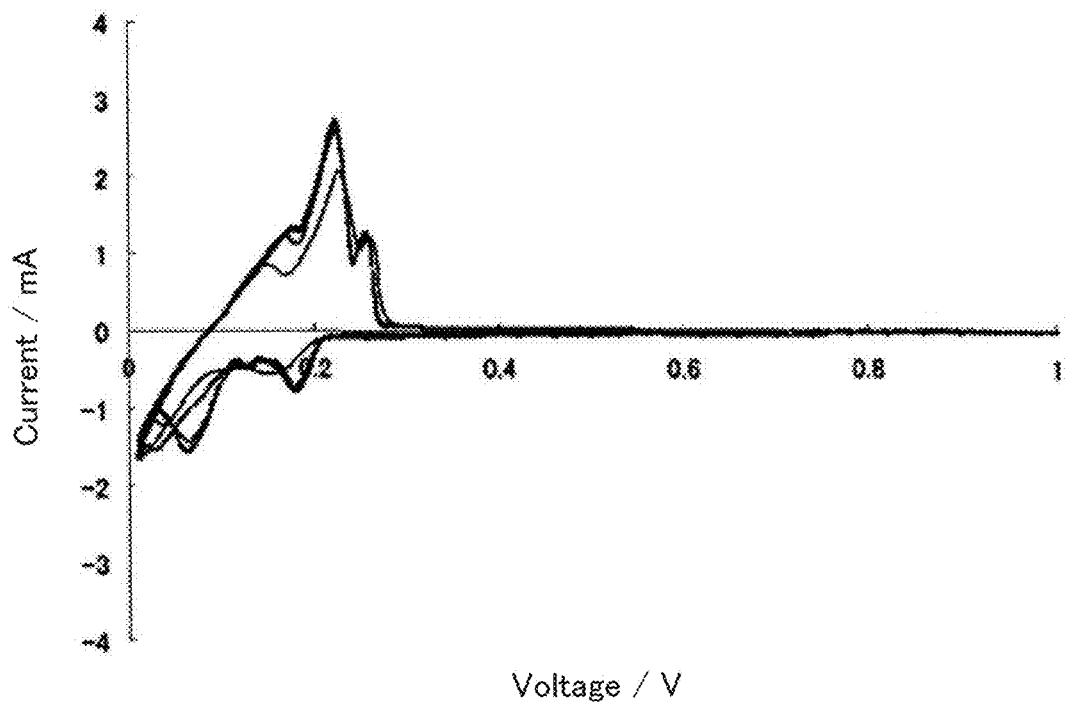
FIG. 44 is a graph showing cyclic voltammetry (CV) of a nonaqueous electrolyte secondary battery of Comparative Example 1-6.
Figure 45:
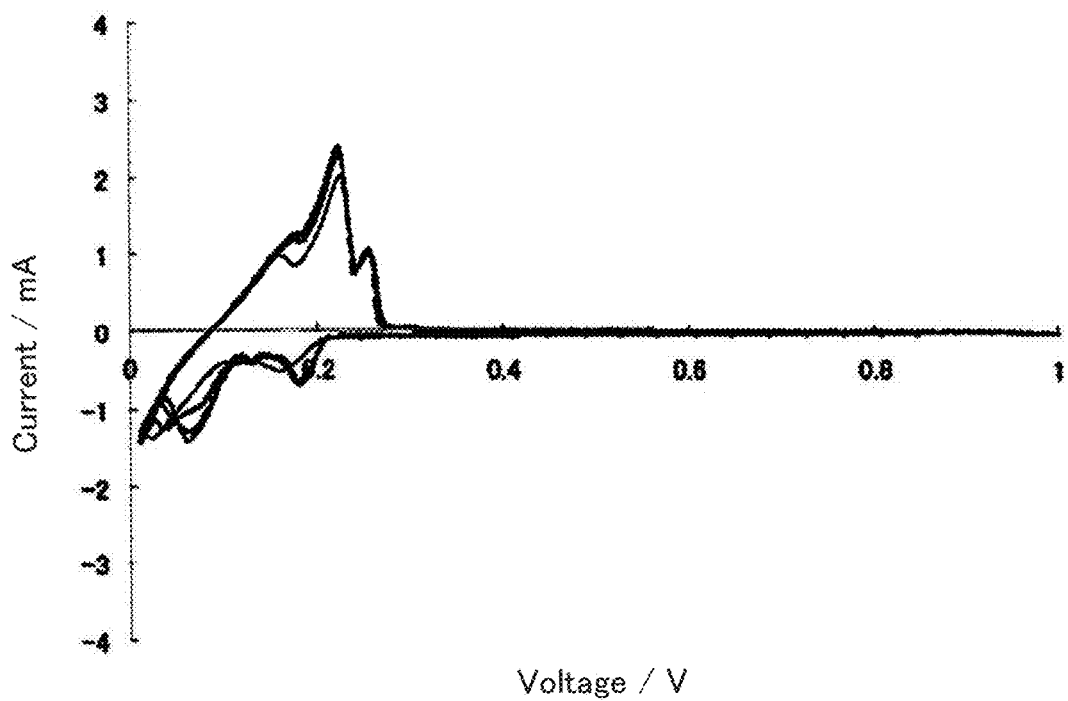
FIG. 45 is a graph showing cyclic voltammetry (CV) of a nonaqueous electrolyte secondary battery of Comparative Example 1-7.

In electrolytic solutions E8, E9, and C4 shown in FIGS. 29 to 31, at 700 to 800 $cm^{-1}$ in the Raman spectra, characteristic peaks derived from $(FSO_2)_2N$ of LiFSA dissolved in acetonitrile were observed. Here, based on FIGS. 29 to 31, the peak is understood as to shift toward the high wave number side associated with an increase in the concentration of LiFSA. As the concentration of the electrolytic solution becomes higher, $(FSO_2)_2N$ corresponding to the anion of a salt is speculated to enter of state of interacting with Li. In other words, Li and an anion are speculated to mainly form an SSIP (Solvent-separated ion pairs) state at a low concentration, and mainly form a CIP (Contact ion pairs) state or an AGG (aggregate) state as the concentration becomes higher. Such a state is thought to be observed as a peak shift in the Raman spectrum.

In electrolytic solutions E11, E13, E15, and C6 shown in FIGS. 32 to 35, at 700 to 800 cm$^{-1}$ in the Raman spectra, characteristic peaks derived from $(FSO_2)_2N$ of LiFSA dissolved in dimethyl carbonate were observed. Here, based on FIGS. 32 to 35, the peak is understood as to shift toward the high wave number side associated with an increase in the concentration of LiFSA. As considered in the previous paragraph, this phenomenon is speculated to be a result of a state, in which $(FSO_2)_2N$ corresponding to the anion of a salt is interacting with multiple Li ions, being reflected in the spectrum, as the concentration of the electrolytic solution became higher.

Evaluation Example 8: Li Transference Number

Li transference numbers of electrolytic solutions E2, E8, C4, and C5 were measured using the following conditions.

An NMR tube including one of the electrolytic solutions was placed in a PFG-NMR device (ECA-500, JEOL Ltd.), and diffusion coefficients of Li ions and anions in each of the electrolytic solutions were measured on $^7$Li and $^{19}$F as targets at a condition of 500 MHz and magnetic field gradient of 1.26 T/m while altering a magnetic field pulse width, using spin echo method. The Li transference number was calculated from the following formula.

Li transference number=(Li ionic diffusion coefficient)/(Li ionic diffusion coefficient+anion diffusion coefficient)

The results of the measurement of Li transference numbers are shown in Table 7.

TABLE 7

| | Lithium salt | Organic solvent | Lithium salt concentration (mol/L) | Li transference number |
|---|---|---|---|---|
| E2 | LiTFSA | DME | 2.8 | 0.52 |
| E8 | LiFSA | AN | 4.5 | 0.50 |
| C4 | LiFSA | AN | 1.0 | 0.42 |
| C5 | LiPF$_6$ | EC/DEC | 1.0 | 0.40 |

When compared to the Li transference numbers of electrolytic solutions C4 and C5, the Li transference numbers of electrolytic solutions E2 and E8 were significantly higher. Here, Li ionic conductivity of an electrolytic solution is calculated by multiplying ionic conductivity (total ionic conductivity) of the electrolytic solution by the Li transference number. As a result, when compared to a conventional electrolytic solution having about the same level of ionic conductivity, the electrolytic solution of the present invention shows a high transportation rate of lithium ion (cation).

In addition, the Li transference number when the temperature was altered was measured in the electrolytic solution E8 in accordance with the measuring conditions for the above described Li transference numbers. The results are shown in Table 8.

TABLE 8

| Temperature (° C.) | Li transference number |
|---|---|
| 30 | 0.50 |
| 10 | 0.50 |
| −10 | 0.50 |
| −30 | 0.52 |

Based on the results in Table 8, the electrolytic solution of the present invention is understood as to maintain a suitable Li transference number regardless of the temperature. The electrolytic solution of the present invention is regarded as to maintain a liquid state even at a low temperature.

The following specific electrolytic solutions are provided as the electrolytic solution of the present invention. The following electrolytic solutions also include those previously stated.

(Electrolytic Solution A)

The electrolytic solution of the present invention was produced in the following manner.

Approximately 5 mL of 1,2-dimethoxyethane, which is an organic solvent, was placed in a flask including a stirring bar and a thermometer. Under a stirring condition, with respect to 1,2-dimethoxyethane in the flask, $(CF_3SO_2)_2NLi$, which is a lithium salt, was gradually added so as to maintain a solution temperature equal to or lower than 40° C. to be dissolved. Since dissolving of $(CF_3SO_2)_2NLi$ momentarily stagnated at a time point when approximately 13 g of $(CF_3SO_2)_2NLi$ was added, the flask was heated by placing the flask in a temperature controlled bath such that the solution temperature in the flask reaches 50° C. to dissolve $(CF_3SO_2)_2NLi$. Since dissolving of $(CF_3SO_2)_2NLi$ stagnated again at a time point when approximately 15 g of $(CF_3SO_2)_2NLi$ was added, a single drop of 1,2-dimethoxyethane was added thereto using a pipette to dissolve $(CF_3SO_2)_2NLi$. Furthermore, $(CF_3SO_2)_2NLi$ was gradually added to accomplish adding an entire predetermined amount of $(CF_3SO_2)_2NLi$. The obtained electrolytic solution was transferred to a 20-mL measuring flask, and 1,2-dimethoxyethane was added thereto until a volume of 20 mL was obtained. The volume of the obtained electrolytic solution was 20 mL, and 18.38 g of $(CF_3SO_2)_2NLi$ was contained in the electrolytic solution. This was used as electrolytic solution A. In electrolytic solution A, the concentration of $(CF_3SO_2)_2NLi$ was 3.2 mol/L and the density was 1.39 g/cm$^3$. The density was measured at 20° C.

The production was performed within a glovebox under an inert gas atmosphere.

(Electrolytic Solution B)

With a method similar to that of electrolytic solution A, electrolytic solution B whose concentration of $(CF_3SO_2)_2NLi$ was 2.8 mol/L and whose density was 1.36 g/cm$^3$ was produced.

(Electrolytic Solution C)

Approximately 5 mL of acetonitrile, which is an organic solvent, was placed in a flask including a stirring bar. Under a stirring condition, with respect to acetonitrile in the flask, $(CF_3SO_2)_2NLi$, which is a lithium salt, was gradually added to be dissolved. A predetermined amount of $(CF_3SO_2)_2NLi$ was added to the flask, and stirring was performed overnight in the flask. The obtained electrolytic solution was transferred to a 20-mL measuring flask, and acetonitrile was added thereto until a volume of 20 mL was obtained. This was used as electrolytic solution C. The production was performed within a glovebox under an inert gas atmosphere.

Electrolytic solution C contained $(CF_3SO_2)_2NLi$ at a concentration of 4.2 mol/L, and had a density of 1.52 g/cm$^3$.

(Electrolytic Solution D)

With a method similar to that of electrolytic solution C, electrolytic solution D whose concentration of $(CF_3SO_2)_2NLi$ was 3.0 mol/L and whose density was 1.31 g/cm$^3$ was produced.

(Electrolytic Solution E)

With a method similar to that of electrolytic solution C except for using sulfolane as the organic solvent, electrolytic solution E whose concentration of $(CF_3SO_2)_2NLi$ was 3.0 mol/L and whose density was 1.57 g/cm$^3$ was produced.

(Electrolytic Solution F)

With a method similar to that of electrolytic solution C except for using dimethyl sulfoxide as the organic solvent, electrolytic solution F whose concentration of $(CF_3SO_2)_2NLi$ was 3.2 mol/L and whose density was 1.49 g/cm$^3$ was produced.

(Electrolytic Solution G)

With a method similar to that of electrolytic solution C except for using $(FSO_2)_2NLi$ as the lithium salt and using 1,2-dimethoxyethane as the organic solvent, electrolytic solution G whose concentration of $(FSO_2)_2NLi$ was 4.0 mol/L and whose density was 1.33 g/cm$^3$ was produced.

(Electrolytic Solution H)

With a method similar to that of electrolytic solution G, electrolytic solution H whose concentration of $(FSO_2)_2NLi$ was 3.6 mol/L and whose density was 1.29 g/cm$^3$ was produced.

(Electrolytic Solution I)

With a method similar to that of electrolytic solution G, electrolytic solution I whose concentration of $(FSO_2)_2NLi$ was 2.4 mol/L and whose density was 1.18 g/cm$^3$ was produced.

(Electrolytic Solution J)

With a method similar to that of electrolytic solution G except for using acetonitrile as the organic solvent, electrolytic solution J whose concentration of $(FSO_2)_2NLi$ was 5.0 mol/L and whose density was 1.40 g/cm$^3$ was produced.

(Electrolytic Solution K)

With a method similar to that of electrolytic solution J, electrolytic solution K whose concentration of $(FSO_2)_2NLi$ was 4.5 mol/L and whose density was 1.34 g/cm$^3$ was produced.

(Electrolytic Solution L)

Approximately 5 mL of dimethyl carbonate, which is an organic solvent, was placed in a flask including a stirring bar. Under a stirring condition, with respect to dimethyl carbonate in the flask, $(FSO_2)_2NLi$, which is a lithium salt, was gradually added to be dissolved. A total amount of 14.64 g of $(FSO_2)_2NLi$ was added to the flask, and stirring was performed overnight in the flask. The obtained electrolytic solution was transferred to a 20-mL measuring flask, and dimethyl carbonate was added thereto until a volume of 20 mL was obtained. This was used as electrolytic solution L. The production was performed within a glovebox under an inert gas atmosphere.

The concentration of $(FSO_2)_2NLi$ in electrolytic solution L was 3.9 mol/L, and the density of electrolytic solution L was 1.44 g/cm$^3$.

(Electrolytic Solution M)

With a method similar to that of electrolytic solution L, electrolytic solution M whose concentration of $(FSO_2)_2NLi$ was 2.9 mol/L and whose density was 1.36 g/cm$^3$ was produced.

(Electrolytic Solution N)

Approximately 5 mL of ethyl methyl carbonate, which is an organic solvent, was placed in a flask including a stirring bar. Under a stirring condition, with respect to ethyl methyl carbonate in the flask, $(FSO_2)_2NLi$, which is a lithium salt, was gradually added to be dissolved. A total amount of 12.81 g of $(FSO_2)_2NLi$ was added to the flask, and stirring was performed overnight in the flask. The obtained electrolytic solution was transferred to a 20-mL measuring flask, and ethyl methyl carbonate was added thereto until a volume of 20 mL was obtained. This was used as electrolytic solution N. The production was performed within a glovebox under an inert gas atmosphere.

The concentration of $(FSO_2)_2NLi$ in electrolytic solution N was 3.4 mol/L, and the density of electrolytic solution N was 1.35 g/cm$^3$.

(Electrolytic Solution O)

Approximately 5 mL of diethyl carbonate, which is an organic solvent, was placed in a flask including a stirring bar. Under a stirring condition, with respect to diethyl carbonate in the flask, $(FSO_2)_2NLi$, which is a lithium salt, was gradually added to be dissolved. A total amount of 11.37 g of $(FSO_2)_2NLi$ was added to the flask, and stirring was performed overnight in the flask. The obtained electrolytic solution was transferred to a 20-mL measuring flask, and diethyl carbonate was added thereto until a volume of 20 mL was obtained. This was used as electrolytic solution O. The production was performed within a glovebox under an inert gas atmosphere.

The concentration of $(FSO_2)_2NLi$ in electrolytic solution O was 3.0 mol/L, and the density of electrolytic solution O was 1.29 g/cm$^3$.

Table 9 shows a list of the electrolytic solutions described above.

TABLE 9

| | Lithium salt | Organic solvent | Density d(g/cm$^3$) |
|---|---|---|---|
| Electrolytic solution A | LiTFSA | DME | 1.39 |
| Electrolytic solution B | LiTFSA | DME | 1.36 |
| Electrolytic solution C | LiTFSA | AN | 1.52 |
| Electrolytic solution D | LiTFSA | AN | 1.31 |
| Electrolytic solution E | LiTFSA | SL | 1.57 |
| Electrolytic solution F | LiTFSA | DMSO | 1.49 |
| Electrolytic solution G | LiFSA | DME | 1.33 |
| Electrolytic solution H | LiFSA | DME | 1.29 |
| Electrolytic solution I | LiFSA | DME | 1.18 |
| Electrolytic solution J | LiFSA | AN | 1.40 |
| Electrolytic solution K | LiFSA | AN | 1.34 |
| Electrolytic solution L | LiFSA | DMC | 1.44 |
| Electrolytic solution M | LiFSA | DMC | 1.36 |
| Electrolytic solution N | LiFSA | EMC | 1.35 |
| Electrolytic solution O | LiFSA | DEC | 1.29 |

LiTFSA: $(CF_3SO_2)_2NLi$,
LiFSA: $(FSO_2)_2NLi$,
AN: acetonitrile,
DME: 1,2-dimethoxyethane,
DMSO: dimethyl sulfoxide,
SL: sulfolane,
DMC: dimethyl carbonate,
EMC: ethyl methyl carbonate,
DEC: diethyl carbonate (Nonaqueous Electrolyte Secondary Battery)

In the following, the nonaqueous electrolyte secondary batteries (1) to (5) are described specifically. Since the following Examples are described in separate sections for convenience sake, duplications may exist. In some cases, the following Examples, and EB and CB described later correspond to the multiple Examples of the nonaqueous electrolyte secondary batteries (1) to (5).

<Nonaqueous Electrolyte Secondary Battery (1)>

Example 1-1

A nonaqueous electrolyte secondary battery of Example 1-1 was produced using electrolytic solution E8.

<Negative Electrode>

A SNO grade (mean particle diameter of 15 μm) graphite (hereinafter, sometimes referred to as graphite (A)) from SEC CARBON, Ltd., and polyvinylidene fluoride (PVdF) were added to, and mixed with N-methyl-2-pyrrolidone (NMP) to prepare a negative electrode mixture in a slurry form. The composition ratio of each component (solid content) in the slurry was graphite:PVdF=90:10 (mass ratio).

Raman spectrum analysis was performed on a powder of the graphite (A). As a device, RAMAN-11 (excitation wavelength λ=532 nm, grating: 600 gr/mm, laser power: 0.02 mW) manufactured by Nanophoton Corporation was used. In the Raman spectrum, a G/D ratio, which is a ratio of intensities of G-band and D-band peaks, was 12.2.

The slurry was applied on the surface of an electrolytic copper foil (current collector) having a thickness of 20 μm using a doctor blade to form a negative electrode active material layer on the copper foil.

Then, the organic solvent was removed from the negative electrode active material layer through volatilization by drying the negative electrode active material layer at 80° C. for 20 minutes. After the drying, the current collector and the negative electrode active material layer were attached firmly and joined by using a roll press machine. The obtained joined object was vacuum dried at 120° C. for 6 hours to form a negative electrode whose thickness of the negative electrode active material layer was about 30 μm.

In the negative electrode, the negative electrode active material layer had a weight per area of 2.3 mg/cm$^2$ and a density of 0.86 g/cm$^3$.

<Nonaqueous Electrolyte Secondary Battery>

By using the produced negative electrode as an evaluation electrode, a nonaqueous electrolyte secondary battery was produced. A metallic lithium foil (thickness of 500 μm) was used as a counter electrode. This nonaqueous electrolyte secondary battery is a nonaqueous electrolyte secondary battery for evaluation, i.e., a half-cell.

The counter electrode and the evaluation electrode were respectively cut to have diameters of 13 mm and 11 mm, and a separator (Whatman glass fiber filter paper) having a thickness of 400 μm was interposed therebetween to form an electrode assembly battery. This electrode assembly battery was housed in a battery case (CR2032 coin cell manufactured by Hohsen Corp.). Electrolytic solution E8 was injected therein, and the battery case was sealed to obtain a nonaqueous electrolyte secondary battery of Example 1-1. Details of the lithium battery of Example 1-1 and nonaqueous electrolyte secondary batteries of the following Examples and Comparative Examples are shown in Table 41 provided at the end of the section of the Examples.

Example 1-2

A negative electrode was produced similarly to that of Example 1-1 except for using, instead of graphite (A), an SNO grade (mean particle diameter of 10 μm) graphite (hereinafter, sometimes referred to as graphite (B)) from SEC CARBON, Ltd. Otherwise, a nonaqueous electrolyte secondary battery of Example 1-2 was obtained similarly to Example 1-1. When Raman spectrum analysis was performed on the used graphite (B) similarly to Example 1-1, the G/D ratio, which is a ratio of intensities of G-band and D-band peaks, was 4.4.

Example 1-3

A negative electrode was produced similarly to that of Example 1-1 except for using, instead of graphite (A), graphite (C) having a mean particle diameter of 10 μm. Otherwise, a nonaqueous electrolyte secondary battery of Example 1-3 was obtained similarly to Example 1-1. When Raman spectrum analysis was performed on the used graphite (C) similarly to Example 1-1, the G/D ratio, which is a ratio of intensities of G-band and D-band peaks, was 16.0.

Example 1-4

A nonaqueous electrolyte secondary battery of Example 1-4 was obtained similarly to Example 1-3 except for using electrolytic solution E11.

Comparative Example 1-1

A negative electrode was produced similarly to that of Example 1-1 except for using, instead of graphite (A), a graphite with a product name SG-BH (mean particle diameter of 20 μm) (hereinafter, sometimes referred to as graphite (D)) from Ito Graphite Co., Ltd. Otherwise, a nonaqueous electrolyte secondary battery of Comparative Example 1-1 was obtained similarly to Example 1-1. When Raman spectrum analysis was performed on the used graphite (D) similarly to Example 1-1, the G/D ratio, which is a ratio of intensities of G-band and D-band peaks, was 3.4.

Comparative Example 1-2

A negative electrode was produced similarly to that of Example 1-1 except for using, instead of graphite (A), a graphite with a product name SG-BH8 (mean particle diameter 8 μm) (hereinafter, sometimes referred to as graphite (E)) from Ito Graphite Co., Ltd. Otherwise, a nonaqueous electrolyte secondary battery of Comparative Example 1-2 was obtained similarly to Example 1-1. When Raman spectrum analysis was performed on the used graphite (E) similarly to Example 1-1, the G/D ratio, which is a ratio of intensities of G-band and D-band peaks, was 3.2.

Comparative Example 1-3

A nonaqueous electrolyte secondary battery of Comparative Example 1-3 was obtained similarly to Example 1-1 except for using electrolytic solution C5 instead of the electrolytic solution of the present invention.

Comparative Example 1-4

A nonaqueous electrolyte secondary battery of Comparative Example 1-4 was obtained similarly to Example 1-2 except for using electrolytic solution C5 instead of the electrolytic solution of the present invention.

Comparative Example 1-5

A nonaqueous electrolyte secondary battery of Comparative Example 1-5 was obtained similarly to Example 1-3 except for using electrolytic solution C5 instead of the electrolytic solution of the present invention.

Comparative Example 1-6

A nonaqueous electrolyte secondary battery of Comparative Example 1-6 was obtained similarly to Comparative Example 1-1 except for using electrolytic solution C5 instead of the electrolytic solution of the present invention.

Comparative Example 1-7

A nonaqueous electrolyte secondary battery of Comparative Example 1-7 was obtained similarly to Comparative Example 1-2 except for using electrolytic solution C5 instead of the electrolytic solution of the present invention.

The configuration of the nonaqueous electrolyte secondary batteries of Examples 1-1 to 1-4 and Comparative Examples 1-1 to 1-7 are shown in Table 6.

TABLE 10

| | Electrolytic solution | Graphite type | Graphite G/D ratio |
|---|---|---|---|
| Example 1-1 | E8 (4.5M LiFSA/AN) | Graphite (A) | 12.2 |
| Example 1-2 | E8 (4.5M LiFSA/AN) | Graphite (B) | 4.4 |
| Example 1-3 | E8 (4.5M LiFSA/AN) | Graphite (C) | 16.0 |
| Example 1-4 | E11 (3.9M LiFSA/DMC) | Graphite (C) | 16.0 |
| Comparative Example 1-1 | E8 (4.5M LiFSA/AN) | Graphite (D) | 3.4 |
| Comparative Example 1-2 | E8 (4.5M LiFSA/AN) | Graphite (E) | 3.2 |
| Comparative Example 1-3 | C5 (1M LiPF$_6$/EC + DEC(3:7)) | Graphite (A) | 12.2 |
| Comparative Example 1-4 | C5 (1M LiPF$_6$/EC + DEC(3.7)) | Graphite (B) | 4.4 |
| Comparative Example 1-5 | C5 (1M LiPF$_6$/EC + DEC(3:7)) | Graphite (C) | 16.0 |
| Comparative Example 1-6 | C5 (1M LiPF$_6$/EC + DEC(3.7)) | Graphite (D) | 3.4 |
| Comparative Example 1-7 | C5 (1M LiPF$_6$/EC + DEC(3:7)) | Graphite (E) | 3.2 |

Evaluation Example 9: Cyclic Voltammetry

With respect to the nonaqueous electrolyte secondary battery of Examples 1-1 to 1-4 and Comparative Examples 1-1 to 1-7, cyclic voltammetry (i.e., CV) measurement was performed with a condition of temperature: 25° C., sweep rate: 0.1 mV/sec, voltage range: 0.01 V to 2 V, and 1 to 5 cycles. The results are shown in FIGS. 36 to 45. In the nonaqueous electrolyte secondary batteries of Examples 1-1 to 1-4, a reversible redox reaction was confirmed similarly to the nonaqueous electrolyte secondary batteries of Comparative Examples 1-1 to 1-7 (i.e., conventional nonaqueous electrolyte secondary batteries). As in the nonaqueous electrolyte secondary batteries of Comparative Examples 1-1 and 1-2, a reversible redox reaction was confirmed even when a graphite whose G/D ratio was lower than 3.5 was used. Thus, the electrolytic solution of the present invention is recognized to be usable for a nonaqueous electrolyte secondary battery when a graphite is used as the negative electrode active material, regardless of the G/D ratio.

Example 1-5

In a nonaqueous electrolyte secondary battery of Example 1-5, the same negative electrode as in Example 1-1 was used.
<Positive Electrode>
As the positive electrode active material, Li[Ni$_{0.5}$Co$_{0.2}$Mn$_{0.3}$]O$_2$, acetylene black (AB), and PVdF were added to, and mixed with NMP to prepare a positive electrode mixture in a slurry form. The composition ratio of each component (solid content) in the slurry is active material:AB:PVdF=94:3:3 (mass ratio). The slurry was applied on the surface of an aluminum foil (current collector) using a doctor blade, and dried to produce a positive electrode having a positive electrode active material layer with a thickness of approximately 25 μm. Hereinafter, if necessary, Li [Ni$_{0.5}$Co$_{0.2}$Mn$_{0.3}$]O$_2$ is referred to as NCM523.

<Nonaqueous Electrolyte Secondary Battery>
By using the positive electrode, the negative electrode, and electrolytic solution E8 described above, a laminated type lithium ion secondary battery, which is one type of the nonaqueous electrolyte secondary battery, was produced. In detail, a 260-μm thick filter paper for experiments was interposed between the positive electrode and the negative electrode as a separator to form an electrode assembly. The electrode assembly was covered with a set of two sheets of a laminate film. The laminate film was formed into a bag-like shape by having three sides thereof sealed, and the electrolytic solution of the present invention was injected therein. Four sides were sealed airtight by sealing the remaining one side to obtain a laminated type lithium ion secondary battery in which the electrode assembly and the electrolytic solution were sealed. The positive electrode and the negative electrode each include a tab enabling electrical connection to the outside, and one part of the tab extends outside the laminated type lithium ion secondary battery.

Example 1-6

A nonaqueous electrolyte secondary battery of Example 1-6 was produced similarly to Example 1-5 except for using electrolytic solution E4.

Comparative Example 1-8

A nonaqueous electrolyte secondary battery of Comparative Example 1-8 was obtained similarly to Example 1-5 except for using electrolytic solution C5 instead of the electrolytic solution of the present invention.

Evaluation Example 10: Thermal Stability

Figure 46:
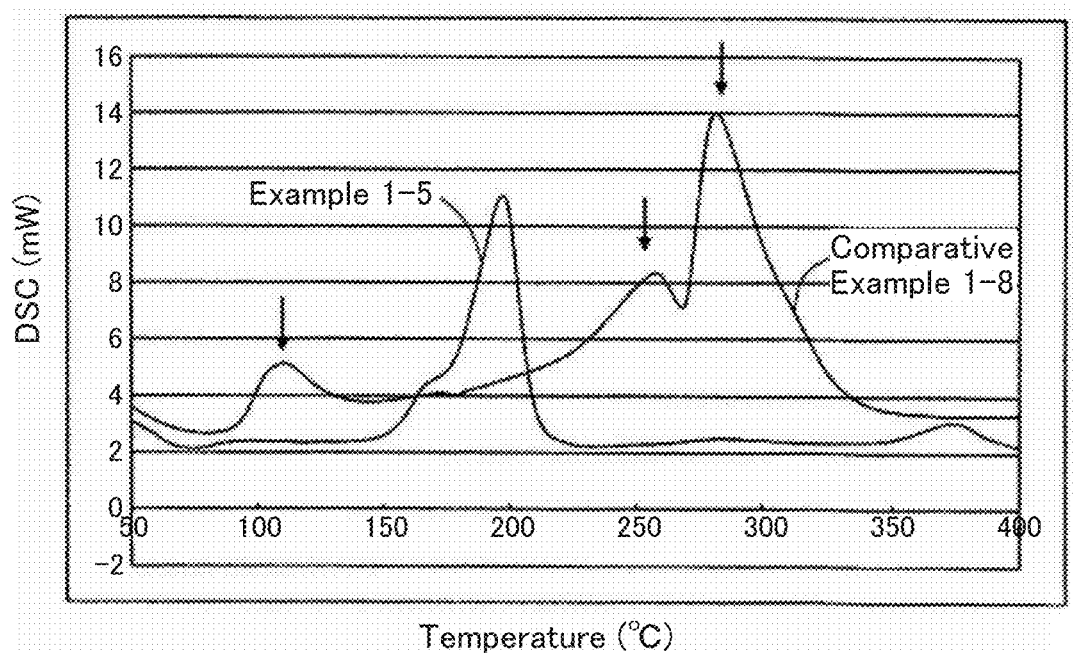
FIG. 46 is a DSC chart of nonaqueous electrolyte secondary batteries of Example 1-5 and Comparative Example 1-8.
Figure 47:
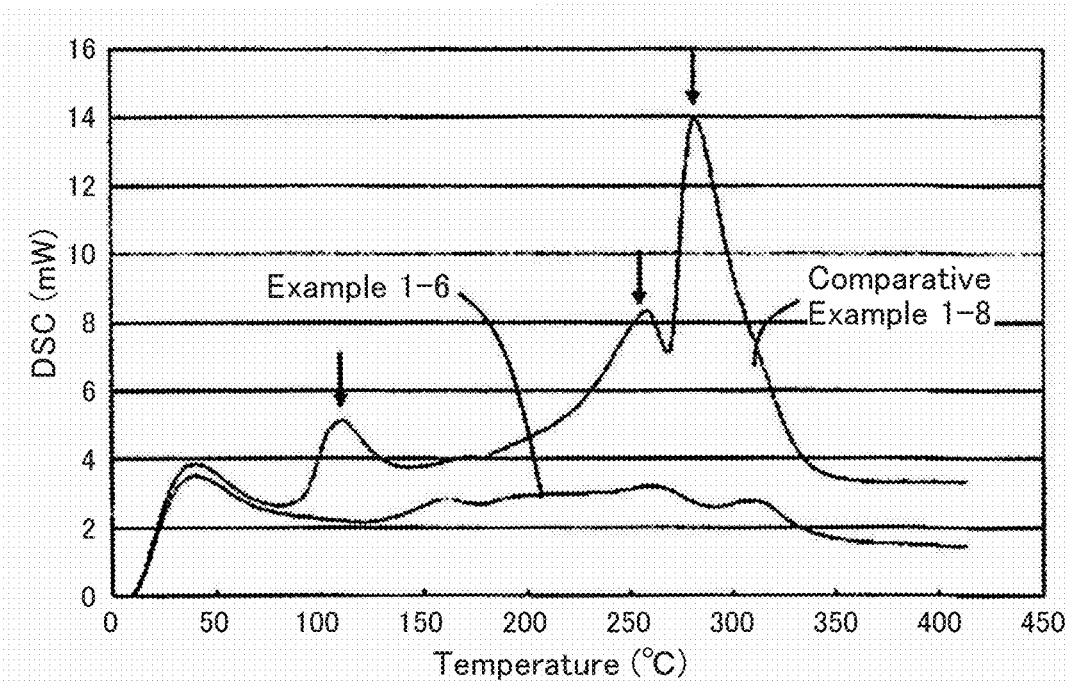
FIG. 47 is a DSC chart of nonaqueous electrolyte secondary batteries of Example 1-6 and Comparative Example 1-8.

Each of the nonaqueous electrolyte secondary batteries of Examples 1-5 and 1-6 and Comparative Example 1-8 was fully charged under constant current constant voltage conditions to obtain an electric potential difference of 4.2 V. The nonaqueous electrolyte secondary battery was disassembled after being fully charged, and the negative electrode thereof was removed. 2.8 mg of the negative electrode and 1.68 μL of an electrolytic solution were placed in a stainless steel pan, and the pan was sealed. Differential scanning calorimetry analysis was performed using the sealed pan under a nitrogen atmosphere at a temperature increase rate of 20° C./min., and a DSC curve was observed. FIGS. 46 and 47 respectively show a DSC chart of the nonaqueous electrolyte secondary batteries of Example 1-5 and Comparative Example 1-8 and a DSC chart of the nonaqueous electrolyte secondary batteries of Example 1-6 and Comparative Example 1-8.

In a fully charged nonaqueous electrolyte secondary battery using a graphite as the negative electrode active material, when a general electrolytic solution was used and heat was applied, multiple exothermic reactions occur at 300° C. or lower as in Comparative Example 1-8. However, since the exothermic peaks that appeared at positions shown with arrows in the figures disappeared, the reactivity between the graphite negative electrode and the electrolytic solution of the present invention was low, revealing excellent thermophysical property in Examples 1-5 and 1-6 using the electrolytic solution of the present invention.

Evaluation Example 11: Rate Characteristics

Figure 48:
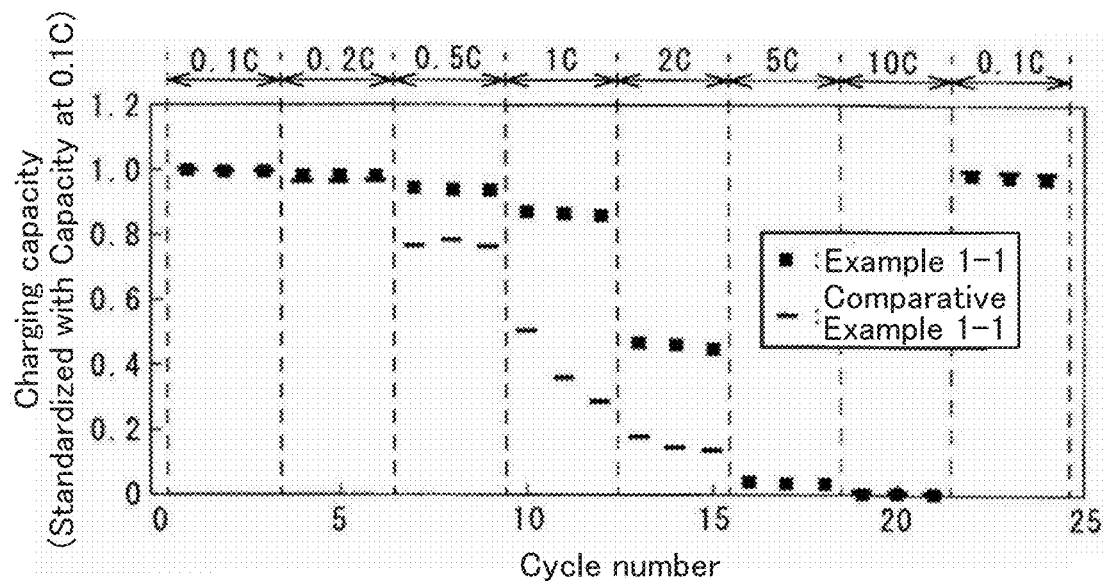
FIG. 48 is a graph showing the relationship between cycle number and current capacity ratio in the nonaqueous electrolyte secondary batteries of Example 1-1 and Comparative Example 1-1.
Figure 49:
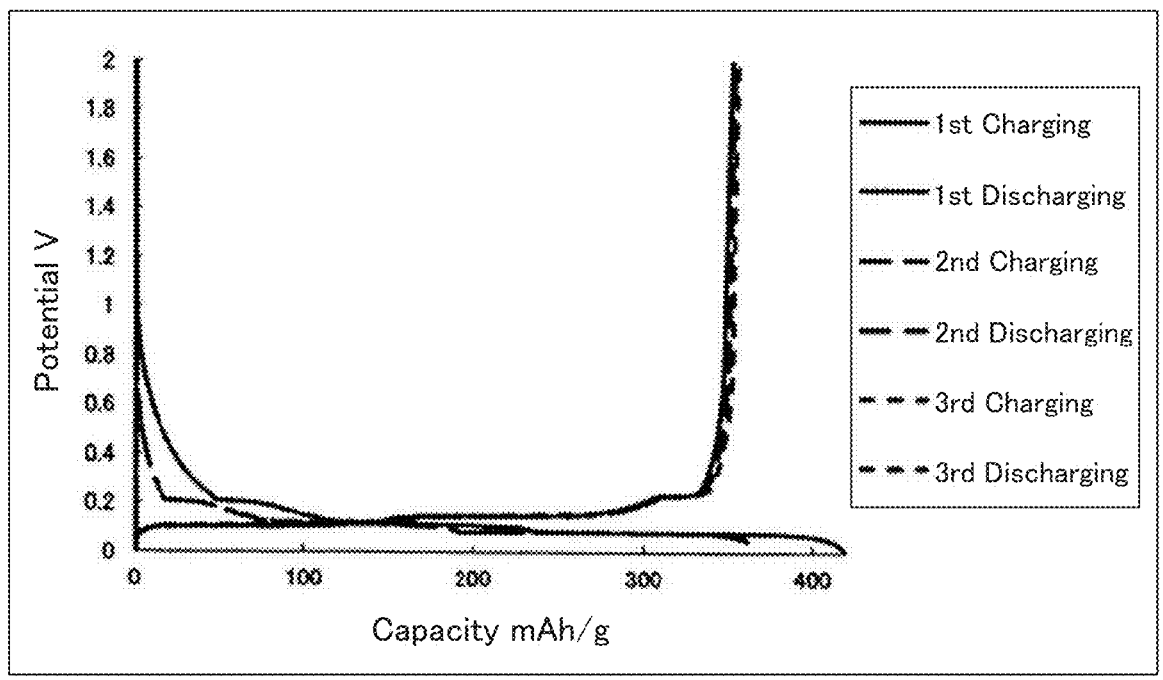
FIG. 49 shows charging/discharging curves of the nonaqueous electrolyte secondary battery of Example 1-8.
Figure 50:
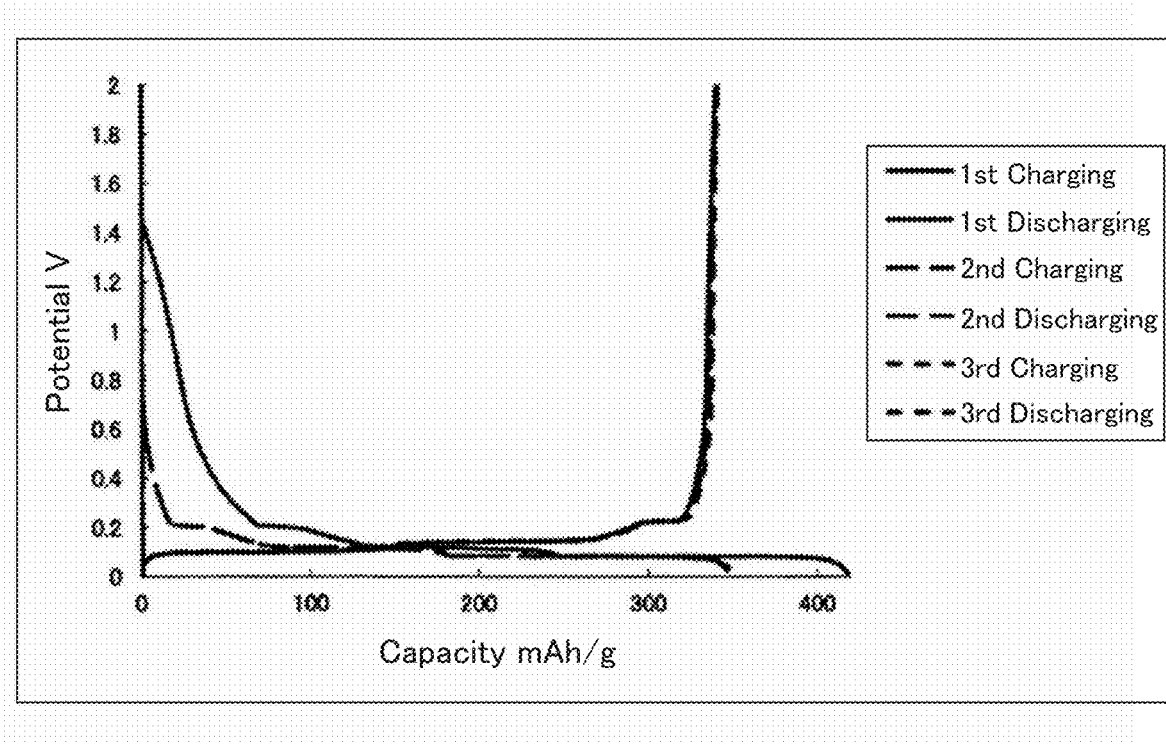
FIG. 50 shows charging/discharging curves of a nonaqueous electrolyte secondary battery of Example 1-9.
Figure 51:
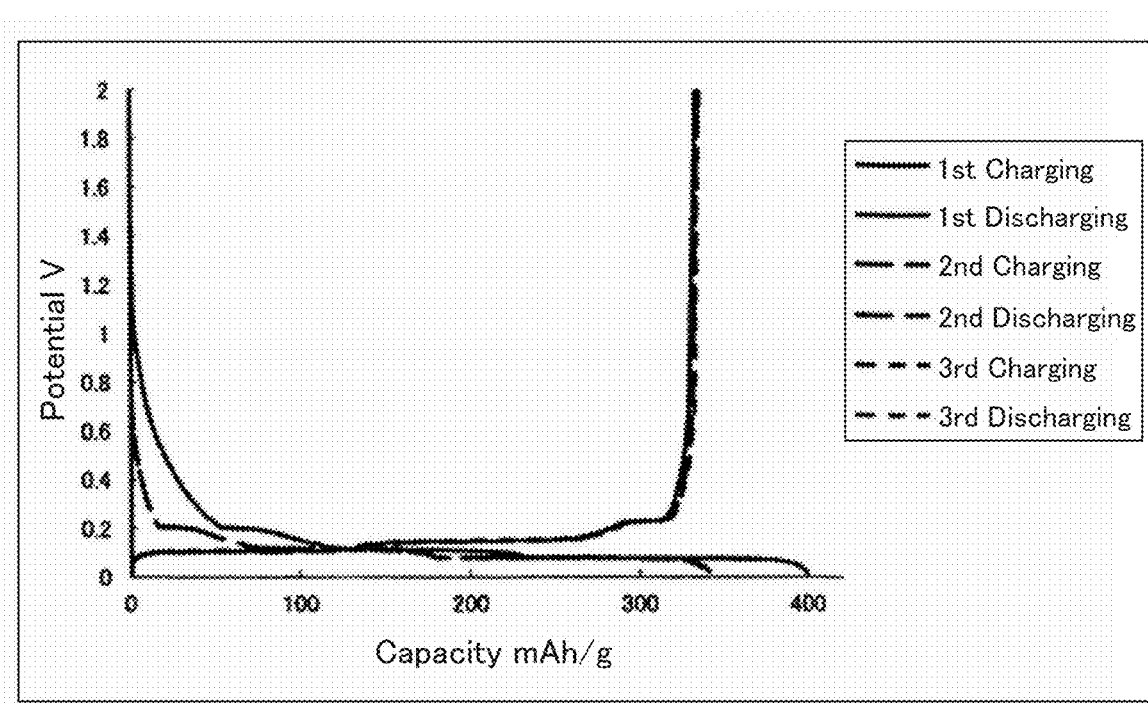
FIG. 51 shows charging/discharging curves of a nonaqueous electrolyte secondary battery of Example 1-10.
Figure 52:
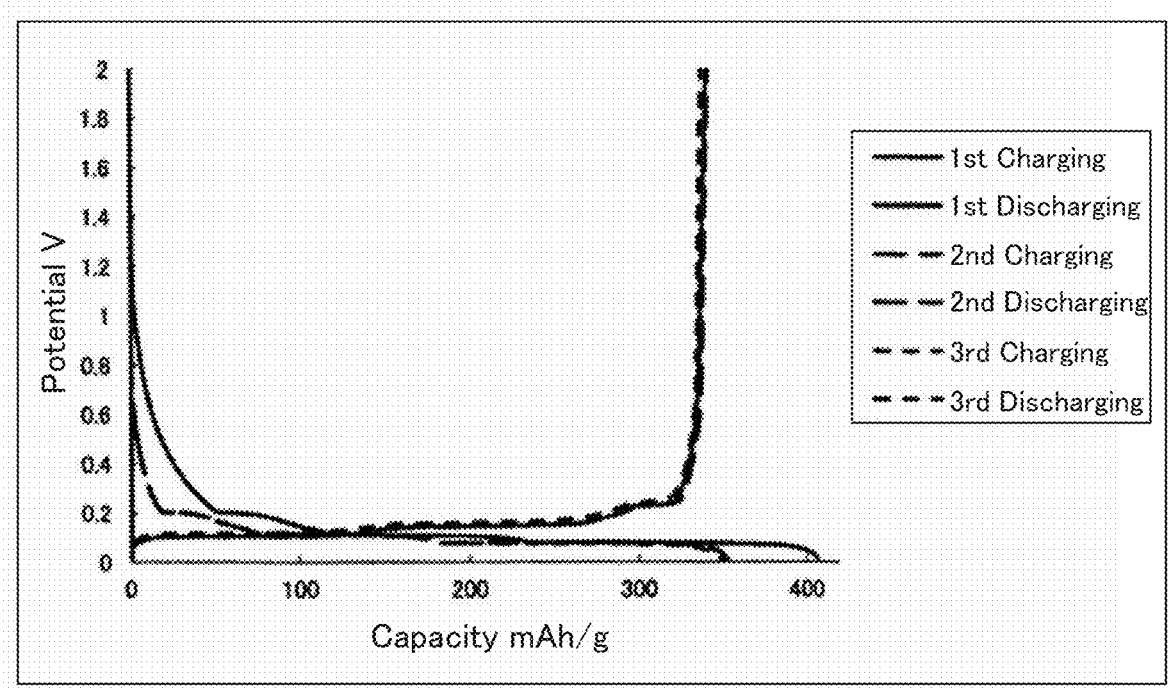
FIG. 52 shows charging/discharging curves of a nonaqueous electrolyte secondary battery of Example 1-11.
Figure 53:
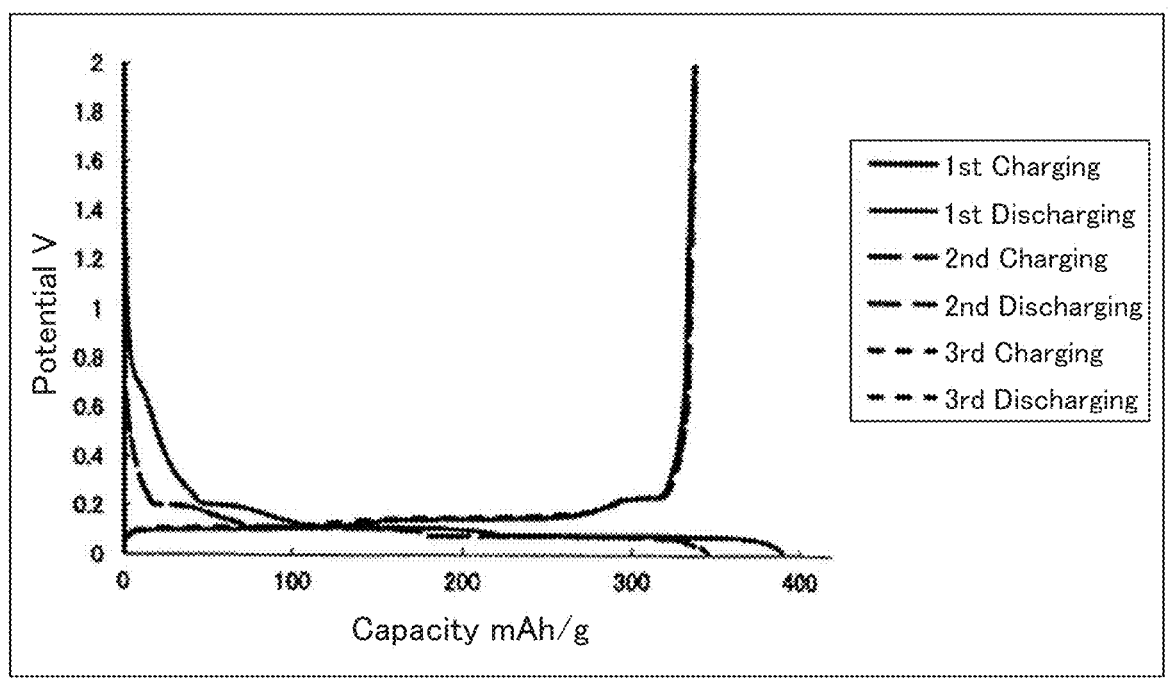
FIG. 53 shows charging/discharging curves of a nonaqueous electrolyte secondary battery of Comparative Example 1-9.

By using the nonaqueous electrolyte secondary batteries of Example 1-1 and Comparative Example 1-1, respective rate capacity characteristics were evaluated under the following conditions. The results are shown in FIG. 48.

(1) Current is supplied in a direction that causes occlusion of lithium to the negative electrode.
(2) Voltage range: From 2 V down to 0.01 V (v.s. Li/Li$^+$)
(3) Rate: 0.1C, 0.2C, 0.5C, 1C, 2C, 5C, 10C, and 0.1C (stop current after reaching 0.01 V).
(4) Three measurements at each rate (a total of 24 cycles).

Here, "1C" represents a current value required for fully charging or discharging a battery in 1 hour under constant current.

The nonaqueous electrolyte secondary battery of Example 1-1 displayed a current capacity approximately twice of that in Comparative Example 1-1 in a range from 0.5C to 2C, and revealed to be capable of high-speed charging.

Evaluation Example 12: Rate Characteristics, Cycle Durability

By using the nonaqueous electrolyte secondary batteries of Examples 1-1 to 1-3 and Comparative Examples 1-1 to 1-3 and 1-7, rate capacity characteristics and cycle capacity retention rates were evaluated.

(1) Current is supplied in a direction that causes occlusion of lithium to the negative electrode.
(2) Voltage range; 0.01 V to 2 V (vs. Li)
(3) Rate: 0.1C, 0.2C, 0.5C, 1C, 2C, 5C, 10C, and 0.1C (stop current after reaching 0.01 V).
(4) Three measurements at each rate (a total of 24 cycles).
(5) Temperature: Room temperature.

Current capacities at 0.1C rate and 2C rate were measured using the above described conditions, and a ratio of a current capacity at 2C rate with respect to a current capacity at 0.1C rate was used as rate capacity characteristics. In addition, charging and discharging were repeated for 25 cycles at 0.2C, and a ratio of a current capacity at the 25-th cycle with respect to a current capacity at the first cycle was used as a cycle capacity retention rate. The results are shown in Table 11.

electrolytic solution of the present invention and the negative electrode whose negative electrode active material is a graphite having a G/D ratio of not lower than 3.5. Furthermore, based on comparison of Examples, since rate capacity characteristics and cycle capacity retention rates tend to improve more when the G/D ratio is higher, the G/D ratio is thought to be more preferably not lower than 10. From this result, an electrolytic solution was revealed to also be the electrolytic solution of the present invention even when both AN was used and when DMC was used as the organic solvent for the electrolytic solution, and rate capacity characteristics and cycle capacity retention rate were revealed to improve when the graphite whose G/D ratio is not lower than 3.5 was used in combination.

Example 1-7

<Negative Electrode>

A SNO grade (mean particle diameter 15 μm) graphite (hereinafter, sometimes referred to as graphite (A)) from SEC CARBON, Ltd., was used as the negative electrode active material. 98 parts by mass of graphite (A), which is a negative electrode active material, 1 part by mass of a styrene butadiene rubber, which is a binding agent, and 1 part by mass of carboxymethyl cellulose were mixed. The mixture was dispersed in a proper amount of ion exchanged water to prepare a negative electrode mixture in a slurry form. Hereinafter, if necessary, the styrene butadiene rubber is abbreviated as SBR, and carboxymethyl cellulose is abbreviated as CMC.

Raman spectrum analysis was performed on a powder of the graphite (A). As a device, RAMAN-11 (excitation wavelength λ=532 nm, grating: 1800 gr/mm, laser power: mW) manufactured by Nanophoton Corporation was used. In the Raman spectrum, a G/D ratio, which is a ratio of intensities of G-band and D-band peaks, was 12.2.

The slurry was applied on the surface of an electrolytic copper foil (current collector) having a thickness of 20 μm

TABLE 11

| | Electrolytic solution | Graphite G/D ratio | Rate capacity characteristic 2 C/0.1 C | Cycle capacity retention rate 25 cyc/ 1 cyc |
|---|---|---|---|---|
| Example 1-1 | E8 (4.5M LiFSA/AN) | 12.2 | 0.53 | 0.98 |
| Example 1-2 | E8 (4.5M LiFSA/AN) | 4.4 | 0.46 | 0.92 |
| Example 1-3 | E8 (4.5M LiFSA/AN) | 16.0 | 0.60 | 0.99 |
| Example 1-4 | E11 (3.9M LiFSA/DMC) | 16.0 | 0.50 | 0.97 |
| Comparative Example 1-1 | E8 (4.5M LiFSA/AN) | 3.4 | 0.30 | 0.70 |
| Comparative Example 1-2 | E8 (4.5M LiFSA/AN) | 3.2 | 0.35 | 0.62 |
| Comparative Example 1-3 | C5 (1M LiPF$_6$/EC + DEC(3:7)) | 12.2 | 0.15 | 0.99 |
| Comparative Example 1-7 | C5 (1M LiPF$_6$/EC + DEC(3:7)) | 3.2 | 0.23 | 0.98 |

As seen in Comparative Examples 1-1 and 1-2, cycle capacity retention rates cannot be easily improved by simply combining the electrolytic solution of the present invention and the negative electrode whose negative electrode active material is a graphite having a G/D ratio lower than 4. In addition, as seen in Comparative Examples 1-3 and 1-7, when a conventional electrolytic solution was used, rate capacity characteristics cannot be easily improved regardless of the G/D ratio of the graphite. However, as seen in Examples 1-1 to 1-3, rate capacity characteristics and cycle capacity retention rates are both improved by combining the using a doctor blade to form a negative electrode active material layer on the copper foil.

Then, the organic solvent was removed from the negative electrode active material layer through volatilization by drying the negative electrode active material layer at 80° C. for 20 minutes. After the drying, the current collector and the negative electrode active material layer were attached firmly and joined by using a roll press machine. The obtained joined object was vacuum dried at 100° C. for 6 hours to form a negative electrode whose weight per area of the negative electrode active material layer was about 8.5 mg/cm$^2$.

<Positive Electrode>

A positive electrode includes a positive electrode active material layer, and a current collector coated with the positive electrode active material layer. The positive electrode active material layer includes a positive electrode active material, a binding agent, and a conductive additive. The positive electrode active material is formed of LiNi$_{0.5}$Co$_{0.2}$Mn$_{0.3}$O$_2$. The binding agent is formed of PVDF and the conductive additive is formed of AB. The current collector is formed from an aluminum foil having a thickness of 20 μm. The contained mass ratio of the positive electrode active material, the binding agent, and the conductive additive is 94:3:3 when mass of the positive electrode active material layer is defined as 100 parts by mass.

In order to produce the positive electrode, NCM523, PVDF, and AB were mixed in the above described mass ratio, and NMP was added thereto as the solvent to obtain a positive electrode material in a paste form. The positive electrode material in the paste form was applied on the surface of the current collector using a doctor blade to form the positive electrode active material layer. The positive electrode active material layer was dried for 20 minutes at 80° C. to remove the NMP through volatilization. An aluminum foil having the positive electrode active material layer formed on the surface thereof was compressed using a roll press machine to firmly attach and join the aluminum foil and the positive electrode active material layer. The obtained joined object was heated in a vacuum dryer for 6 hours at 120° C. and cut in a predetermined shape to obtain the positive electrode.

<Nonaqueous Electrolyte Secondary Battery>

A nonaqueous electrolyte secondary battery of Example 1-7 was obtained similarly to Example 1-5 except for using the positive electrode, the negative electrode, and electrolytic solution E8 described above, and cellulose nonwoven fabric (thickness of 20 μm) as the separator.

Comparative Example 1-9

A nonaqueous electrolyte secondary battery of Comparative Example 1-9 was obtained similarly to Example 1-7 except for using electrolytic solution C5 instead of the electrolytic solution of the present invention.

Evaluation Example 13: Input Characteristics

By using the lithium ion batteries of Example 1-7 and Comparative Example 1-9, input (charging) characteristics were evaluated using the following conditions.
(1) Usage voltage range: 3 V to 4.2 V
(2) Capacity: 13.5 mAh
(3) SOC: 80%
(4) Temperature: 0° C., 25° C.
(5) Number of measurements: Three times each The used evaluation conditions were: state of charge (SOC) of 80%, 0° C. or 25° C., usage voltage range of 3 V to 4.2 V, and capacity of 13.5 mAh. SOC 80% at 0° C. is in a range in which input characteristics are unlikely to be exerted such as, for example, when used in a cold room. Evaluation of input characteristics of Example 1-7 and Comparative Example 1-9 was performed three times each for 2-second input and 5-second input. Evaluation results of input characteristics are shown in Tables 12 and 13. In the tables, "2-second input" refers to an input inputted at 2 seconds after the start of charging, and "5-second input" refers to an input inputted at 5 seconds after the start of charging.

In Tables 12 and 13, the electrolytic solution of the present invention used in Example 1-7 is abbreviated as "FSA," and the electrolytic solution used in Comparative Example 1-9 is abbreviated as "ECPF."

TABLE 12

|  | Example | Comparative Example 1-9 |
| --- | --- | --- |
| Graphite | 1-7 Graphite (A) | Graphite (A) |
| Electrolytic solution | FSA | ECPF |
| 2-second input (mW) | 958.3 | 817.2 |
|  | 1255.0 | 797.3 |
|  | 1127.5 | 785.3 |
| 5-second input (mW) | 737.1 | 617.1 |
|  | 973.5 | 602.8 |
|  | 864.0 | 585.0 |

(25° C., SOC80%)

TABLE 13

|  | Example 1-7 | Comparative Example 1-9 |
| --- | --- | --- |
| Graphite | Graphite (A) | Graphite (A) |
| Electrolytic solution | FSA | ECPF |
| 2-second input (mW) | 362.9 | 189.2 |
|  | 482.6 | 204.4 |
|  | 424.0 | 195.7 |
| 5-second input (mW) | 298.7 | 163.3 |
|  | 396.4 | 199.1 |
|  | 350.7 | 191.3 |

(0° C., SOC80%)

At both 0° C. and 25° C., Example 1-7 displayed improvement in input (charging) characteristics when compared to Comparative Example 1-9. This is the effect of using the electrolytic solution of the present invention and the graphite whose GD ratio is not lower than 3.5, and, since high input (charging) characteristics were shown particularly even at 0° C., movement of lithium ions in the electrolytic solution is shown to occur smoothly even at a low temperature.

Example 1-8

A nonaqueous electrolyte secondary battery of Example 1-8 using electrolytic solution E11 was produced in the following manner.

<Negative Electrode>

90 parts by mass of a natural graphite having a mean particle diameter 10 μm, which is an active material, and 10 parts by mass of PVdF, which is a binding agent, were mixed. The mixture was dispersed in a proper amount of NMP to create a slurry. As the current collector, a copper foil having a thickness of 20 μm was prepared. 2.46 mg of the slurry was applied in a film form on the surface of the copper foil by using a doctor blade. The natural graphite used in Example 1-8 had a G/D ratio of 4.4.

The copper foil on which the slurry was applied was dried to remove NMP, and then the copper foil was pressed to obtain a joined object. The obtained joined object was heated and dried in a vacuum dryer for 6 hours at 120° C. to obtain a copper foil having the active material layer formed thereon. This was used as the working electrode. The mass of the active material on the copper foil was 2.214 mg. The mass of the active material per 1 cm$^2$ of the copper foil was 1.48 mg. Furthermore, the density of the natural graphite and the PVdF before being pressed was 0.68 g/cm$^3$, and the density of the active material layer after being pressed was 1.025 g/cm$^3$.

<Nonaqueous Electrolyte Secondary Battery>

Metal Li was used as the counter electrode.

The working electrode, the counter electrode, and electrolytic solution E11 were housed in a battery case (CR2032 type coin cell case manufactured by Hohsen Corp.) having a diameter of 13.82 mm to obtain a nonaqueous electrolyte secondary battery of Example 1-8.

Example 1-9

A nonaqueous electrolyte secondary battery of Example 1-9 was obtained with a method similar to that of Example 1-8 except for using electrolytic solution E8 instead of electrolytic solution E11.

Example 1-10

A nonaqueous electrolyte secondary battery of Example 1-10 was obtained with a method similar to that of Example 1-8 except for using electrolytic solution E16 instead of electrolytic solution E11.

Example 1-11

A nonaqueous electrolyte secondary battery of Example 1-11 was obtained with a method similar to that of Example 1-8 except for using electrolytic solution E19 instead of electrolytic solution E11.

Comparative Example 1-10

A nonaqueous electrolyte secondary battery of Comparative Example 1-10 was obtained similarly to Example 1-8 except for using electrolytic solution C5 instead of electrolytic solution E11.

Evaluation Example 14: Reversibility of Reaction

With respect to each of the nonaqueous electrolyte secondary batteries of Examples 1-8 to 1-11 and Comparative Example 1-10, a charging/discharging test was performed for three times using the conditions shown in Table 14. Respective charging/discharging curves obtained therefrom are shown in FIGS. 49 to 53.

Similarly to a general nonaqueous electrolyte secondary battery of Comparative Example 1-10, the nonaqueous electrolyte secondary batteries of Examples 1-8 to 1-11 are understood as to undergo charging/discharging reactions reversibly.

TABLE 14

| | Cut-off voltage | Current rate |
|---|---|---|
| CC charging | 0.01 V | 0.1 C |
| CC discharging | 2.0 V | 0.1 C |

Temperature: 25° C., Cycle number: 3

Evaluation Example 15: Rate Characteristics

Rate characteristics of the nonaqueous electrolyte secondary battery of Examples 1-8 to 1-11 and Comparative Example 1-10 were tested using the following method. With respect to each of the nonaqueous electrolyte secondary batteries, at 0.1C, 0.2C, 0.5C, 1C, and 2C rates, charging and then discharging were performed, and the discharge capacity of the working electrode was measured at each rate. "1C" refers to a current required for fully charging or discharging a battery in 1 hour under a constant current. In the description here, the counter electrode was regarded as the negative electrode and the working electrode was regarded as the positive electrode. With respect to the capacity of the working electrode at 0.1C rate, proportions of capacities at other rates, i.e., rate characteristics, were calculated. The results are shown in Table 15.

TABLE 15

| | Example 1-8 | Example 1-9 | Example 1-10 | Example 1-11 | Comparative Example 1-10 |
|---|---|---|---|---|---|
| 0.2 C capacity/ 0.1 C capacity | 0.982 | 0.981 | 0.981 | 0.985 | 0.974 |
| 0.5 C capacity/ 0.1 C capacity | 0.961 | 0.955 | 0.956 | 0.960 | 0.931 |
| 1 C capacity/ 0.1 C capacity | 0.925 | 0.915 | 0.894 | 0.905 | 0.848 |
| 2 C capacity/ 0.1 C capacity | 0.840 | 0.777 | 0.502 | 0.538 | 0.575 |

In the nonaqueous electrolyte secondary batteries of Examples 1-8 to 1-11, at 0.2C, 0.5C, and 1C rates, decrease in capacity was suppressed compared to in the nonaqueous electrolyte secondary battery of Comparative Example 1-10. Based on this result, the nonaqueous electrolyte secondary battery of each of the Examples, i.e., the nonaqueous electrolyte secondary battery of the present invention, was confirmed to show excellent rate characteristics. Furthermore, in the nonaqueous electrolyte secondary batteries of Examples 1-8 and 1-9, at 2C rate, decrease in capacity was suppressed compared to in the nonaqueous electrolyte secondary battery of Comparative Example 1-10. Thus, the nonaqueous electrolyte secondary batteries of Examples 1-8 and 1-9 display particularly excellent rate characteristics.

Evaluation Example 16: Capacity Retention Rate

Capacity retention rates of the nonaqueous electrolyte secondary battery of Examples 1-8 to 1-11 and Comparative Example 1-10 were tested using the following method.

With respect to each of the nonaqueous electrolyte secondary batteries, a charging/discharging cycle from 2.0 V to 0.01 V, which is CC charging (constant current charging) to a voltage of 2.0 V and CC discharging (constant current discharging) to a voltage of 0.01 V, was performed at 25° C. In detail, firstly, charging and discharging were performed for three cycles at a charging/discharging rate of 0.1C. Then, charging and discharging were performed for three cycles at respective charging/discharging rates of 0.2C, 0.5C, 1C, 2C, 5C, and 10C, sequentially. Lastly, charging and discharging were performed for three cycles at 0.1C. Capacity retention rate (%) of each of the nonaqueous electrolyte secondary batteries was obtained from the following formula.

Capacity Retention rate (%)=$B/A\times100$

A: Second discharge capacity of the working electrode in the first charging/discharging cycle at 0.1C B: Second discharge capacity of the working electrode in the last charging/discharging cycle at 0.1C The results are shown in Table 16. In the description here, the counter electrode was regarded as the negative electrode and the working electrode was regarded as the positive electrode.

TABLE 16

|  | Example 1-8 | Example 1-9 | Example 1-10 | Example 1-11 | Comparative Example 1-10 |
|---|---|---|---|---|---|
| Capacity retention rate (%) | 98.1 | 98.7 | 98.9 | 99.8 | 98.8 |

All the nonaqueous electrolyte secondary batteries performed the charging/discharging reaction finely, and displayed suitable capacity retention rate. In particular, capacity retention rates of the half-cells of Example 1-9, 1-10, and 1-11 were significantly superior.

Example 1-12

A nonaqueous electrolyte secondary battery of Example 1-12 was obtained similarly to Example 1-2 except for using electrolytic solution E9.

Evaluation Example 17: Rate Characteristics at Low Temperature

By using the nonaqueous electrolyte secondary batteries of Example 1-12 and Comparative Example 1-4, rate characteristics at −20° C. were evaluated in the following manner. The results are shown in FIGS. 54 and 55.

(1) Current is supplied in a direction that causes occlusion of lithium to the negative electrode (evaluation electrode).
(2) Voltage range: From 2 V down to 0.01 V (v.s. Li/Li$^+$).
(3) Rate: 0.02C, 0.05C, 0.1C, 0.2C, and 0.5C (stop current after reaching 0.01 V).

"1C" represents a current value required for fully charging or discharging a battery in 1 hour under constant current.

Figure 54:
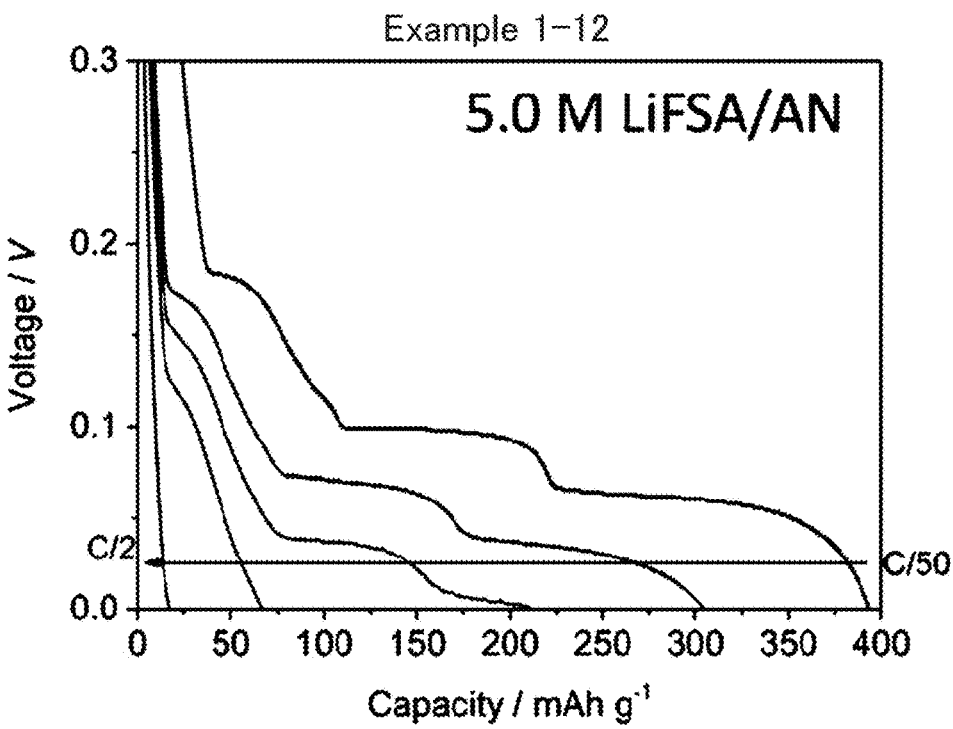
FIG. 54 is a graph representing the relationship between current rate and voltage curve in a nonaqueous electrolyte secondary battery of Example 1-12.
Figure 55:
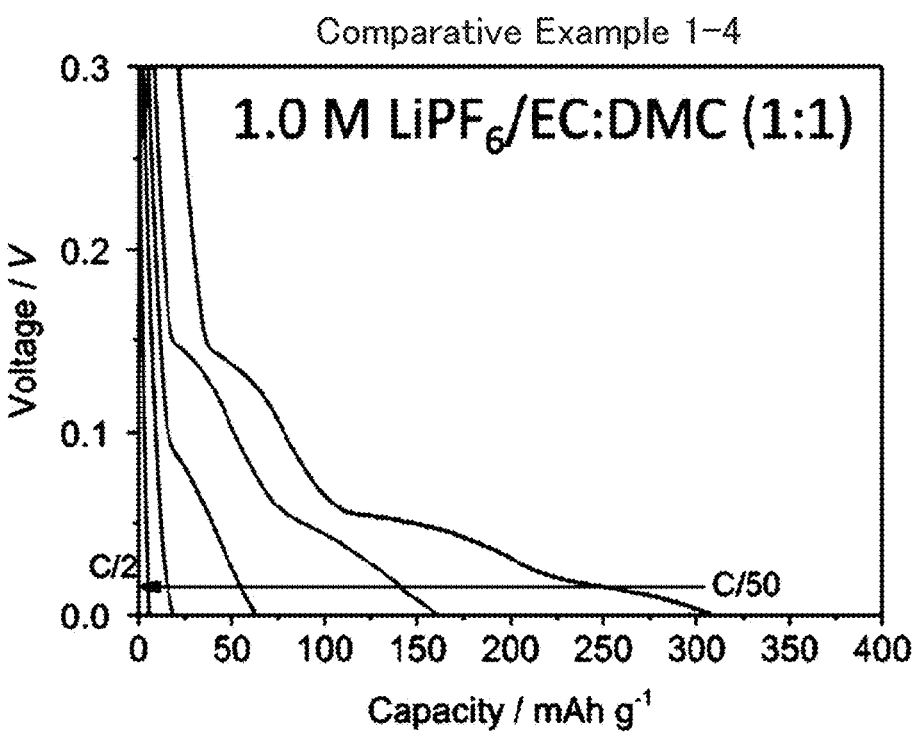
FIG. 55 is a graph representing the relationship between current rate and voltage curve in a nonaqueous electrolyte secondary battery of Comparative Example 1-4.

Based on FIGS. 54 and 55, voltage curves of the nonaqueous electrolyte secondary battery of Example 1-12 at each current rate are understood as to display high voltage compared to the voltage curves of the nonaqueous electrolyte secondary battery of Comparative Example 1-4. Based on this result, the nonaqueous electrolyte secondary battery of the present invention was confirmed to show excellent rate characteristics even in a low-temperature environment.

Evaluation Example 18: Rate Characteristics

Rate characteristics of the nonaqueous electrolyte secondary batteries of Example 1-2 and Comparative Example 1-4 were tested using the following method.

With respect to each of the nonaqueous electrolyte secondary batteries, at 0.1C, 0.2C, 0.5C, 1C, and 2C rates, charging and then discharging were performed, and the capacity (discharge capacity) of the working electrode was measured at each rate. Here, the counter electrode was regarded as the negative electrode and the working electrode was regarded as the positive electrode, and rate characteristics were calculated similarly to that described above. The results are shown in Table 17.

TABLE 17

|  | Example 1-2 | Comparative Example 1-4 |
|---|---|---|
| 0.1 C capacity (mAh/g) | 334 | 330 |
| 0.2 C capacity/0.1 C capacity | 0.983 | 0.966 |
| 0.5 C capacity/0.1 C capacity | 0.946 | 0.767 |
| 1 C capacity/0.1 C capacity | 0.868 | 0.498 |
| 2 C capacity/0.1 C capacity | 0.471 | 0.177 |

When compared to the nonaqueous electrolyte secondary battery of Comparative Example 1-4, the nonaqueous electrolyte secondary battery of Example 1-2 showed suppression of decrease in capacity at all rates of 0.2C, 0.5C, 1C, and 2C. Thus, the nonaqueous electrolyte secondary battery of Example 1-2 displayed excellent rate characteristics. Also based on this result, the nonaqueous electrolyte secondary battery of the present invention using the electrolytic solution of the present invention was confirmed to show excellent rate characteristics.

Figure 56:
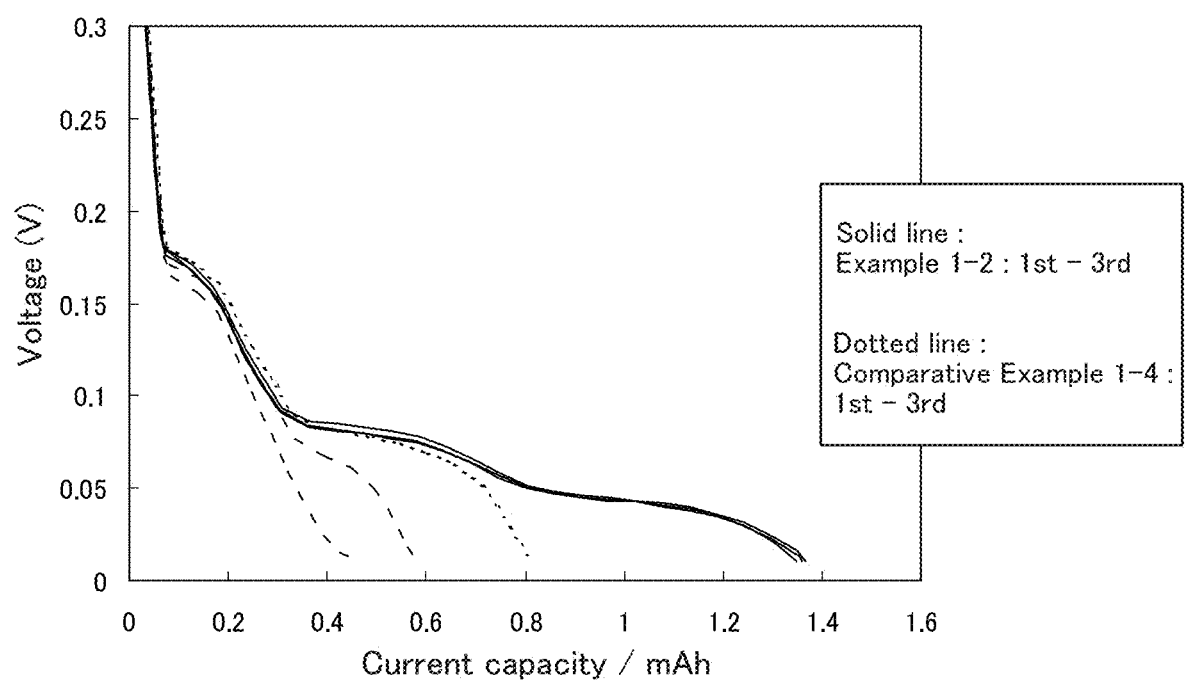
FIG. 56 shows the results of cycle characteristics of Evaluation Example 19.

Evaluation Example 19: Responsivity with Respect to Repeated Rapid Charging/Discharging The changes in capacity and voltage were observed when charging and discharging were repeated three times at 1C rate using the nonaqueous electrolyte secondary batteries of Example 1-2 and Comparative Example 1-4. The results are shown in FIG. 56.

Associated with repeated charging and discharging, the nonaqueous electrolyte secondary battery of Comparative Example 1-4 tended to show greater polarization when current was passed therethrough at 1C rate, and capacity obtained from 2 V to 0.01 V rapidly decreased. On the other hand, the nonaqueous electrolyte secondary battery of Example 1-2 hardly displayed increase or decrease of polarization even when charging and discharging were repeated, and had maintained its capacity suitably. This is confirmed from the manner three curves overlap in FIG. 56.

A conceivable reason why polarization increased in the nonaqueous electrolyte secondary battery of Comparative Example 1-4 is the inability of the electrolytic solution to supply sufficient amount of Li to a reaction interface with an electrode because of Li concentration unevenness generated in the electrolytic solution when charging and discharging are repeated rapidly, i.e., uneven distribution of Li concentration in the electrolytic solution. In the nonaqueous electrolyte secondary battery of Example 1-2, using the electrolytic solution of the present invention having a high Li concentration is thought to have enabled suppression of uneven distribution of Li concentration of the electrolytic solution. Also based on this result, the nonaqueous electrolyte secondary battery of the present invention using the electrolytic solution of the present invention was confirmed to show excellent responsivity against rapid charging/discharging.

<Nonaqueous Electrolyte Secondary Battery (2)>

Example 2-1

<Negative Electrode>
A hard carbon whose crystallite size (L) was 1.1 nm and polyvinylidene fluoride (PVdF) were added to, and mixed in N-methyl-2-pyrrolidone (NMP) to prepare a negative electrode mixture in a slurry form. The composition ratio of each component (solid content) in the slurry was hard carbon: PVdF=9:1 (mass ratio).

Measurement of the crystallite size was performed with an X-ray diffraction method using Cu K-α radiation as an X-ray source, and the crystallite size was calculated using the Scherrer's equation based on a half width of a diffraction peak detected at a diffraction angle 2θ=20 degrees to 30 degrees and the diffraction angle. [SmartLab] manufactured by Rigaku Corporation was used as the measuring device, and focusing method was used for the optical system.

The slurry was applied on the surface of an electrolytic copper foil (current collector) having a thickness of 20 μm using a doctor blade to form a negative electrode active material layer on the copper foil.

Then, the organic solvent was removed from the negative electrode active material layer through volatilization by drying the negative electrode active material layer at 80° C. for 20 minutes. After the drying, the current collector and the negative electrode active material layer were attached firmly and joined by using a roll press machine. The obtained joined object was heated and dried under vacuum at 120° C. for 6 hours to form a negative electrode whose thickness of the negative electrode active material layer was about 30 μm.

<Nonaqueous Electrolyte Secondary Battery>

By using the produced negative electrode described above as an evaluation electrode, a nonaqueous electrolyte secondary battery was produced. A metallic lithium foil (thickness of 500 μm) was used as a counter electrode.

The counter electrode and the evaluation electrode were respectively cut to have diameters of 13 mm and 11 mm, and a separator (Whatman glass fiber filter paper) having a thickness of 400 μm was interposed therebetween to form an electrode assembly battery. This electrode assembly battery was housed in a battery case (CR2032 coin cell manufactured by Hohsen Corp.). Electrolytic solution E8 was injected therein, and the battery case was sealed to obtain a nonaqueous electrolyte secondary battery of Example 2-1. Details of the nonaqueous electrolyte secondary battery of Example 2-1 and nonaqueous electrolyte secondary batteries of the following Examples and Comparative Examples are shown in Table 42 provided at the end of the section of the Examples.

Comparative Example 2-1

A nonaqueous electrolyte secondary battery of Comparative Example 2-1 was obtained similarly to Example 2-1 except for using electrolytic solution C5 instead of electrolytic solution E8.

Evaluation Example 20: Reversibility of Charging and Discharging

Figure 57:
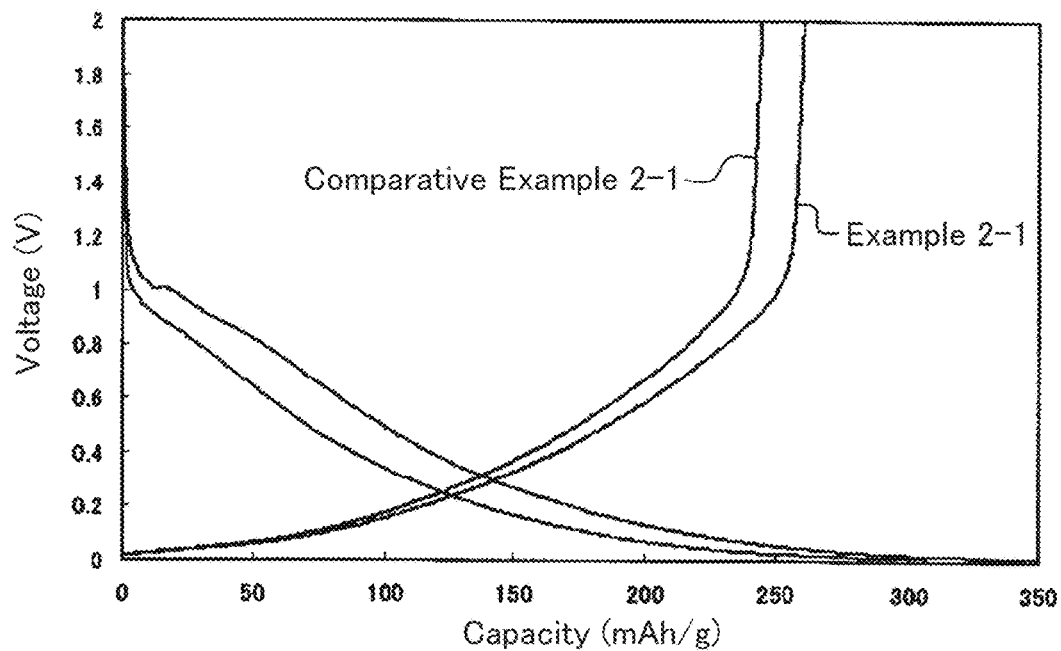
FIG. 57 shows initial charging/discharging curves of nonaqueous electrolyte secondary batteries of Example 2-1 and Comparative Example 2-1.
Figure 58:
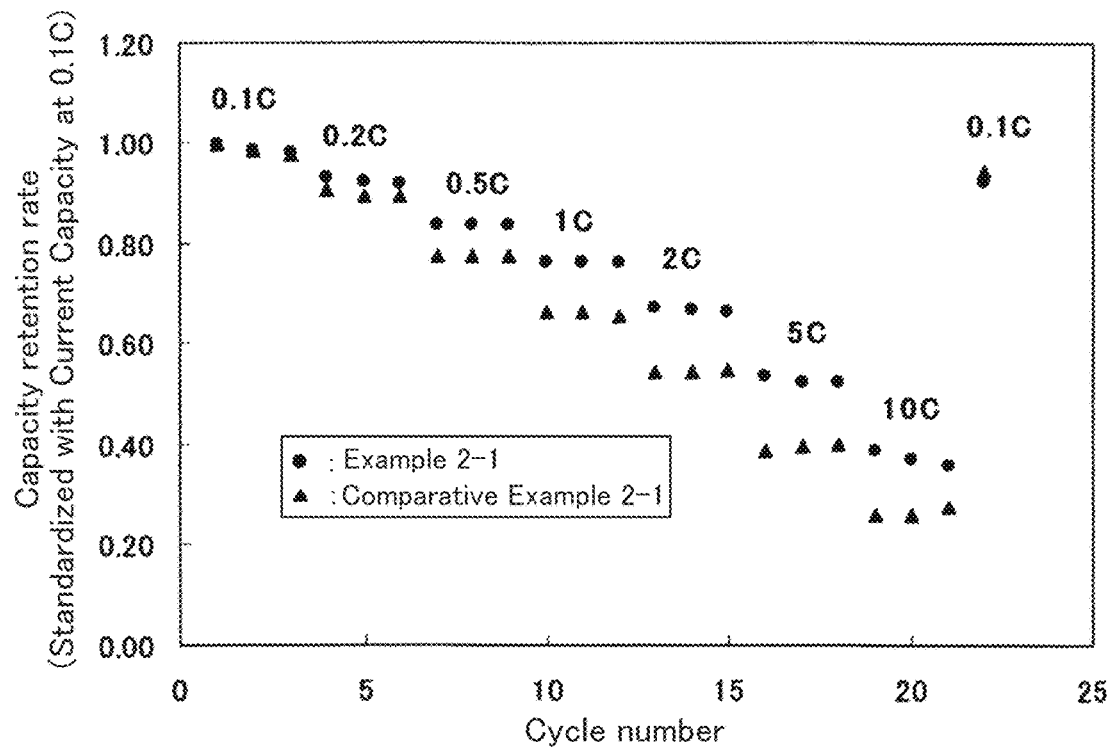
FIG. 58 is a graph representing the relationship between cycle number and current capacity ratio in the nonaqueous electrolyte secondary batteries of Example 2-1 and Comparative Example 2-1.

Respective rate capacity characteristics of the nonaqueous electrolyte secondary batteries of Example 2-1 and Comparative Example 2-1 were evaluated under the following conditions. FIG. 57 shows the charging/discharging curve of the first cycle, and FIG. 58 shows the results of the rate capacity test.

(1) Current is supplied in a direction that causes occlusion of lithium to the negative electrode.
(2) Voltage range: From 2 V down to 0.01 V (v.s. Li/Li$^+$)
(3) Rate: 0.1C, 0.2C, 0.5C, 1C, 2C, 5C, 10C, and 0.1C (stop current after reaching 0.01 V).
(4) Three measurements at each rate (a total of 24 cycles).

Here, "1C" represents a current value required for fully charging or discharging a battery in 1 hour under constant current.

Based on FIG. 57, the nonaqueous electrolyte secondary battery of Example 2-1 is obviously chargeable and dischargeable. In addition, based on FIG. 58, the nonaqueous electrolyte secondary battery of Example 2-1 is understood as to have excellent rate capacity characteristics over the nonaqueous electrolyte secondary battery of Comparative Example 2-1, and functions as a battery appropriate for high-speed charging and high input-output.

Example 2-2

A negative electrode was produced similarly to that of Example 1-1 except for choosing a soft carbon whose crystallite size (L) was 4.2 nm and using this soft carbon. Other than using this negative electrode, a nonaqueous electrolyte secondary battery of Example 2-2 was obtained similarly to Example 1-1.

Example 2-3

A nonaqueous electrolyte secondary battery of Example 2-3 was obtained similarly to Example 2-1 except for using electrolytic solution E11.

Example 2-4

A nonaqueous electrolyte secondary battery of Example 2-4 was obtained similarly to Example 2-2 except for using the same electrolytic solution E11 as in Example 2-3.

Comparative Example 2-2

A negative electrode was produced similarly to Example 2-1 except for selecting and using a graphite whose crystallite size (L) was 28 nm. A nonaqueous electrolyte secondary battery of Comparative Example 2-2 was obtained similarly to that of Example 2-1 except for using this negative electrode.

Comparative Example 2-3

A negative electrode was produced similarly to Example 2-1 except for selecting and using a graphite whose crystallite size (L) was 42 nm. A nonaqueous electrolyte secondary battery of Comparative Example 2-3 was obtained similarly to that of Example 2-1 except for using this negative electrode.

Comparative Example 2-4

A negative electrode was produced similarly to Example 2-1 using a similar hard carbon as in Example 2-1. A nonaqueous electrolyte secondary battery of Comparative Example 2-4 was obtained similarly to that of Example 2-1 except for using this negative electrode and using electrolytic solution C5 instead of the electrolytic solution of the present invention.

Comparative Example 2-5

A negative electrode was produced similarly to Example 2-1 using a similar soft carbon as in Example 2-2. A nonaqueous electrolyte secondary battery of Comparative Example 2-5 was obtained similarly to that of Example 2-1 except for using this negative electrode and using electrolytic solution C5 instead of the electrolytic solution of the present invention.

Comparative Example 2-6

A negative electrode was produced similarly to Comparative Example 2-2. A nonaqueous electrolyte secondary battery of Comparative Example 2-6 was obtained similarly to that of Example 2-1 except for using this negative electrode and using electrolytic solution C5 instead of the electrolytic solution of the present invention.

Comparative Example 2-7

A negative electrode was produced similarly to Comparative Example 2-3. A nonaqueous electrolyte secondary battery of Comparative Example 2-7 was obtained similarly to that of Example 2-1 except for using this negative electrode and using electrolytic solution C5 instead of the electrolytic solution of the present invention.

Evaluation Example 21: Rate Characteristics

Respective rate capacity characteristics of the nonaqueous electrolyte secondary batteries of Examples 2-1 and 2-2 and Comparative Examples 2-2 to 2-7 were evaluated with the same condition as "(Evaluation Example 20: Reversibility of Charging and Discharging)" described above. A ratio of a current capacity at 5C rate with respect to a current capacity at 0.1C rate was used as rate capacity characteristics. The results are shown in Table 18.

TABLE 18

| | Carbon material | Electrolytic solution | Crystallite size (nm) | Rate capacity characteristic (5 C/0.1 C) |
|---|---|---|---|---|
| Example 2-1 | HC | E8 (4.5M LiFSA/AN) | 1.1 | 0.54 |
| Example 2-2 | SC | E8 (4.5M LiFSA/AN) | 4.2 | 0.57 |
| Example 2-3 | HC | E11 (3.9M LiFSA/DMC) | 1.1 | 0.42 |
| Example 2-4 | SC | E11 (3.9M LiFSA/DMC) | 4.2 | 0.64 |
| Comparative Example 2-2 | Graphite | E8 (4.5M LiFSA/AN) | 28.0 | 0.10 |
| Comparative Example 2-3 | Graphite | E8 (4.5M LiFSA/AN) | 42.0 | 0.24 |
| Comparative Example 2-4 | HC | C5 (1M LiPF$_6$/EC + DEC(3:7)) | 1.1 | 0.39 |
| Comparative Example 2-5 | SC | C5 (1M LiPF$_6$/EC + DEC(3:7)) | 4.2 | 0.47 |
| Comparative Example 2-6 | Graphite | C5 (1M LiPF$_6$/EC + DEC(3:7)) | 28.0 | 0.04 |
| Comparative Example 2-7 | Graphite | C5 (1M LiPF$_6$/EC + DEC(3:7)) | 42.0 | 0.19 |

HC: hard carbon,
SC: soft carbon

As in the case of Comparative Examples 2-2 and 2-3, with a combination of the electrolytic solution of the present invention and a carbon material whose crystallite size (L) is larger than 20 nm, sufficiently large rate capacity characteristic cannot be obtained. On the other hand, as in the case of Examples 2-1 and 2-2, when a carbon material whose crystallite size (L) is smaller than 20 nm is used, excellent rate capacity characteristics comparable to or better than those of Comparative Examples 2-4 to 2-7 are expressed also when the electrolytic solution of the present invention is used. In addition, since a trend in which the rate capacity characteristics improved as the crystallite size (L) becomes smaller was observed, the crystallite size (L) is more preferably not larger than 5 nm.

In addition, as in the case of Examples 2-3 and 2-4, excellent rate capacity characteristics compared to Comparative Examples 2-2 and 2-3 are expressed also when DMC, which is a linear carbonate, is used as the organic solvent for the electrolytic solution.

<Nonaqueous Electrolyte Secondary Battery (3)>

Example 3-1

By using electrolytic solution E8 described above and the negative electrode active material formed of a silicon-carbon composite powder, a nonaqueous electrolyte secondary battery of Example 3-1 was produced.

<Negative Electrode>

The silicon-carbon composite powder was obtained by mixing an Si powder having a particle diameter of 50 nm and acetylene black at a mass ratio of 6:4, and forming a composite using a planetary ball mill.

90 parts by mass of the silicon-carbon composite powder as the negative electrode active material and 10 parts by mass of polyamide-imide (PAI) as the binding agent were mixed. This mixture was dispersed in a proper amount of NMP to prepare a negative electrode mixture in a slurry form. By using a doctor blade, this slurry was applied on the negative electrode current collector in a film form. As the negative electrode current collector, a copper foil having a thickness of 20 µm was used. The negative electrode current collector, on which the slurry form negative electrode mixture was applied, was dried for 20 minutes at 80° C., and then pressed using a roller press machine. A joined object after pressing was heated for 2 hours at 200° C. in a vacuum dryer, and cut in a predetermined shape to obtain a negative electrode.

A lithium foil (metal lithium) was used as the counter electrode, and electrolytic solution E8 was used as the electrolytic solution.

By using the negative electrode, the positive electrode, and the electrolytic solution described above, a nonaqueous electrolyte secondary battery was produced. In detail, a Whatman glass fiber filter paper having a thickness of 400 µm was interposed between the positive electrode and the negative electrode as a separator to form an electrode assembly. The electrode assembly was housed in a battery case (CR2032 coin cell manufactured by Hohsen Corp.). Then, the electrolytic solution was injected in the battery case. After the injection the electrolytic solution, the battery case was sealed to obtain a nonaqueous electrolyte secondary battery of Example 3-1. Details of the nonaqueous electrolyte secondary battery of Example 4-1 and each battery described in the following are shown in Table 43 provided at the end of the Examples section.

Example 3-2

A nonaqueous electrolyte secondary battery of Example 3-2 was identical to the nonaqueous electrolyte secondary battery of Example 3-1 except for the composition of the negative electrode mixture. The negative electrode mixture in the nonaqueous electrolyte secondary battery of Example 3-2 contains 75 parts by mass of a silicon-carbon composite powder as the negative electrode active material, 15 parts by mass of a graphite also as the negative electrode active material, and 10 parts by mass of polyamide-imide (PAI) as the binding agent.

Example 3-3

A nonaqueous electrolyte secondary battery of Example 3-3 was identical to the nonaqueous electrolyte secondary battery of Example 3-2 except for using electrolytic solution E11.

Comparative Example 3-1

A nonaqueous electrolyte secondary battery of Comparative Example 3-1 was identical to the nonaqueous electrolyte secondary battery of Example 3-1 except for using electrolytic solution C5.

Comparative Example 3-2

A nonaqueous electrolyte secondary battery of Comparative Example 3-2 was identical to the nonaqueous electrolyte secondary battery of Example 3-2 except for using the same electrolytic solution C5 as in Comparative Example 3-1.

Evaluation Example 22: Charging/Discharging Characteristics

Charging/discharging characteristics of the nonaqueous electrolyte secondary batteries of Examples 3-1 to 3-3 and Comparative Examples 3-1 and 3-2 were evaluated using the following method.

Figure 59:
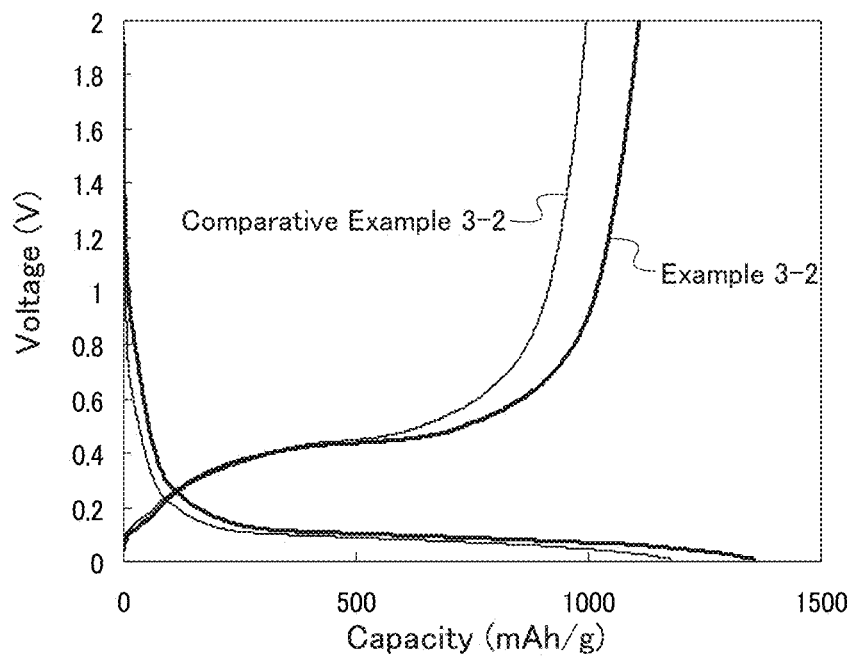
FIG. 59 shows charging/discharging curves of nonaqueous electrolyte secondary batteries of Example 3-2 and Comparative Example 3-2.
Figure 60:
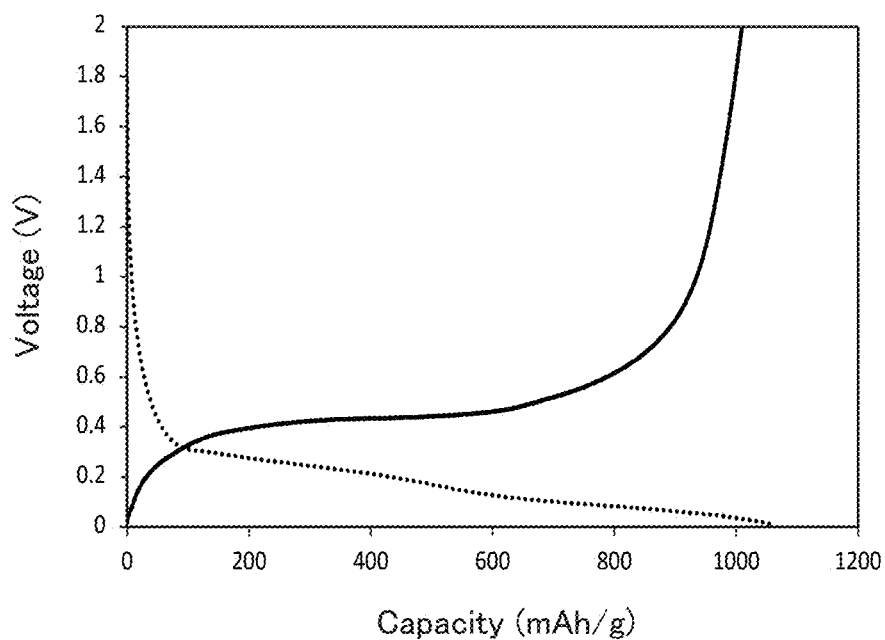
FIG. 60 shows charging/discharging curves of a nonaqueous electrolyte secondary battery of Example 3-3.

With respect to each of the nonaqueous electrolyte secondary batteries, constant current (CC) charging and discharging were performed. The voltage range was 2 V to 0.01 V and the C rate was 0.1C. Discharge capacities of each of the nonaqueous electrolyte secondary batteries are shown in Table 19. Charging/discharging curves of the nonaqueous electrolyte secondary batteries of Example 3-2 and Comparative Example 3-2 are shown in FIG. 59. Charging/discharging curves of the nonaqueous electrolyte secondary battery of Example 3-3 are shown in FIG. 60.

TABLE 19

| | Negative electrode mixture | Electrolytic solution | Discharge capacity |
|---|---|---|---|
| Example 3-1 | Si—C:PAI = 90:10 | E8 (4.5M LiFSA + AN) | 1465 |
| Example 3-2 | Si—C:graphite:PAI = 75:15:10 | E8 (4.5M LiFSA + AN) | 1109 |
| Example 3-3 | Si—C:graphite:PAI = 75:15:10 | E11 (3.9M LiFSA + DMC) | 1061 |
| Comparative Example 3-1 | Si—C:PAI = 90:10 | C5 (1M LiPF$_6$ + EC/DEC) | 1392 |
| Comparative Example 3-2 | Si—C:graphite:PAI = 75:15:10 | C5 (1M LiPF$_6$ + EC/DEC) | 995 |

AB: acetylene black,
Si—C: nano-silicon aggregated particle - carbon composite powder,
PAI: polyamide-imide,
LiFSA: (FSO$_2$)$_2$NLi,
AN: acetonitrile,
EC/DEC: mixed solvent of ethylene carbonate and diethyl carbonate (volume ratio 3:7)

As shown in Table 19, Example 3-1 and Comparative Example 3-1 used the same negative electrode mixture, and Example 3-2 and Comparative Example 3-2 used the same negative electrode mixture. Through a comparison of the nonaqueous electrolyte secondary batteries of Example 3-1 and Comparative Example 3-1 using the same negative electrode mixture, and a comparison of the nonaqueous electrolyte secondary batteries of Example 3-2 and Comparative Example 3-2 using the same negative electrode mixture; discharge capacity of a nonaqueous electrolyte secondary battery is understood as to improve by using the electrolytic solution of the present invention as an electrolytic solution. Based on this result, combining the electrolytic solution of the present invention and the composite material of silicon and carbon is shown to improve the discharge capacity of the nonaqueous electrolyte secondary battery. Although the reason thereof is not certain, a change in an electrical double layer structure, or the like due to a coordination environment of the anion and the solvent in the electrolytic solution of the present invention being different from that of a general electrolytic solution is speculated to be one reason.

Furthermore, as in the case of the nonaqueous electrolyte secondary battery of Example 3-3, a nonaqueous electrolyte secondary battery using DMC as the organic solvent for the electrolytic solution is also understood as to undergo charging and discharging sufficiently in a manner similar to the nonaqueous electrolyte secondary batteries of the Examples. Based on this result, the electrolytic solution of the present invention using a linear carbonate as the organic solvent is understood as to be useful when being combined with the composite material of silicon and carbon.

<Nonaqueous Electrolyte Secondary Battery (4)>

Example 4-1

A nonaqueous electrolyte secondary battery of Example 4-1 was produced using electrolytic solution E8 described above.

<Negative Electrode>

The negative electrode in the nonaqueous electrolyte secondary battery of Example 4-1 includes a negative electrode active material, a binder, and a conductive additive. 90 parts by mass of lithium titanate (Li$_4$Ti$_5$O$_{12}$, i.e., LTO) as the negative electrode active material, 2 parts by mass of SBR as the binder, and 2 parts by mass of CMC also as the binder, and 6 parts by mass of Ketchen black (KB) as the conductive additive were obtained and mixed. This mixture was dispersed in a proper amount of ion exchanged water to prepare a negative electrode mixture in a slurry form. By using a doctor blade, the negative electrode mixture was applied on the negative electrode current collector in a film form. As the negative electrode current collector, a copper foil having a thickness of 20 μm was used. A complex of the negative electrode mixture and the negative electrode current collector was dried and pressed using a roller press machine to obtain a joined object. The joined object that had been pressed was heated for 6 hours at 100° C. in a vacuum dryer, and cut in a predetermined shape to obtain a negative electrode.

As the positive electrode in the nonaqueous electrolyte secondary battery of Example 4-1, a lithium foil (metal lithium) was used. Thus, the nonaqueous electrolyte secondary battery of Example 4-1 is a half-cell for evaluation. By charging and discharging the half-cell, the effect of the negative electrode and the electrolytic solution on the battery characteristics of the nonaqueous electrolyte secondary battery is evaluated.

By using the negative electrode, the positive electrode, and electrolytic solution E8 described above, a nonaqueous electrolyte secondary battery was produced. In detail, a Whatman glass fiber filter paper having a thickness of 400 μm was interposed between the positive electrode and the negative electrode as a separator to form an electrode assembly. The electrode assembly was housed in a battery case (CR2032 coin cell manufactured by Hohsen Corp.). Then, the electrolytic solution was injected in the battery case. After the injection the electrolytic solution, the battery case was sealed to obtain a nonaqueous electrolyte secondary battery of Example 4-1. Details of the nonaqueous electrolyte secondary battery of Example 4-1 and each battery described in the following are shown in Table 44 provided at the end of the Examples section.

Example 4-2

A nonaqueous electrolyte secondary battery of Example 4-2 was produced similarly to Example 4-1 except for using electrolytic solution E11 instead of electrolytic solution E8.

Example 4-3

A nonaqueous electrolyte secondary battery of Example 4-3 was produced similarly to Example 4-1 except for using electrolytic solution E13 instead of electrolytic solution E8.

Comparative Example 4-1

A nonaqueous electrolyte secondary battery of Comparative Example 1 was different from that of Example 4-1 regarding the components of the electrolytic solution. In the nonaqueous electrolyte secondary battery of Comparative Example 4-1, electrolytic solution C5 was used. Other components were similar to those of Example 4-1.

Evaluation Example 23: Energy Density and Charging/Discharging Efficiency

Energy density and charging/discharging efficiency of the nonaqueous electrolyte secondary batteries of Example 4-1 and Comparative Example 4-1 were evaluated using the following method.

Figure 61:
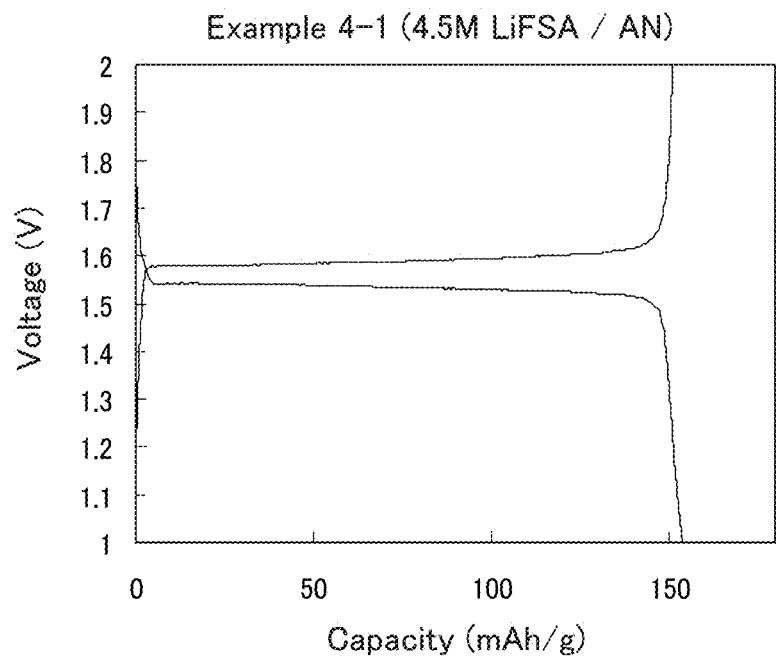
FIG. 61 shows charging/discharging curves of a nonaqueous electrolyte secondary battery of Example 4-1.
Figure 62:
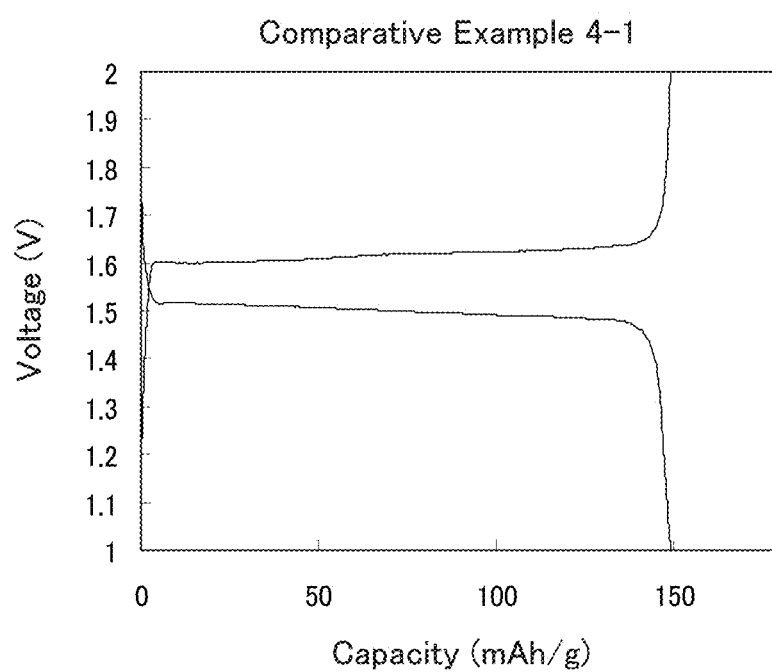
FIG. 62 shows charging/discharging curves of a nonaqueous electrolyte secondary battery of Comparative Example 4-1.

With respect to each of the nonaqueous electrolyte secondary batteries, charging was performed at 0.1C rate, and then discharging was performed to measure the capacities (charge capacity and discharge capacity) of the working electrode. Charging/discharging curves (second cycle) of the nonaqueous electrolyte secondary battery of Example 4-1 are shown in FIG. 61, and charging/discharging curves (second cycle) of the half-cell of Comparative Example 4-1 are shown in FIG. 62. Based on the charging/discharging curves shown in FIGS. 61 and 62 and assuming a positive electrode having an average voltage of 4 V was used as the counter electrode, energy density (mWh/g) during discharging and charging/discharging efficiency (%) of the nonaqueous electrolyte secondary batteries of Example 4-1 and Comparative Example 4-1 were calculated. The energy density is the density per 1 g of the negative electrode active material layer (i.e., solid content mass of LTO, binder, and the like). The charging/discharging efficiency was calculated based on (energy density during discharging/energy density during charging)×100(%).

Energy densities and charging/discharging efficiencies of the nonaqueous electrolyte secondary batteries of Example 4-1 and Comparative Example 4-1 are shown in Table 20. The charging/discharging efficiency may be rephrased as energy efficiency.

TABLE 20

|  | Example 4-1 | Comparative Example 4-1 |
| --- | --- | --- |
| Energy density (discharging) (mWh/g) | 364.5 | 354.3 |
| charging/discharging efficiency (%) | 97.8 | 95.2 |

Only the electrolytic solutions are different between the nonaqueous electrolyte secondary batteries of Comparative Example 4-1 and Example 4-1 using lithium titanium oxide (LTO) as the negative electrode active material. As shown in Table 20, large differences were observed in energy density and charging/discharging efficiency due to the difference in the electrolytic solution. Specifically, the nonaqueous electrolyte secondary battery of Example 4-1 using the electrolytic solution of the present invention had high energy density and excellent charging/discharging efficiency when compared to the nonaqueous electrolyte secondary battery of Comparative Example 4-1 using a general electrolytic solution. As shown in FIGS. 61 and 62, when current was passed at the same rate, the level of polarization in the nonaqueous electrolyte secondary battery of Example 4-1 was smaller than the level of polarization of the nonaqueous electrolyte secondary battery of Comparative Example 4-1. Thus, the nonaqueous electrolyte secondary battery of Example 4-1 is considered superior over the nonaqueous electrolyte secondary battery of Comparative Example 4-1 in terms of energy density and charging/discharging efficiency. In addition, polarization is speculated to be suppressed due to a decrease in reaction resistance caused by a cation of a supporting salt being abundantly contained in the electrolytic solution of the present invention used in the nonaqueous electrolyte secondary battery of Example 4-1 and the cation being supplied sufficiently to the negative electrode in the nonaqueous electrolyte secondary battery of Example 4-1.

The nonaqueous electrolyte secondary battery of Example 4-1 used lithium titanium oxide as the negative electrode active material. Thus, the nonaqueous electrolyte secondary battery of Example 4-1 was given the excellent cycle characteristics derived by lithium titanium oxide.

Figure 63:
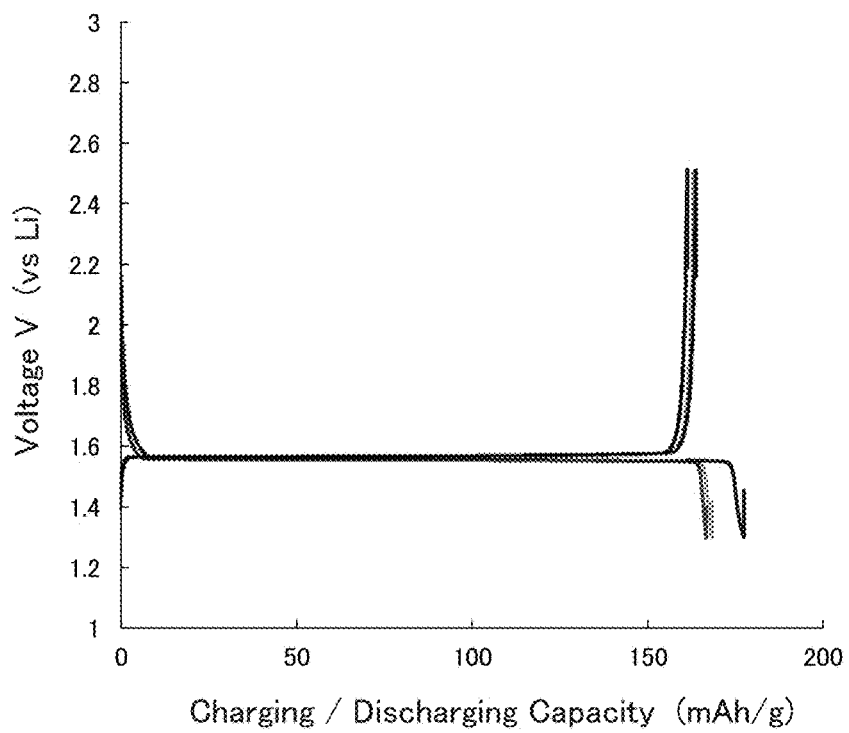
FIG. 63 shows charging/discharging curves of a nonaqueous electrolyte secondary battery of Example 4-2.
Figure 64:
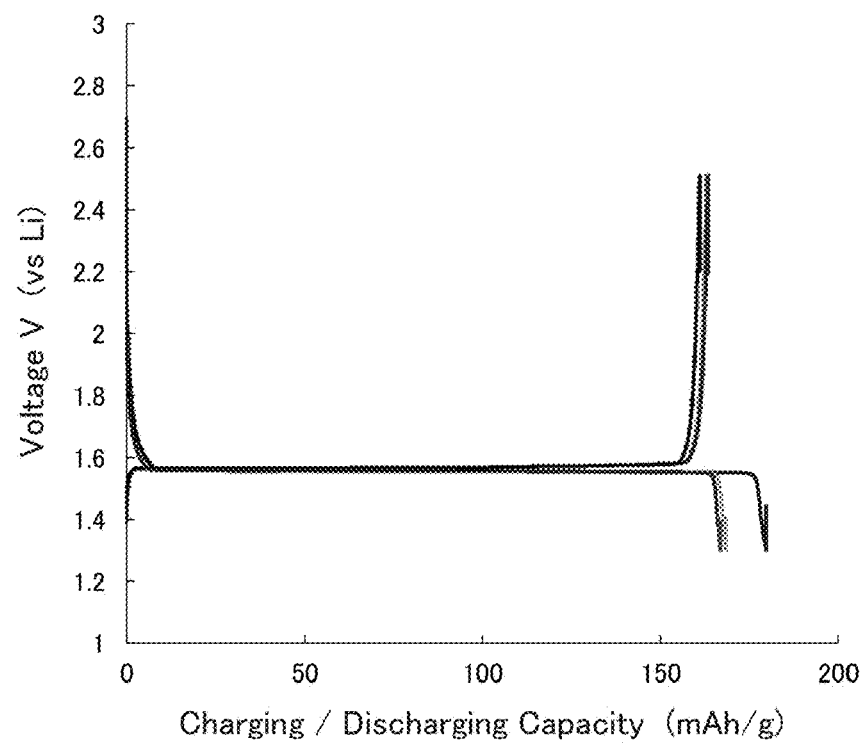
FIG. 64 shows charging/discharging curves of a nonaqueous electrolyte secondary battery of Example 4-3.

With respect to the nonaqueous electrolyte secondary batteries of Examples 4-2 and 4-3, CC charging and discharging were repeated for three cycles in a usage voltage range of 1.3 V to 2.5 V (Li reference) at a C-rate of 0.1C. Charging/discharging curves of the nonaqueous electrolyte secondary battery of Example 4-2 are shown in FIG. 63, and charging/discharging curves of the nonaqueous electrolyte secondary battery of Example 4-3 are shown in FIG. 64. As shown in FIGS. 63 and 64, reversible charging/discharging reaction was obtained also when the negative electrode using LTO as the negative electrode active material was combined with the electrolytic solution of the present invention using a linear carbonate, i.e., DMC. Thus, based on this result, the combination of the negative electrode active material and the electrolytic solution is understood as to be applicable to the nonaqueous electrolyte secondary battery of the present invention.

<Nonaqueous Electrolyte Secondary Battery (5)>

Example 5-1

A nonaqueous electrolyte secondary battery of Example 5-1 was produced using electrolytic solution E8.
<Negative Electrode>
98 parts by mass of product name SG-BH8 (mean particle diameter of 8 μm) manufactured by Ito Graphite Co., Ltd., and 1 part by mass of SBR and 1 part by mass of CMC which are binding agents were mixed. The mixture was dispersed in a proper amount of ion exchanged water to create a slurry. The aspect ratio of the used graphite particles was 2.1, and I(110)/I(004) measured through X-ray diffraction was 0.035.

The aspect ratio was calculated by, after producing a sample for observing a cross section of an electrode using a cross-section polisher manufactured by JEOL Ltd., measuring the lengths of the long axis and the short axis of a cross section of an active material using a scanning electron microscope (SEM). X-ray diffraction was measured using [SmartLab] manufactured by Rigaku Corporation and focusing method for the optical system, and I(110)/I(004) was calculated from a ratio of integrated intensities of I(110) and I(004).

This slurry was applied in a film form on the surface of an electrolytic copper foil (current collector) having a thickness of 20 μm using a doctor blade. The copper foil on which the slurry was applied was dried to remove water, and then the copper foil was pressed to obtain a joined object.

The obtained joined object was heated and dried in a vacuum dryer for 6 hours at 100° C. to obtain a copper foil having the negative electrode active material layer formed thereon. This was used as the negative electrode. The weight per area of the negative electrode active material layer in the negative electrode was about 8.5 mg/cm$^2$.

<Positive Electrode>

A positive electrode includes a positive electrode active material layer, and a current collector coated with the positive electrode active material layer. The positive electrode active material layer includes a positive electrode active material, a binding agent, and a conductive additive. The positive electrode active material is formed from NCM523. The binding agent is formed from PVdF. The conductive additive is formed from AB. The current collector is formed from an aluminum foil having a thickness of 20 μm. The contained mass ratio of the positive electrode active material, the binding agent, and the conductive additive is 94:3:3 when mass of the positive electrode active material layer is defined as 100 parts by mass.

In order to produce the positive electrode, NCM523, PVdF, and AB were mixed in the above described mass ratio, and NMP was added thereto as the solvent to obtain a positive electrode material in a paste form. The positive electrode material in the paste form was applied on the surface of the current collector using a doctor blade to form the positive electrode active material layer. The positive electrode active material layer was dried for 20 minutes at 80° C. to remove the NMP through volatilization. An aluminum foil having the positive electrode active material layer formed on the surface thereof was compressed using a roll press machine to firmly attach and join the aluminum foil and the positive electrode active material layer. The obtained joined object was heated in a vacuum dryer for 6 hours at 120° C. and cut in a predetermined shape to obtain the positive electrode.

<Nonaqueous Electrolyte Secondary Battery>

By using the positive electrode, the negative electrode, and electrolytic solution E8 described above, a laminated type lithium ion secondary battery, which is one type of the nonaqueous electrolyte secondary battery, was produced. In detail, a cellulose nonwoven fabric (thickness of 20 μm) was interposed between the positive electrode and the negative electrode as a separator to form an electrode assembly. The electrode assembly was covered with a set of two sheets of a laminate film. The laminate film was formed into a bag-like shape by having three sides thereof sealed, and the electrolytic solution was injected therein. Four sides were sealed airtight by sealing the remaining one side to obtain a laminated type lithium ion secondary battery in which the electrode assembly and the electrolytic solution were sealed. The positive electrode and the negative electrode each include a tab enabling electrical connection to the outside, and one part of the tab extends outside the laminated type lithium ion secondary battery. For convenience, hereinafter, this lithium ion secondary battery is referred to as a nonaqueous electrolyte secondary battery of Example 5-1.

Details of the nonaqueous electrolyte secondary battery of Example 5-1 and each battery described in the following are shown in Table 45 provided at the end of the Examples section.

Comparative Example 5-1

A negative electrode was produced similarly to Example 5-1 except for using, as the active material, a graphite (SNO grade (mean particle diameter of 10 μm), SEC CARBON, Ltd.) whose aspect ratio was 6.5. The weight per area of the negative electrode active material layer of the negative electrode was about the same as that of Example 5-1. Otherwise, a nonaqueous electrolyte secondary battery of Comparative Example 5-1 was obtained similarly to Example 5-1. I(110)/I(004) measured through X-ray diffraction was 0.027.

Comparative Example 5-2

A nonaqueous electrolyte secondary battery of Comparative Example 5-2 was obtained similarly to Example 5-1 except for using electrolytic solution C5 instead of electrolytic solution E8.

Evaluation Example 24: Input Characteristics

By using the nonaqueous electrolyte secondary batteries of Example 5-1 and Comparative Examples 5-1 and 5-2, input (charging) characteristic were evaluated using the following conditions.

(1) Usage voltage range: 3 V to 4.2 V (2) Capacity: 13.5 mAh (3) SOC: 80%

(4) Temperature: 0° C., 25° C.

(5) Number of measurements: Three times each

The used evaluation conditions were: state of charge (SOC) of 80%, 0° C. or 25° C., usage voltage range of 3 V to 4.2 V, and capacity of 13.5 mAh. SOC 80% at 0° C. is in a range in which input characteristics are unlikely to be exerted such as, for example, when used in a cold room. Evaluation of the input characteristics of Example 5-1 and Comparative Examples 5-1 and 5-2 were performed three times each for 2-second input and 5-second input. Evaluation results of the input characteristics are shown in Tables 21 and 22. In the tables, "2-second input" refers to an input inputted at 2 seconds after the start of charging, and "5-second input" refers to an input inputted at 5 seconds after the start of charging.

In Tables 21 and 22, the electrolytic solution of the present invention used in Example 5-1 and Comparative Example 5-1 is abbreviated as "FSA," and the electrolytic solution used in Comparative Example 5-2 is abbreviated as "ECPF."

TABLE 21

|  | Example 5-1 | Comparative Example 5-1 | Comparative Example 5-2 |
| --- | --- | --- | --- |
| Graphite | Spheroidal | Flake-like | Spheroidal |
| electrolytic solution | FSA | FSA | ECPF |
| 2-second input (mW) | 1271.2 | 958.3 | 716.9 |
|  | 1353.7 | 1255.0 | 685.5 |
|  | 1230.4 | 1127.5 | 794.2 |

TABLE 21-continued

|  | Example 5-1 | Comparative Example 5-1 | Comparative Example 5-2 |
|---|---|---|---|
| 5-second input (mW) | 992.7 | 737.1 | 591.9 |
|  | 1059.1 | 973.5 | 564.0 |
|  | 960.6 | 864.0 | 650.6 |

(25° C., SOC80%)

TABLE 22

|  | Example 5-1 | Comparative Example 5-1 | Comparative Example 5-2 |
|---|---|---|---|
| Graphite | Spheroidal | Flake-like | Spheroidal |
| Electrolytic solution | FSA | FSA | ECPF |
| 2-second input (mW) | 500.6 | 362.9 | 230.9 |
|  | 530.6 | 482.6 | 209.7 |
|  | 464.3 | 424.0 | 256.3 |
| 5-second input (mW) | 408.6 | 298.7 | 205.9 |
|  | 433.9 | 396.4 | 188.3 |
|  | 382.7 | 350.7 | 226.0 |

(0° C., SOC80%)

Input-output characteristics were improved in Example 5-1 when compared to Comparative Examples 5-1 and 5-2 at both 0° C. and 25° C. This is an effect of using the electrolytic solution of the present invention and a graphite having a certain aspect ratio, and, in particular, since high input-output characteristics were shown even at 0° C., movement of lithium ions in the electrolytic solution was shown to occur smoothly even at a low temperature.

Example 5-2

<Positive Electrode>

A positive electrode includes a positive electrode active material layer, and a current collector coated with the positive electrode active material layer. The positive electrode active material layer includes a positive electrode active material, a binding agent, and a conductive additive. The positive electrode active material is formed from NCM523. The binding agent is formed from PVdF. The conductive additive is formed from AB. The current collector is formed from an aluminum foil having a thickness of 20 μm. The contained mass ratio of the positive electrode active material, the binding agent, and the conductive additive is 94:3:3 when mass of the positive electrode active material layer is defined as 100 parts by mass.

In order to produce the positive electrode, NCM523, PVdF, and AB were mixed in the above described mass ratio, and NMP was added thereto as the solvent to obtain a positive electrode mixture in a paste form. The positive electrode mixture in the paste form was applied on the surface of the current collector using a doctor blade to form the positive electrode active material layer. The positive electrode active material layer was dried for 20 minutes at 80° C. to remove NMP through volatilization. An aluminum foil having the positive electrode active material layer formed on the surface thereof was compressed using a roll press machine to firmly attach and join the aluminum foil and the positive electrode active material layer. The obtained joined object was heated in a vacuum dryer for 6 hours at 120° C. and cut in a predetermined shape to obtain the positive electrode.

<Negative Electrode>

A negative electrode includes a negative electrode active material layer, and a current collector coated with the negative electrode active material layer. The negative electrode active material layer includes a negative electrode active material and a binding agent. In order to produce the negative electrode, as the negative electrode active material, 98 parts by mass of graphite and, as the binding agent, 1 part by mass of SBR and 1 part by mass of CMC were mixed. The mixture was dispersed in a proper amount of ion exchanged water to produce a negative electrode mixture in a slurry form. The negative electrode mixture in the slurry form was applied in a film form on a copper foil, which is the negative electrode current collector and has a thickness of 20 μm, using a doctor blade to form the negative electrode active material layer. A composite material of the negative electrode active material layer and the current collector was dried and then pressed. The obtained joined object was heated in a vacuum dryer for 6 hours at 100° C., and cut in a predetermined shape to obtain the negative electrode.

The aspect ratio of the used graphite particle was 2.1.

<Nonaqueous Electrolyte Secondary Battery>

By using the positive electrode and the negative electrode described above, a nonaqueous electrolyte secondary battery of Example 5-2 was obtained similarly to Example 5-1 except for using electrolytic solution E11 described above as the electrolytic solution.

Comparative Example 5-3

A nonaqueous electrolyte secondary battery of Comparative Example 5-3 was obtained similarly to Example 5-2 except for using electrolytic solution C5 instead of electrolytic solution E11.

Evaluation Example 25: Cycle Durability

Figure 65:
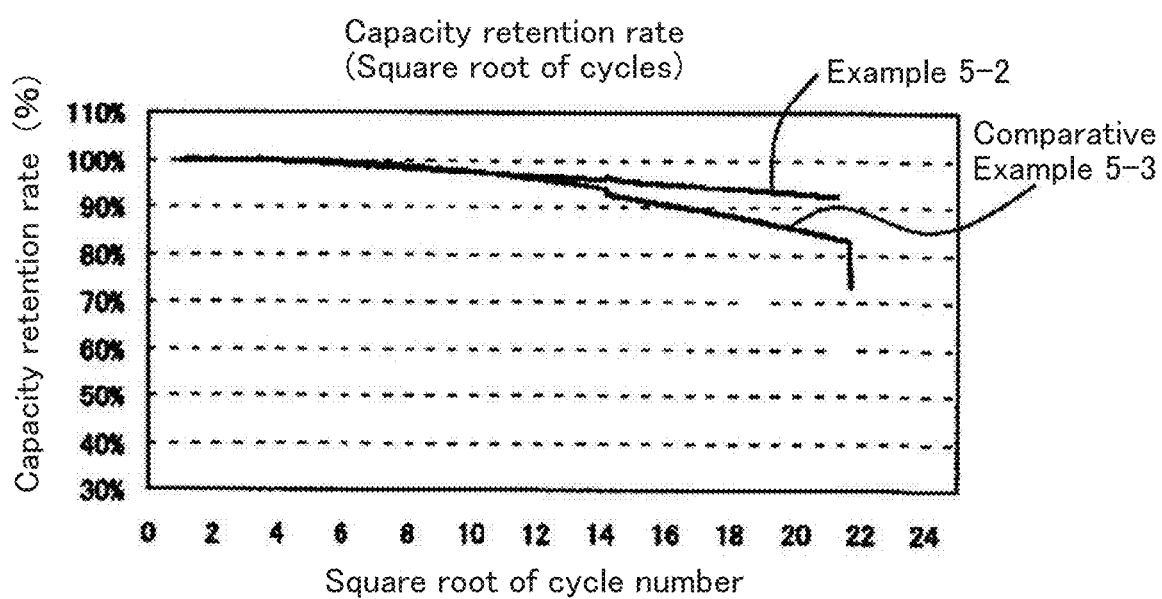
FIG. 65 is a graph showing the relationship between the square root of cycle number and discharge capacity retention rate when a cycle test was performed.

By using the nonaqueous electrolyte secondary batteries of Example 5-2 and Comparative Example 5-3, a cycle involving charging to 4.1 V under a condition of CC charging of 1C at a temperature 25° C., pausing for 1 minute, discharging to 3.0 V with CC discharging of 1C, and pausing for 1 minute, was repeated for 500 cycles as a cycle test. A discharge capacity retention rate at the 500-th cycle is shown in Table 23. The discharge capacity retention rate is a percentage value of a value obtained by dividing a discharge capacity at the 500-th cycle by the first discharge capacity ((Discharge capacity at 500-th cycle)/(First discharge capacity)×100). The change in the discharge capacity retention rate during the cycle test is shown in FIG. 65.

At the beginning and the 200-th cycle, after adjusting the voltage to 3.5 V at a temperature of 25° C. with a CCCV of 0.5C, a direct current resistance (discharging) was measured based on Ohm's law from a current value and an amount of change in voltage (a difference between pre-discharge voltage and voltage obtained 10 seconds after discharging) when CC discharging was performed at 3C of 10 seconds.

Furthermore at the beginning and the 200-th cycle, after adjusting the voltage to 3.5 V at a temperature of 25° C. with a CCCV of 0.5C, a direct current resistance (charging) was measured based on Ohm's law from a current value and an amount of change in voltage (a difference between pre-charge voltage and voltage obtained 10 seconds after charging) when CC-charging was performed at 3C for 10 seconds. Respective results are shown in Table 23.

TABLE 23

|  | Electrolytic solution | Capacity retention rate (%) | Direct current resistance (Ω) | | | |
|---|---|---|---|---|---|---|
|  |  |  | Discharging | | Charging | |
|  |  |  | Beginning | 200 cyc | Beginning | 200 cyc |
| Example 5-2 | LiFSA/DMC | 92 | 5.0 | 3.4 | 3.9 | 3.3 |
| Comparative Example 5-3 | LiPF$_6$/EC + DEC | 82 | 6.7 | 6.0 | 4.3 | 5.5 |

The nonaqueous electrolyte secondary battery of Example 5-2 is understood as to have small resistance even after the cycles. In addition, the nonaqueous electrolyte secondary battery of Example 5-2 is understood as to have a high capacity retention rate and is unlikely to degrade.

(Other Modes I)

In the following, other possible modes of the nonaqueous electrolyte secondary battery of the present invention are described in detail using experimental examples and reference experimental examples. In the following, a nonaqueous electrolyte secondary battery of an experimental example is represented as "EB," and a nonaqueous electrolyte secondary battery of a reference experimental example is represented as "CB." The difference between an EB and a CB is the electrolytic solution, and an EB uses the electrolytic solution of the present invention.

As described above, a coating (S,O-containing coating) is formed on a negative electrode of a nonaqueous electrolyte secondary battery using the electrolytic solution of the present invention. As reference, the analysis results of the S,O-containing coating is provided in the following. Those previously stated are also included in the following nonaqueous electrolyte secondary batteries.

(EB1)

A nonaqueous electrolyte secondary battery EB1 was produced in the following manner using electrolytic solution E8. A positive electrode was produced similarly to the positive electrode of the nonaqueous electrolyte secondary battery of Example 5-1, and a negative electrode was produced similarly to the negative electrode of the nonaqueous electrolyte secondary battery of Example 5-2. Otherwise, the nonaqueous electrolyte secondary battery EB1 was obtained similarly to that of Example 5-1 except form using a filter paper for experiments (Toyo Roshi Kaisha, Ltd., made from cellulose, thickness of 260 μm) as a separator.

(EB2)

A nonaqueous electrolyte secondary battery EB2 was similar to EB1 except for using electrolytic solution E4.

(EB3)

A nonaqueous electrolyte secondary battery EB3 was similar to EB1 except for using electrolytic solution E11.

(EB4)

A nonaqueous electrolyte secondary battery EB4 was similar to EB1 except for using electrolytic solution E11, the mixing ratio of the positive electrode active material, the conductive additive, and the binding agent, and the separator. NCM523:AB:PVdF=90:8:2 was used for the positive electrode. The active material layer of the positive electrode had a weight per area of 5.5 mg/cm$^2$ and a density of 2.5 g/cm$^3$. The same applies for the following EB5 to EB7, CB2, and CB3.

Natural graphite:SBR:CMC=98:1:1 was used for the negative electrode. The active material layer of the negative electrode had a weight per area of 3.8 mg/cm$^2$ and a density of 1.1 g/cm$^3$. The same applies for the following EB5 to EB7, CB2 and CB3. As the separator, a cellulose nonwoven fabric having a thickness of 20 μm was used.

(EB5)

A nonaqueous electrolyte secondary battery EB5 was similar to EB4 except for using electrolytic solution E8.

(EB6)

A nonaqueous electrolyte secondary battery EB6 was similar to EB4 regarding the type of the binding material for the negative electrode, and the mixing ratio of the negative electrode active material and the binding agent. Natural graphite:polyacrylic acid (PAA)=90:10 was used for the negative electrode.

(EB7)

A nonaqueous electrolyte secondary battery EB7 was similar to EB6 except for using electrolytic solution E8.

(CB1)

A nonaqueous electrolyte secondary battery CB1 was similar to EB1 except for using electrolytic solution C5.

(CB2)

A nonaqueous electrolyte secondary battery CB2 was similar to EB4 except for using electrolytic solution C5.

(CB3)

A nonaqueous electrolyte secondary battery CB3 was similar to EB6 except for using electrolytic solution C5.

Evaluation Example 26: Analysis of S,O-Containing Coating

Hereinafter, if necessary, coatings formed on the surfaces of the negative electrodes in EB1 to EB7 are abbreviated as negative-electrode S,O-containing coatings of EB1 to EB7, and coatings formed on the surfaces of the negative electrodes in CB1 to CB3 are abbreviated as negative-electrode coatings of CM to CB3. Similarly, coatings formed on the surfaces of the positive electrodes in EB1 to EB7 are abbreviated as positive-electrode S,O-containing coatings of EB1 to EB7, and coatings formed on the surfaces of the positive electrodes in CB1 to CB3 are abbreviated as positive-electrode coatings of CB1 to CB3.

(Analysis of Negative-Electrode S,O-Containing Coating and Negative-Electrode Coating)

Figure 66:
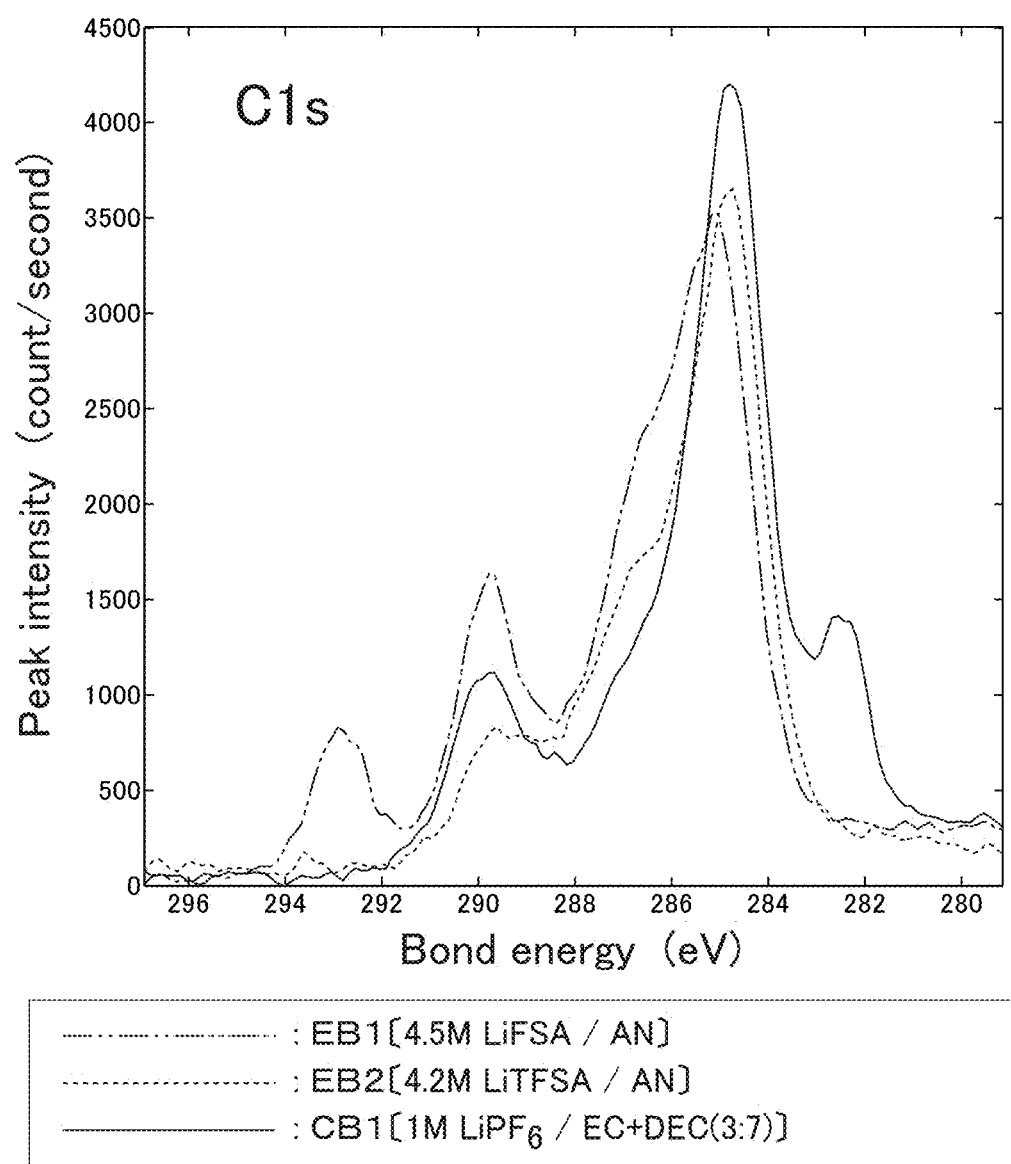
FIG. 66 shows the results of XPS analysis of carbon element in negative-electrode S,O-containing coatings of EB1, EB2, and CB1 in Evaluation Example 26.
Figure 67:
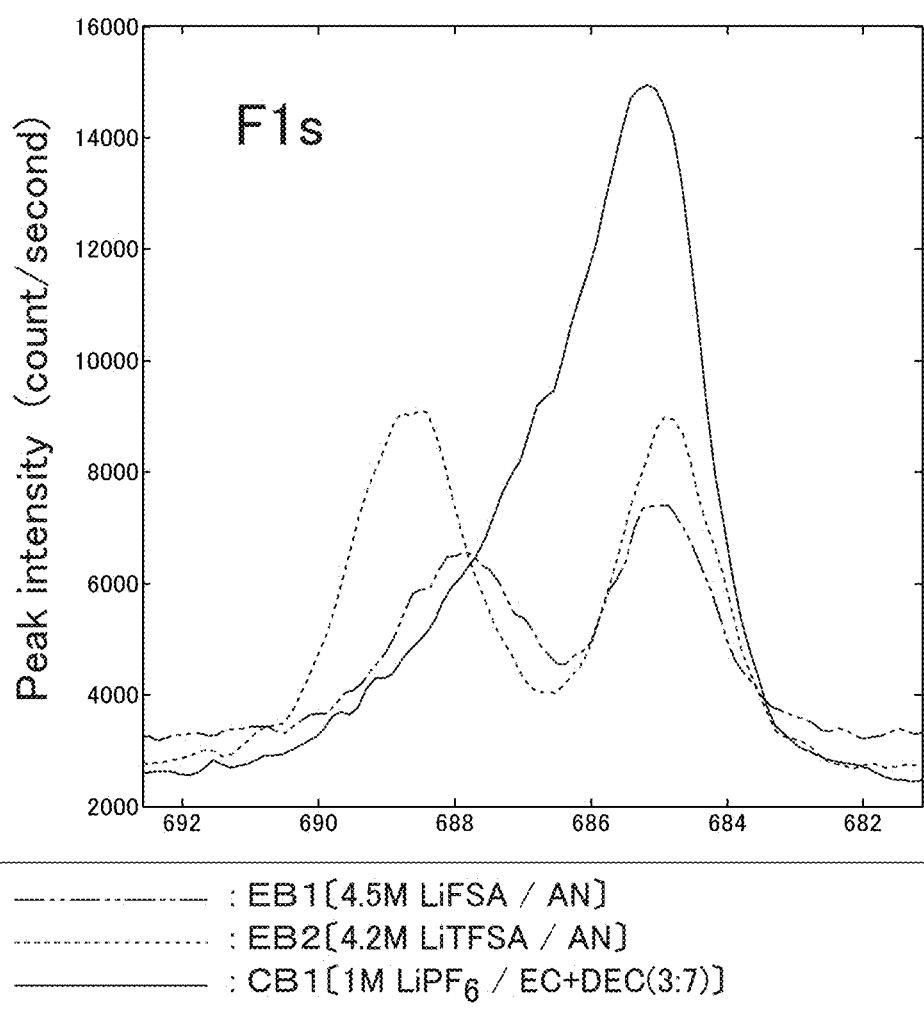
FIG. 67 shows the results of XPS analysis of fluorine element in the negative-electrode S,O-containing coatings of EB1, EB2, and CB1 in Evaluation Example 26.
Figure 68:
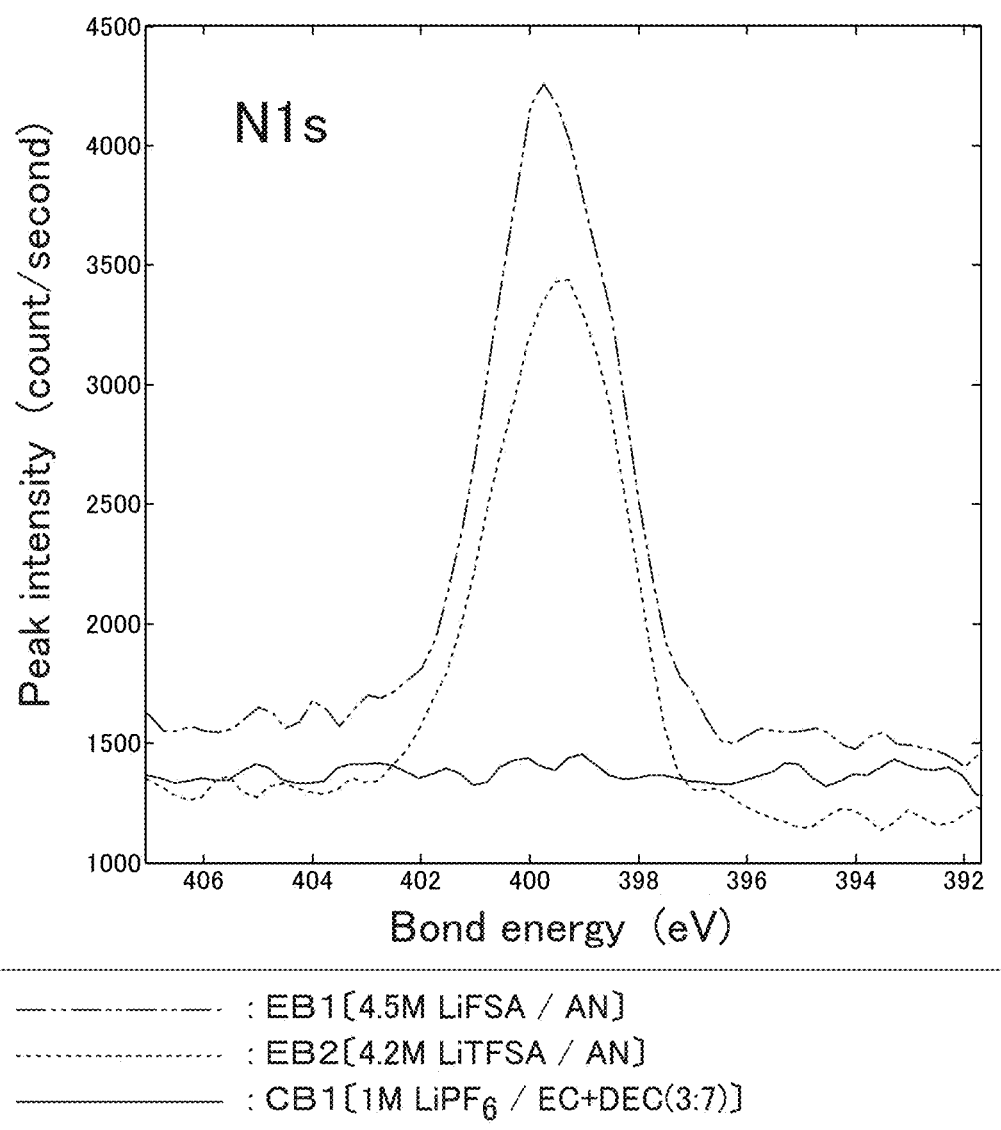
FIG. 68 shows the results of XPS analysis of nitrogen element in negative-electrode S,O-containing coatings of EB1, EB2, and CB1 in Evaluation Example 26.
Figure 69:
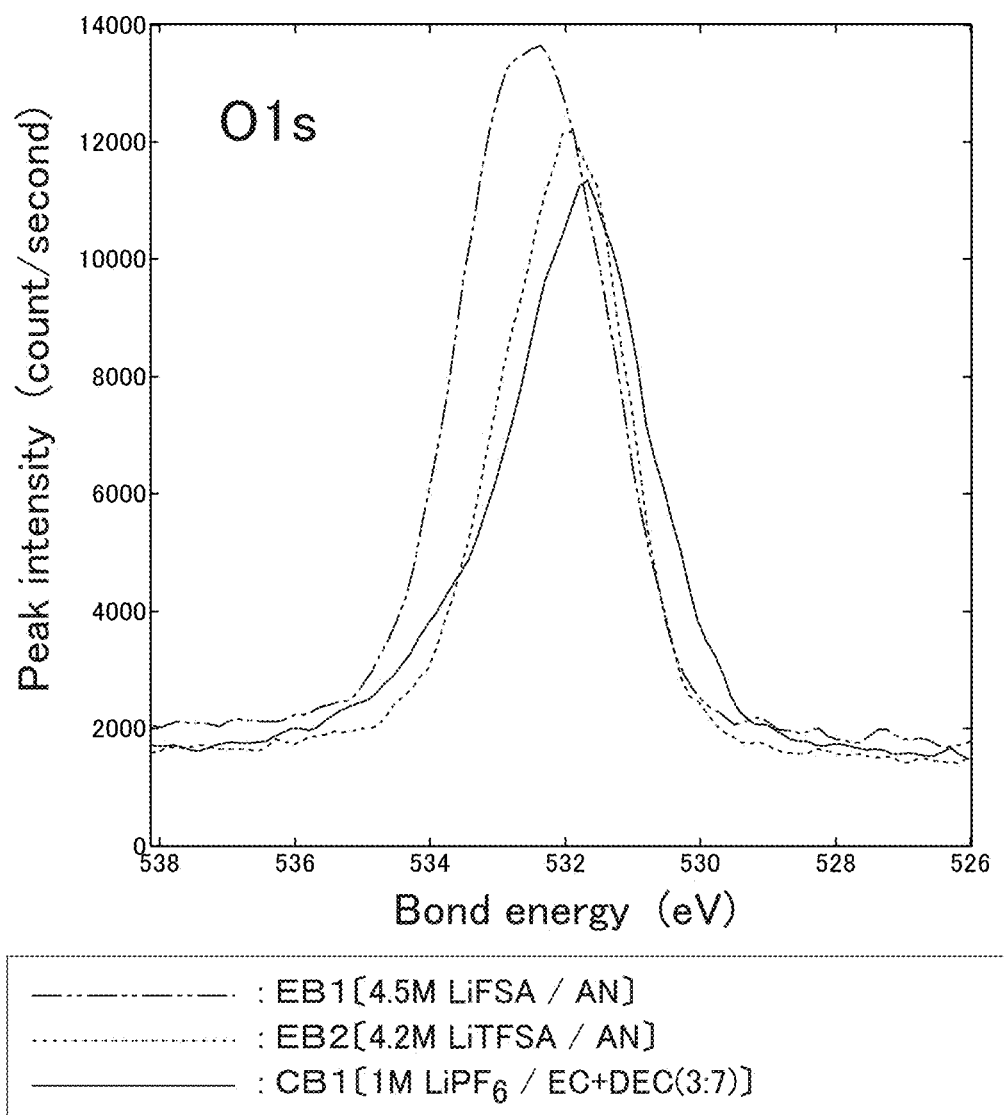
FIG. 69 shows the results of XPS analysis of oxygen element in negative-electrode S,O-containing coatings of EB1, EB2, and CB1 in Evaluation Example 26.
Figure 70:
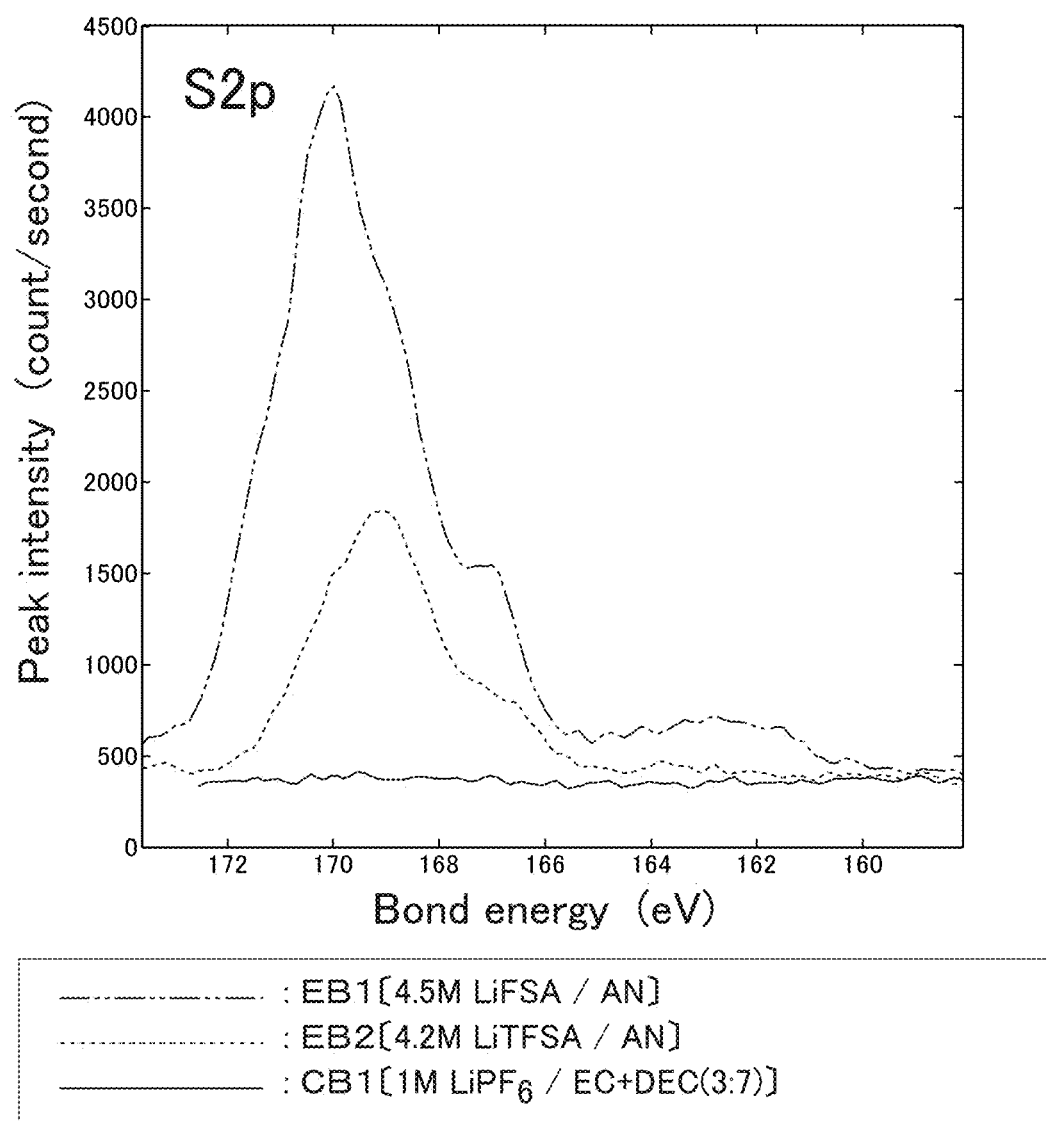
FIG. 70 shows the results of XPS analysis of sulfur element in the negative-electrode S,O-containing coatings of EB1, EB2, and CB1 in Evaluation Example 26.

With respect to EB1, EB2, and CB1, charging and discharging were repeated for 100 cycles, and analysis of the surfaces of the S,O-containing coatings or the coating was performed using X-ray photoelectron spectroscopy (XPS) at a discharged state with a voltage of 3.0 V. As a pre-treatment, the following treatment was performed. First, each of the nonaqueous electrolyte secondary batteries was disassembled to extract a negative electrode, and the negative electrode was rinsed and dried to obtain the negative electrode that is a subject for analysis. The rinsing was performed for three times using DMC (dimethyl carbonate). In addition, all the steps from disassembling the cell to transporting the negative electrode as the subject for analysis into an analysis device were performed under an Ar gas atmosphere without exposing the negative electrode to air. The following pre-treatment was performed on each of EB1, EB2, and CM, and XPS analysis was performed on an obtained negative electrode sample. As the device, PHI 5000 VersaProbe II of ULVAC-PHI, Inc., was used. The X-ray source was monochromatic Al K-α radiation (15 kV, 10 mA). The analysis result of the negative-electrode S,O-containing coatings of EB1 and EB2 and the negative-electrode coating of CM measured through XPS are shown in FIGS. 66 to 70. Specifically, FIG. 66 shows the results of analysis regarding carbon element, FIG. 67 shows the results of analysis regarding fluorine element, FIG. 68 shows the results of analysis regarding nitrogen element, FIG. 69 shows the results of analysis regarding oxygen element, and FIG. 70 shows the results of analysis regarding sulfur element.

The electrolytic solution in EB1 and the electrolytic solution in EB2 include sulfur element (S), oxygen element, and nitrogen element (N) in the salts. On the other hand, the electrolytic solution in CM does not include these in the salt. Furthermore, the electrolytic solutions in EB1, EB2 and CM all include fluorine element (F), carbon element (C), and oxygen element (O) in the salts.

As shown in FIGS. 66 to 70, as a result of the analysis on the negative-electrode S,O-containing coating of EB1 and the negative-electrode S,O-containing coating of EB2, a peak indicating the existence of S (FIG. 70) and a peak indicating the existence of N (FIG. 68) were observed. Thus, the negative-electrode S,O-containing coating of EB1 and the negative-electrode S,O-containing coating of EB2 included S and N. However, these peaks were not identified in the analysis results of the negative-electrode coating of CB1. Thus, the negative-electrode coating of CM did not include any of S and N at an amount equal to or more than a detection limit. The peaks indicating the existence of F, C, and O were observed in all the analysis results of the negative-electrode S,O-containing coatings of EB1 and EB2 and the negative-electrode coating of CB1. Thus, the negative-electrode S,O-containing coatings of EB1 and EB2 and the negative-electrode coating of CM all included F, C, and O.

These elements are all components derived from the electrolytic solution. In particular, S, O, and F are components included in the metal salt of the electrolytic solution, more specifically, components included in the chemical structure of the anion of the metal salt. Based on these results, the negative-electrode S,O-containing coatings and the negative-electrode coatings are understood as to include components derived from the chemical structure of the anion of the metal salt (i.e., supporting salt).

Detailed analysis was further performed on the analysis result regarding sulfur element (S) shown in FIG. 70. With respect to the analysis result of EB1 and EB2, peak resolution was performed using mixed Gaussian/Lorentzian function. The analysis results of EB1 and EB2 are respectively shown in FIGS. 71 and 72.

Figure 71:
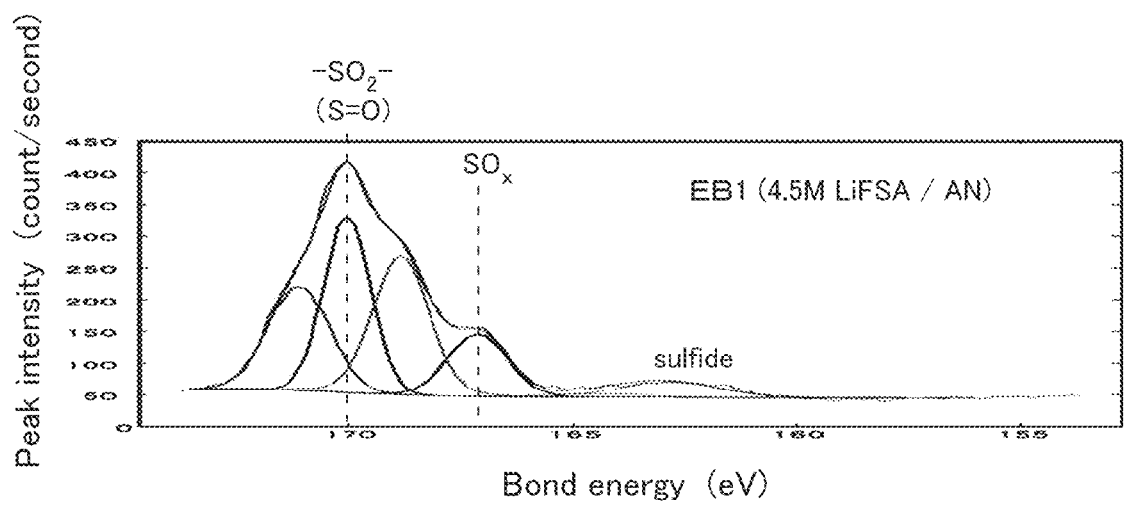
FIG. 71 shows the result of XPS analysis on the negative-electrode S,O-containing coating of EB1 in Evaluation Example 26.
Figure 72:
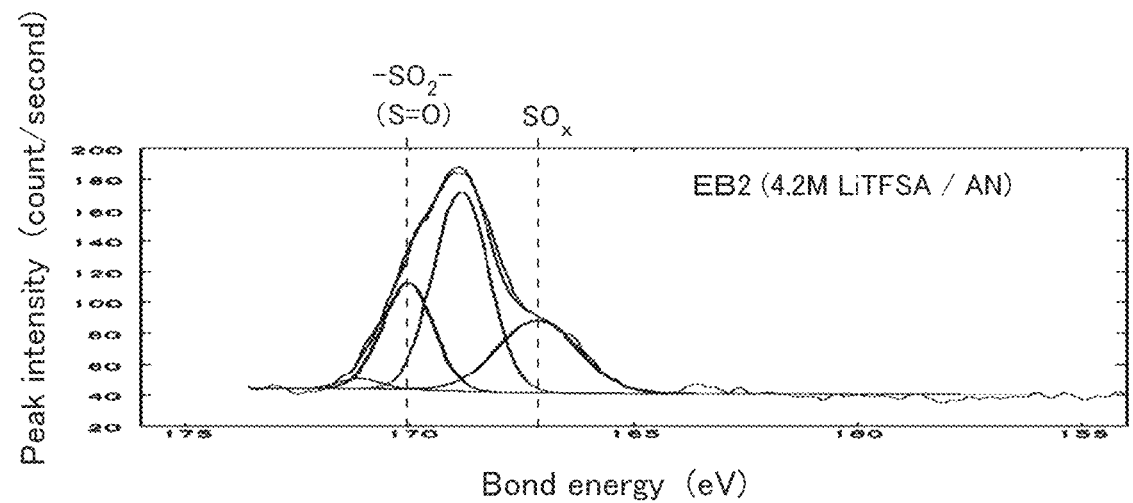
FIG. 72 shows the result of XPS analysis on the negative-electrode S,O-containing coating of EB2 in Evaluation Example 26.

As shown in FIGS. 71 and 72, as a result of analyzing the negative-electrode S,O-containing coatings of EB1 and EB2, a relatively large peak (waveform) was observed at around 165 to 175 eV. Then, as shown in FIGS. 71 and 72, this peak (waveform) at around 170 eV was separated into four peaks. Among these, one is a peak around 170 eV indicating the existence of $SO_2$ (S=O structure). Based on this result, the S,O-containing coating formed on the surface of the negative electrode in the nonaqueous electrolyte secondary battery of the present invention was considered to have an S=O structure. When this result and the XPS analysis results described above were considered, S included in the S=O structure of the S,O-containing coating is speculated to be S included in the chemical structure of the anion of the metal salt, i.e., supporting salt.

(S Element Ratio in Negative-Electrode S,O-Containing Coating)

Based on the XPS analysis results of the negative-electrode S,O-containing coatings described above, the ratio of S element at the discharged state in the negative-electrode S,O-containing coatings of EB1 and EB2 and the negative-electrode coating of CB1 were calculated. Specifically, with respect to each of the negative-electrode S,O-containing coatings and the negative-electrode coating, the element ratio of S was calculated when the total of peak intensities of S, N, F, C, and O were defined as 100%. The results are shown in Table 24.

TABLE 24

|  | EB1 | EB2 | CB1 |
|---|---|---|---|
| S element ratio (at. %) | 10.4 | 3.7 | 0.0 |

As described above, although the negative-electrode coating of CM did not include S at an amount equal to or more than the detection limit, S was detected in the negative-electrode S,O-containing coating of EB1 and the negative-electrode S,O-containing coating of EB2. In addition, the negative-electrode S,O-containing coating of EB1 included more S than the negative-electrode S,O-containing coating of EB2. Since S was not detected in the negative-electrode S,O-containing coating of CM, S included in the negative-electrode S,O-containing coating of each of the experimental examples is considered to be derived not from unavoidable impurities and other additives included in the positive electrode active material but from the metal salt in the electrolytic solution.

Since the S element ratio in the negative-electrode S,O-containing coating of EB1 was 10.4 at. % and the S element ratio in the negative-electrode S,O-containing coating of EB2 was 3.7 at. %; in the nonaqueous electrolyte secondary battery of the present invention, the S element ratio in the negative-electrode S,O-containing coating is not lower than 2.0 at. %, preferably not lower than 2.5 at. %, more preferably not lower than 3.0 at. %, and further preferably not lower than 3.5 at. %. The element ratio (at. %) of S refers to a peak intensity ratio of S when the total of peak intensities of S, N, F, C, and O was defined as 100%. Although the upper limit value of the element ratio of S is not determined in particular, a ratio not higher than 25 at. % is preferable.

(Thickness of Negative-Electrode S,O-Containing Coating)

With respect to EB1, one that was set in a discharged state with a voltage of 3.0 V after charging and discharging were repeated for 100 cycles, and one that was set in a charged state with a voltage of 4.1 V after charging and discharging were repeated for 100 cycles were prepared, and negative electrode samples that were subjects for analysis were obtained with a method similar to the pre-treatment in the XPS analysis described above. By performing FIB (Focused Ion Beam) processing on the obtained negative electrode samples; samples, each having a thickness of about 100 nm, for STEM analysis were obtained. As a pre-treatment for the FIB processing, Pt was vapor-deposited on the negative electrode. The steps above were performed without exposing the negative electrode to air.

Figure 73:
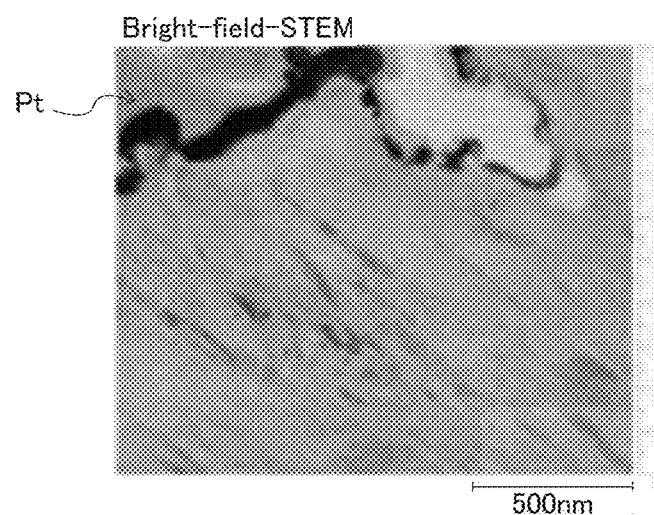
FIG. 73 is a BF-STEM image of the negative-electrode S,O-containing coating of EB1 in Evaluation Example 26.
Figure 74:
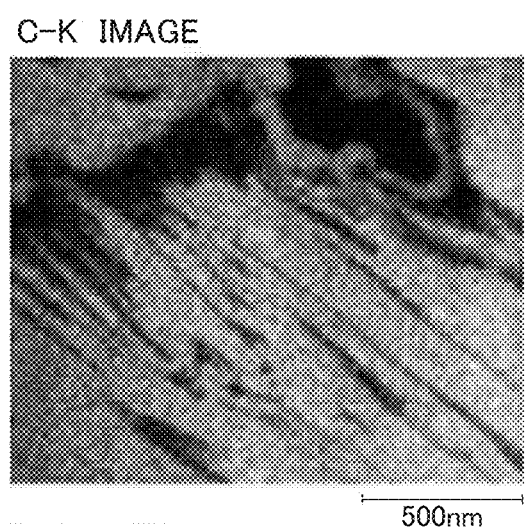
FIG. 74 shows the result of STEM analysis of C in the negative-electrode S,O-containing coating of EB1 in Evaluation Example 26.
Figure 75:
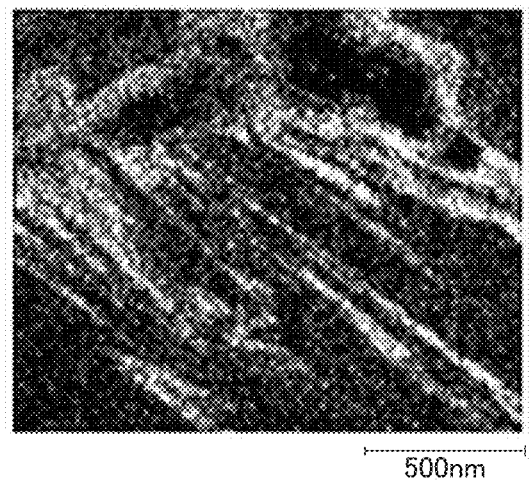
FIG. 75 shows the result of STEM analysis of O in the negative-electrode S,O-containing coating of EB1 in Evaluation Example 26.
Figure 76:
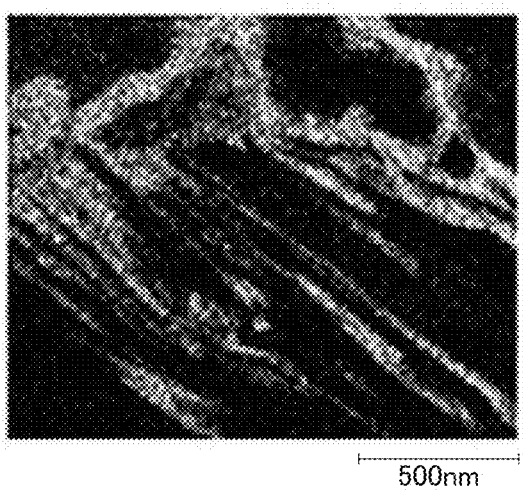
FIG. 76 shows the result of STEM analysis of S in the negative-electrode S,O-containing coating of EB1 in Evaluation Example 26.

Each of the samples for STEM analysis was analyzed using a STEM (Scanning Transmission Electron Microscope) to which an EDX (Energy Dispersive X-ray spectroscopy) device was attached. The results are shown in FIGS. 73 to 76. Of these, FIG. 73 is a BF (Bright-field)-STEM image, and FIGS. 74 to 76 are element distribution images obtained using the STEM-EDX in the observation area identical to that in FIG. 73. FIG. 74 shows the results of analysis regarding C, FIG. 75 shows the results of analysis regarding O, and FIG. 76 shows the results of analysis regarding S. FIGS. 74 to 76 are analysis results of the negative electrode in the nonaqueous electrolyte secondary battery in the discharged state.

As show in FIG. 73, a black portion exists in the upper left part of the STEM image. The black portion is derived from Pt vapor-deposited in the pre-treatment of the FIB processing. In each of the STEM images, a portion above the portion derived from Pt (referred to as Pt part) is regarded as a portion that was tainted after vapor deposition of Pt. Thus, in FIGS. 74 to 76, only the portion below the Pt part was studied.

As shown in FIG. 74, C formed a layer below the Pt part. This is considered as a layer structure of graphite which is the negative electrode active material. In FIG. 75, O was found at portions corresponding to the outer circumference and interlayer of graphite. Also in FIG. 76, S was found at portions corresponding to the outer circumference and interlayer of graphite. Based on these results, the negative-electrode S,O-containing coating including S and O such as an S=O structure is speculated to be formed on the surface and interlayer of graphite.

Ten parts of the negative-electrode S,O-containing coating formed on the surface of graphite were randomly selected, and thicknesses of the negative-electrode S,O-containing coating were measured to calculate an average value of the measured values. The negative electrode in the nonaqueous electrolyte secondary battery in a charged state was also analyzed similarly, and, based on the analysis results, an average value of the thickness of the negative-electrode S,O-containing coating formed on the surface of graphite was calculated. The results are shown in Table 25.

TABLE 25

|  | Negative-electrode S,O-containing coating of EB1 | |
|---|---|---|
|  | Discharged state (3.0 V) | Charged state (4.1 V) |
| Thickness of negative-electrode S,O-containing coating (nm) | 40 | 48 |

As shown in Table 25, the thickness of the negative-electrode S,O-containing coating increased after charging. Based on this result, in the negative-electrode S,O-containing coating, a fixed portion that exists stably against charging and discharging and an adsorption portion that increases or decreases associated with charging and discharging are speculated to exist. The negative-electrode S,O-containing coating is speculated to increase or decrease in thickness upon charging and discharging because the adsorption portion exists.

(Analysis of Positive-Electrode Coating)

Figure 77:
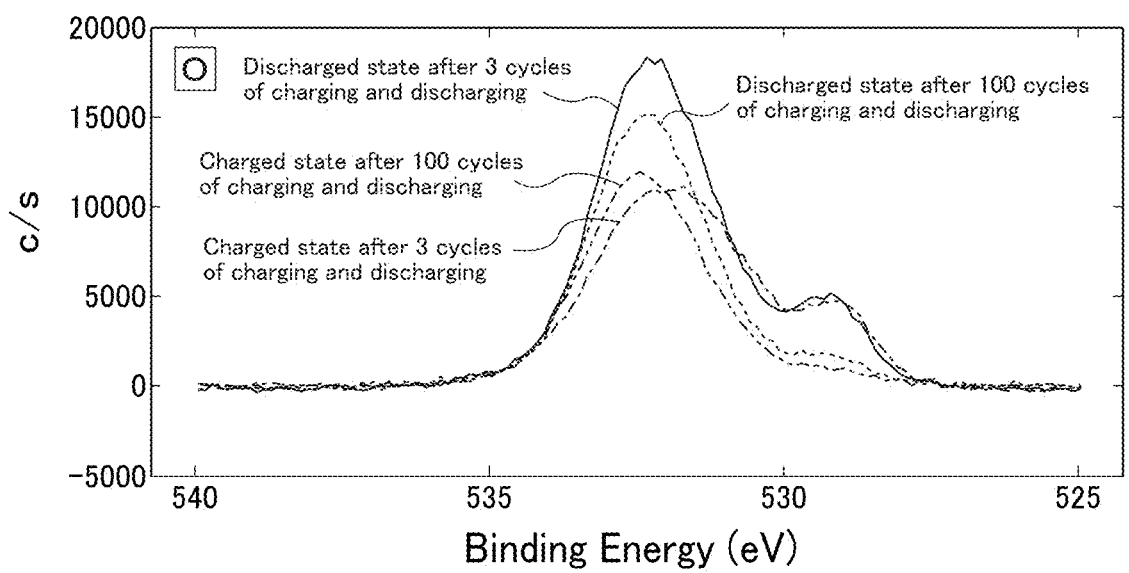
FIG. 77 shows the result of XPS analysis of O in a positive-electrode S,O-containing coating of EB1 in Evaluation Example 26.
Figure 78:
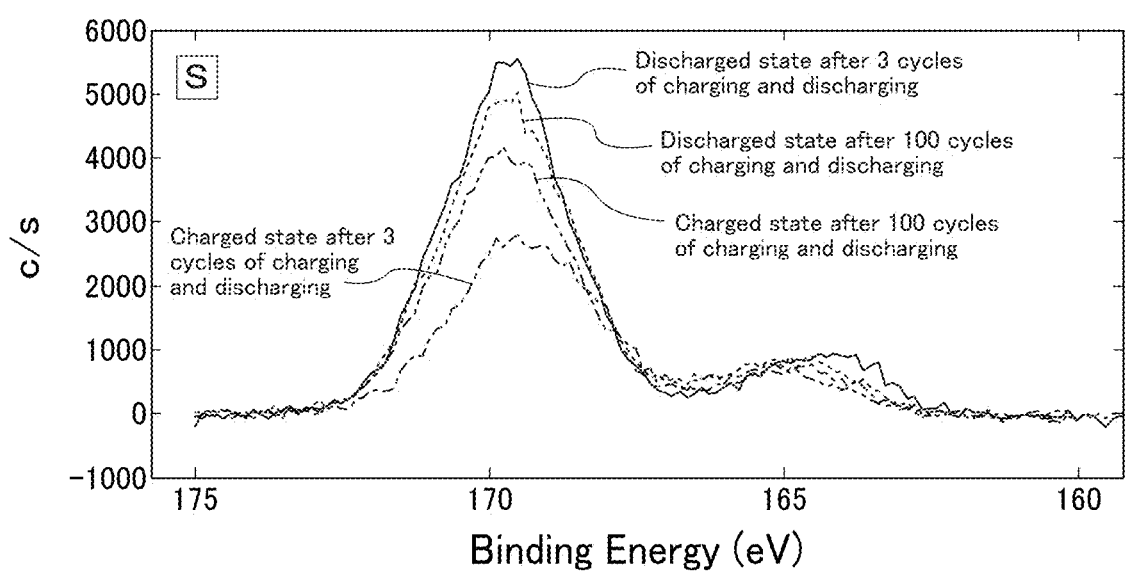
FIG. 78 shows the result of XPS analysis of S in the positive-electrode S,O-containing coating of EB1 in Evaluation Example 26.

With respect to EB1, the following four were prepared: one that was set in a discharged state with a voltage of 3.0 V after charging and discharging were repeated for 3 cycles; one that was set in a charged state with a voltage of 4.1 V after charging and discharging were repeated for 3 cycles; one that was set in a discharged state with a voltage of 3.0 V after charging and discharging were repeated for 100 cycles; and one that was set in a charged state with a voltage of 4.1 V after charging and discharging were repeated for 100 cycles. With respect to each of the four EB1s, a positive electrode that was the subject for analysis was obtained using a method similar to that described above. Then, XPS analysis was performed on the obtained positive electrodes. The results are shown in FIGS. 77 and 78. FIG. 77 shows the results of analysis regarding oxygen element, and FIG. 78 shows the results of analysis regarding sulfur element.

As shown in FIGS. 77 and 78, the positive-electrode S,O-containing coating of EB1 is also understood as to include S and O. In addition, since a peak around 170 eV was observed in FIG. 78, the positive-electrode S,O-containing coating of EB1 is understood as to include an S=O structure derived from the electrolytic solution of the present invention, similarly to the negative-electrode S,O-containing coating of EB1.

As shown in FIG. 77, the height of a peak existing around 529 eV was decreased after the cycles. This peak is thought to show existence of O derived from the positive electrode active material, and, more specifically, is thought to be a result of a photoelectron, excited by an O atom in the positive electrode active material, passing the S,O-containing coating and being detected in the XPS analysis. Since the peak was decreased after the cycles, the thickness of the S,O-containing coating formed on the surface of the positive electrode is thought to have increased associated with the cycles.

As shown in FIGS. 77 and 78, O and S in the positive-electrode S,O-containing coating increased at the discharged state and decreased at the charged state. Based on this result, O and S are thought to move in and out of the positive-electrode S,O-containing coating in association with charging and discharging. Based on this, associated with charging and discharging, the concentration of S and O in the positive-electrode S,O-containing coating is speculated to increase and decrease, or, similarly to the negative-electrode S,O-containing coating, the thickness is speculated to increase and decrease also in the positive-electrode S,O-containing coating due to existence of the adsorption portion.

In addition, XPS analysis was also performed on the positive-electrode S,O-containing coating and the negative-electrode S,O-containing coating in EB4.

Figure 79:
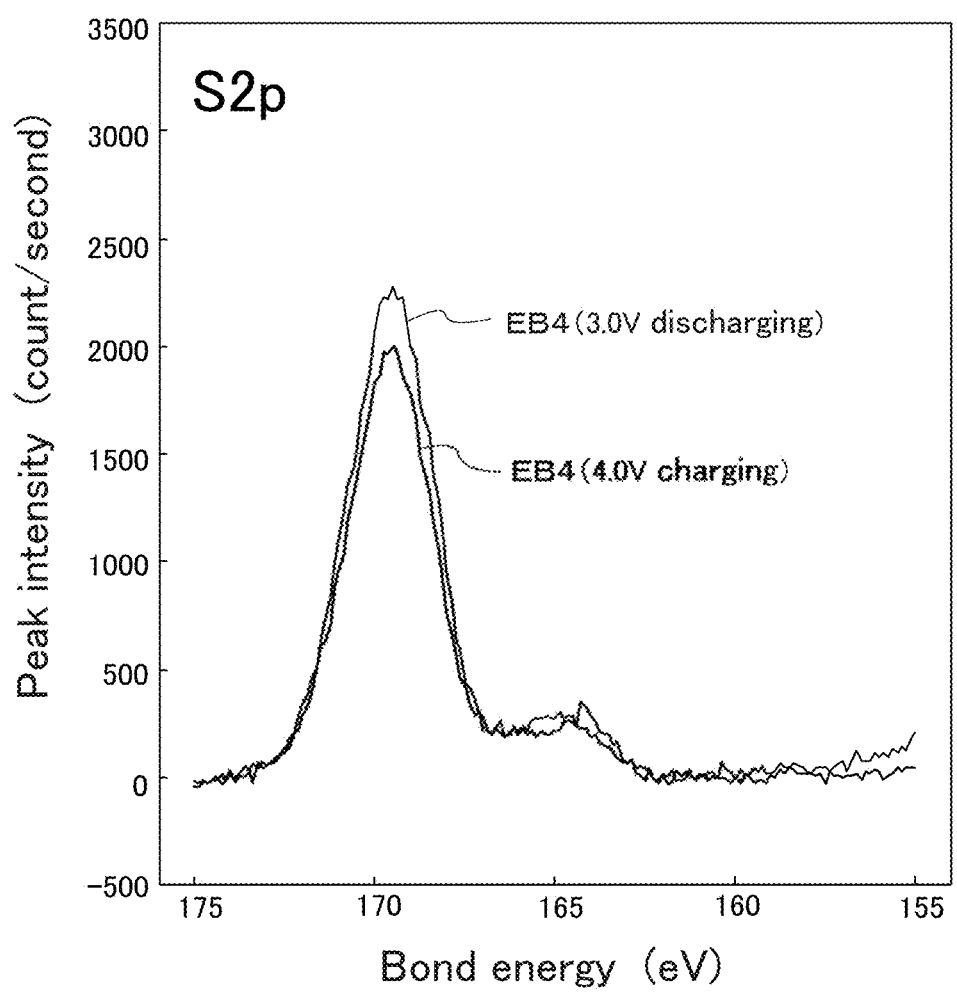
FIG. 79 shows the result of XPS analysis of S in a positive-electrode S,O-containing coating of EB4 in Evaluation Example 26.
Figure 80:
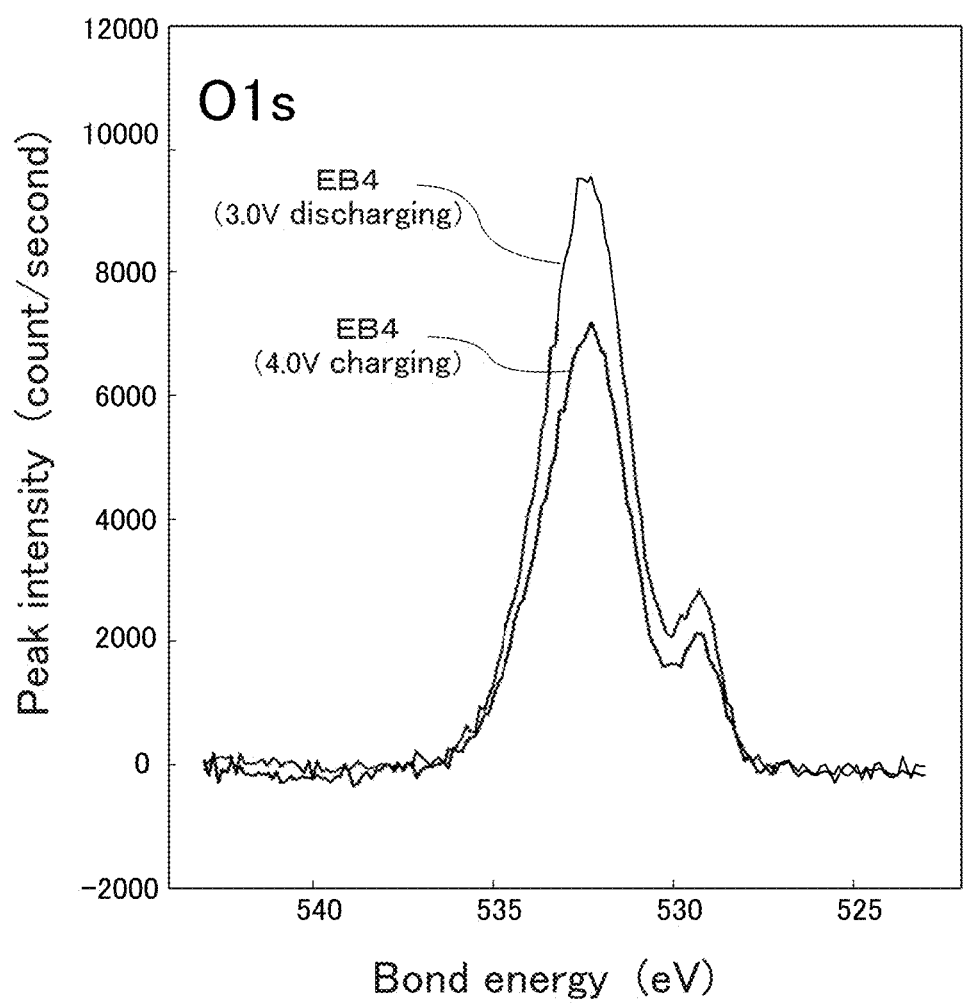
FIG. 80 shows the result of XPS analysis of O in the positive-electrode S,O-containing coating of EB4 in Evaluation Example 26.

By using EB4, CC charging and discharging were repeated for 500 cycles at a rate of 1C at 25° C. in a usage voltage range of 3.0 V to 4.1 V. After 500 cycles, XPS spectra of the positive-electrode S,O-containing coating at a discharged state of 3.0 V and a charged state of 4.0 V were measured. In addition, with respect to the negative-electrode S,O-containing coating in the discharged state of 3.0 V before the cycle test (i.e., after the first charging and discharging) and the negative-electrode S,O-containing coating in the discharged state of 3.0 V after 500 cycles; elemental analysis using XPS was performed and the ratios of S element contained in the negative-electrode S,O-containing coatings were calculated. FIGS. 79 and 80 show the analysis results of the positive-electrode S,O-containing coating of EB4 measured through XPS. Specifically, FIG. 79 shows the results of analysis regarding sulfur element, and FIG. 80 shows the results of analysis regarding oxygen element. In addition, Table 26 shows the S element ratio (at. %) of the negative-electrode S,O-containing coating. The S element ratio was calculated similarly to that in the above described section of "S element ratio of negative-electrode S,O-containing coating."

As shown in FIGS. 79 and 80, also from the positive-electrode S,O-containing coating of EB4, a peak indicating the existence of S and a peak indicating the existence of O were detected. In addition, both the peak of S and the peak of O increased at the discharged state and decreased at the charged state. This result also confirms the positive-electrode S,O-containing coating having the S=O structure, and O and S in the positive-electrode S,O-containing coating moving in and out of the positive-electrode S,O-containing coating in association with charging and discharging.

TABLE 26

|  | After first charging and discharging | After 500 cycles |
|---|---|---|
| S element ratio (at. %) | 3.1 | 3.8 |

In addition, as shown in Table 26, the negative-electrode S,O-containing coating of EB4 included S by 2.0 at. % or more after the first charging and discharging and also after 500 cycles. From this result, the negative-electrode S,O-containing coating of the nonaqueous electrolyte secondary battery of the present invention is understood as to include S by 2.0 at. % or more in both before the cycles and after the cycles.

With respect to EB4 to EB7, CB2, and CB3, a high-temperature storage test of storing at 60° C. for 1 week was performed, and, after the high-temperature storage test, the positive-electrode S,O-containing coatings and the negative-electrode S,O-containing coatings of EB4 to EB7 and the positive-electrode coatings and the negative-electrode coatings of CB2 and CB3 were analyzed. Before starting the high-temperature storage test, CC-CV charging was performed from 3.0 V to 4.1 V at a rate of 0.33C. The charge capacity at this time was used as a standard (SOC100), and a portion of 20% with respect to this standard was CC discharged to adjust each of the batteries to SOC80, and the high-temperature storage test was started. After the high-temperature storage test, CC-CV discharging to 3.0 V was performed at 1C. After the discharging, XPS spectra of the positive-electrode S,O-containing coatings, the negative-electrode S,O-containing coatings, the positive-electrode coatings, and the negative-electrode coatings were measured. FIGS. 81 to 84 show analysis results of the positive-electrode S,O-containing coatings of EB4 to EB7 and the positive-electrode coatings of CB2 and CB3 measured through XPS. In addition, FIGS. 85 to 88 show analysis results of the negative-electrode S,O-containing coatings of EB4 to EB7 and the negative-electrode coatings of CB2 and CB3 measured through XPS.

Figure 81:
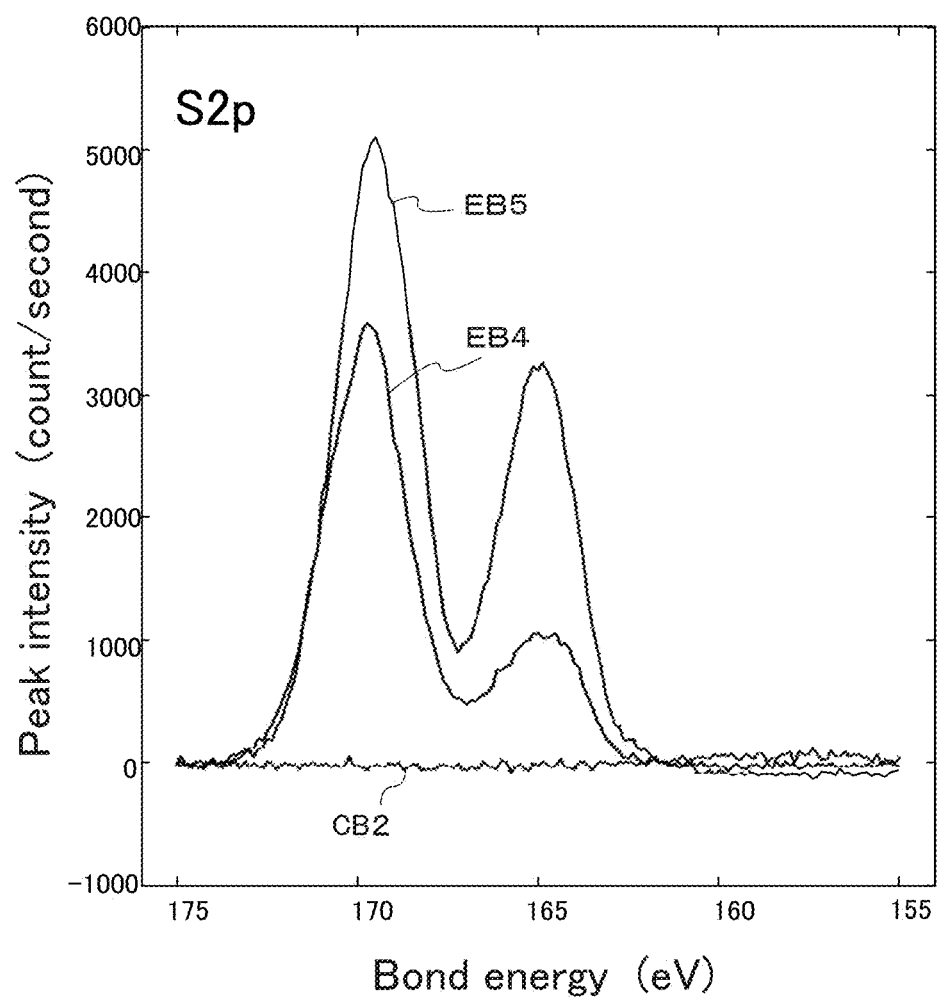
FIG. 81 shows the results of XPS analysis of S in positive-electrode S,O-containing coatings of EB4, EB5, and CB2 in Evaluation Example 26.
Figure 82:
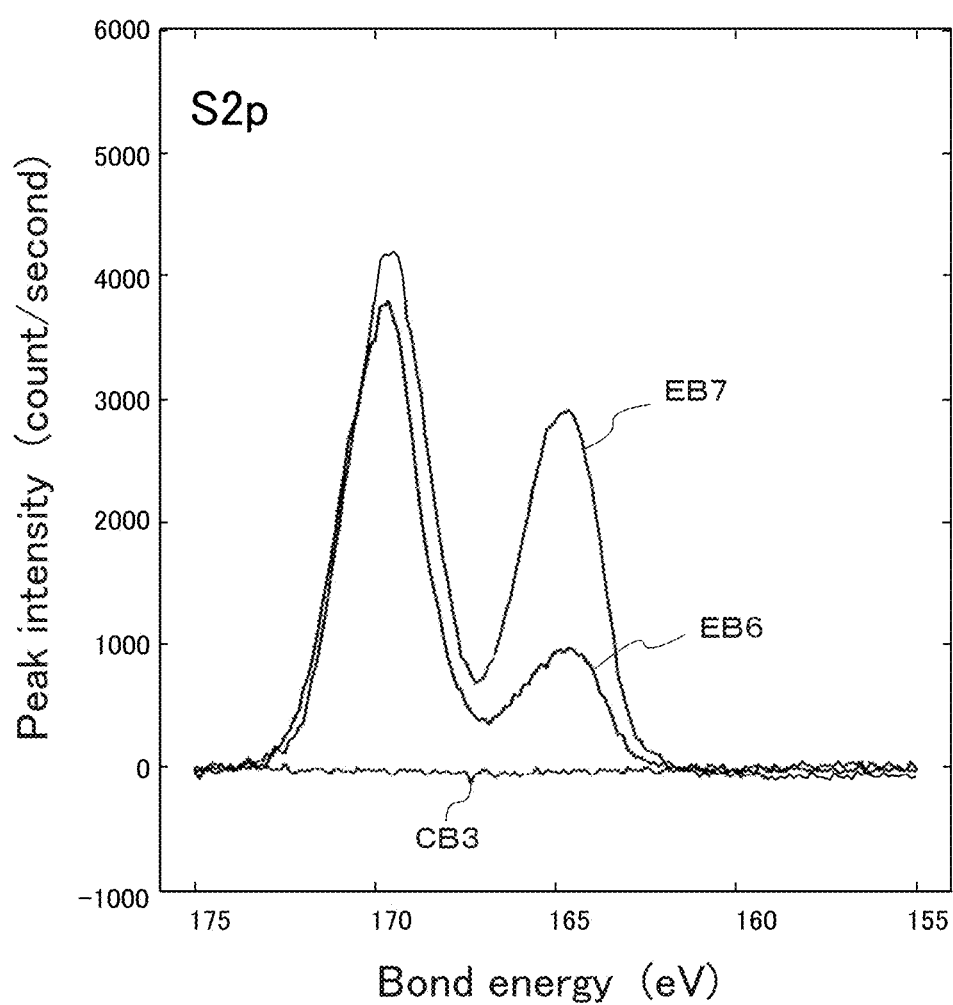
FIG. 82 shows the results of XPS analysis of S in positive-electrode S,O-containing coatings of EB6, EB7, and CB3 in Evaluation Example 26.
Figure 83:
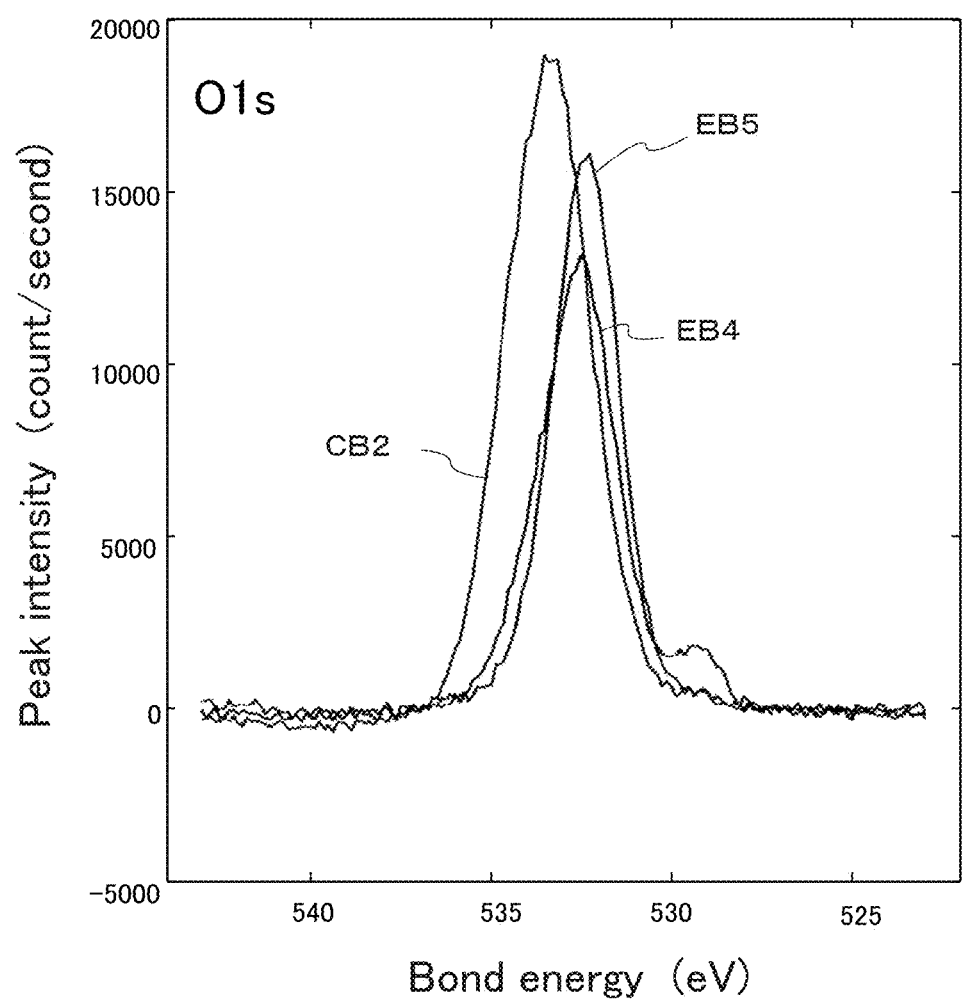
FIG. 83 shows the results of XPS analysis of O in the positive-electrode S,O-containing coatings of EB4, EB5, and CB2 in Evaluation Example 26.
Figure 84:
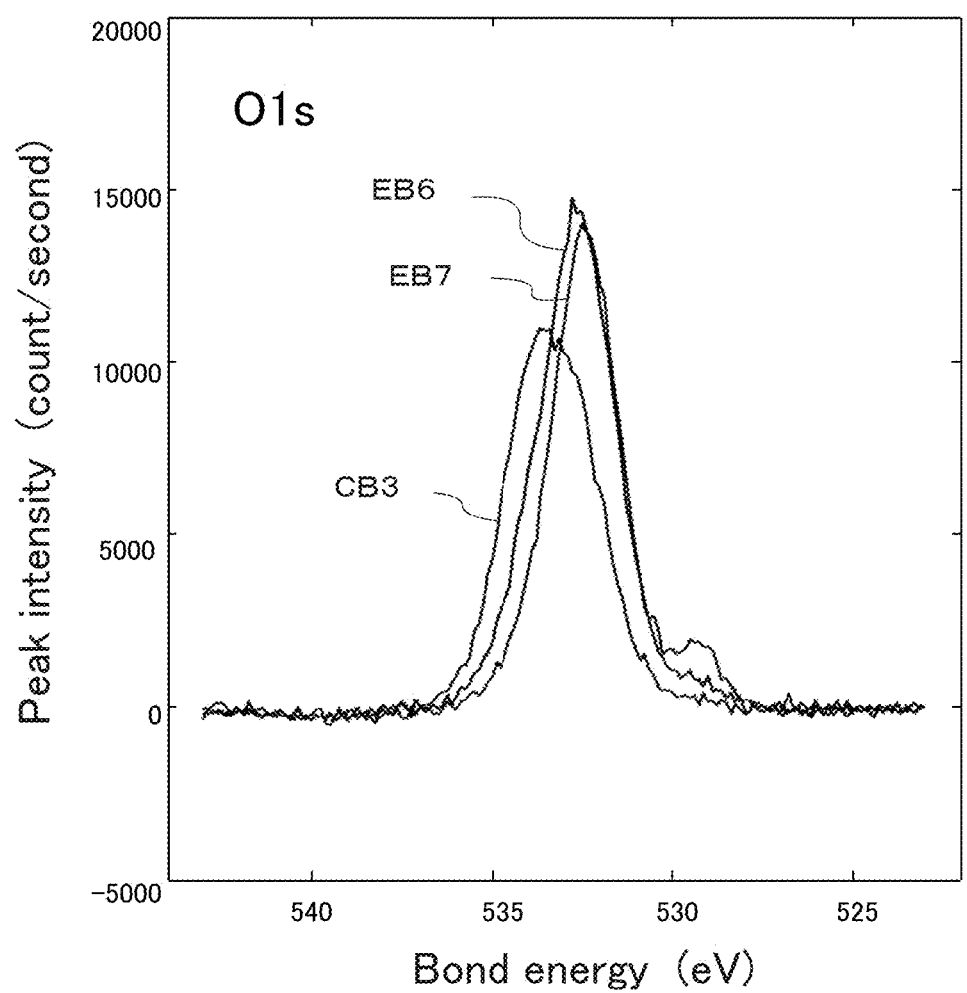
FIG. 84 shows the results of analysis of O in the positive-electrode S,O-containing coatings of EB6, EB7, and CB3 in Evaluation Example 26.
Figure 85:
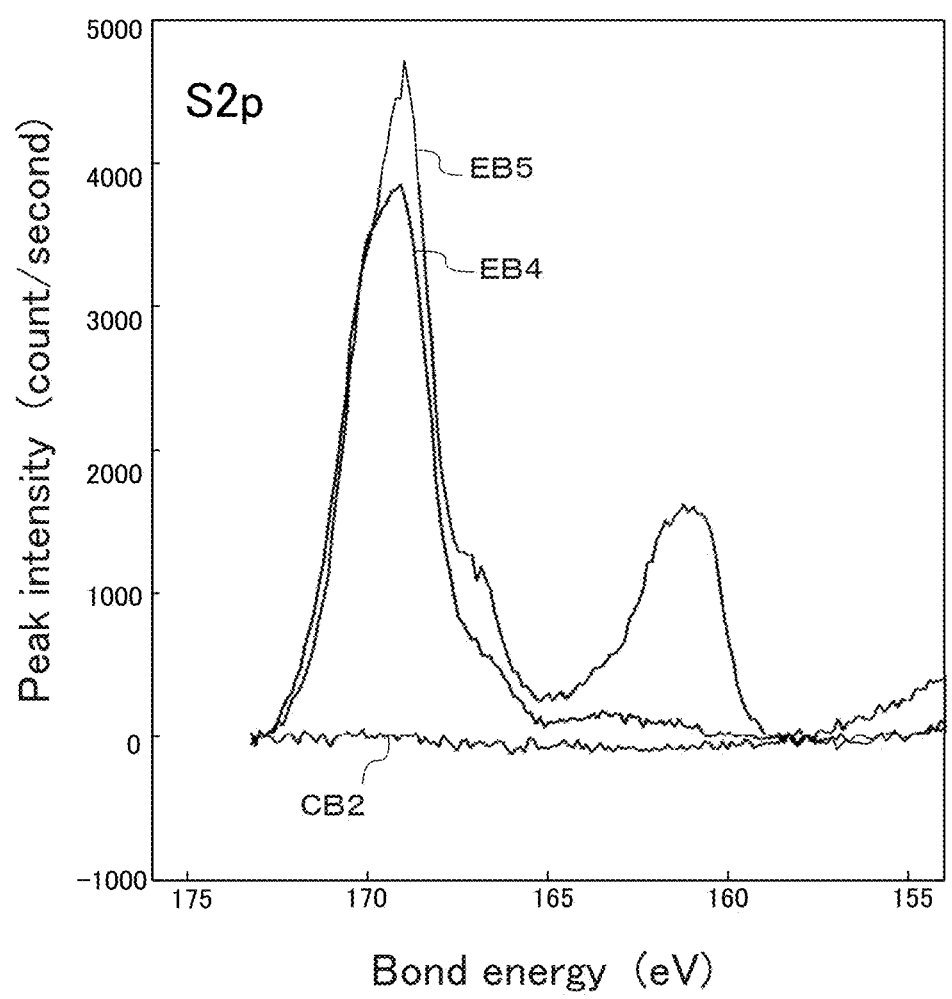
FIG. 85 shows the results of analysis of S in negative-electrode S,O-containing coatings of EB4, EB5, and CB2 in Evaluation Example 26.
Figure 86:
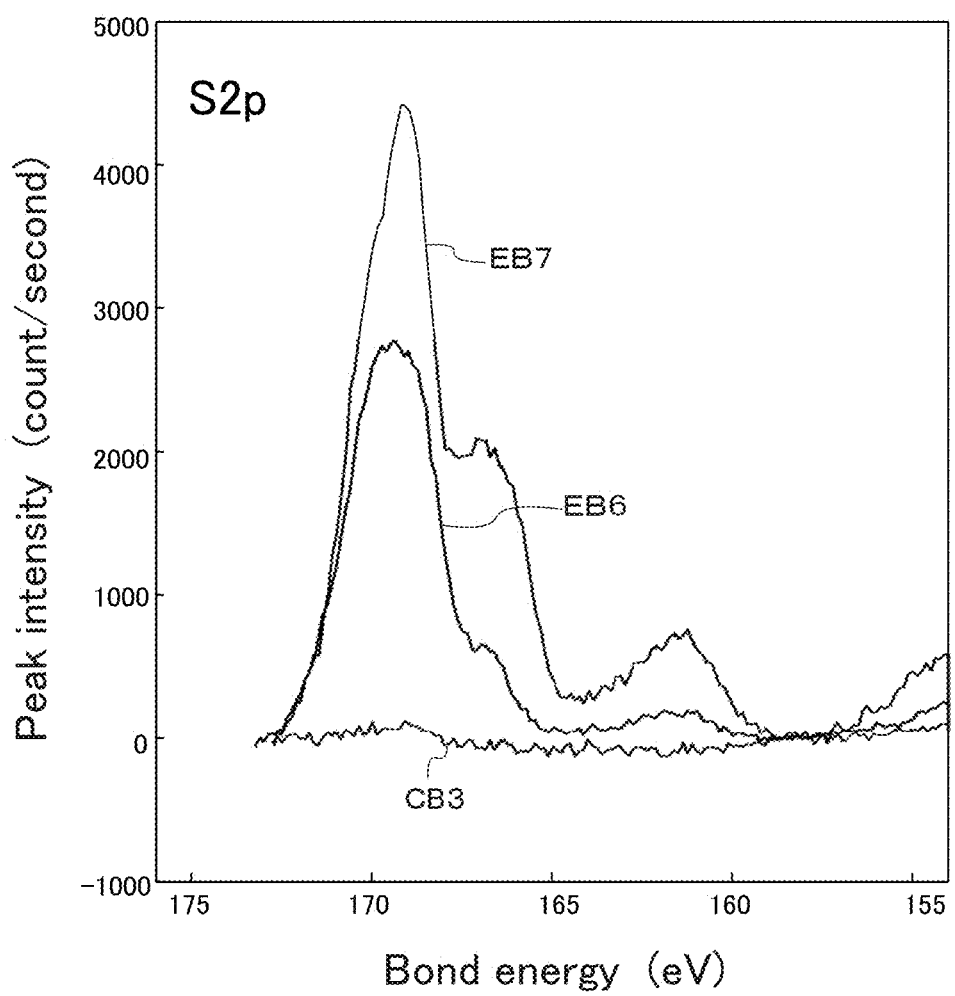
FIG. 86 shows the results of analysis of S in negative-electrode S,O-containing coatings of EB6, EB7, and CB3 in Evaluation Example 26.
Figure 87:
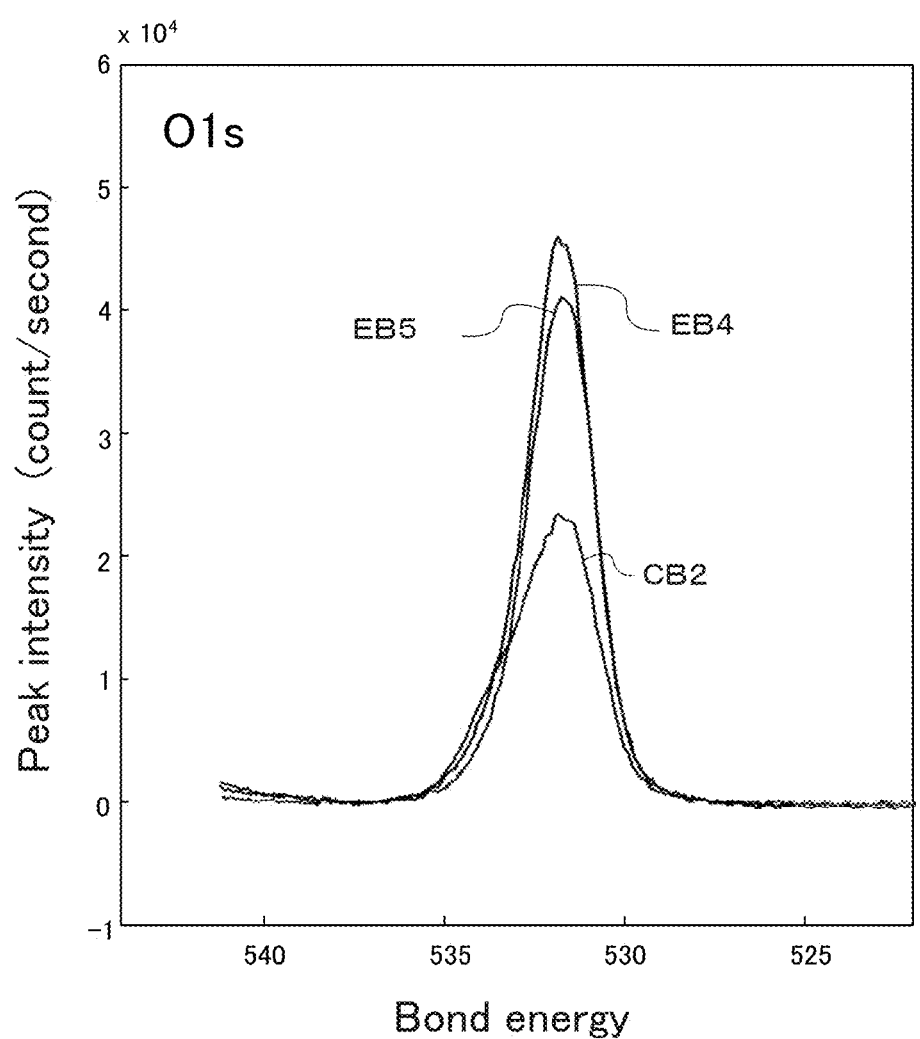
FIG. 87 shows the results of analysis of O in the negative-electrode S,O-containing coatings of EB4, EB5, and CB2 in Evaluation Example 26.
Figure 88:
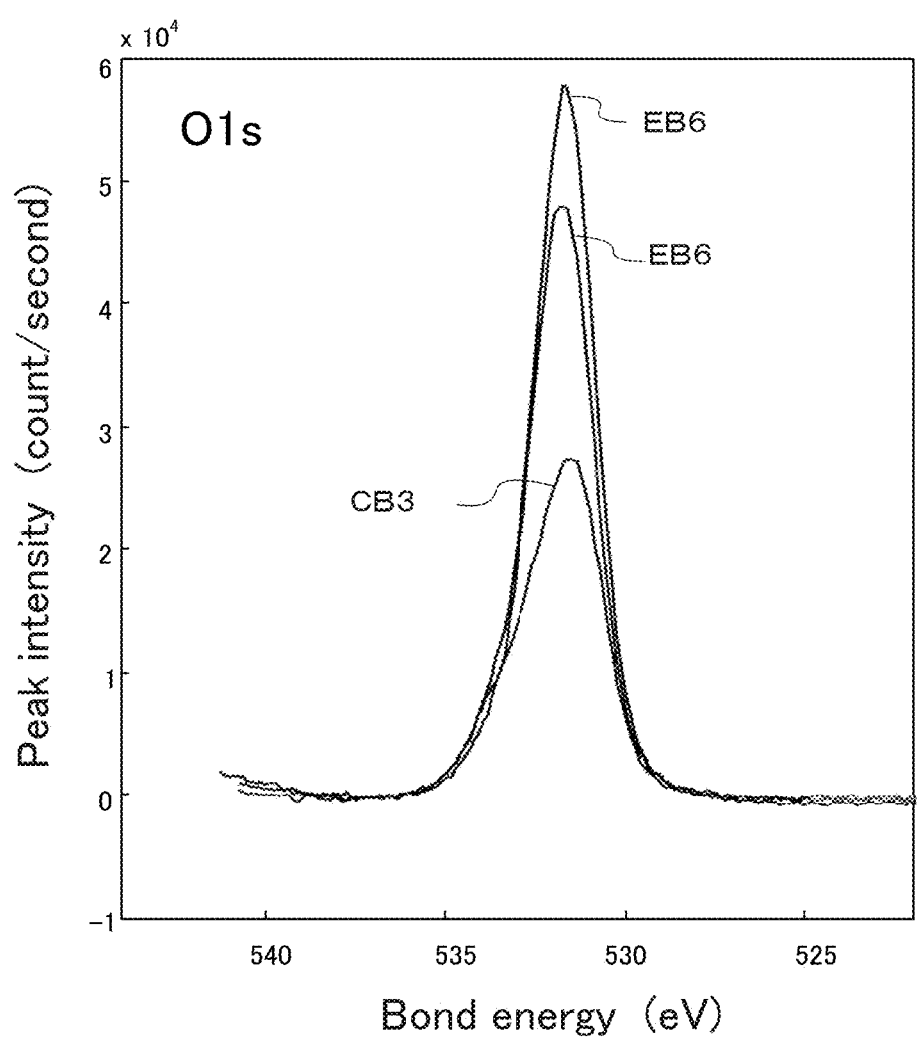
FIG. 88 shows the results of analysis of O in the negative-electrode S,O-containing coatings of EB6, EB7, and CB3 in Evaluation Example 26.

Specifically, FIG. 81 shows the result of analysis regarding sulfur element in the positive-electrode S,O-containing coatings of EB4 and EB5 and the positive-electrode coating of CB2. FIG. 82 shows the result of analysis regarding sulfur element in the positive-electrode S,O-containing coatings of EB6 and EB7 and the positive-electrode coating of CB3. FIG. 83 shows the result of analysis regarding oxygen element in the positive-electrode S,O-containing coatings of EB4 and EB5 and the positive-electrode coating of CB2. FIG. 84 shows the result of analysis regarding oxygen element in the positive-electrode S,O-containing coatings of EB6 and EB7 and the positive-electrode coating of CB3. FIG. 85 shows the result of analysis regarding sulfur element in the negative-electrode S,O-containing coatings of EB4 and EB5 and the negative-electrode coating of CB2. FIG. 86 shows the result of analysis regarding sulfur element in the negative-electrode S,O-containing coatings of EB6 and EB7 and the negative-electrode coating of CB3. FIG. 87 shows the result of analysis regarding oxygen element in the negative-electrode S,O-containing coatings of EB4 and EB5 and the negative-electrode coating of CB2. FIG. 88 shows the result of analysis regarding oxygen element in the negative-electrode S,O-containing coatings of EB6 and EB7 and the negative-electrode coating of CB3.

As shown in FIGS. 81 and 82, although CB2 and CB3 using the conventional electrolytic solution did not include S in the positive-electrode coatings, EB4 to EB7 using the electrolytic solution of the present invention included S in the positive-electrode S,O-containing coatings. In addition, as shown in FIGS. 83 and 84, all EB4 to EB7 contained O in the positive-electrode S,O-containing coatings. Furthermore, as shown in FIGS. 81 and 82, from all the positive-electrode S,O-containing coatings of EB4 to EB7, a peak of around 170 eV indicating existence of $SO_2$ (S=O structure) was detected. From these results, in both when AN was used and when DMC was used as the organic solvent for the electrolytic solution in the nonaqueous electrolyte secondary battery of the present invention, a stable positive-electrode S,O-containing coating that includes S and O is understood as to be formed. In addition, since the positive-electrode S,O-containing coating is not affected by the type of the negative electrode binder, O in the positive-electrode S,O-containing coating is thought to be not derived from CMC. Furthermore, as shown in FIGS. 83 and 84, when DMC was used as the organic solvent for the electrolytic solution, a peak of O derived from the positive electrode active material was detected at around 530 eV. Thus, when DMC was used as the organic solvent for the electrolytic solution, the thickness of the positive-electrode S,O-containing coating is thought to be smaller compared to when AN was used.

Similarly, as shown in FIGS. 85 to 88, although CB2 and CB3 using the conventional electrolytic solution did not include S in the negative-electrode coatings, EB4 to EB7 using the electrolytic solution of the present invention included S and O in the negative-electrode S,O-containing coatings. Furthermore, as shown in FIGS. 85 and 86, from all the negative-electrode S,O-containing coatings of EB4 to EB7, a peak of around 170 eV indicating the existence of $SO_2$ (S=O structure) was detected. From these results, in both when AN was used and when DMC was used as the organic solvent for the electrolytic solution in the nonaqueous electrolyte secondary battery of the present invention, a stable negative-electrode S,O-containing coating that includes S and O is understood as to be formed.

With respect to EB4, EB5, and CB2, after the high-temperature storage test and discharging, XPS spectra of the respective negative-electrode S,O-containing coatings and the negative-electrode coatings were measured, and the ratio of S element at the discharged state was calculated in each of the negative-electrode S,O-containing coating of EB4 and EB5 and the negative-electrode coating of CB2. Specifically, with respect to each of the negative-electrode S,O-containing coatings or the negative-electrode coatings, an element ratio of S when the total peak intensity of S, N, F, C, and O was defined as 100% was calculated. The results are shown in Table 27.

TABLE 27

|  | EB4 | EB5 | CB2 |
|---|---|---|---|
| S element ratio (at. %) | 4.2 | 6.4 | 0.0 |

As shown in Table 27, although the negative-electrode coating of CB2 did not include S at an amount equal to or more than the detection limit, S was detected in the negative-electrode S,O-containing coatings of EB4 and EB5. In addition, the negative-electrode S,O-containing coating of EB5 included more S than the negative-electrode S,O-containing coating of EB4. From this result, the S element ratio in the negative-electrode S,O-containing coating is understood as to be equal to or higher than 2.0 at. % even after high temperature storage.

(EB8)

Electrolytic solution E11 was used in EB8. EB8 was similar to the nonaqueous electrolyte secondary battery of Example 5-1 except for the composition of the negative electrode mixture, the mixing ratio of the negative electrode active material and the conductive additive, the separator, and the electrolytic solution. NCM523:AB:PVdF=90:8:2 was used for the positive electrode.

(EB9)

Electrolytic solution E13 was used in EB9. EB9 was similar to EB8 except for the electrolytic solution.

(EB10)

EB10 was similar to EB8 except for using electrolytic solution E8.

(CB4)

CB4 was similar to EB8 except for using electrolytic solution C5.

Evaluation Example 27: Internal Resistance of Battery

By using EB8, EB9, EB10, and CB4, internal resistances of respective batteries were evaluated.

Figure 89:
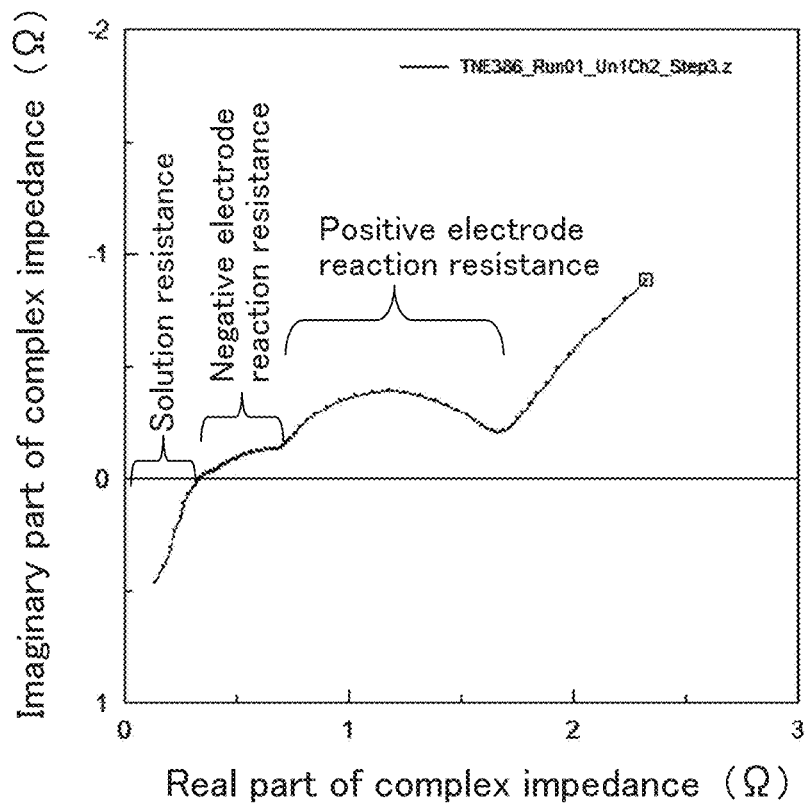
FIG. 89 is a planar plot of complex impedance of batteries, obtained by measuring alternating current impedances after the first charging and discharging and after 100 cycles, using EB8, EB9, EB10, and CB4.

With each of the nonaqueous electrolyte secondary batteries, CC charging and discharging, i.e., constant current charging and discharging, were repeated at room temperature in a range of 3.0 V to 4.1 V (vs. Li reference). Then, an alternating current impedance after the first charging and discharging and an alternating current impedance after 100 cycles were measured. Based on obtained complex impedance planar plots, reaction resistances of electrolytic solutions, negative electrodes, and positive electrodes were each analyzed. As shown in FIG. 89, two circular arcs were observed in a complex impedance planar plot. A circular arc on the left side of the figure (i.e., a side in which the real part of complex impedance is smaller) is referred to as a first circular arc. A circular arc on the right side of the figure is referred to as a second circular arc. Reaction resistance of a negative electrode was analyzed based on the size of the first circular arc, and reaction resistance of a positive electrode was analyzed based on the size of the second circular arc. Resistance of an electrolytic solution was analyzed based on a plot continuing from the first circular arc toward the leftmost side in FIG. 89. The analysis results are shown in Tables 28 and 29. Table 28 shows a resistance of an electrolytic solution (i.e., solution resistance), a reaction resistance of a negative electrode, and a reaction resistance of a positive electrode after the first charging and discharging. Table 29 shows respective resistances after 100 cycles.

TABLE 28

<Beginning alternating-current resistance>

| | | EB8 | EB9 | EB10 | Unit: Ω CB4 |
|---|---|---|---|---|---|
| Electrolytic solution | Organic solvent | DMC | AN | DMC | EC/DEC |
| | Metal salt | LiFSA | LiFSA | LiFSA | LiPF$_6$ |
| Binder for negative electrode | | CMC-SBR | CMC-SBR | CMC-SBR | CMC-SBR |
| Solution resistance | | 0.5 | 0.3 | 0.4 | 0.3 |
| Negative-electrode reaction resistance | | 0.5 | 0.4 | 0.4 | 0.4 |
| Positive-electrode reaction resistance | | 0.5 | 0.1 | 0.5 | 1.0 |

TABLE 29

<Alternating-current resistance after 100 cycles>

| | | EB8 | EB9 | EB10 | Unit: Ω CB4 |
|---|---|---|---|---|---|
| Electrolytic solution | Organic solvent | DMC | AN | DMC | EC/DEC |
| | Metal salt | LiFSA | LiFSA | LiFSA | LiPF$_6$ |
| Binder for negative electrode | | CMC-SBR | CMC-SBR | CMC-SBR | CMC-SBR |
| Solution resistance | | 0.5 | 0.3 | 0.3 | 0.3 |
| Negative-electrode reaction resistance | | 0.4 | 0.2 | 0.3 | 0.4 |
| Positive-electrode reaction resistance | | 0.2 | 0.3 | 0.2 | 0.6 |
| Durability | | AA | A | AA | B |

As shown in Tables 28 and 29, in each of the nonaqueous electrolyte secondary batteries, the reaction resistances of the negative and positive electrodes tended to decrease after 100 cycles when compared to the respective resistances after the first charging and discharging.

The durability of each of the nonaqueous electrolyte secondary batteries was different even though the same polymer (CMC-SBR) having a hydrophilic group was used as the binder for the negative electrode. After 100 cycles as shown in Table 29, the reaction resistances of the negative and positive electrodes of the nonaqueous electrolyte secondary batteries of EB8, EB9, and EB10 were lower when compared to the reaction resistances of the negative and positive electrodes of the nonaqueous electrolyte secondary battery of CB4. The reason may be that, although the electrolytic solution of the present invention was not used in the nonaqueous electrolyte secondary battery of CB4, the electrolytic solution of the present invention was used in the nonaqueous electrolyte secondary batteries of EB8, EB9, and EB10. Thus, the nonaqueous electrolyte secondary battery of the present invention using the electrolytic solution of the present invention is understood as to have excellent durability since the reaction resistance after the cycles is reduced.

Furthermore, with regard to EB8, EB9, and EB10, the electrolytic solution of the present invention was used and S,O-containing coatings derived from the electrolytic solution of the present invention were formed on the surfaces of the negative electrodes and the positive electrodes. On the other hand, in CB4 in which the electrolytic solution of the present invention was not used, the S,O-containing coating was not formed on the surfaces of the negative electrode and the positive electrode. As shown in Table 29, the reaction resistances of the negative and positive electrodes of EB8, EB9, and EB10 were lower than those of CB4. Base on this, in each of the experimental examples, the reaction resistances of the negative and positive electrodes are speculated to be lowered because of the existence of the S,O-containing coating derived from the electrolytic solution of the present invention.

The solution resistances of the electrolytic solutions in EB10 and CB4 were almost identical, whereas the solution resistances of the electrolytic solutions in EB8 and EB9 were higher compared to those of EB10 and CB4. In addition, the solution resistance of each of the electrolytic solutions of the nonaqueous electrolyte secondary batteries was almost identical between after the first charging and discharging and after 100 cycles. Thus, deterioration in durability is considered not to be occurring in each of the electrolytic solutions. The difference that emerged between the reaction resistances of the negative and positive electrodes in the reference experimental examples and the experimental examples described above is considered to be occurring in the electrode itself and not related to deterioration in durability of the electrolytic solution.

Internal resistance of a nonaqueous electrolyte secondary battery is comprehensively determined from a solution resistance of an electrolytic solution, a reaction resistance of a negative electrode, and a reaction resistance of a positive electrode. Based on the results of Tables 28 and 29 and from a standpoint of suppressing an increase in internal resistance of a nonaqueous electrolyte secondary battery, EB8 and EB9 are considered to excel the most particularly in terms of durability, and EB10 is considered to excel the next in terms of durability.

Evaluation Example 28: Cycle Durability of Battery

With respect to EB8, EB9, EB10, and CB4, CC charging and discharging were repeated at room temperature in a range of 3.0 V to 4.1 V (vs. Li reference), and a discharge capacity at the first charging and discharging, a discharge capacity at the 100-th cycle, and a discharge capacity at the 500-th cycle were measured. When a capacity of each of the nonaqueous electrolyte secondary batteries at the first charging and discharging was defined as 100%, capacity retention rates (%) of each of the nonaqueous electrolyte secondary batteries at the 100-th cycle and the 500-th cycle were calculated. The results are shown in Table 30.

TABLE 30

| | | EB8 | EB10 | EB9 | CB4 |
|---|---|---|---|---|---|
| Electrolytic solution | Organic solvent | DMC | AN | DMC | EC/DEC |
| | Metal salt | LiFSA | LiFSA | LiFSA | LiPF$_6$ |
| Capacity retention rate (%) | 100 cycle | 97 | 92 | 97 | 96 |
| | 500 cycle | 90 | 67 | | 85 |

As shown in Table 30, EB8, EB9, and EB10 each showed a capacity retention rate comparable to that of CB4 even after 100 cycles. Thus, the nonaqueous electrolyte secondary batteries of the respective experimental examples were superior in cycle durability, similarly to CB4.

The SEI coating on the surface of the electrode is thought to be involved in the improvement in cycle durability. EC in the electrolytic solution is thought to be the material of the SEI coating, and EC is generally blended in the electrolytic solution to form the SEI coating for improving cycle durability.

However, EB8, EB9, and EB10, even though not containing EC that becomes a material of SEI, showed a capacity retention rate comparable to that of CB4 containing EC. The reason may be that an S,O-containing coating originated from the electrolytic solution of the present invention exists on the positive electrode and the negative electrode of the nonaqueous electrolyte secondary battery of each of the experimental examples. EB8 showed an extremely high capacity retention rate even after 500 cycles, and was particularly excellent in durability. Thus, durability is considered to improve more when DMC is selected as the organic solvent of the electrolytic solution compared to when AN is selected.

Evaluation Example 29: High-Temperature Storage Resistance of Battery

With respect to EB8, EB10, and CB4, a high-temperature storage test of storing at 60° C. for 1 week was performed. Before starting the high-temperature storage test, CC-CV (constant current constant voltage) charging was performed from 3.0 V to 4.1 V. The charge capacity at this time was used as a standard (SOC100), and a portion of 20% with respect to this standard was CC discharged to adjust each of the batteries to SOC80, and the high-temperature storage test was started. After the high-temperature storage test, CC-CV discharging to 3.0 V was performed at 1C. Based on a ratio of a discharge capacity at this moment and a capacity at SOC80 before storage, a remaining capacity was calculated using the following formula. The results are shown in Table 31.

Remaining capacity=100×(CC-CV discharge capacity after storage)/(Capacity at SOC80 before storage)

TABLE 31

| | | EB8 | EB10 | CB4 |
|---|---|---|---|---|
| Electrolytic solution | Organic solvent | DMC | AN | EC/DEC |
| | Metal salt | LiFSA | LiFSA | LiPF$_6$ |
| Remaining capacity (%) | | 54 | 36 | 20 |

The remaining capacities of EB8 and EB10 were larger than the remaining capacity of CB4. Based on this result, the S,O-containing coatings derived from the electrolytic solution of the present invention and formed on the positive electrode and the negative electrode are considered to also contribute to increase the remaining capacity.

(EB11)

A nonaqueous electrolyte secondary battery EB11 was produced similarly to EB1 except for the weight per area of the positive electrode and the negative electrode. The active material layer of the positive electrode had a weight per area of 5.5 mg/cm$^2$, and the active material layer of the negative electrode had a weight per area of 4.0 mg/cm$^2$. The weight per area of the active material layer described herein refers to the weight per area after roll-pressing and drying. In EB1, the active material layer of the positive electrode had a weight per area of 11.0 mg/cm$^2$, and the active material layer of the negative electrode had a weight per area of 8.0 mg/cm$^2$.

(CB5)

A nonaqueous electrolyte secondary battery CB5 was produced similarly to CB1 except for the weight per area of the positive electrode and the negative electrode. The active material layer of the positive electrode had a weight per area identical to EB11 of 5.5 mg/cm$^2$, and the active material layer of the negative electrode had a weight per area also identical to EB11 of 4.0 mg/cm$^2$. The weight per area of the active material layer in the positive electrode and the weight per area of the active material layer in the negative electrode in EB11 and CB5 were half of those of EB1 and CB1. In addition, the weight per area of the positive electrode and the negative electrode in the nonaqueous electrolyte secondary battery of Comparative Example 5-2 were similar to those of the nonaqueous electrolyte secondary battery of Example 5-1.

Evaluation Example 30: Input-Output Characteristics of Battery

Output characteristics of EB11 and CB5 described above were evaluated.

The usage voltage range during evaluation was 3 V to 4.2 V and the capacity was 13.5 mAh. Evaluation of each of the batteries was performed at three levels of: state of charge (SOC) of 30% and at −30° C., SOC of 30% and at −10° C., and SOC of 80% and at 25° C. In addition, the evaluation was performed three times each for 2-second output and 5-second output. Evaluation results of output characteristics are shown in Table 32. Hereinafter, "2-second output" refers to an output outputted at 2 seconds after the start of discharging, and "5-second input" refers to an input inputted at 5 seconds after the start of discharging.

TABLE 32

| Electrolytic solution | EB11<br>E8<br>4.5M<br>AN/LiFSA | CB5<br>C5<br>1M LiPF$_6$/<br>(EC/DEC) |
|---|---|---|
| −30° C., SOC30%, 2-second output (mW) | 85 | 45 |
| −10° C., SOC30%, 2-second output (mW) | 329 | 161 |
| 25° C., SOC80%, 5-second input (mW) | 890 | 684 |

As shown in Table 32, even when the weight per area was approximately half compared to that of EB1, EB11 using the electrolytic solution of the present invention had superior input-output characteristics compared to CB5 not using the electrolytic solution of the present invention.

Evaluation Example 31: Rate Capacity Characteristics

Rate capacity characteristics of EB1 and CB1 were evaluated using the following method. The capacity of each of the batteries was adjusted to 160 mAh/g. Regarding the evaluation conditions, with respect to each of the nonaqueous electrolyte secondary batteries, at 0.1C, 0.2C, 0.5C, 1C, and 2C rates, charging and then discharging were performed, and the capacity (discharge capacity) of the working electrode was measured at each rate. Discharge capacity after performing a 0.1C-discharge and a 1C-discharge is shown in Table 33. The discharge capacity shown in Table 33 is a calculated value of capacity per mass (g) of the positive electrode active material.

TABLE 33

|  | EB1 | CB1 |
|---|---|---|
| 0.1 C capacity (mAh/g) | 158.3 | 158.2 |
| 1.0 C capacity (mAh/g) | 137.5 | 125.0 |

As shown in Table 33, almost no difference in discharge capacity existed between EB1 and CB1 when the discharge rate was slow (0.1C). However, when the discharge rate was fast (1.0C), the discharge capacity of EB1 was large compared to the discharge capacity of CB1. Based on this result, the nonaqueous electrolyte secondary battery of the present invention was confirmed to have excellent rate capacity characteristics. Conceivable reasons are the electrolytic solution in the nonaqueous electrolyte secondary battery of the present invention being different from that of a conventional one, and the S,O-containing coating formed on the negative electrode and/or the positive electrode of the nonaqueous electrolyte secondary battery of the present invention also being different from that of a conventional one.

Evaluation Example 32: Output Characteristics Evaluation at 0°, SOC 20%

Output characteristics of EB1 and CB1 described above were evaluated. The used evaluation conditions were: state of charge (SOC) of 20%, 0° C., usage voltage range of 3V to 4.2 V, and capacity of 13.5 mAh. SOC 20% at 0° C. is in a range in which output characteristics are unlikely to be exerted such as, for example, when used in a cold room. Evaluation of output characteristics of EB1 and CB1 was performed three times each for 2-second output and 5-second output. Evaluation results of the output characteristics are shown in Table 34.

TABLE 34

| Output characteristics (0° C., SOC20%) | | |
|---|---|---|
|  | EB1 | CB1 |
| 2-second output<br>(mW) | 121.7 | 98.1 |
|  | 123.9 | 98.5 |
|  | 119.8 | 99.2 |
| 5-second output<br>(mW) | 98.4 | 75.1 |
|  | 101.0 | 75.7 |
|  | 96.3 | 76.5 |

As shown in Table 34, the output of EB1 at 0° C., SOC 20% was 1.2 to 1.3 times higher than the output of CB1.

Evaluation Example 33: Output Characteristics Evaluation at 25° C., SOC 20%

Output characteristics of EB1 and CB1 were evaluated at conditions of: state of charge (SOC) of 20%, 25° C., usage voltage range of 3 V to 4.2 V, and capacity of 13.5 mAh. Evaluation of output characteristics of EB1 and CB1 was performed three times each for 2-second output and 5-second output. Evaluation results are shown in Table 35.

TABLE 35

| Output characteristics (25° C., SOC20%) | | |
|---|---|---|
|  | EB1 | CB1 |
| 2-second output<br>(mW) | 458.9 | 371.4 |
|  | 471.3 | 372.4 |
|  | 466.8 | 370.8 |
| 5-second output<br>(mW) | 374.1 | 290.4 |
|  | 387.6 | 292.7 |
|  | 382.0 | 285.4 |

As shown in Table 35, the output of EB1 at 25° C., SOC 20% was 1.2 to 1.3 times higher than the output of CB1.

Evaluation Example 34: Effect of Temperature on Output Characteristics

The effect of temperature during measurement on output characteristics of EB1 and CB1 described above was investigated. Measurements were performed at 0° C. and 25° C., and the evaluation conditions were: state of charge (SOC) of 20%, usage voltage range of 3 V to 4.2 V, and capacity of 13.5 mAh for measurements at both temperatures. A ratio (0° C.-output/25° C.-output) of an output at 0° C. with respect to an output at 25° C. was calculated. The results are shown in Table 36.

TABLE 36

| 0° C. output/25° C. output | | |
|---|---|---|
| | EB1 | CB1 |
| 2-second output | 0.26 | 0.27 |
| 5-second output | 0.26 | 0.26 |

As shown in Table 36, since the ratios (0° C.-output/25° C.-output) of output at 0° C. with respect to output at 25° C. for 2-second output and 5-second output in EB1 were about the same level as those of CB1, EB1 was revealed to be capable of suppressing decrease in output at a low temperature at the same level as CB1.

Evaluation Example 35: Analysis of Positive-Electrode S,O-Containing Coating

By using TOF-SIMS (Time-of-Flight Secondary Ion Mass Spectrometry), structural information of each molecule included in the positive-electrode S,O-containing coating of EB4 was analyzed.

EB4 was subjected to 3 cycles of charging and discharging at 25° C., and disassembled at a 3 V-discharged state to remove the positive electrode. Aside from this, EB4 was subjected to 500 cycles of charging and discharging at 25° C., and disassembled at the 3 V-discharged state to remove the positive electrode. Also aside from this, EB4 was subjected to 3 cycles of charging and discharging at 25° C., left for one month at 60° C., and disassembled at the 3 V-discharged state to remove the positive electrode. Each of the positive electrodes was rinsed three times with DMC to obtain a positive electrode for analysis. On each of the positive electrodes, a positive-electrode S,O-containing coating was formed, and structural information of molecules included in the positive-electrode S,O-containing coating was analyzed in the following analysis.

Each of the positive electrodes for analysis was analyzed using TOF-SIMS. A time-of-flight secondary ion mass spectrometer was used as a mass spectrometer to measure positive secondary ions and negative secondary ions. Bi was used as a primary ion source, and the primary accelerating voltage was 25 kV. Ar-GCIB (Ar1500) was used as a sputtering ion source. The results of the measurement are shown in Tables 37 to 39. A positive ionic strength (relative value) of each fragment in Table 38 is a relative value when the total of the positive ionic strength of all the detected fragments was defined as 100%. Similarly, a negative ionic strength (relative value) of each fragment described in Table 39 is a relative value when the total of the negative ionic strength of all the detected fragments was defined as 100%.

TABLE 37

(Detected main fragments)

| | Positive secondary ion | Negative secondary ion |
|---|---|---|
| S-containing fragments (estimated to be coating component derived from metal salt) | SO, $Li_2SO_2$, $Li_3SO_3$, $Li_3SO_4$ | $SO_3$, $Li_3S_2O_3$, $SNO_2$, $SFO_2$, $SFO_3$, $S_2F_2NO_4$ |
| Hydrocarbon fragments | $C_3H_3$, $C_4H_3$ | Attributable fragments |
| (estimated to be coating component derived from solvent) | | not present |
| Other Li containing fragments | Li, $Li_3O$, $Li_2F$, $Li_3F_2$, $Li_3CO_3$ | $LiF_2$, $Li_2F_3$ |

TABLE 38

(Positive ion analysis results)

| | | Positive ionic strength (relative value) | | |
|---|---|---|---|---|
| | | 3 cycle | 500 cycle | 60° C. storage |
| Positive secondary ion | SO | 2.2E−04 | 2.2E−04 | 2.5E−04 |
| | $Li_2SO_2$ | 1.9E−03 | 2.0E−03 | 1.5E−03 |
| | $Li_3SO_3$ | 4.4E−03 | 4.2E−03 | 2.2E−03 |
| | $Li_3SO_4$ | 7.5E−03 | 5.4E−03 | 2.6E−03 |
| | $C_3H_3$ | 1.2E−02 | 1.3E−02 | 1.5E−02 |
| | $C_4H_3$ | 2.8E−03 | 3.6E−03 | 4.2E−03 |
| | Li | 4.5E−02 | 3.6E−02 | 2.2E−02 |
| | $Li_3O$ | 2.4E−02 | 1.7E−02 | 5.7E−03 |
| | $Li_2F$ | 1.3E−01 | 1.4E−01 | 8.2E−02 |
| | $Li_3F_2$ | 4.7E−02 | 5.3E−02 | 2.9E−02 |
| | $Li_3CO_3$ | 3.7E−03 | 2.3E−03 | 1.8E−03 |

TABLE 39

(Negative ion analysis results)

| | | Negative ionic strength (relative value) | | |
|---|---|---|---|---|
| | | 3 cycle | 500 cycle | 60° C. storage |
| Negative secondary ion | $SO_3$ | 3.0E−02 | 4.0E−02 | 2.5E−02 |
| | $Li_3S_2O_6$ | 1.6E−03 | 1.3E−03 | 1.3E−03 |
| | $SNO_2$ | 2.0E−02 | 2.4E−02 | 3.1E−02 |
| | $SFO_2$ | 1.6E−02 | 2.1E−02 | 2.6E−02 |
| | $SFO_3$ | 4.6E−03 | 7.6E−03 | 9.1E−03 |
| | $S_2F_2NO_4$ | 2.2E−01 | 3.1E−01 | 4.6E−01 |
| | $LiF_2$ | 8.0E−03 | 1.1E−02 | 6.1E−03 |
| | $Li_2F_3$ | 4.0E−03 | 5.5E−03 | 2.8E−03 |

As shown in Table 37, fragments that were estimated to be derived from the solvent of the electrolytic solution were only $C_3H_3$ and $C_4H_3$ detected as positive secondary ions. Fragments estimated to be derived from the salt of the electrolytic solution were mainly detected as negative secondary ions, and had larger ionic strengths than the fragments derived from the solvent described above. In addition, fragments including Li were mainly detected as positive secondary ions, and the ionic strength of the fragments including Li accounted for a large proportion among the positive secondary ions and the negative secondary ions.

Thus, the main component of the S,O-containing coating is speculated to be a component derived from the metal salt contained in the electrolytic solution, and the S,O-containing coating is speculated to include a large amount of Li.

Furthermore, as shown in Table 37, as fragments estimated to be derived from the salt, $SNO_2$, $SFO_2$, and $S_2F_2NO_4$, etc., were also detected. All of these have the S=O structure, and a structure in which N or F are bound to S. Thus, in the S,O-containing coating, S is capable of not only forming a double bond with O, but also forming a structure bound to other elements such as $SNO_2$, $SFO_2$, and $S_2F_2NO_4$. Thus, the S,O-containing coating preferably has at least the S=O structure, and S included in the S=O structure may bind with other elements. Obviously, the S,O-containing coating may include S and O that do not form the S=O structure.

In a conventional electrolytic solution described in, for example, JP2013145732 (A), more specifically, in a conventional electrolytic solution including EC as the organic solvent, $LiPF_6$ as the metal salt, and LiFSA as the additive; S is taken into a degradation product of the organic solvent. Thus, in the negative-electrode coating and/or the positive-electrode coating, S is thought to exist as an ion of such as $C_pH_qS$ (p and q are independently an integer). On the other hand, as shown in Tables 37 to 39, the fragments including S detected in the S,O-containing coating were not fragments of $C_pH_qS$, but were mainly fragments reflecting an anion structure. This also shows that the S,O-containing coating is fundamentally different from a coating formed on a conventional nonaqueous electrolyte secondary battery.

(EB12)

A nonaqueous electrolyte secondary battery using electrolytic solution E8 was produced in the following manner.

An aluminum foil (JIS A1000 series) having a diameter of 13.82 mm, an area size of 1.5 cm², and a thickness of 20 μm was used as the working electrode, and metal Li was used as the counter electrode. As the separator, a Whatman glass fiber filter paper (stock number: 1825-055) having a thickness of 400 μm was used.

The working electrode, the counter electrode, the separator, and the electrolytic solution of E8 were housed in a battery case (CR2032 type coin cell case manufactured by Hohsen Corp.) to obtain a nonaqueous electrolyte secondary battery EB12.

Evaluation Example 36: Confirmation of Elution of Al

Figure 90:
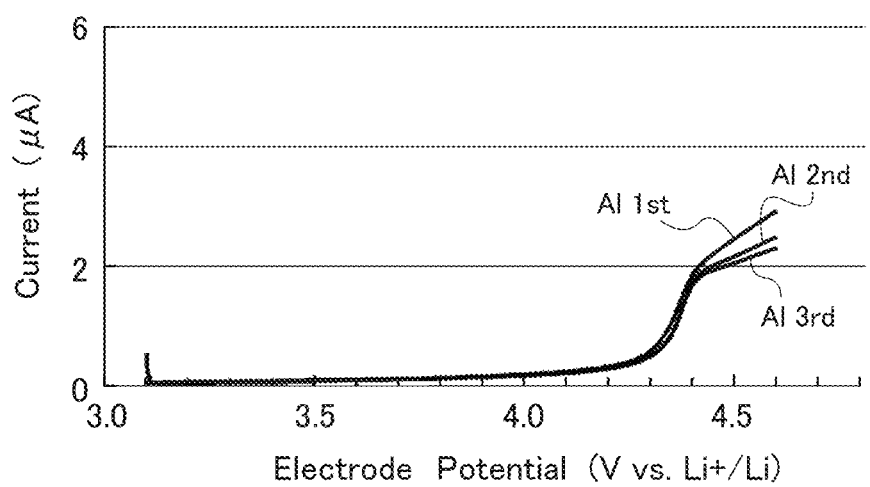
FIG. 90 is a graph showing the relationship between current and electrode potential in EB12 in Evaluation Example 36.
Figure 91:
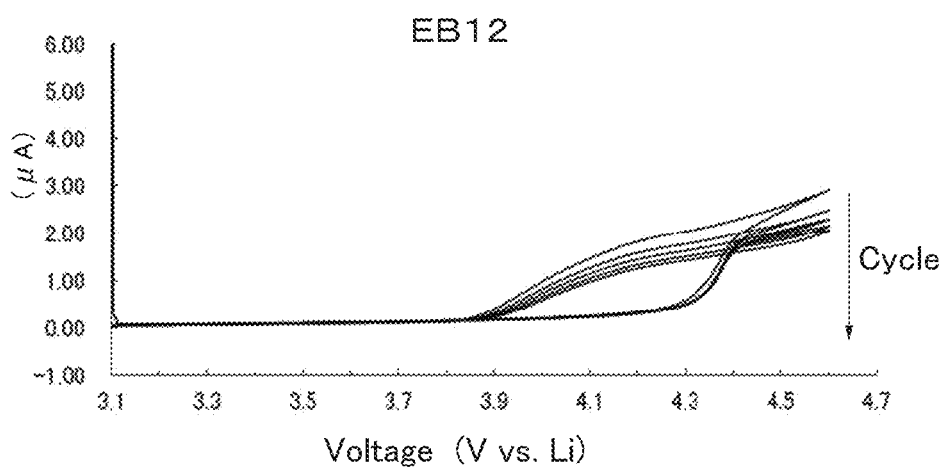
FIG. 91 is a graph showing the relationship between potential (3.1 to 4.6 V) and response current in EB12 in Evaluation Example 37.
Figure 92:
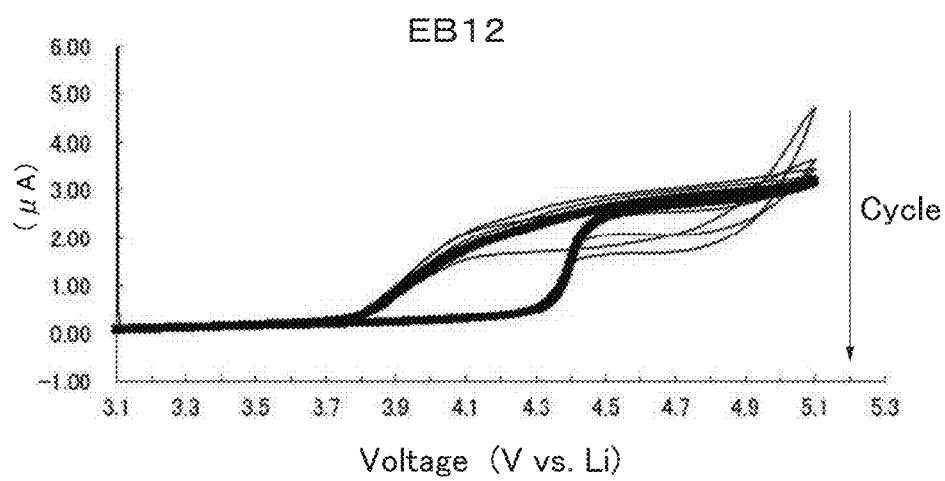
FIG. 92 is a graph showing the relationship between potential (3.1 to 5.1 V) and response current in EB12 in Evaluation Example 37.
Figure 93:
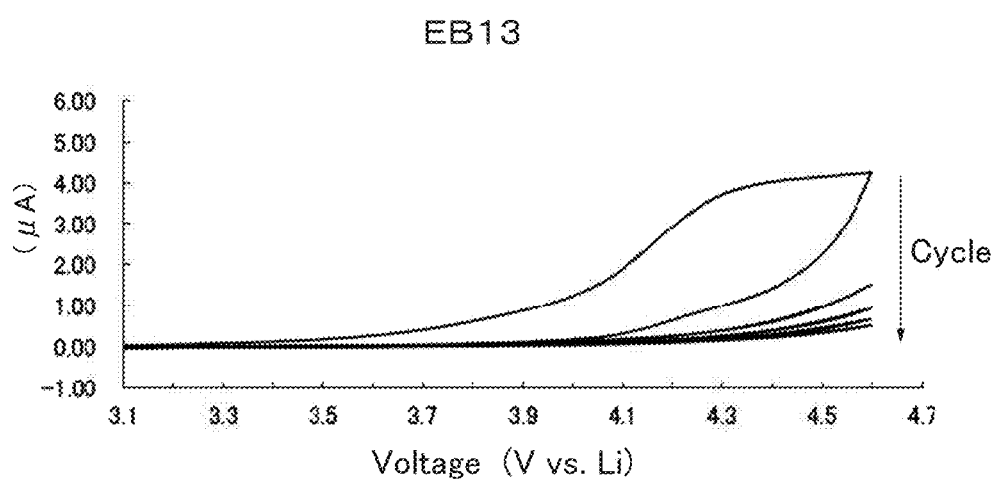
FIG. 93 is a graph showing the relationship between potential (3.1 to 4.6 V) and response current in EB13 in Evaluation Example 37.
Figure 94:
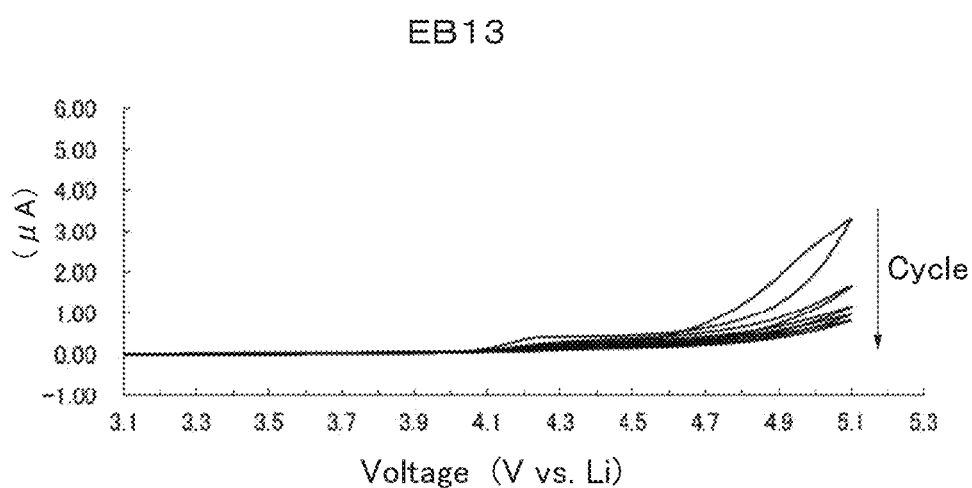
FIG. 94 is a graph showing the relationship between potential (3.1 to 5.1 V) and response current in EB13 in Evaluation Example 37.
Figure 95:
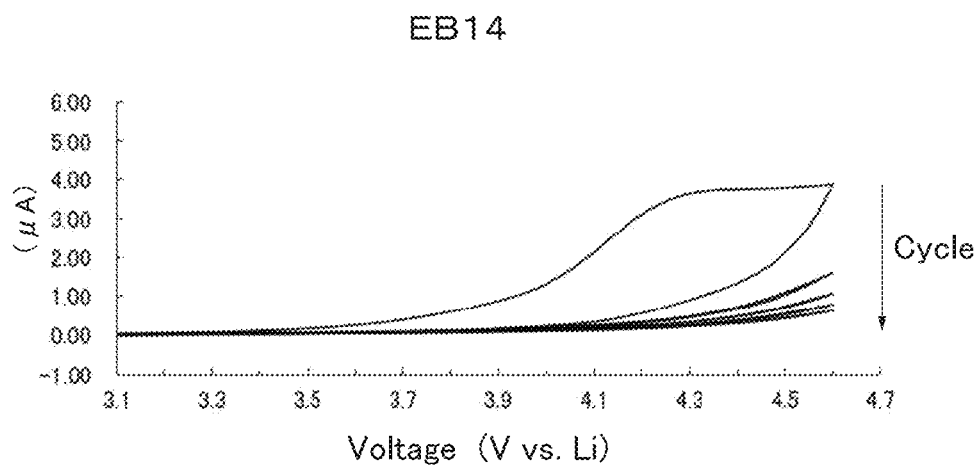
FIG. 95 is a graph showing the relationship between potential (3.1 to 4.6 V) and response current in EB14 in Evaluation Example 37.
Figure 96:
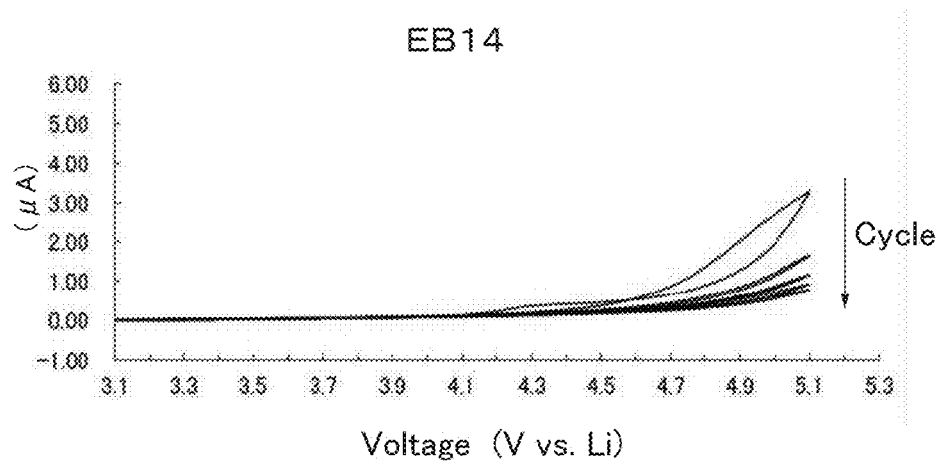
FIG. 96 is a graph showing the relationship between potential (3.1 to 5.1 V) and response current in EB14 in Evaluation Example 37.
Figure 97:
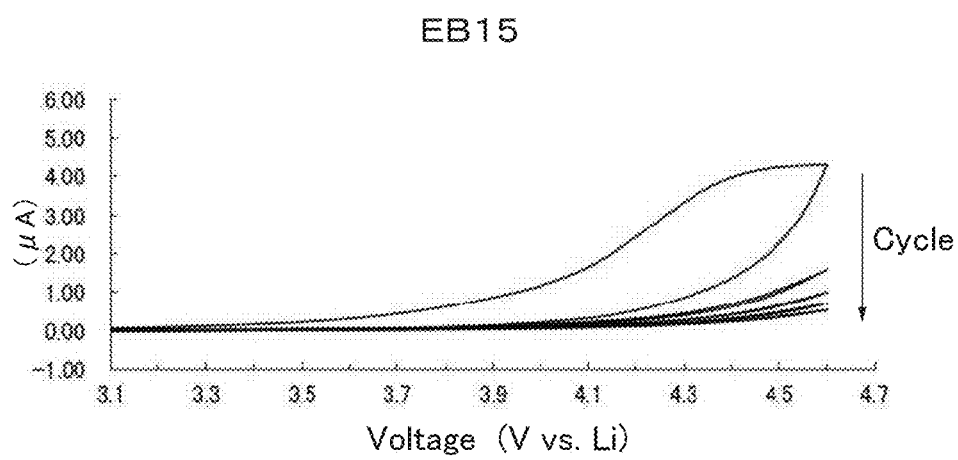
FIG. 97 is a graph showing the relationship between potential (3.1 to 4.6 V) and response current in EB15 in Evaluation Example 37.
Figure 98:
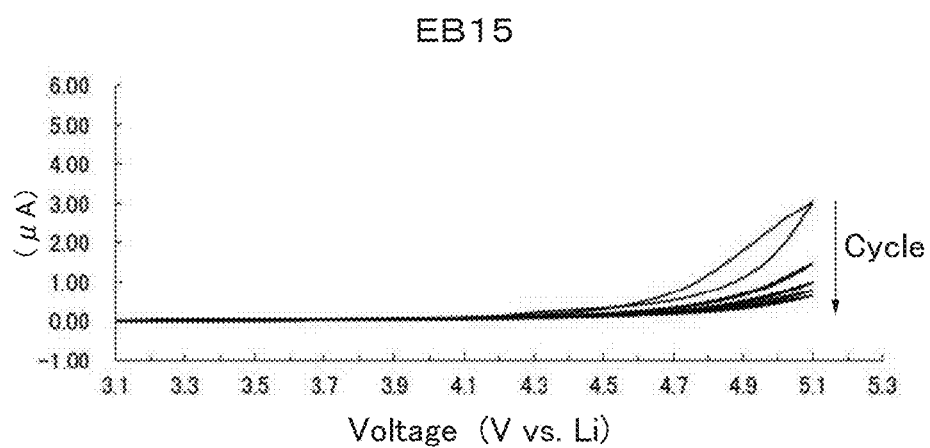
FIG. 98 is a graph showing the relationship between potential (3.1 to 5.1 V) and response current in EB15 in Evaluation Example 37.

The changes in current and electrode potential were observed when linear sweep voltammetry (i.e., LSV) measurement was performed on EB12 repeatedly for ten times in a range of 3.1 V to 4.6 V (vs. Li reference) at a rate of 1 mV/s. FIG. 90 is a graph showing the relationship between current and electrode potential after the first, second, and third charging and discharging of EB12.

In FIG. 90, current was hardly confirmed at 4.0 V in EB12 in which the working electrode was Al, and, although the current slightly increased at 4.3 V for a moment, a large increase was not observed thereafter up to 4.6 V. In addition, the amount of current reduced and became steady after repeating the charging and discharging.

Based on the results described above, the nonaqueous electrolyte secondary battery using the electrolytic solution of the present invention and the aluminum current collector on the positive electrode is thought unlikely to cause elution of Al even at a high potential. Although the reason why elution of Al is unlikely to occur is unclear, solubility of Al with respect to the electrolytic solution of the present invention is speculated to be low when compared to a conventional electrolytic solution since the electrolytic solution of the present invention is different from the conventional electrolytic solution regarding the types and existing environment of the metal salt and the organic solvent, and the concentration of the metal salt.

(EB13)

A nonaqueous electrolyte secondary battery EB13 was obtained similarly to EB12 except for using electrolytic solution E11 instead of electrolytic solution E8.

(EB14)

A nonaqueous electrolyte secondary battery EB14 was obtained similarly to EB12 except for using electrolytic solution E16 instead of electrolytic solution E8.

(EB15)

A nonaqueous electrolyte secondary battery EB15 was obtained similarly to EB12 except for using electrolytic solution E19 instead of electrolytic solution E8.

(EB16)

A nonaqueous electrolyte secondary battery EB16 was obtained similarly to EB12 except for using electrolytic solution E13 instead of electrolytic solution E8.

(CB6)

A nonaqueous electrolyte secondary battery CB6 was obtained similarly to EB12 except for using electrolytic solution C5 instead of electrolytic solution E8.

(CB7)

A nonaqueous electrolyte secondary battery CB7 was obtained similarly to EB12 except for using electrolytic solution C6 instead of electrolytic solution E8.

Evaluation Example 37: Cyclic Voltammetry Evaluation Using Al Working Electrode

With respect to EB12 to EB15 and CB6, 5 cycles of cyclic voltammetry evaluation were performed with a condition of 1 mV/s in a range of 3.1 V to 4.6 V. Then, 5 cycles of cyclic voltammetry evaluation were performed with a condition of 1 mV/s in a range of 3.1 V to 5.1 V.

With respect to EB13, EB16, and CB7, 10 cycles of cyclic voltammetry evaluation were performed with a condition of 1 mV/s in a range of 3.0 V to 4.5 V. Then, 10 cycles of cyclic voltammetry evaluation were performed with a condition of 1 mV/s in a range of 3.0 V to 5.0 V.

FIGS. 91 to 99 show graphs showing the relationship between potential and response current in EB12 to EB15 and CB6 In addition, FIGS. 100 to 105 show graphs showing the relationship between potential and response current in EB13, EB16, and CB7.

Figure 99:
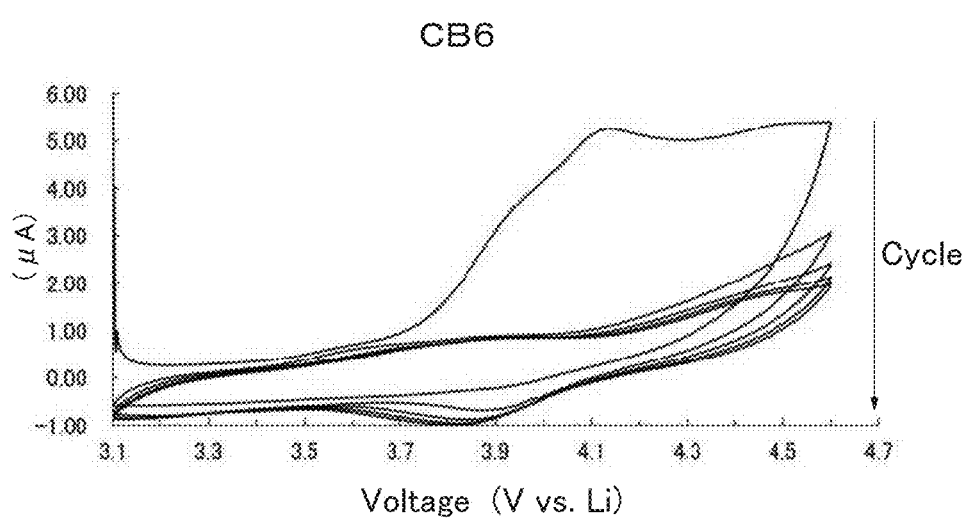
FIG. 99 is a graph showing the relationship between potential (3.1 to 4.6 V) and response current in CB6 in Evaluation Example 37.
Figure 100:
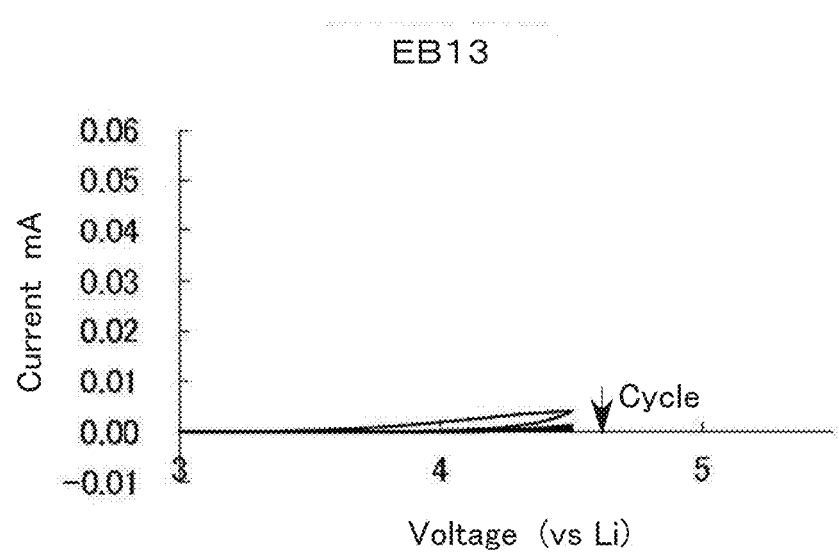
FIG. 100 is a graph showing the relationship between potential (3.0 to 4.5 V) and response current in EB13 in Evaluation Example 37, and is obtained by changing the scale of the vertical axis in FIG. 93.
Figure 101:
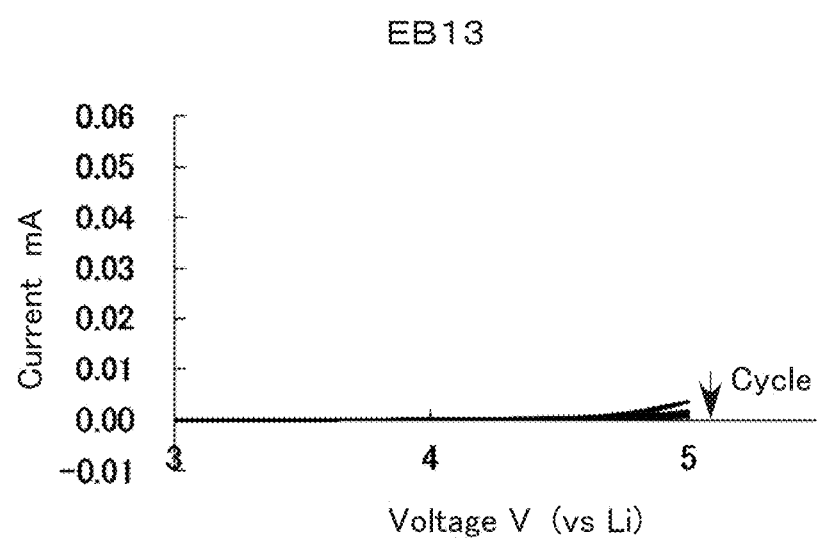
FIG. 101 is a graph showing the relationship between potential (3.0 to 5.0 V) and response current in EB13 in Evaluation Example 37, and is obtained by changing the scale of the vertical axis in FIG. 94.
Figure 102:
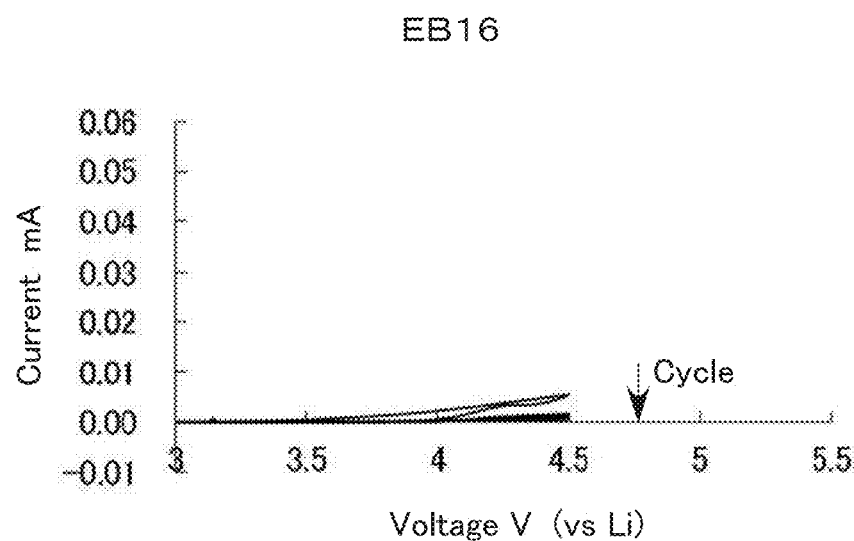
FIG. 102 is a graph showing the relationship between potential (3.0 to 4.5 V) and response current in EB16 in Evaluation Example 37.
Figure 103:
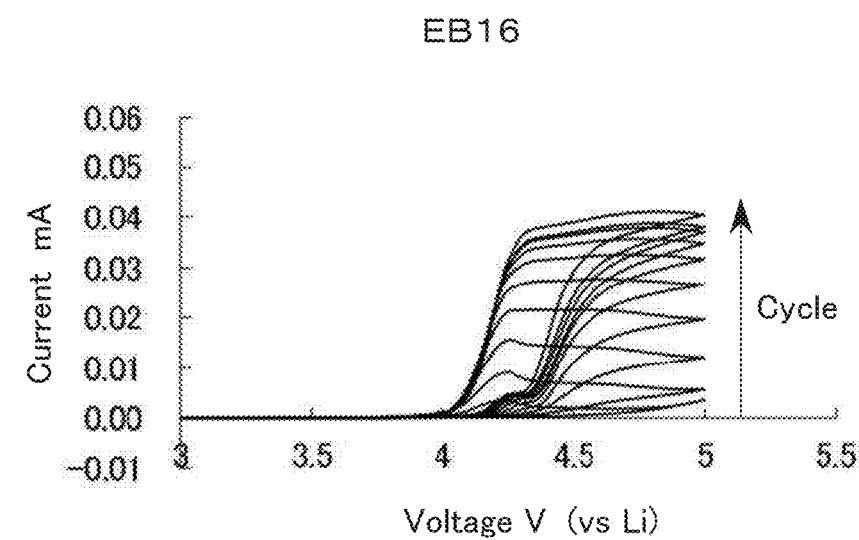
FIG. 103 is a graph showing the relationship between potential (3.0 to 5.0 V) and response current in EB16 in Evaluation Example 37.
Figure 104:
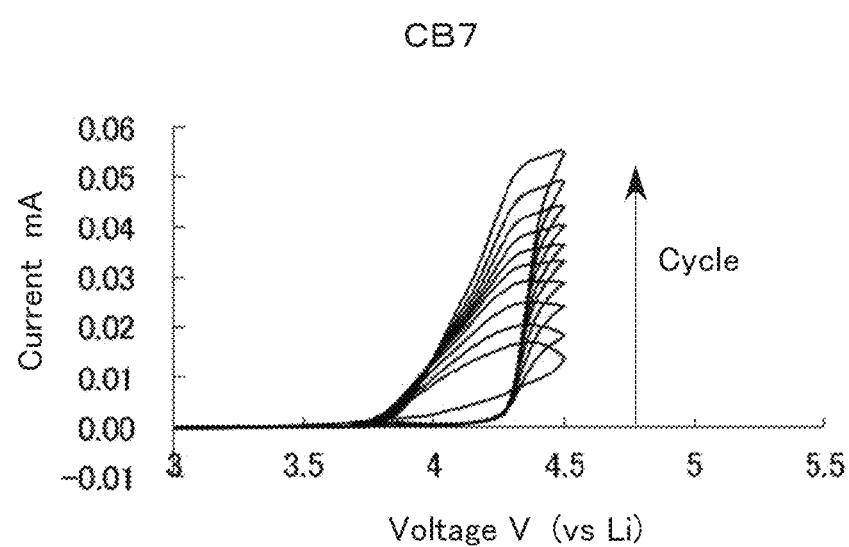
FIG. 104 is a graph showing the relationship between potential (3.0 to 4.5 V) and response current in CB7 in Evaluation Example 37.
Figure 105:
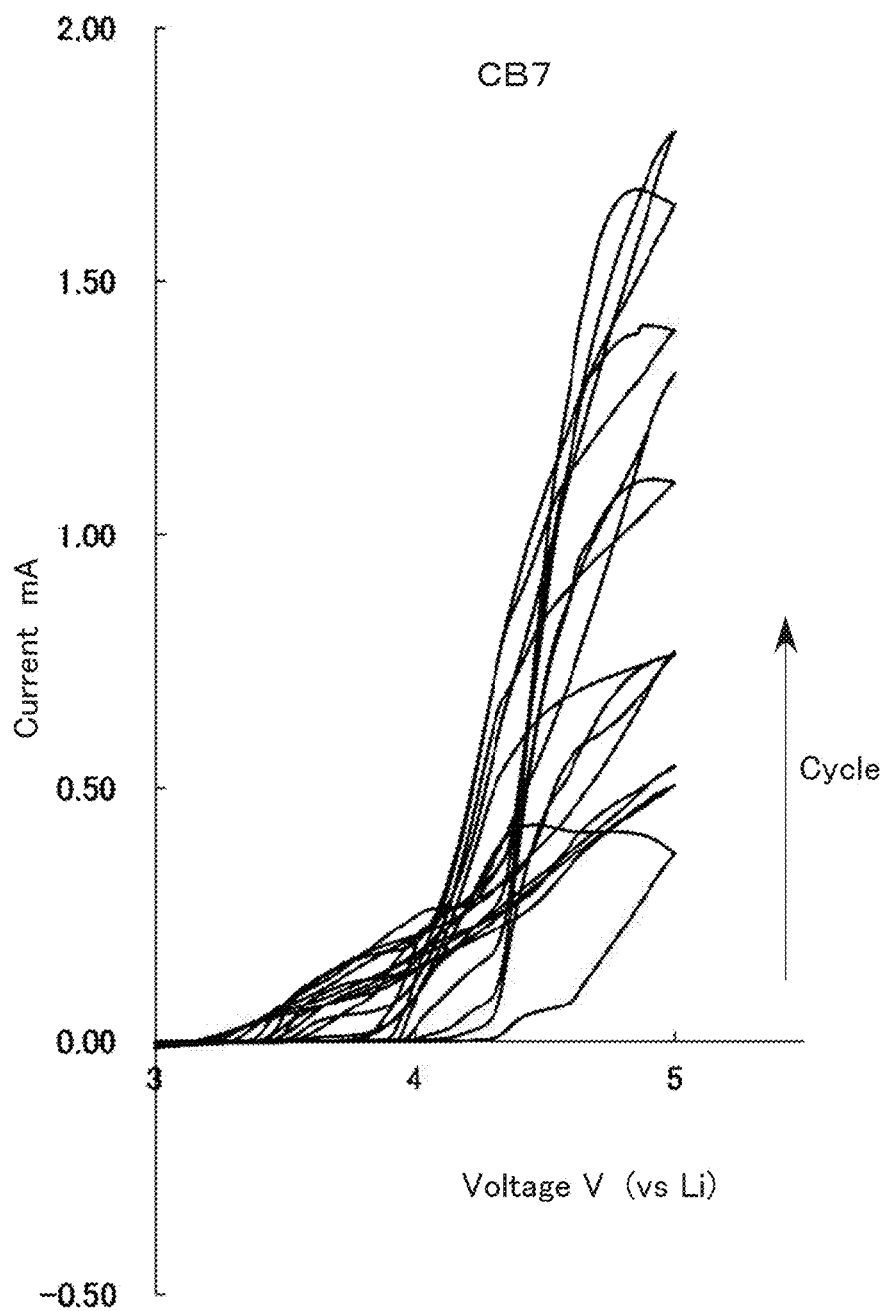
FIG. 105 is a graph showing the relationship between potential (3.0 to 5.0 V) and response current in CB7 in Evaluation Example 37.

From FIG. 99, with CB6, current is understood to be flowing in a range of 3.1 V to 4.6 V during and after the second cycle, and the current is understood to increase as the potential became higher. In addition, from FIGS. 104 and 105, also with CB7, current flowed in a range of 3.0 V to 4.5 V during and after the second cycle, and current increased as the potential became higher. This current is estimated to be a current resulting from oxidation of Al, generated through corrosion of aluminum of the working electrode.

On the other hand, from FIGS. 91 to 98, with EB12 to EB15, almost no current is understood as to flow in a range of 3.1 V to 4.6 V during and after the second cycle. Although a slight increase in current was observed associated with an increase in potential in a range equal to or higher than 4.3 V, the amount of current decreased and became steady as the cycle was repeated. Particularly in EB13 to EB15, a significant increase in current was not observed up to a high potential of 5.1 V, and a decrease in the amount of current associated with repeated cycles was observed.

In addition, from FIGS. 100 to 103, similarly with EB13 and EB16, almost no current is understood as to flow in a range of 3.0 V to 4.5 V during and after the second cycle. In particular, during and after the third cycle, almost no increase in current was observed until reaching 4.5 V. Although an increase in current beyond a high potential of 4.5 V was observed in EB16, the value was much smaller when compared to a current value beyond 4.5 V in CB7. In EB13, almost no increase in current was observed beyond 4.5 V up to 5.0 V, and a decrease in the amount of current associated with repeated cycles was observed in manner similar to EB13 to EB15.

From the results of cyclic voltammetry evaluation, corrosiveness of electrolytic solutions E8, E11, E16, and E19 with respect to aluminum is considered to be low even at a high potential condition exceeding 5 V. Thus, electrolytic solutions E8, E11, E16, and E19 are considered as electrolytic solutions suitable for a battery using aluminum as a current collector or the like.

(EB17)

A nonaqueous electrolyte secondary battery EB17 using electrolytic solution E8 was produced in the following manner.

94 parts by mass of NCM523 which is a positive electrode active material, 3 parts by mass of AB which is a conductive additive, and 3 parts by mass of PVdF which is a binding agent were obtained and mixed. This mixture was dispersed in a proper amount of NMP to obtain a positive electrode mixture in a slurry form. An aluminum foil (JIS A1000 series) having a thickness of 20 μm was prepared as the positive electrode current collector. The positive electrode mixture described above was applied in a film form on the surface of the positive electrode current collector by using a doctor blade. The positive electrode current collector on which the positive electrode mixture was applied was dried for 20 minutes at 80° C. to remove NMP through volatilization. Then, a complex of the positive electrode mixture and the positive electrode current collector was pressed to obtain a joined object. The obtained joined object was heated and dried for 6 hours at 120° C. in a vacuum dryer to obtain a positive electrode in which the positive electrode active material layer was formed on the positive electrode current collector.

98 parts by mass of natural graphite which is a negative electrode active material and 1 part by mass each of SBR and CMC which are binding agents were obtained and mixed. This mixture was dispersed in a proper amount of ion exchanged water to obtain a negative electrode mixture in a slurry form. As the negative electrode current collector, a copper foil having a thickness of 20 μm was prepared. The above described negative electrode mixture was applied in a film form on the surface of the negative electrode current collector by using a doctor blade. The negative electrode current collector having the negative electrode mixture applied thereon was dried to remove water, and then a complex of the negative electrode mixture and the negative electrode current collector was pressed to obtain a joined object. The obtained joined object was heated and dried for 6 hours at 100° C. in a vacuum dryer to obtain a negative electrode in which the negative electrode active material layer was formed on the negative electrode current collector.

As the separator, a nonwoven fabric made from cellulose and having a thickness of 20 μm was prepared.

An electrode assembly was formed by sandwiching the separator between the positive electrode and the negative electrode. The electrode assembly was covered with a set of two sheets of a laminate film. The laminate film was formed into a bag-like shape by having three sides thereof sealed, and electrolytic solution E8 was poured in the laminate film. Four sides were sealed airtight by sealing the remaining one side to obtain a nonaqueous electrolyte secondary battery EB17 in which the electrode assembly and the electrolytic solution were sealed.

(EB18)

A nonaqueous electrolyte secondary battery EB18 using electrolytic solution E8 was produced in the following manner.

A positive electrode was produced similarly to the positive electrode of EB17.

90 parts by mass of natural graphite which is a negative electrode active material and 10 parts by mass of PVdF which is a binding agent were mixed. This mixture was dispersed in a proper amount of ion exchanged water to obtain a negative electrode mixture in a slurry form. As the negative electrode current collector, a copper foil having a thickness of 20 μm was prepared. The negative electrode mixture was applied in a film form on the surface of the copper foil by using a doctor blade. A complex of the negative electrode mixture and the negative electrode current collector was dried to remove water, and then pressed to obtain a joined object. The obtained joined object was dried and heated for 6 hours at 120° C. in a vacuum dryer to obtain a negative electrode in which the negative electrode active material layer was formed on the negative electrode current collector. By using this negative electrode, the nonaqueous electrolyte secondary battery EB18 was obtained similarly to EB17.

(CB8)

A nonaqueous electrolyte secondary battery CB8 was obtained similarly to EB17 except for using electrolytic solution C5.

(CB9)

A nonaqueous electrolyte secondary battery CB9 was obtained similarly to EB18 except for using electrolytic solution C5.

Evaluation Example 38: Input-Output Characteristics of Nonaqueous Electrolyte Secondary Battery Output characteristics of EB17, EB18, CB8, and CB9 were evaluated using the following conditions.

(1) Input Characteristics Evaluation at 0° C. or 25° C., SOC 80%

The used evaluation conditions were: state of charge (SOC) of 80%, 0° C. or 25° C., usage voltage range of 3 V to 4.2 V, and capacity of 13.5 mAh. Evaluation of input characteristics of each of the batteries was performed three times each for 2-second input and 5-second input.

In addition, based on the volume of each of the batteries, battery output density (W/L) at 25° C. in 2-second input was calculated.

Evaluation results of input characteristics are shown in Table 40. In Table 40, "2-second input" refers to an input inputted at 2 seconds after the start of charging, and "5-second input" refers to an input inputted at 5 seconds after the start of charging.

As shown in Table 40, regardless of the difference in temperature, the input of EB17 was significantly higher than the input of CB8. Similarly, the input of EB18 was significantly higher than the input of CB9.

In addition, the battery input density of EB17 was significantly higher than the battery input density of CB8. Similarly, the battery input density of EB18 was significantly higher than the battery input density of CB9.

(2) Output Characteristics Evaluation at 0° C. or 25° C., SOC 20%

The used evaluation conditions were: state of charge (SOC) of 20%, 0° C. or 25° C., usage voltage range of 3 V to 4.2 V, and capacity of 13.5 mAh. SOC 20% at 0° C. is in a range in which output characteristics are unlikely to be exerted such as, for example, when used in a cold room. Evaluation of output characteristics of each of the batteries was performed three times each for 2-second output and 5-second output.

In addition, based on the volume of each of the batteries, battery output density (W/L) at 25° C. in 2-second output was calculated.

Evaluation results of output characteristics are shown in Table 40. In Table 40, "2-second output" refers to an output outputted at 2 seconds after the start of discharging, and "5-second output" refers to an output outputted at 5 seconds after the start of discharging.

As shown in Table 40, regardless of the difference in temperature, the output of EB17 was significantly higher than the output of CB8. Similarly, the output of EB18 was significantly higher than the output of CB9.

In addition, the battery output density of EB17 was significantly higher than the battery output density of CB8. Similarly, the battery output density of EB18 was significantly higher than the battery output density of CB9.

TABLE 40

| Battery<br>Electrolytic solution | | EB17<br>E8 | CB8<br>C5 | EB18<br>E8 | CB9<br>C5 |
|---|---|---|---|---|---|
| SOC80%, | 2-second input (mW) | 1285.1 | 732.2 | 1113.6 | 756.9 |
| 25° C. | 5-second input (mW) | 1004.2 | 602.2 | 858.2 | 614.2 |
| SOC80%, | 2-second input (mW) | 498.5 | 232.3 | 423.2 | 218.3 |
| 0° C. | 5-second input (mW) | 408.4 | 206.8 | 348.6 | 191.2 |
| SOC20%, | 2-second output (mW) | 924.6 | 493.5 | 1079.3 | 696.0 |
| 25° C. | 5-second output (mW) | 899.6 | 425.9 | 1057.3 | 659.9 |
| SOC20%, | 2-second output (mW) | 305.2 | 175.3 | 354.8 | 207.5 |
| 0° C. | 5-second output (mW) | 291.7 | 165.6 | 347.1 | 202.1 |
| Battery input density (W/L):<br>SOC80%, 25° C. | | 6255.0 | 3563.9 | 3762.1 | 2558.4 |
| Battery output density (W/L):<br>SOC20%, 25° C. | | 4497.4 | 2399.6 | 3647.1 | 2352.6 |

(EB19)

A nonaqueous electrolyte secondary battery EB19 using electrolytic solution E8 was produced in the following manner. A positive electrode was produced similarly to the positive electrode of EB17.

98 parts by mass of natural graphite, which is a negative electrode active material, and 1 part by mass of SBR and 1 part by mass of CMC which are binding agents were mixed. This mixture was dispersed in a proper amount of ion exchanged water to obtain a negative electrode mixture in a slurry form. By using this negative electrode mixture, a negative electrode was obtained similarly to EB17. As a separator, a filter paper for experiments (Toyo Roshi Kaisha, Ltd., made from cellulose, thickness of 260 μm) was prepared. By using the positive electrode, the negative electrode, and the separator described above, the nonaqueous electrolyte secondary battery EB19 was obtained similarly to EB17.

(CB10)

A nonaqueous electrolyte secondary battery CB10 was obtained similarly to EB19 except for using electrolytic solution C5.

Evaluation Example 39: Thermal Stability of Battery

Thermal stability of an electrolytic solution against a charged-state positive electrode of EB19 and CB10 was evaluated using the following method.

Figure 106:
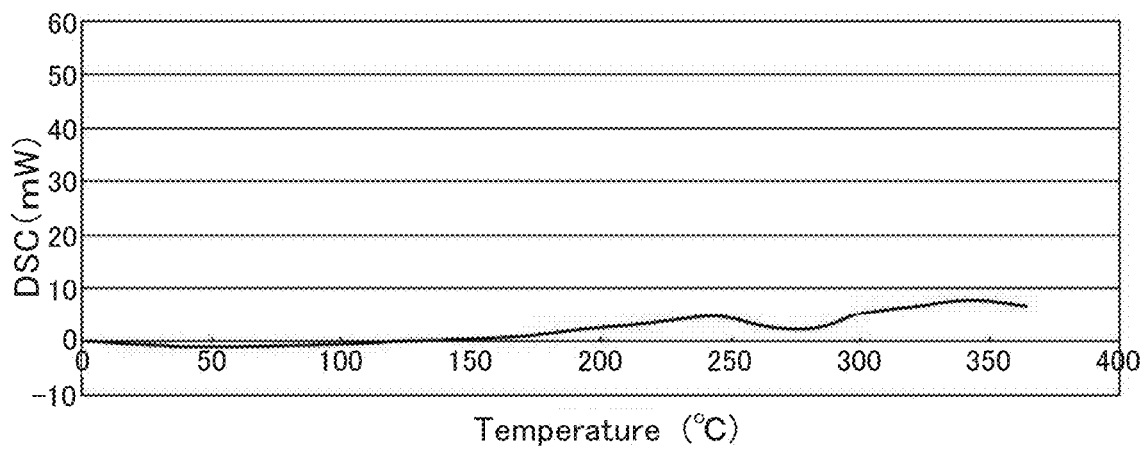
FIG. 106 shows a DSC chart of EB19 in Evaluation Example 39.

Each of the nonaqueous electrolyte secondary batteries was fully charged under constant current constant voltage conditions to obtain a charge end voltage of 4.2 V. The nonaqueous electrolyte secondary battery was disassembled after being fully charged, and the positive electrode thereof was removed. 3 mg of a positive electrode active material layer obtained from the positive electrode and 1.8 μL of an electrolytic solution were placed in a stainless steel pan, and the pan was sealed. Differential scanning calorimetry analysis was performed using the sealed pan under a nitrogen atmosphere at a temperature increase rate of 20° C./min., and a DSC curve was observed. As a differential scanning calorimeter, Rigaku DSC8230 was used. FIG. 106 shows a DSC chart obtained when the electrolytic solution and the charged-state positive electrode active material layer of EB19 were placed together. In addition, FIG. 107 shows a DSC chart obtained when the electrolytic solution and the charged-state positive electrode active material layer of CB10 were placed together.

Figure 107:
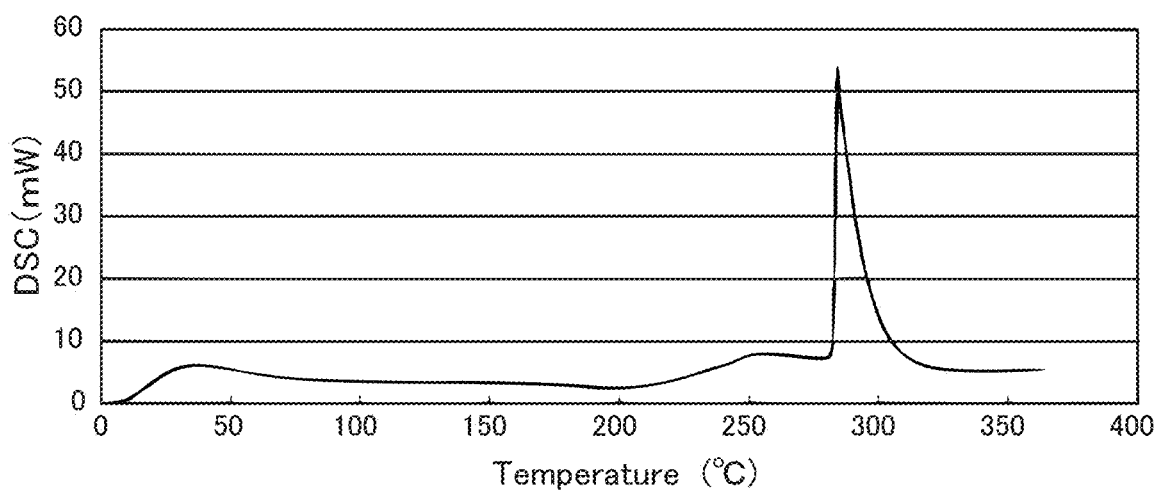
FIG. 107 shows a DSC chart of CB10 in Evaluation Example 39.

As obvious from the results of FIGS. 106 and 107, although endothermic/exothermic peaks were hardly observed in the DSC curve obtained when the electrolytic solution and the charged-state positive electrode of EB19 were placed together, an exothermic peak was observed at around 300° C. in the DSC curve obtained when the electrolytic solution and the charged-state positive electrode of CB10 were placed together. The exothermic peak is estimated to be generated as a result of a reaction between the positive electrode active material and the electrolytic solution.

Based on these results, when compared to a nonaqueous electrolyte secondary battery using a conventional electrolytic solution, the nonaqueous electrolyte secondary battery using the electrolytic solution of the present invention is understood as having excellent thermal stability since reactivity between the positive electrode active material and the electrolytic solution is low.

TABLE 41

| | Positive electrode NCM523: A3:PVdF | Positive electrode (counter electrode) | Negative electrode Natural graphite: PVdF | Electrolytic solution |
|---|---|---|---|---|
| Example 1-1 | | Li | 90:10 (graphite (A) G/D12.2) | E8 |
| Example 1-2 | | Li | 90:10 (graphite (B) G/D4.4) | E8 |
| Example 1-3 | | Li | 90:10 (graphite (C) G/D16.0) | E8 |
| Example 1-4 | | Li | 90:10 (graphite (C) G/D16.0) | E11 |
| Example 1-5 | 94:3:3 | | 90:10 (graphite (A) G/D12.2) | E8 |
| Example 1-6 | 94:3:3 | | 90:10 (graphite (A) G/D12.2) | E4 |
| Example 1-7 | 94:3:3 | | 90:10 (graphite (A) G/D12.2) | E8 |
| Example 1-8 | | Li | 90:10 (G/D4.4) | E11 |
| Example 1-9 | | Li | 90:10 (G/D4.4) | E8 |
| Example 1-10 | | Li | 90:10 (G/D4.4) | E16 |
| Example 1-11 | | Li | 90:10 (G/D4.4) | E19 |
| Example 1-12 | | Li | 90:10 (graphite (B) G/D4.4) | E9 |
| Comparative Example 1-1 | | Li | 90:10 (graphite (D) G/D3.4) | E8 |
| Comparative Example 1-2 | | Li | 90:10 (graphite (E) G/D3.2) | E8 |
| Comparative Example 1-3 | | Li | 90:10 (graphite (A) G/D12.2) | C5 |

TABLE 41-continued

| | Positive electrode NCM523: A3:PVdF | Positive electrode (counter electrode) | Negative electrode Natural graphite: PVdF | Electrolytic solution |
|---|---|---|---|---|
| Comparative Example 1-4 | | Li | 90:10 (graphite (B) G/D4.4) | C5 |
| Comparative Example 1-5 | | Li | 90:10 (graphite (C) G/D16.0) | C5 |
| Comparative Example 1-6 | | Li | 90:10 (graphite (D) G/D3.4) | C5 |
| Comparative Example 1-7 | | Li | 90:10 (graphite (3) G/D3.2) | C5 |
| Comparative Example 1-8 | 94:3:3 | | 90:10 (graphite (A) G/D12.2) | C5 |
| Comparative Example 1-9 | 94:3:3 | | 90:10 (graphite (A) G/D12.2) | C5 |
| Comparative Example 1-10 | | Li | 90:10 (G/D4.4) | C5 |

TABLE 42

| | Positive electrode (counter electrode) | Negative electrode | | | Electrolytic solution |
|---|---|---|---|---|---|
| | | Carbon material | Crystallite size (nm) | Carbon material: PVdF | |
| Example 2-1 | Li | Hard carbon | 1.1 | 90:10 | E8 |
| Example 2-2 | Li | Soft carbon | 4.2 | 90:10 | E8 |
| Example 2-3 | Li | Hard carbon | 1.1 | 90:10 | E11 |
| Example 2-4 | Li | Soft carbon | 4.2 | 90:10 | E11 |
| Comparative Example 2-1 | Li | Hard carbon | 1.1 | 90:10 | C5 |
| Comparative Example 2-2 | Li | Graphite | 28 | 90:10 | E8 |
| Comparative Example 2-3 | Li | Graphite | 42 | 90:10 | E8 |
| Comparative Example 2-4 | Li | Hard carbon | 1.1 | 90:10 | C5 |
| Comparative Example 2-5 | Li | Soft carbon | 4.2 | 90:10 | C5 |
| Comparative Example 2-6 | Li | Graphite | 28 | 90:10 | C5 |
| Comparative Example 2-7 | Li | Graphite | 42 | 90:10 | C5 |

TABLE 43

| | Positive electrode (counter electrode) | Negative electrode | | Electrolytic solution |
|---|---|---|---|---|
| | | Si-C: PVdF | Si-C: graphite:PAI | |
| Example 3-1 | Li | 90:10 | | E8 |
| Example 3-2 | Li | | 75:15:10 | E8 |
| Example 3-3 | Li | | 75:15:10 | E11 |
| Comparative Example 3-1 | Li | 90:10 | | C5 |
| Comparative Example 3-2 | Li | | 75:15:10 | C5 |

TABLE 44

| | Positive electrode (counter electrode) | Negative electrode (LTO:SBR:CMC:KB) | Electrolytic solution |
|---|---|---|---|
| Example 4-1 | Li | 90:2:2:6 | E8 |
| Example 4-2 | Li | 90:2:2:6 | E11 |
| Example 4-3 | Li | 90:2:2:6 | E13 |
| Comparative Example 4-1 | Li | 90:2:2:6 | C5 |

TABLE 45

| | Positive electrode (NCM523: AB:PVdF) | Negative electrode (natural graphite: SBR:CMC) | Electrolytic solution |
|---|---|---|---|
| Example 5-1 | 94:3:3 | 98:1:1 (spheroidal) | E8 |
| Example 5-2 | 94:3:3 | 98:1:1 (spheroidal) | E10 |
| Comparative Example 5-1 | 94:3:3 | 98:1:1 (flake-like) | E8 |
| Comparative Example 5-2 | 94:3:3 | 98:1:1 (spheroidal) | C5 |
| Comparative Example 5-3 | 94:3:3 | 98:1:1 (spheroidal) | C5 |

INDUSTRIAL APPLICABILITY

The nonaqueous electrolyte secondary battery of the present invention can be utilized as secondary batteries, electric double layer capacitors, lithium ion capacitors, and the like. In addition, the nonaqueous electrolyte secondary battery of the present invention is useful as nonaqueous electrolyte secondary batteries utilized for driving motors of electric vehicles and hybrid automobiles and for personal computers, portable communication devices, home appliances, office instrument, industrial instrument, and the like. The nonaqueous electrolyte secondary battery of the present invention can be optimally used particularly for driving motors of electric vehicles and hybrid automobiles requiring large capacity and large output.

The invention claimed is:

1. A nonaqueous electrolyte secondary battery comprising a negative electrode and an electrolytic solution, wherein
the electrolytic solution contains a lithium salt having a chemical structure of an anion represented by Formula (7) below and an organic solvent, $$(R^{13}SO_2)(R^{14}SO_2)N \qquad \text{Formula (7),}$$

in Formula (7), $R^{13}$ and $R^{14}$ are each independently $C_nH_aF_bCl_cBr_dI_e$, "n," "a," "b," "c," "d," and "e" are each independently an integer not smaller than 0, and satisfy $2n+1=a+b+c+d+e$, and $R^{13}$ and $R^{14}$ can optionally bind with each other to form a ring, and, in the case, satisfy $2n=a+b+c+d+e$, the organic solvent comprises a linear carbonate represented by formula (10) below:

$$R^{19}OCOOR^{20} \qquad \text{Formula (10),}$$

in Formula (10), $R^{19}$ and $R^{20}$ are each independently selected from $C_nH_aF_bCl_cBr_dI_e$ that is a linear alkyl or $C_mH_fF_gCl_hBr_iI_j$ whose chemical structure includes a cyclicalkyl, "n," "a," "b," "c," "d," "e," "m," "f," "g," "h," "i," and "j" are each independently an integer not smaller than 0, and satisfy $2n+1=a+b+c+d+e$ and $2m-1=f+g+h+i+j$, regarding an intensity of a peak derived from the linear carbonate in a vibrational spectroscopy spectrum of the electrolytic solution, Is>Io is satisfied when an intensity of an original peak of the linear carbonate is represented as Io and an intensity of a peak resulting from shifting of the original peak is represented as Is, a concentration c (mol/L) of the lithium salt in the electrolytic solution is within a range of 2.2≤c, at least one of the following conditions 1 to 5 is satisfied:

Condition 1: The negative electrode includes, in a negative electrode active material, a graphite whose G/D ratio, which is a ratio of G-band and D-band peaks in a Raman spectrum, is not lower than 3.5;

Condition 2: The negative electrode includes, in a negative electrode active material, a carbon material whose crystallite size, calculated from a half width of a peak appearing at 2θ=20 degrees to 30 degrees in a X-ray diffraction profile measured by X-ray diffraction method, is not larger than 20 nm;

Condition 3: The negative electrode includes, in a negative electrode active material, silicon element and/or tin element;

Condition 4: The negative electrode includes, as a negative electrode active material, a metal oxide configured to occlude and release lithium ions;

Condition 5: The negative electrode includes, in a negative electrode active material, a graphite whose ratio (long axis/short axis) of long axis to short axis is 1 to 5, an ionic conductivity σ (mS/cm) of the electrolytic solution is 3<σ<100 mS/cm, an amount of the linear carbonate represented by formula (10) is at least 80 vol % when a total volume of the organic solvent is considered 100 vol %, and a molar ratio of the linear carbonate to the lithium salt is from 1.4 to 5.0.

2. The nonaqueous electrolyte secondary battery according to claim 1, wherein
the condition 1 is satisfied, and
the G/D ratio is not lower than 10.

3. The nonaqueous electrolyte secondary battery according to claim 1, wherein
the condition 2 is satisfied, and
the crystallite size is not larger than 5 nm.

4. The nonaqueous electrolyte secondary battery according to claim 1, wherein
the condition 3 is satisfied, and
the negative electrode active material includes silicon element.

5. The nonaqueous electrolyte secondary battery according to claim 1, wherein
the condition 3 is satisfied, and
the negative electrode active material includes silicon element, and oxygen element and/or carbon element.

6. The nonaqueous electrolyte secondary battery according to claim 1, wherein
the condition 4 is satisfied, and
the metal oxide includes, as a main component, at least one type selected from titanium oxides, lithium titanium oxides, tungsten oxides, amorphous tin oxides, and tin silicon oxides.

7. The nonaqueous electrolyte secondary battery according to claim 1, wherein
the condition 4 is satisfied, and
the metal oxide includes, as a main component, a lithium titanium oxide represented by $Li_{4+x}Ti_{5+y}O_{12}$ (x and y respectively satisfy −1≤x≤4 and −1≤y≤1).

8. The nonaqueous electrolyte secondary battery according to claim 1, wherein
the condition 5 is satisfied, and
I(110)/I(004) of particles of the graphite measured through X-ray diffraction is in a range of 0.03 to 1.

9. The nonaqueous electrolyte secondary battery according to claim 1, wherein the lithium salt is $(CF_3SO_2)_2NLi$, $(FSO_2)_2NLi$, $(C_2F_5SO_2)_2NLi$, $FSO_2(CF_3SO_2)NLi$, $(SO_2CF_2CF_2SO_2)NLi$, $(SO_2CF_2CF_2CF_2SO_2)NLi$, $FSO_2(CH_3SO_2)NLi$, $FSO_2(C_2F_5SO_2)NLi$, or $FSO_2(C_2H_5SO_2)NLi$.

10. The nonaqueous electrolyte secondary battery according to claim 1, wherein the linear carbonate is selected from dimethyl carbonate, ethyl methyl carbonate, or diethyl carbonate.

11. The nonaqueous electrolyte secondary battery according to claim 1, wherein a relationship between the Io and the Is is Is>2×Io.

12. The nonaqueous electrolyte secondary battery according to claim 1, wherein the density d (g/cm³) of the electrolytic solution is 1.2≤d≤2.2.

13. The nonaqueous electrolyte secondary battery according to claim 1, wherein the lithium salt is $(FSO_2)_2NLi$ (LiFSA).

14. The nonaqueous electrolyte secondary battery according to claim 1, wherein when the electrolytic solution comprises a plurality of organic solvents, the mass % of the organic solvent that is most easily coordinated with the cation of the lithium salt is 60% or higher with respect to the total mass of the plurality of organic solvents.

15. The nonaqueous electrolyte secondary battery according to claim 1, wherein the molar ratio of the linear carbonate to the lithium salt is from 1.4 to less than 3.5.

16. The nonaqueous electrolyte secondary battery according to claim 1, wherein the concentration c (mol/L) of the lithium salt in the electrolytic solution is within the range of 2.6≤c.

17. The nonaqueous electrolyte secondary battery according to claim 1, wherein the concentration c (mol/L) of the lithium salt in the electrolytic solution is within the range of 2.9≤c.

18. The nonaqueous electrolyte secondary battery according to claim 1, wherein the concentration c (mol/L) of the lithium salt in the electrolytic solution is within the range of 3.0≤c.

19. The nonaqueous electrolyte secondary battery according to claim 1, wherein the lithium salt is $(FSO_2)_2NLi$ (LiFSA) and the concentration c (mol/L) of the lithium salt in the electrolytic solution is within the range of 2.6≤c.

20. The nonaqueous electrolyte secondary battery according to claim 1, wherein the lithium salt is $(FSO_2)_2NLi$ (LiFSA) and the concentration c (mol/L) of the lithium salt in the electrolytic solution is within the range of 2.9≤c.

21. The nonaqueous electrolyte secondary battery according to claim 1, wherein the lithium salt is $(FSO_2)_2NLi$ (LiFSA) and the concentration c (mol/L) of the lithium salt in the electrolytic solution is within the range of 3.0≤c.

* * * * *